US010676383B2

(12) United States Patent
Graves

(10) Patent No.: US 10,676,383 B2
(45) Date of Patent: Jun. 9, 2020

(54) HIGH EFFICIENCY WASTEWATER TREATMENT SYSTEM

(71) Applicant: Gregory D. Graves, Milan, OH (US)

(72) Inventor: Gregory D. Graves, Milan, OH (US)

( * ) Notice: Subject to any disclaimer, the term of this patent is extended or adjusted under 35 U.S.C. 154(b) by 583 days.

(21) Appl. No.: 15/403,005

(22) Filed: Jan. 10, 2017

(65) Prior Publication Data

US 2017/0275193 A1 Sep. 28, 2017

Related U.S. Application Data

(63) Continuation-in-part of application No. 13/617,314, filed on Sep. 14, 2012, now Pat. No. 10,167,216.

(51) Int. Cl.

| | |
|---|---|
| ***C02F 9/00*** | (2006.01) |
| *C02F 101/16* | (2006.01) |
| *C02F 101/20* | (2006.01) |
| *C02F 1/00* | (2006.01) |
| *C02F 3/20* | (2006.01) |
| *C02F 1/76* | (2006.01) |
| *C02F 1/28* | (2006.01) |

(Continued)

(52) U.S. Cl.

CPC ................ *C02F 9/00* (2013.01); *C02F 1/004* (2013.01); *C02F 1/283* (2013.01); *C02F 1/32* (2013.01); *C02F 1/444* (2013.01); *C02F 1/76* (2013.01); *C02F 3/20* (2013.01); *C02F 3/308* (2013.01); *C02F 2101/16* (2013.01); *C02F 2101/163* (2013.01); *C02F 2101/20* (2013.01); *C02F 2203/006* (2013.01); *C02F 2209/008* (2013.01); *C02F 2209/40* (2013.01); *C02F 2301/046* (2013.01); *C02F 2303/185* (2013.01); *Y02W 10/15* (2015.05)

(58) Field of Classification Search

None

See application file for complete search history.

(56) References Cited

U.S. PATENT DOCUMENTS

| | | | |
|---|---|---|---|
| 3,957,632 | A | 5/1976 | Knopp et al. |
| 4,122,013 | A | 10/1978 | Greenleaf |

(Continued)

FOREIGN PATENT DOCUMENTS

| | | | |
|---|---|---|---|
| CA | 2617162 | A1 | 7/2007 |
| CA | 2572353 | A1 | 4/2008 |

(Continued)

OTHER PUBLICATIONS

Non-Final Rejection issued in U.S. Appl. No. 13/617,314 dated Sep. 19, 2017.

(Continued)

*Primary Examiner* — Michael J Felton
*Assistant Examiner* — Katherine A Will
(74) *Attorney, Agent, or Firm* — Miles & Stockbridge P.C.; David R. Schaffer

(57) ABSTRACT

A high efficiency treatment system (system) wastewater treatment system including a tank with a multi-chamber tank system that is designed to remove pollutants from domestic wastewater. Embodiments of the system consist of a pre-treatment chamber, which is in fluid communication with an anoxic chamber, which is in fluid communication with an aeration chamber, which is in fluid communication with a clarification chamber, and which is in fluid communication with a polishing chamber. The system can be applied to remove suspended solids, BOD, ammonia, nitrate and TKN from wastewater.

78 Claims, 112 Drawing Sheets

(51) Int. Cl.

| | |
|---|---|
| *C02F 1/44* | (2006.01) |
| *C02F 1/32* | (2006.01) |
| *C02F 3/30* | (2006.01) |

(56) References Cited

U.S. PATENT DOCUMENTS

| | | | |
|---|---|---|---|
| 4,608,157 | A | 8/1986 | Graves |
| 5,413,706 | A | 5/1995 | Graves |
| 5,514,278 | A | 5/1996 | Khudenko |
| 5,582,733 | A | 12/1996 | Desbos |
| 5,605,629 | A | 2/1997 | Rogalla |
| 5,616,241 | A | 4/1997 | Khudenko |
| 6,015,496 | A | 1/2000 | Khudenko |
| 6,139,744 | A | 10/2000 | Spears |
| 6,163,932 | A | 12/2000 | Rosen |
| 6,555,002 | B2 | 4/2003 | Garcia |
| 6,692,642 | B2 | 2/2004 | Josse |
| 6,946,073 | B2 | 9/2005 | Daigger |
| 7,011,757 | B1 | 3/2006 | Reid |
| 7,261,811 | B2 | 8/2007 | Nakhla |
| 7,326,343 | B2 | 2/2008 | Nakhla |
| 7,648,634 | B2 | 1/2010 | Probst |
| 7,674,372 | B2 | 3/2010 | Graves |
| 7,713,413 | B2 | 5/2010 | Barnes |
| 7,736,513 | B2 | 6/2010 | Zhu |
| 8,012,352 | B1 | 9/2011 | Giraldo |
| 2004/0007523 | A1 | 1/2004 | Gabon |
| 2007/0187329 | A1 | 8/2007 | Moller |
| 2008/0179237 | A1 | 7/2008 | Graves |
| 2010/0200496 | A1 | 8/2010 | Graveleau |
| 2010/0282653 | A1 | 11/2010 | Korzeniowski |
| 2011/0168611 | A1 | 7/2011 | Early |
| 2014/0076800 | A1 | 3/2014 | Graves |

FOREIGN PATENT DOCUMENTS

| | | | |
|---|---|---|---|
| CA | 2617162 | A1 | 7/2008 |
| CA | 2751221 | A1 | 10/2012 |
| JP | 2007117908 | A | 5/2007 |

OTHER PUBLICATIONS

Canadian Office Action dated May 25, 2018 in corresponding Canadian Patent Application No. 2,961,073.

Final Rejection issued in U.S. Appl. No. 13/617,314 dated Jun. 1, 2017.

Office Action dated Dec. 11, 2017 for related Canadian Patent Application No. 2,961,073.

2500

L-L

2500

HIGH EFFICIENCY WASTEWATER TREATMENT SYSTEM

CROSS-REFERENCE TO RELATED APPLICATIONS

This application is a Continuation-in-part of U.S. patent application Ser. No. 13/617,314, which is hereby incorporated herein by reference in its entirety.

FIELD OF THE INVENTION

A High Efficiency Treatment System ("the system") is designed to remove pollutants from domestic wastewater. The system consists of one pretreatment chamber, one anoxic chamber, one aeration chamber, one clarification chamber and, in some embodiments, one polishing chamber. The system can be applied to remove suspended solids, BOD, ammonia, nitrate and TKN from wastewater.

BACKGROUND

The most widely used on-site wastewater treatment systems for individual households have traditionally been either septic systems or aerobic treatment units. Septic systems generally include a septic tank followed by a leaching tile field or a similar absorption device located downstream, but physically on-site of the individual residence. The septic tank allows for larger/heavier solids in the sewage to settle out within the tank, while anaerobic bacteria partially degrade the organic material in the waste. The discharge from the septic tank is further treated by dispersion into the soil through any number of soil absorption devices, such as a leaching tile field, whereby bacteria in the soil continue the biodegradation process.

SUMMARY

A High Efficiency Treatment System is designed to remove pollutants from domestic wastewater. Embodiments of the system, in general, can include (i.e., comprise) one pretreatment chamber, one anoxic chamber, one aeration chamber, one clarification chamber and, in some embodiments, one polishing chamber. The system can be applied to remove suspended solids, BOD, ammonia, nitrate and TKN from wastewater.

The system combines an aerobic process, an anaerobic process, an anoxic process, a clarification process and a polishing process in one treatment system. This combination of processes improves removal efficiencies of total nitrogen, SS and $BOD_5$. Also, the system has the advantage of consuming less power. Surprisingly, a recirculation pump that consumes low energy and is operated intermittently for short periods for example, but not limited to, about 5 to 20 and 10 to 15, 10 to 20, and 15 to 25 seconds, as well as ranges there between that total only 15 to 50 minutes per day has been applied to successfully treat domestic wastewater. This equipment plays a key role in the treatment processes for aerating mixed liquor, returning the activated sludge from the clarification chamber to the anoxic chamber, and mixing the returned sludge in the anoxic chamber.

A polishing chamber, which can be equipped with various final treatment pieces of equipment, is used to filter and/or disinfect the effluent from the clarification chamber. The optimal design of the filter is used to polish the effluent from the clarification chamber for 10 to 18 months without any required maintenance service.

The filtrate from the system contains low pollutants. If the influent characteristics are in certain ranges, the pollutants that are monitored by regulators and/or health authorities can be reduced to low levels.

BRIEF DESCRIPTION OF THE DRAWINGS

This application is a Continuation-in-part of U.S. patent application Ser. No. 13/617,314, which is hereby incorporated herein by reference in its entirety.

Non-limiting and non-exhaustive embodiments of the disclosed subject matter are described with reference to the following figures, wherein like reference numerals and/or indicia refer to like parts throughout the various views unless otherwise precisely specified.

FIG. 111 is a lateral cross-sectional view along line A"-A" of the pretreatment chamber in FIG. 109, in accordance with one or more embodiments of the disclosed subject matter.

FIG. 112 is a lateral cross-sectional view along line B"-B' of the anoxic chamber in FIG. 109, in accordance with one or more embodiments of the disclosed subject matter.

FIG. 113 is a lateral cross-sectional view along line C"-C" of the aerobic chamber in FIG. 109, in accordance with one or more embodiments of the disclosed subject matter.

FIG. 114 is a lateral cross-sectional view along line $D_1$"-$D_1$" of the clarification chamber in FIG. 109, in accordance with one or more embodiments of the disclosed subject matter.

FIG. 115 is a lateral cross-sectional view along line $D_2$""-$D_2$"" of the polishing chamber in FIG. 109, in accordance with one or more embodiments of the disclosed subject matter.

FIG. 116 is a lateral cross-sectional view along line $D_3$""-$D_3$"" of the polishing chamber in FIG. 109, in accordance with one or more embodiments of the disclosed subject matter.

FIG. 117 is a top right rear perspective view of the wastewater treatment system in FIGS. 108 and 109, in accordance with one or more embodiments of the disclosed subject matter.

FIG. 118 is a top view of a bio-film reactor element positioned in a reactor baffle, in accordance with one or more embodiments of the disclosed subject matter.

FIG. 119 is an isometric view of the bio-film reactor element and reactor baffle of FIG. 118 with an example of attached growth media that are contained in the bio-film reactor, in accordance with one or more embodiments of the disclosed subject matter.

FIG. 120 is a close-up, isometric view of an exemplary media unit or a media member or a media material or a media segment or a media piece or an attached growth media (hereinafter all referred to as "attached growth media) of FIG. 118, in accordance with one or more embodiments of the disclosed subject matter.

FIG. 121 is a side view of the bio-film reactor element and reactor baffle of FIG. 118 with an example of attached growth media that are contained in the bio-film reactor, in accordance with one or more embodiments of the disclosed subject matter.

FIG. 122 is an open end view of the bio-film reactor element and reactor baffle of FIG. 118 with an example of attached growth media that are contained in the bio-film reactor, in accordance with one or more embodiments of the disclosed subject matter.

Figure 123:
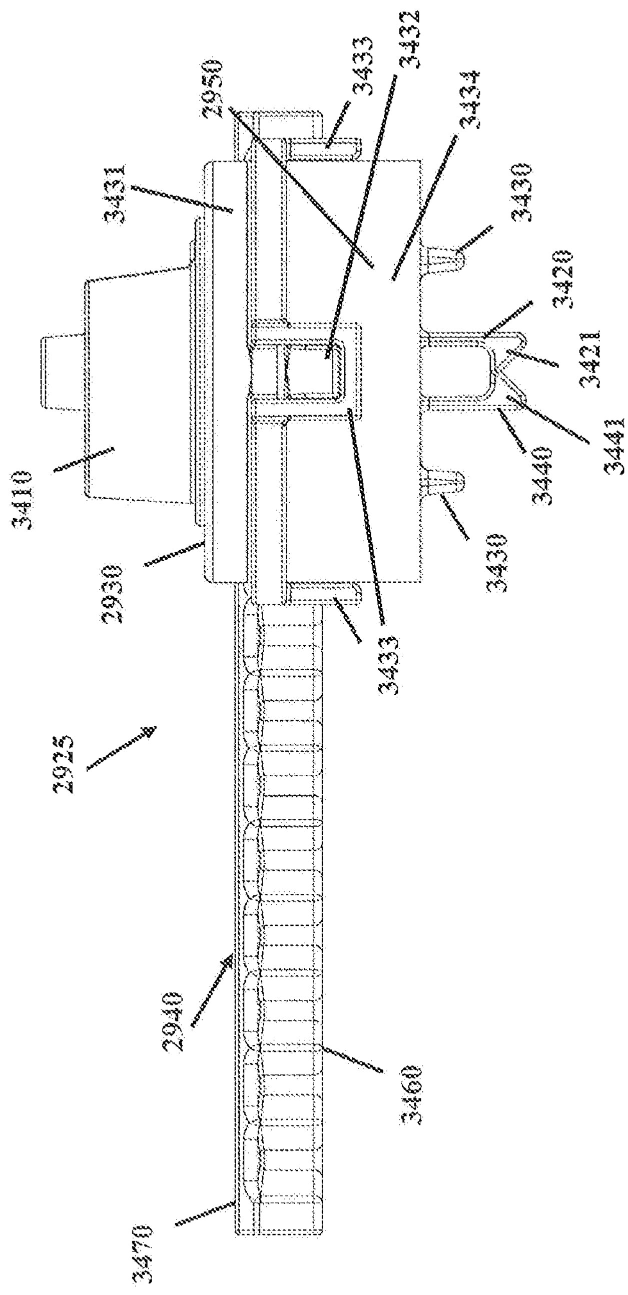

FIG. 123 is a side view of a slide lock assembly for a bio-film reactor element, in accordance with one or more embodiments of the disclosed subject matter.

Figure 124:
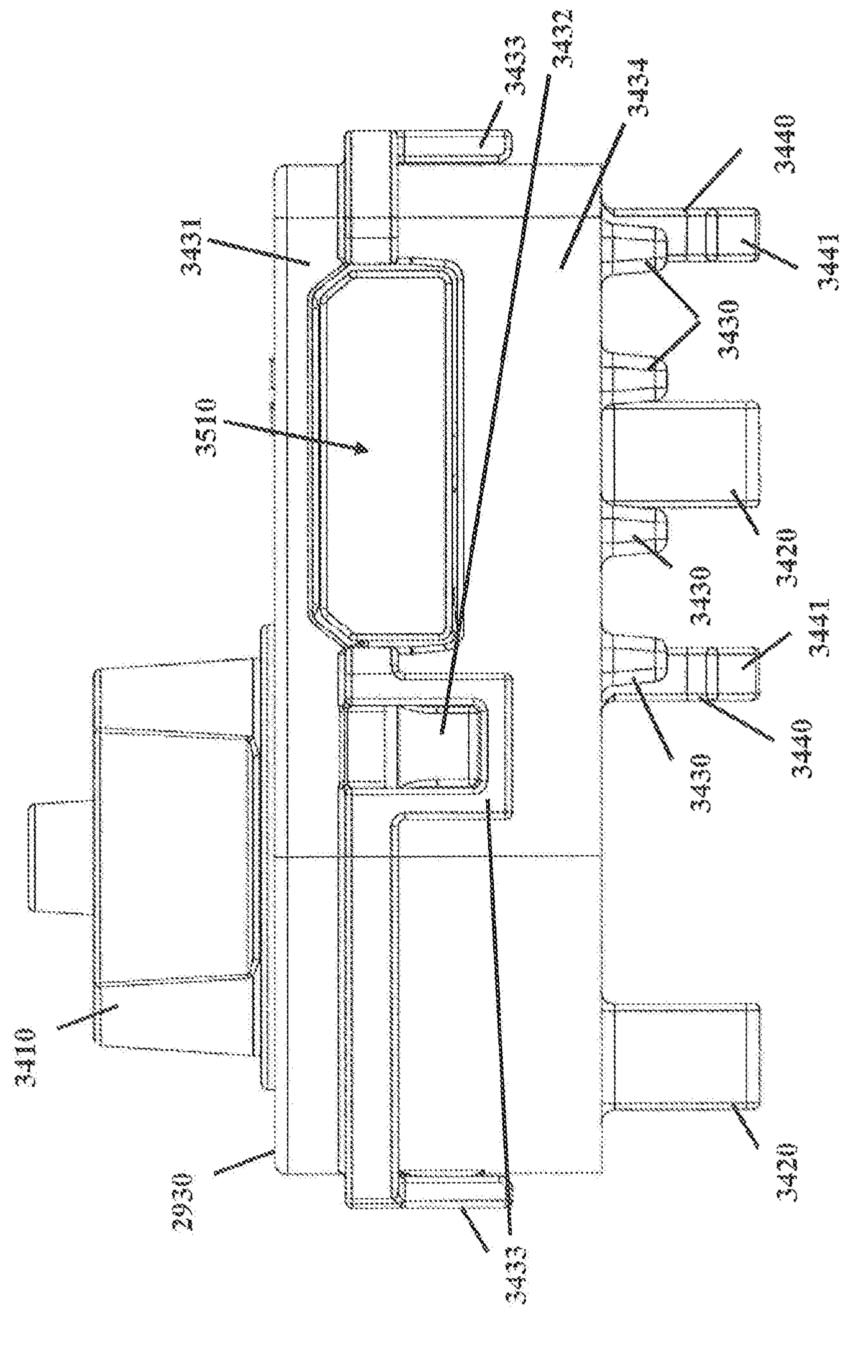

FIG. 124 is an end view of the slide lock assembly of FIG. 123 for a bio-film reactor element, in accordance with one or more embodiments of the disclosed subject matter.

Figure 125:
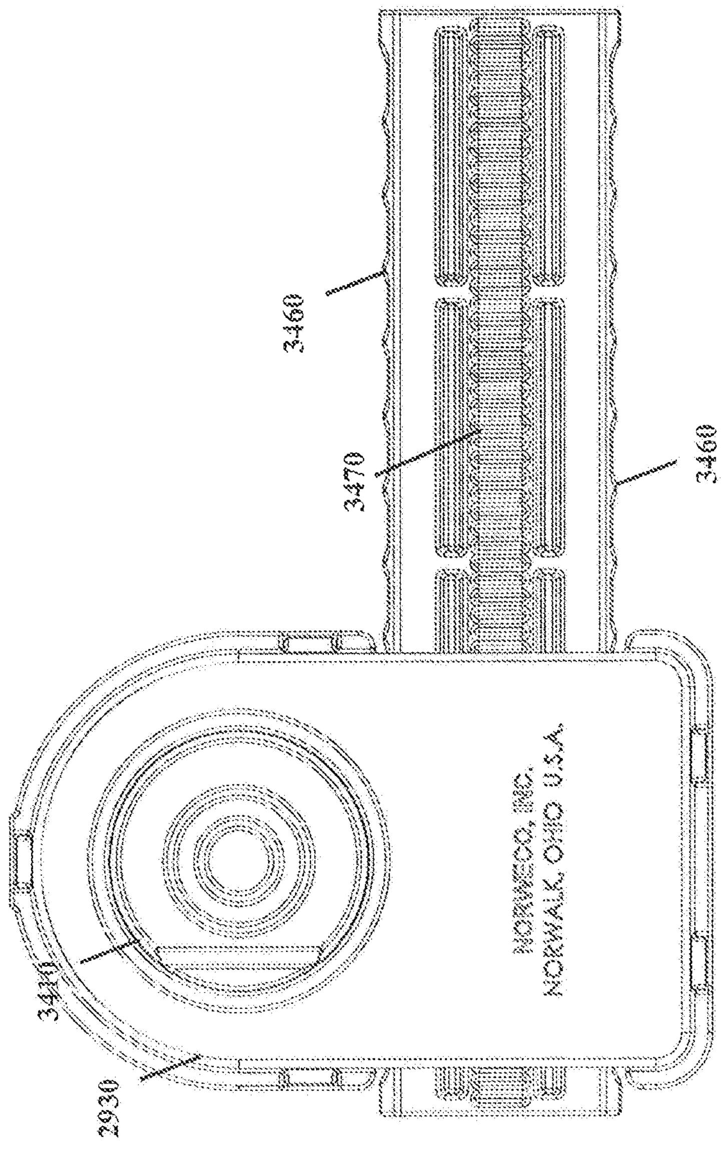

FIG. 125 is a top view of the slide lock assembly of FIG. 123 for a bio-film reactor element, in accordance with one or more embodiments of the disclosed subject matter.

Figure 126:
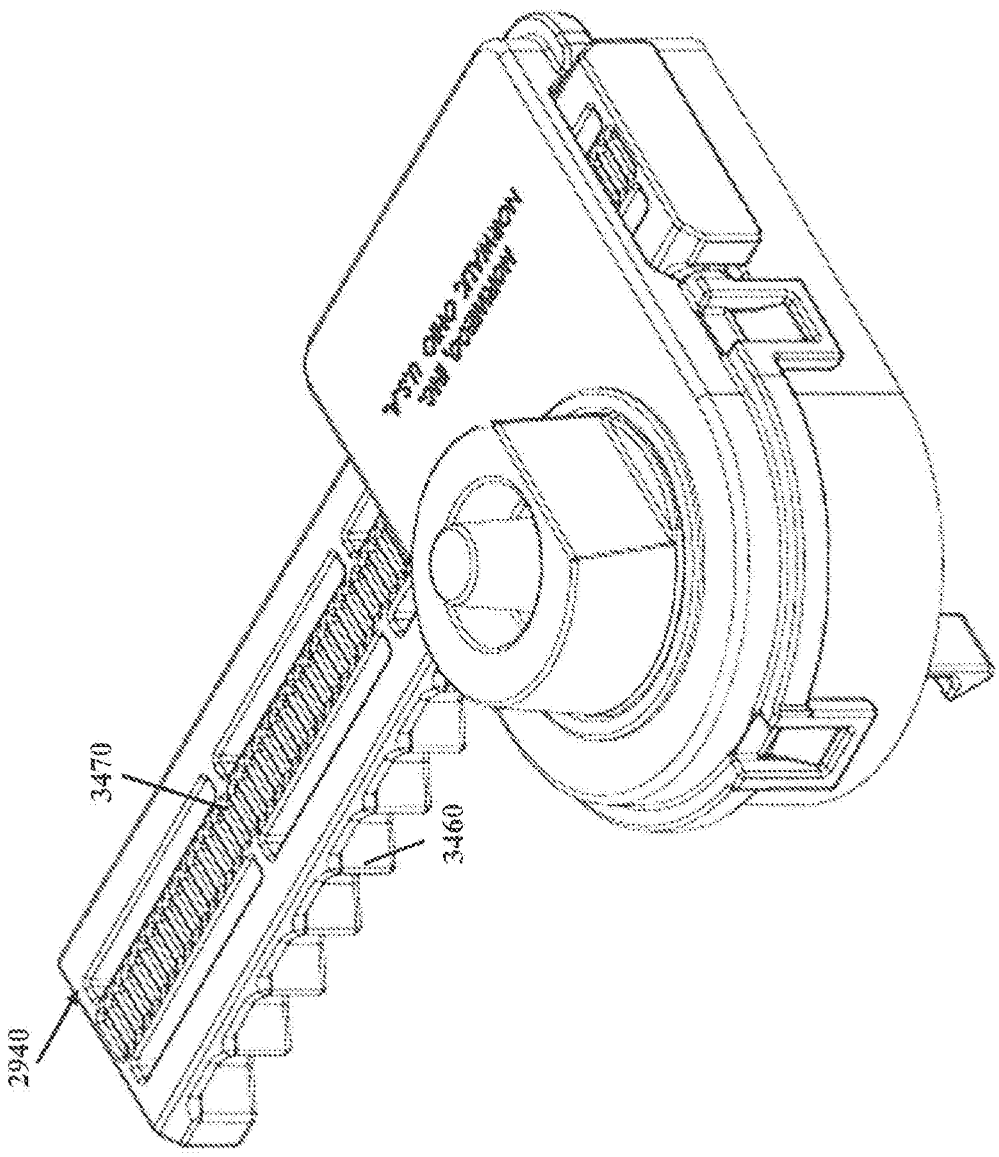

FIG. 126 is an isometric view of the slide lock assembly of FIG. 123 for a bio-film reactor element, in accordance with one or more embodiments of the disclosed subject matter.

Figure 127:
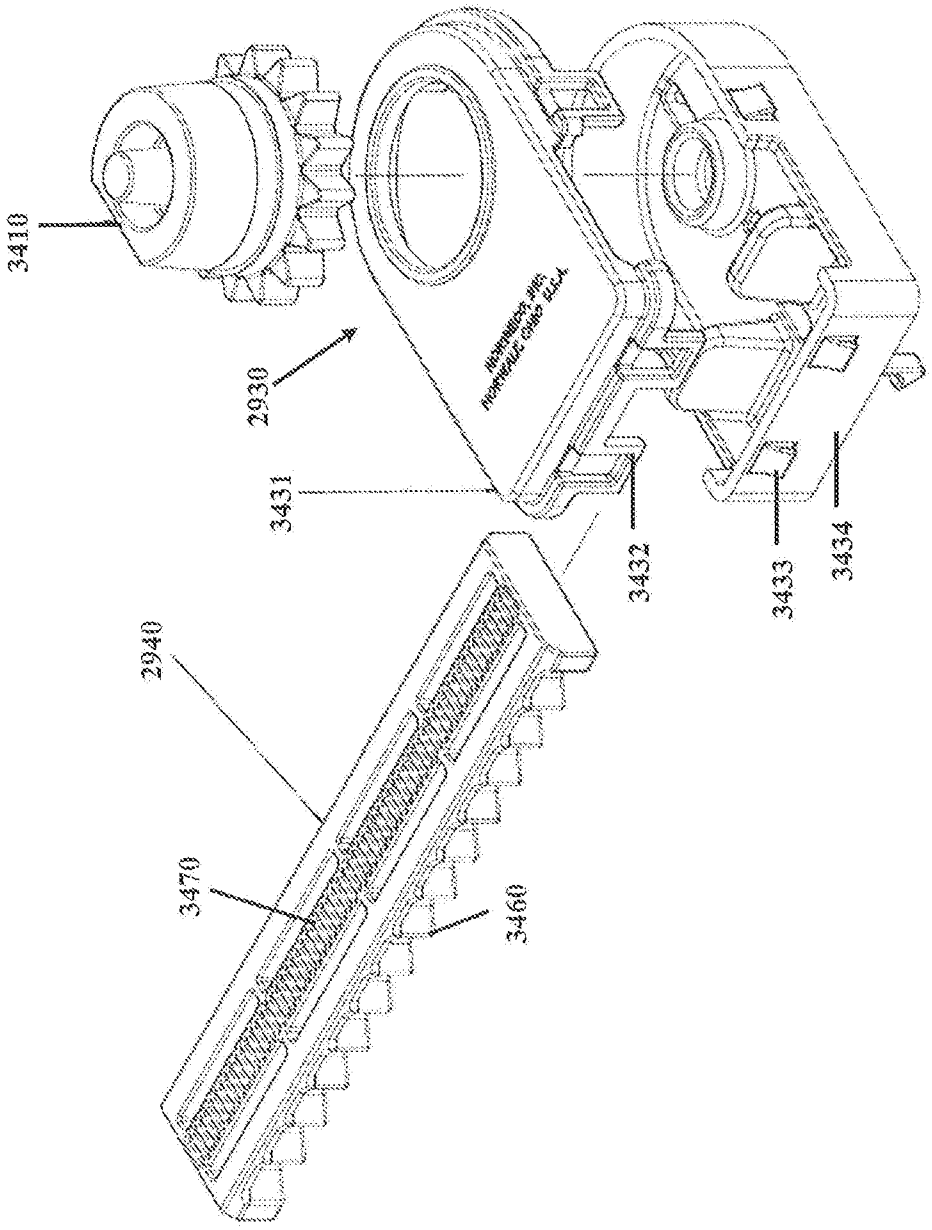

FIG. 127 is an exploded, isometric view of the slide lock assembly of FIG. 126 for a bio-film reactor element, in accordance with one or more embodiments of the disclosed subject matter.

DETAILED DESCRIPTION

The disclosed subject matter relates to a High Efficiency Treatment System that is designed to remove pollutants from domestic wastewater. Embodiments of the system, in general, can include (i.e., comprise) one pretreatment chamber, one anoxic chamber, one aeration chamber, one clarification chamber and, in some embodiments, one polishing chamber. The system can be applied to remove suspended solids, BOD, ammonia, nitrate and TKN from wastewater.

The system combines an aerobic process, an anoxic process, a clarification process and a polishing process in one treatment system. This combination of processes improves removal efficiencies of total nitrogen, SS and $BOD_5$. Also, the system has the advantage of consuming less power. Surprisingly, a recirculation pump that consumes low energy and is operated intermittently for short periods for example, but not limited to, about 5 to 20, 10 to 15, 10 to 20, and 15 to 25 seconds, as well as ranges there between for a total of only 15 to 50 minutes per day has been applied to successfully treat domestic wastewater. This equipment plays a key role in the treatment processes for aerating mixed liquor, returning the activated sludge from the clarification chamber to the anoxic chamber, and mixing the returned sludge in the anoxic chamber.

A polishing chamber, which can be equipped with various final treatment pieces of equipment, is used to filter and/or disinfect the effluent from the clarification chamber. The optimal design of the filter is used to polish the effluent from the clarification chamber in 10 to 18 months without any required maintenance service.

The filtrate from the system contains low pollutants. If the influent characteristics are in certain ranges, the pollutants that are monitored by regulators and/or health authorities can be reduced to low levels.

Figure 1:
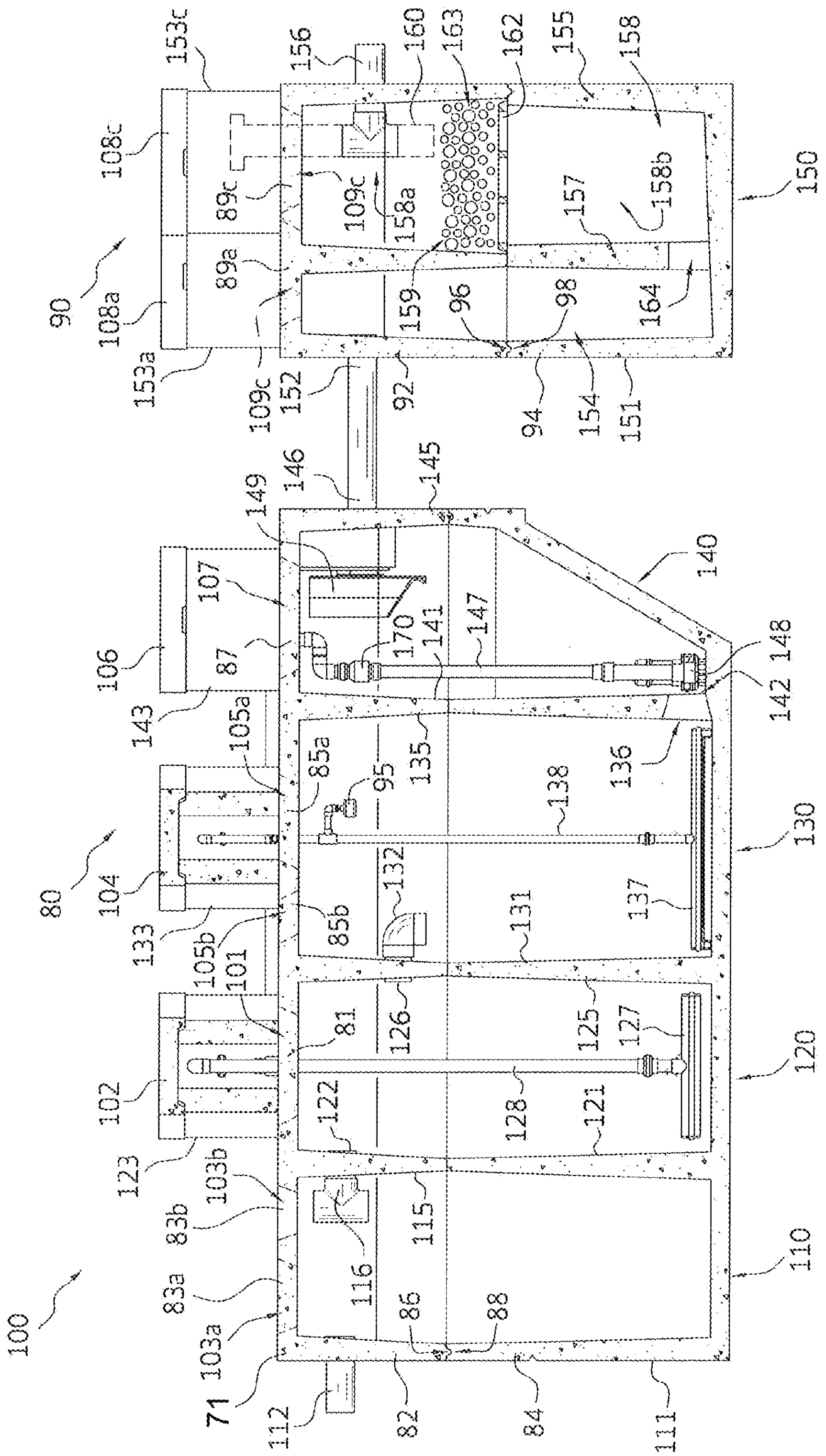
FIG. 1 is a cross-sectional, side view of a wastewater treatment system tank with a pretreatment chamber, an anoxic chamber, an aeration chamber, a clarification chamber and a polishing chamber, in accordance with one or more embodiments of the disclosed subject matter.

FIG. 1 is a cross-sectional, side view of a wastewater treatment system with a pretreatment chamber, an anoxic chamber, an aeration chamber, a clarification chamber and a polishing chamber, in accordance with one or more embodiments of the disclosed subject matter. In FIG. 1, a wastewater treatment system 100 includes a first component 80 and a second component 90. In the embodiment illustrated in FIG. 1, the first and second components 80, 90 each include a top half 82, 92 and a bottom half 84, 94, respectively. In general, the top components 82, 92 have a ridge 86, 96 extending from a bottom edge and the bottom components 84, 92 have a reciprocally shaped groove 88, 98, respectively, to receive the appropriate top component ridge 86, 96 when the two components are assembled together. The first component 80 includes a pretreatment chamber 110, an anoxic chamber 120 in fluid communication with the pretreatment chamber 110, an aeration chamber 130 in fluid communication with the anoxic chamber 120, a clarification chamber 140 in fluid communication with the aeration chamber 130 and the anoxic chamber 120. The second component 90 includes a polishing chamber 150 in fluid communication with the clarification chamber 140 of the first component 80.

In FIG. 1, the pretreatment chamber 110 has a front wall 111 through which an influent inlet pipe 112 is located in an upper left corner of the front wall 111, when viewed from the outside and facing the front wall 111 (see FIG. 3A), and provides access for an incoming flow of wastewater to be treated. The pretreatment chamber 110 also has a back wall 115 through which an outlet pipe 116 is located in an upper right corner of the back wall 115 (see FIG. 3B) and permits pretreated wastewater to flow into the anoxic chamber 120. Located in a top wall 71 of the pretreatment chamber 110 and above an exit of the influent inlet pipe 112 is a frustoconical first access opening 103*a* with a reciprocal frustoconical first access opening cover 83*a*. Also located in the top wall of the pretreatment chamber 110 and above an entrance of the outlet pipe 116 is a frustoconical second access opening 103*b* with a reciprocal frustoconical second access opening cover 83*b*. In general, the pretreatment chamber outlet pipe 116 is located at a height that is slightly below, for example, about 1 inch below, the pretreatment chamber influent inlet pipe 112.

In FIG. 1, the anoxic chamber 120 has a front wall 121 through which an inlet pipe 122 is located in an upper right corner of the front wall 121, when looking back toward the pretreatment chamber 110, and provides access for an incoming flow of pretreated wastewater from the pretreatment chamber 110. In fact, the anoxic chamber front wall 121 is also the pretreatment chamber back wall 115 and the anoxic chamber inlet pipe 122 is directly connected to and in fluid communication with the pretreatment chamber outlet pipe 116. The anoxic chamber 120 also has a back wall 125 through which an outlet pipe 126 is located in an upper left corner of the back wall 125 (see FIG. 3C) and permits anoxically treated wastewater to flow into the aeration chamber 130. In general, the anoxic chamber outlet pipe 126 is located at a height that is below the anoxic chamber influent inlet pipe 122. Located in a top wall of the anoxic chamber 120 and adjacent to the anoxic chamber inlet pipe 122 is a frustoconical access opening 101, which can include a reciprocal frustoconical first access opening cover 81. An anoxic chamber riser 123 is sealingly affixed around and extends upwardly away from opening 101 and riser 123 is covered by an anoxic chamber riser cover 102.

In FIG. 1, the aeration chamber 130 has a front wall 131 through which an inlet pipe 132 is located in an upper left corner of the front wall 131, when looking back toward the anoxic chamber 120, and provides access for an incoming flow of anoxically treated wastewater from the anoxic chamber 120. In fact, the aeration chamber front wall 131 is also the anoxic chamber back wall 125 and the aeration chamber inlet pipe 132 is directly connected to and in fluid communication with the anoxic chamber outlet pipe 126. The aeration chamber 130 also has a back wall 135 through which an outlet opening 136 is located in a bottom center of the back wall 135 (see FIG. 3D) and permits aerated wastewater to flow into the clarification chamber 140. In general, the aeration chamber outlet opening 136 is located at a height that is well below the aeration chamber inlet pipe 132 and permits a back and forth flow of wastewater between the aeration chamber 130 and the clarification chamber 140. Located in a top wall of the aeration chamber 130 and adjacent to the aeration chamber inlet pipe 132 is a frustoconical access opening 105*b* with a reciprocal frustoconical first access opening cover 85*b*. Also located in the top wall of the aeration chamber 130 on the same side as and in-line with access openings 103*b* and 101 is a frustoconical second access opening 105*a* which can include a reciprocal frustoconical second access opening cover 85*a*. An aeration chamber riser 133 is sealingly affixed around and extends upwardly away from opening 105*a* and riser 133 is covered by an aeration chamber riser cover 104.

The clarification chamber 140 has a front wall 141 through which an inlet opening 142 is located in a bottom center of the clarification chamber front wall 141 and provides access for an incoming flow of aerated wastewater from the aeration chamber 130. In fact, the clarification chamber front wall 141 is also the aeration chamber back wall 135 and the clarification chamber inlet opening 142 is directly connected to and in fluid communication with the aeration chamber outlet opening 136. The clarification chamber 140 also has a back wall 145 through which an outlet pipe 146 is located in a top center of the back wall 145 and permits clarified wastewater to flow into the polishing chamber 150. A flow equalization device 149 is positioned in front of and controls the flow to the clarification chamber outlet pipe 146 (see FIG. 3E). In general, the clarification chamber outlet pipe 146 is located at a height that is well above the clarification chamber inlet opening 142 and permits a one way flow of wastewater from the clarification chamber 140 to the polishing chamber 150. Located in substantially the center of a top wall of the clarification chamber 140 and above the clarification chamber inlet pipe 142, the flow equalization unit 149 and the clarification chamber outlet pipe 146 is a frustoconical access opening 107, which can include a reciprocal frustoconical first access opening cover 87. A clarification chamber riser 143 is sealingly affixed around and extends upwardly away from opening 107 and riser 143 is covered by a clarification chamber riser cover 106.

In FIG. 1, the polishing chamber 150 is shown as a separate system/component that is connected to and in fluid communication with the clarification chamber 140 via the clarification chamber outlet pipe 146, which connects to and is in fluid communication with a polishing chamber inlet pipe 152 in a front wall 151 of the polishing chamber 150. The polishing chamber inlet pipe 152 is located in a top center of the polishing chamber front wall 151 and provides access for an incoming flow of clarified wastewater from the clarification chamber 140. The polishing chamber 150 also has a back wall 155 through which an effluent outlet pipe 156 is located in a top center of the back wall 155 and permits fully treated wastewater to flow out of the polishing chamber 150. In general, the polishing chamber outlet pipe 156 is located at a height that is below the polishing chamber inlet opening 152 and permits a one way flow of wastewater from the clarification chamber 140 into and out of the polishing chamber 150. Located in a top wall of the polishing chamber 150 and above the polishing chamber inlet pipe 152 is a first frustoconical access opening 109*a*, which can include a first reciprocal frustoconical first access opening cover 89*a*. Also located in the top wall of the polishing chamber 150, but on the back wall 155 side of the top wall and adjacent to but not directly above the polishing chamber outlet pipe, is a third frustoconical second access opening 109*c*, which can include a third reciprocal frustoconical second access opening cover 89*c*. Although not shown in FIG. 1, located in the top wall of the polishing chamber 150, but on the back wall 155 side of the top wall and adjacent to but not directly above the polishing chamber outlet pipe, is a second frustoconical access opening 109*b* (See FIG. 2), which can include a second reciprocal frustoconical third access opening cover 89*b* (see FIG. 2). The second and third access openings 109*b* and 109*c* are substantially aligned with each other along the polishing chamber back wall 155 and offset from the first access opening 109*a*. A first, second and third polishing chamber risers 153*a*, 153*b*, 153*c* are each sealingly affixed around and extend upwardly away from openings 109*a*, 109*b*, 109*c*, respectively, and each of risers is covered by a polishing chamber riser cover 108*a*, 108*b*, 108*c*, respectively.

The embodiment of the system 100 in FIG. 1 is divided into two systems. In order to meet different application treatment requirements, the system is designed in different combinations to meet the different discharge requirements. For example, if a local authority requires a treatment plant to meet regular discharge limits or stringent discharge limits, a system including the first component 80 having the pre-treatment, anoxic, aeration and clarification chambers 110, 120, 130, 140 can be applied to meet the discharge limits. If water reuse or a water recycling program is required, the second component 90 including the polishing chamber 150 can be added after the clarification chamber. Under such a situation or application, the system can be used as the first treatment step. Some additional polishing processes can be considered after the polishing chamber filtration. For example, chlorination, de-chlorination, de-nitrification, nitrogen/nitrate removal, phosphorus removal, carbon filtration and an ultra-filtration process or a similar process can be applied to enhance the water quality. After the polishing filtration treatment, the water quality meets the requirements for non-potable reuse. The function of the pretreatment chamber 110 is to remove grit, floating material and large suspended particles from domestic wastewater. The wastewater is preconditioned by passing through the pretreatment chamber 110 prior to being introduced to the anoxic chamber 120. The outlet pipe 116 of the pretreatment chamber is equipped with a discharge tee or a baffle that extends vertically into the liquid so that only supernatant is displaced to the anoxic chamber 120. The distance between the inlet 112 and outlet 116 of the pretreatment chamber is designed to be as far apart as possible. This design creates a good settling condition and improves solids removal efficiency.

As described above, the system 100 is different from any residential sewage treatment system. Not only does it use an aeration process, but it also uses anoxic and anaerobic processes. The purpose of using the anoxic chamber 120 in the system is to remove nitrate and total nitrogen. In a regular aeration treatment system, ammonia nitrogen is converted into nitrate by nitrifiers under an aerobic condition. A de-nitrification process must be applied to remove nitrate from treated effluent. Since the nitrate removal process (de-nitrification) needs certain organic nutrition, alkalinity and an anoxic condition for de-nitrifiers, this anoxic chamber receives the returned mixture of clarification chamber liquid and settled activated sludge containing nitrate from clarification chamber, and effluent containing certain amounts of organic nutrition from pretreatment chamber. Under the anoxic environment and mixing condition, the incubated de-nitrification bacteria in the anoxic chamber converts nitrate into nitrogen gas. Nitrate and organic matters measured as BOD are partially removed from sewage in the de-nitrification process.

Figure 5:
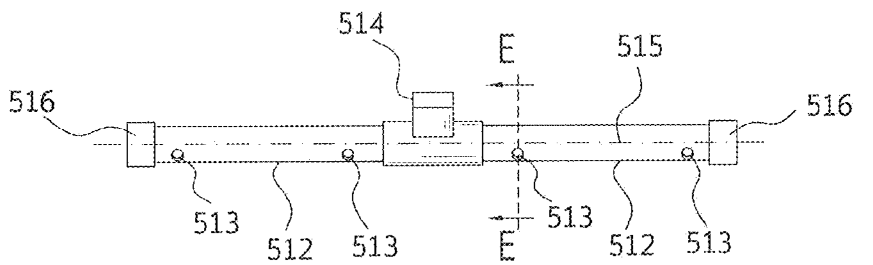
FIG. 5 is a longitudinal side view of a mixing bar of a wastewater treatment system tank with a pretreatment chamber, an anoxic chamber, an aeration chamber, a clarification chamber and a polishing chamber, in accordance with one or more embodiments of the disclosed subject matter.

The nitrate sources from the effluent are pumped from the bottom of the clarification chamber 140 to the anoxic chamber 120 periodically. A mixing bar 127, which is further shown in and described herein in relation to FIG. 5, is installed at the end of a sludge return pipe 128 and located near the bottom of the anoxic chamber 120. An energy saving concept has been applied to design this system. Specifically, while a submersible sludge return pump 148 is pumping the mixture of liquid and sludge up a sludge return pipe 147 and back to the anoxic chamber 120, the current flows through holes (see FIG. 50) on the mixing bar 127. As a result, the settled sludge and liquid in the anoxic chamber 120 are mixed by the current to form a mixed liquor. Mixing also creates a contact condition for de-nitrifiers and pollutants. Since fresh air is prohibited in the anoxic chamber, the mixture presents an anoxic condition that is essential for the de-nitrification process. When the sludge or solids in the anoxic chamber 120 settle down to a certain level, the sludge return pump 148 in the clarification chamber 140 starts its pumping cycle and creates a mixing condition in the anoxic chamber 120. Frequent pumping keeps sludge in a suspension condition in the anoxic chamber. The pumping frequency can be selected based on the strength of the wastewater.

The sludge return pump 148 and mixing bar 127 play two functions: 1) sending settled aerobic sludge and nitrate from the clarification chamber 140 to the anoxic chamber 120 and, 2) the current mixes the liquid simultaneously. In the de-nitrification process, nitrates from the clarification chamber and nutrition from pretreatment are mixed together, and the de-nitrification process is conducted under this anoxic condition.

Usually, the sludge return pump 148 is turned on from 1 to 10 percent of the system operating time. The pumping duration and frequency are based upon the flow rate of the submersible sludge return pump 148 and the strength of the influent wastewater. The flow rate of the sludge return pump 148 is adjustable for a return flow rate of between 100 to 1,000 percent of system flow rate depending on the organic and hydraulic load.

Because the sludge in the treatment system 100 is not allowed to be discarded, all the solids or sludge produced during the treatment period is kept in the system 100. If a simple aeration system is operated under this kind of condition, floating sludge or scum is found at the surface of the clarification chamber 140. In other words, the settleability of the aerobic sludge is not good after a certain length of operation. In long term aeration it is easy to cause a sludge expansion problem when dead microorganisms are pushed to the clarification chamber by a slow current in the system. Then, the sludge floats to the water surface of the clarification chamber 140 by tiny bubbles inside of the sludge particles. The floating solids or sludge affects the solids separation process. Some solids flow out of the clarification chamber 140 with effluent and cause high suspended solids in the effluent. Therefore, in order to combat this sludge expansion problem, the present system, alternatively applies an anoxic condition and an aerobic condition to the microorganisms. This improves the settleability of the sludge, and the floating sludge has been dramatically reduced. Therefore, the effluent quality from the clarification chamber is enhanced. The addition of an anoxic chamber not only removes total nitrogen, but also improves the effluent quality in both BOD and SS.

Figure 2:
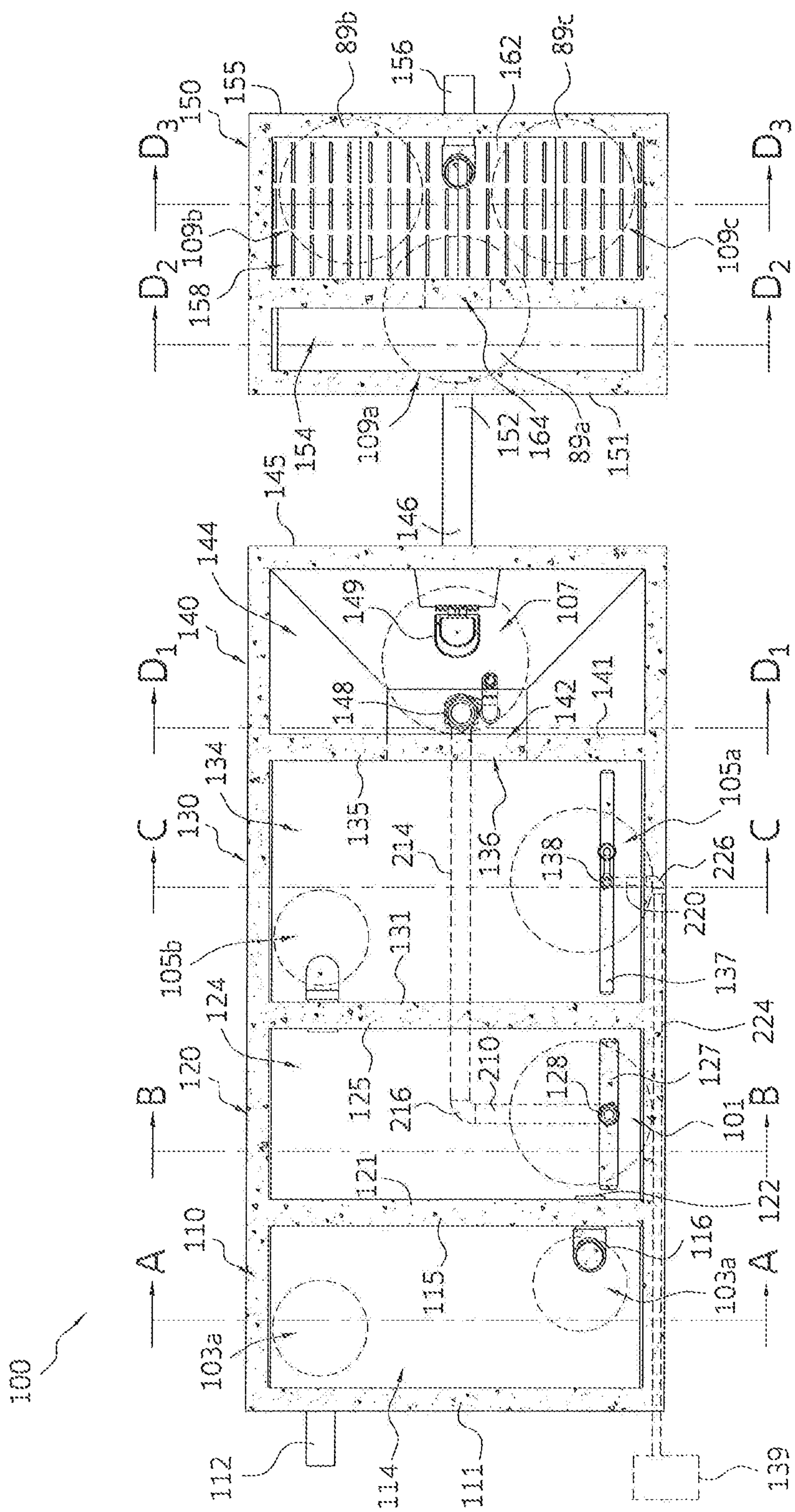
FIG. 2 is a partially exposed, top view of a wastewater treatment system tank with a pretreatment chamber, an anoxic chamber, an aeration chamber, a clarification chamber and a polishing chamber, in accordance with one or more embodiments of the disclosed subject matter.

In the system 100 of FIG. 1, the denitrified domestic wastewater contains certain amounts of suspended solids, $BOD_5$ and nitrogen pollutants and flows through an elbow at an outlet end of the aeration chamber inlet tube 132 on that and enters the aeration chamber 130. A low energy consumption air pump 139 is used to inject air into the mixed liquor and the aerobic bio-organisms in the aeration chamber 130 digest and remove organic pollutants, and convert TKN and ammonia to nitrate under the aerobic condition. The aeration process is completed by an air pump 139, which can be located within the aeration chamber riser 133 or externally as shown in FIG. 2 as reference number 139, a diffusion bar 137 and an air supply pipe 138. The diffusion bar 137 is made from plastic pipe and tiny holes are distributed along the length of the pipe. Air bubbles released from the diffusion bar 137 are injected into the wastewater and mix and aerate the mixed liquor. Activated sludge that is constructed by biomass plays a key role to treat domestic wastewater in the aeration chamber. An overflow level detector 95 is connected to the air supply pipe 138 adjacent aeration chamber access opening 105*a*.

After the aeration process in the aeration chamber 130, although the pollutants in the domestic wastewater are reduced to a low level the activated sludge needs to be separated from mixed liquor before entering the polishing chamber 150 for final treatment and discharge. The clarification chamber 140 is used to remove the solids from the treated wastewater. The mixed liquor flows through an opening at the bottom of the wall that is constructed between the aeration chamber 130 and the clarification chamber 140. This small opening regulates flow from the aeration chamber 130 to the clarification chamber 140. Solids in the treated wastewater are separated from the liquid and settle down to the bottom of the clarification chamber 140 and form a sludge layer or pile. The sludge return pump 148 that is installed at the bottom of the clarification chamber 140 pumps settled activated sludge and liquid from the clarification chamber 140 through a check valve 170 and a pipe system 147 to the anoxic chamber 120 to be mixed with the wastewater and further treated in the anoxic chamber 120. Because the hydraulic detention time of the clarification chamber is more than 4 hours during a peak flow period, the accumulated sludge separated in the clarification chamber is gradually turned into an anoxic condition before entering the anoxic chamber 120. After returning to the anoxic chamber 120, the de-nitrification bacteria in the returned sludge are mixed with the existing sludge in the anoxic chamber 120. The de-nitrifiers in the sludge start to be active to digest nitrate and organics.

In order to improve the solids removal efficiency, a flow equalization apparatus 149 is installed on an inlet end of the outlet pipe 146 of the clarification chamber 140. At least one flow equalization port regulates the peak flow from the clarification chamber 140 to the polishing chamber 150 and improves solids removal efficiency. The purpose of using this flow equalization apparatus 149 is to average the effluent flow rate and enhance settling efficiency. This system has been experimentally tested for a 52 week period without discarding any sludge. Sometimes, small amounts of sludge turn into light weight sludge that cannot be removed by the settling process. The sludge usually floats from the bottom of the chamber to the water surface in the clarification chamber 140. To separate floating sludge and supernatant, an outer housing is structured at the outside of the flow equalization port to keep floating solids away from effluent flow. At least one overflow port is located above the at least one flow equalization port. If the at least one flow equalization port is plugged, treated wastewater flows to the polishing chamber 150 through the at least one overflow port. Usually, the at least one flow equalization port is not plugged by solids easily. If sludge accumulates inside the flow equalization port and plugs the flow, the water level in the clarification chamber 140 will be raised to achieve the water level at the at least one overflow port. During the water level elevating time, the plugged at least one flow equalization port will be self-cleaned under the pressure of the water. If the plugged flow equalization port cannot be cleaned, the at least one overflow port allows liquid to flow into the polishing chamber 150. The diameter of the at least one flow equalization port varies from 0.25 to 0.5 inches. Additional details on embodiments of the flow equalization apparatus 149 are shown in FIGS. 11-14, 31, 32 and 59-65.

In FIG. 1, the polishing chamber 150 consists of an influent well 154 and an effluent well 158 separated by a central wall 157, all located transversely across the polishing chamber 150 with a filtration bed 159 horizontally located in and dividing the effluent well 158 of the polishing chamber 150 into upper and lower sections 158*a*, 158*b*. The effluent from the clarification chamber 140 flows into the polishing chamber 150. The flow is distributed to the effluent well through an opening 164 located at a bottom and in a center of the central wall 167 and moves up through the filtration bed 159 where the treated wastewater passes through a filtration bed base 16 and a filtration media 163 to perform a coarse filtration function. The biomass accumulated inside of the filtration material performs three functions: 1) further settling, 2) filtering, and 3) polishing treatment. The filter removes suspended solids (SS), BOD and total nitrogen from the clarification chamber effluent. The anoxic condition inside of the settled sludge and filtration beds allows de-nitrification bacteria to grow and remove certain amounts of nitrate.

The filtrate from the two filtration beds is collected from two submerged holes and directed to the effluent well 158, in which, a finishing treatment system 160 can be installed to perform a final treatment on the effluent water before being discharged from the polishing chamber 150. For example, the finishing treatment system 160 can include, but is not limited to, an UV assembly, a chlorination system, a de-chlorination system, a phosphorus removal system, a heavy metal removal system, a nitrogen/nitrate removal system and any combination of the above and is installed for disinfecting of the effluent from the filter. Since the filter is designed and structured very well and the filtrate is clear and contains less BOD and SS, disinfection performance of the UV assembly is excellent.

Several different types of material can be used as the filtration media for the system 100 of FIG. 1. For example, gravel, ceramic, closed cell Styrofoam, natural, synthetic, rubber and plastic materials in certain sizes can be used as the filtration media 163 in the filter. Specifically, the diameter of the filtration media 163 varies from 0.5 to 5 inches. Because coarse filtration media 163 and a thin filtration bed are used in this design, it is easy to clean the filtration media during maintenance services. After the liquid in the filter is pumped out though the influent well 154, an operator can rinse the filtration media 163 with a garden hose, the sloughed biofilm is washed down to the bottom of the filter and flows along the slope to the influent well with accumulated sludge. A service pump pumps all the solids out of the filter. The filter cleaning process can be completed easily.

The wastewater treatment system tank of FIG. 1 can be constructed using concrete and/or a molded plastic.

FIG. 2 is a partially exposed, top view along line B-B of the wastewater treatment system tank of FIG. 1, in accordance with one or more embodiments of the disclosed subject matter. In FIG. 2, the positions of the access openings 101, 103*a*, 103*b*, 105*a*, 105*b*, 107 in the top wall 71 of the first component 80 are shown in dashed line. In addition, the external components of the sludge return system are seen extending from the clarification chamber access opening 107 back toward anoxic chamber 120. Specifically, a first cross piece 214 is seen extending out from the clarification chamber 140 and across aeration chamber 130 to connect with a first end of a first elbow 216, which has a second end connected to a first end of a return piece 210, which connects to the mixing bar 127 via the mixing bar riser tube 128. An air pump 139 is connected to a first pipe section 224, which extends from off the front of the pretreatment chamber 110 and along a top, side edge of the first component 80 to connect to a first end of an elbow 226 and second end of the elbow is connected to a first end of a diffuser bar return piece 220, which connects to the diffuser bar 137 the diffuser bar riser 138.

In FIG. 2, the internal structure of the polishing chamber is more clearly illustrated. For example, inlet pipe 152 is seen attached to the front wall 151 of the polishing chamber and in fluid communication with an influent well 154. Adjacent to influent well 154 is an effluent well 158 in which a topside of the filtration bed base 162 is shown without the filtration media.

Figure 3A:
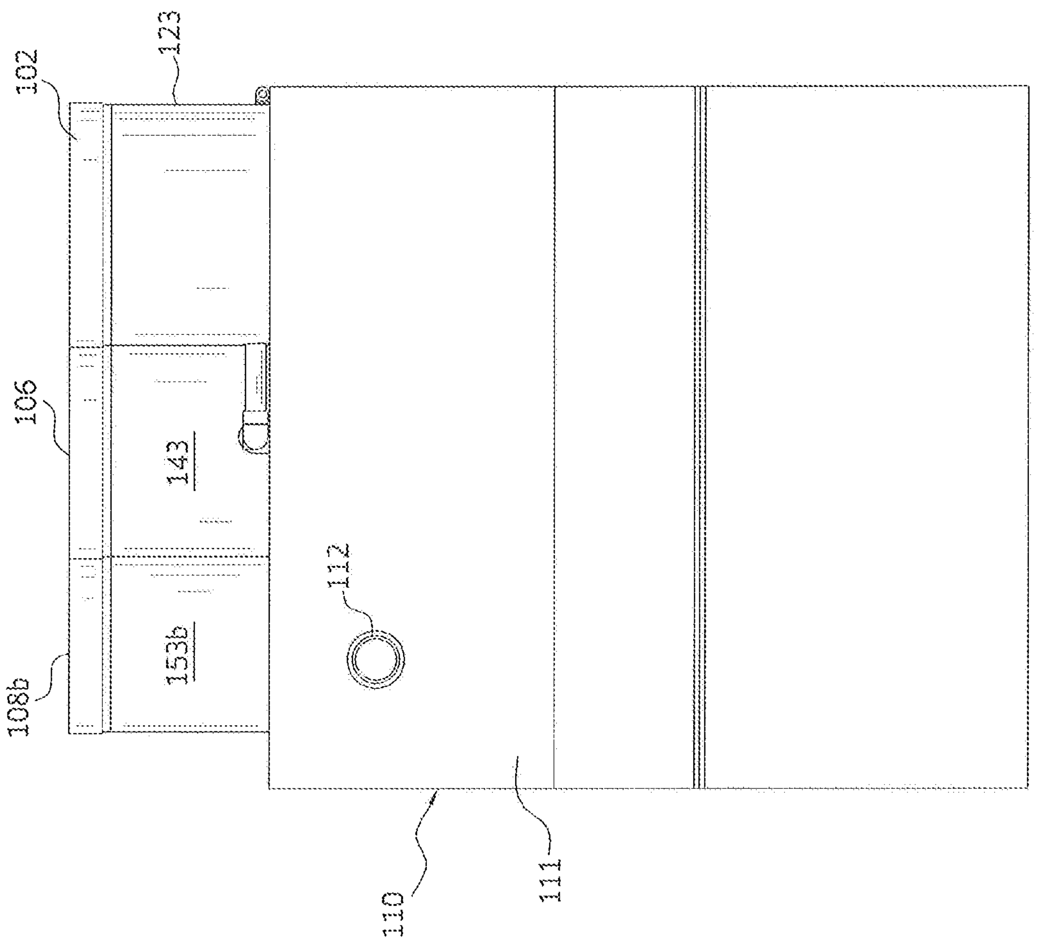
FIG. 3A is a front view of the pretreatment chamber in FIGS. 1 and 2, in accordance with one or more embodiments of the disclosed subject matter.

FIG. 3A is a front view of the pretreatment chamber in FIGS. 1 and 2, in accordance with one or more embodiments of the disclosed subject matter. In FIG. 3A, the pretreatment chamber inlet opening 112 is seen in the upper left corner of the front wall 111 of the pretreatment chamber 110.

Figure 3B:
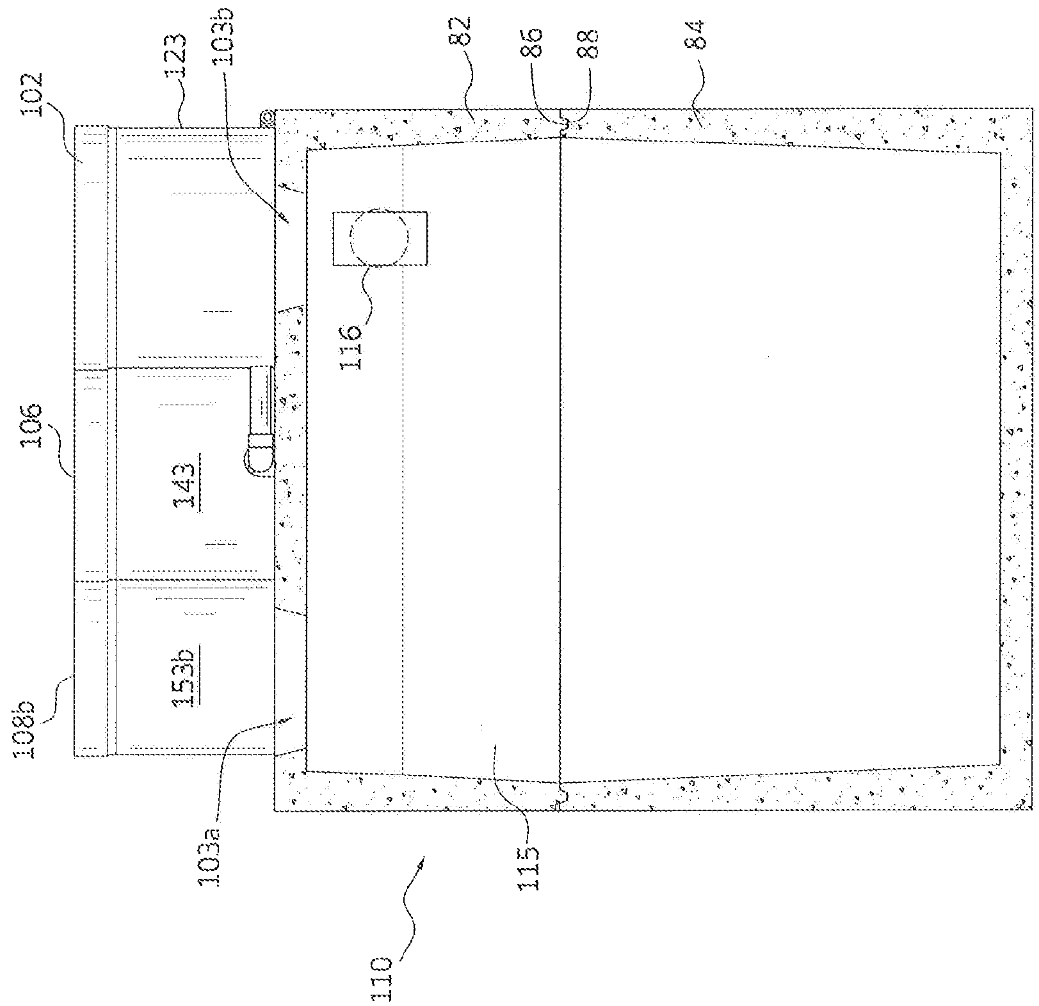
FIG. 3B is a lateral cross-sectional view along line A-A of the pretreatment chamber in FIG. 2, in accordance with one or more embodiments of the disclosed subject matter.

FIG. 3B is a lateral cross-sectional view along line A-A of the pretreatment chamber in FIG. 2, in accordance with one or more embodiments of the disclosed subject matter. In FIG. 3B, the pretreatment chamber outlet pipe 116 is shown in the upper right corner of the pretreatment chamber back wall 115. The "T"-shape of the outlet pipe 116 permits wastewater to flow from the bottom in normal flow conditions and from the bottom and top in overflow conditions.

Figure 3C:
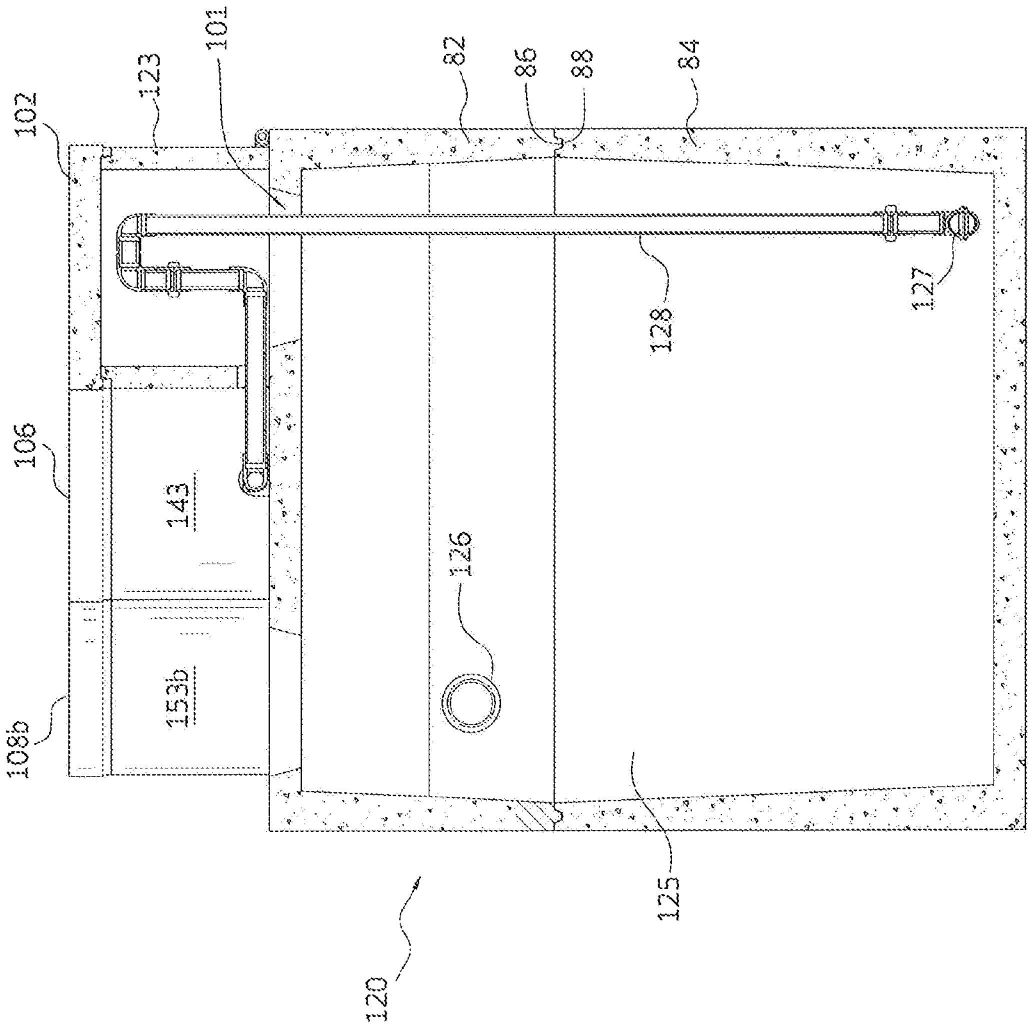
FIG. 3C is a lateral cross-sectional view along line B-B of the anoxic chamber in FIG. 2, in accordance with one or more embodiments of the disclosed subject matter.

FIG. 3C is a lateral cross-sectional view along line B-B of the anoxic chamber in FIG. 2, in accordance with one or more embodiments of the disclosed subject matter.

Figure 3D:
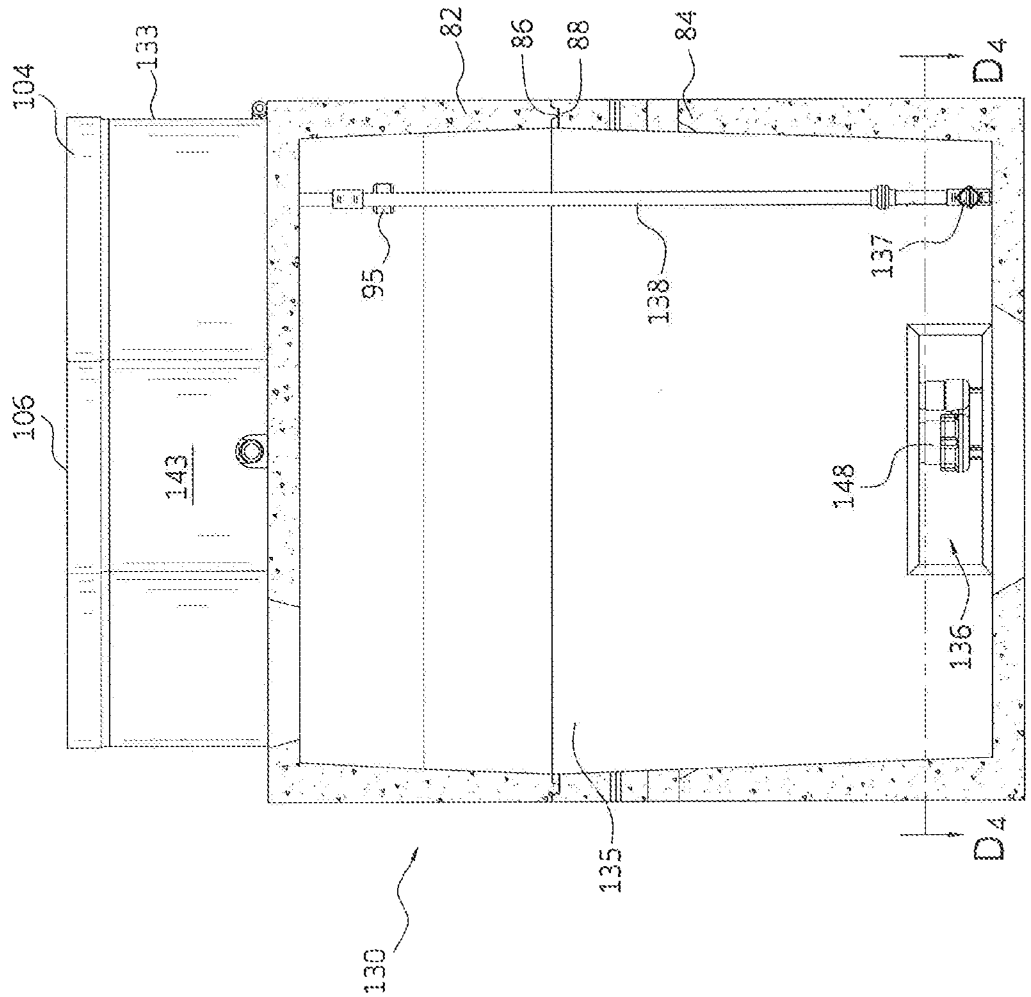
FIG. 3D is a lateral cross-sectional view along line C-C of the aerobic chamber in FIG. 2, in accordance with one or more embodiments of the disclosed subject matter.

FIG. 3D is a lateral cross-sectional view along line C-C of the aerobic chamber in FIG. 2, in accordance with one or more embodiments of the disclosed subject matter. In FIG. 3D, the aeration chamber outlet opening 136 is seen at the bottom of the back wall 135 of the aeration chamber 130. The outlet opening 136 is rectangular in shape with dimension of about 18 inches wide by about 6 inches high on the aeration chamber side and tapers down on all four sides to an opening in the clarification chamber front wall 141 of the about 16 inches wide and about 4 inches high. The sludge return pump 148 is partially visible through the aeration chamber outlet opening 136.

Figure 3E:
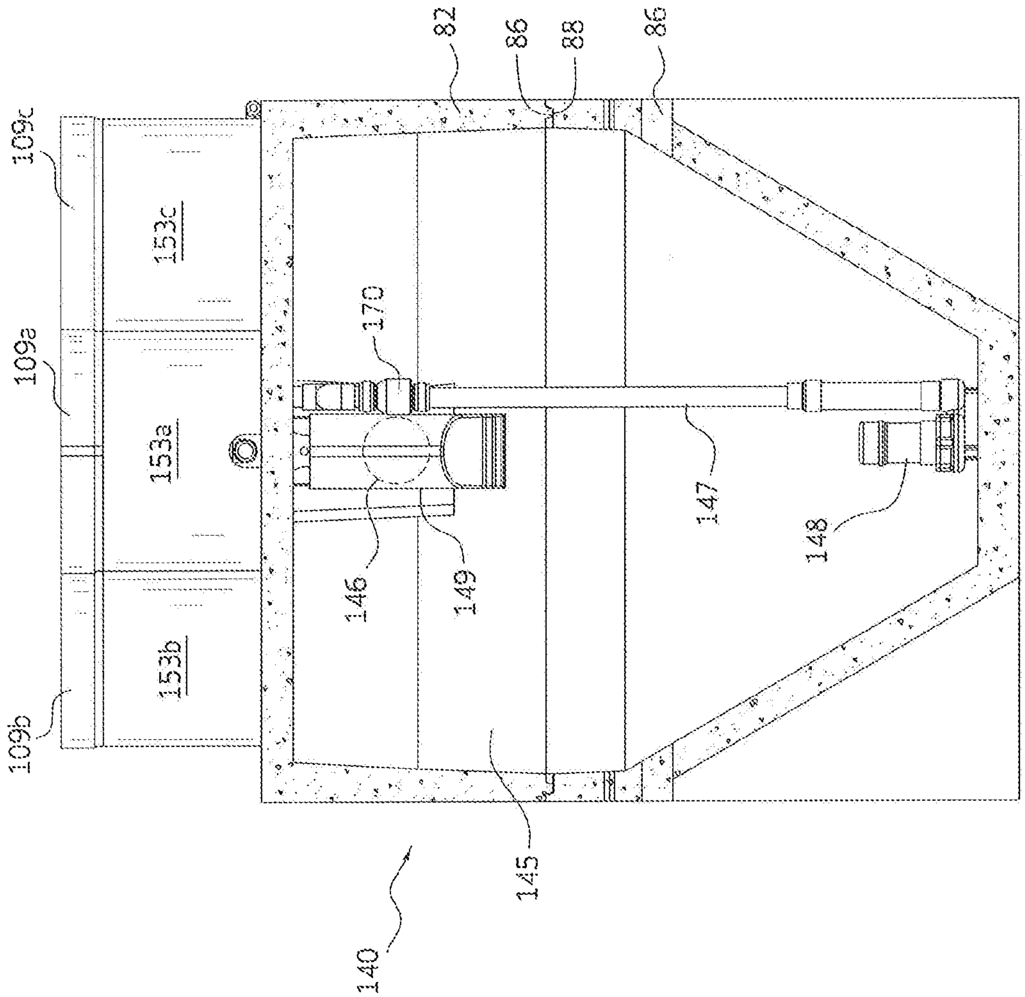
FIG. 3E is a lateral cross-sectional view along line $D_1$-$D_1$ of the clarification chamber in FIG. 2, in accordance with one or more embodiments of the disclosed subject matter.

FIG. 3E is a lateral cross-sectional view along line $D_1$-$D_1$ of the clarification chamber in FIG. 2, in accordance with one or more embodiments of the disclosed subject matter. In FIG. 3E, the clarification chamber outlet opening 146 is shown in broken line behind the flow equalization device 149 in the top center of the clarification chamber back wall 145.

Figure 3F:
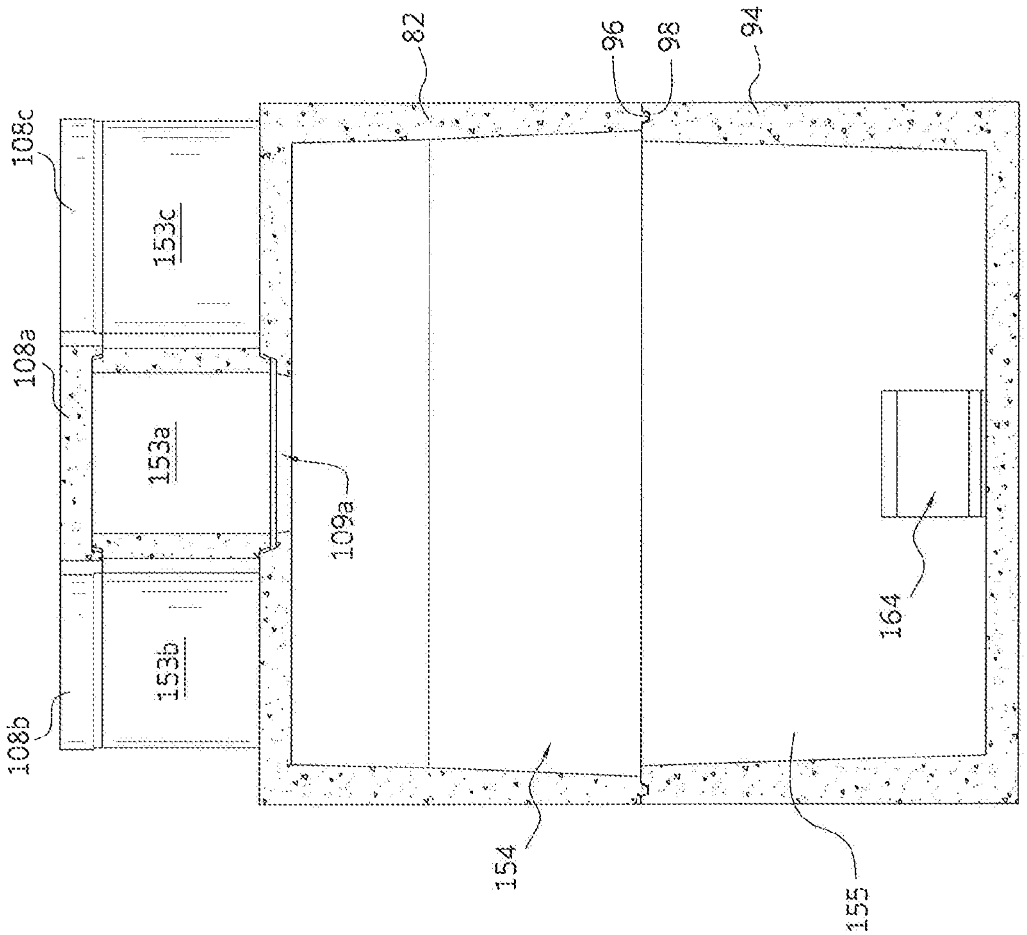
FIG. 3F is a lateral cross-sectional view along line $D_2$-$D_2$ of the polishing chamber in FIG. 2, in accordance with one or more embodiments of the disclosed subject matter.

FIG. 3F is a lateral cross-sectional view along line $D_2$-$D_2$ of the polishing chamber in FIG. 2, in accordance with one or more embodiments of the disclosed subject matter. In FIG. 3F, the influent well outlet opening 164 is shown in the bottom of the chamber back wall 155.

Figure 3G:
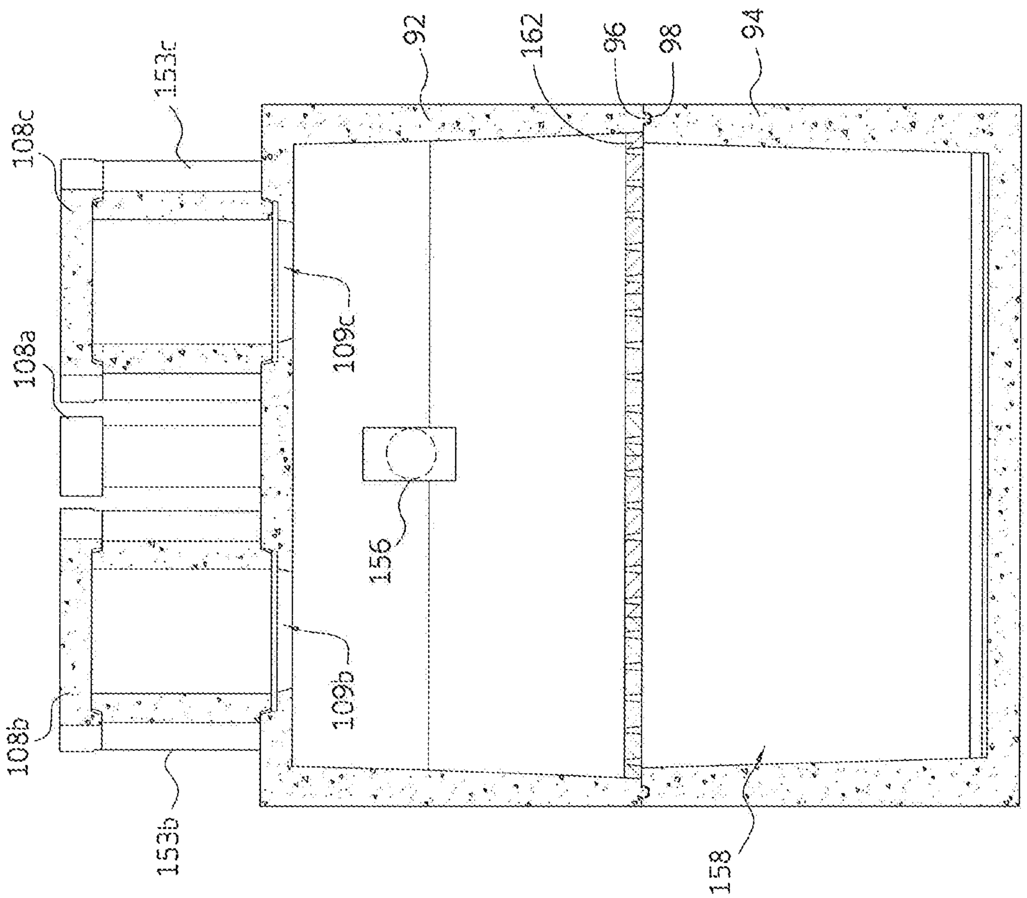
FIG. 3G is a lateral cross-sectional view along line $D_3$-$D_3$ of the polishing chamber in FIG. 2, in accordance with one or more embodiments of the disclosed subject matter.

FIG. 3G is a lateral cross-sectional view along line $D_3$-$D_3$ of the polishing chamber in FIG. 2, in accordance with one or more embodiments of the disclosed subject matter. In FIG. 3G, the effluent well outlet opening 156 is shown in broken line behind a "T"-shaped junction inlet.

Figure 4:
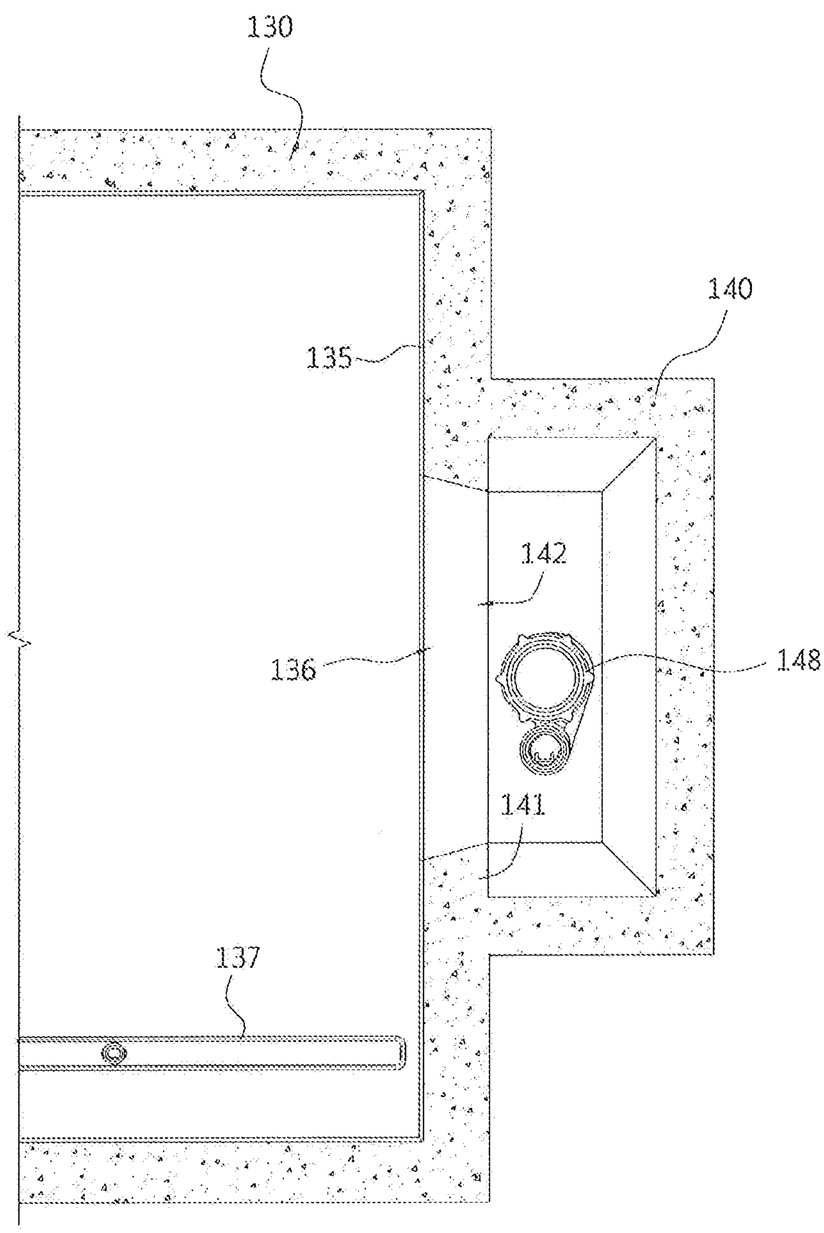
FIG. 4 is a cross-sectional, top view along line $D_4$-$D_4$ of a bottom opening between the aerobic chamber and the clarification chamber of FIG. 3D, in accordance with one or more embodiments of the disclosed subject matter.

FIG. 4 is a cross-sectional, top view along line $D_4$-$D_4$ of a bottom opening between the aerobic chamber and the clarification chamber of FIG. 3D, in accordance with one or more embodiments of the disclosed subject matter. In FIG. 4, the outlet opening 136 of the aeration chamber 130 and inlet opening 142 of the clarification chamber 140 is shown with a wall 141 on the side of the inlet opening 142.

FIG. 5 is a longitudinal side view of a mixing bar of a wastewater treatment system tank with a pretreatment chamber, an anoxic chamber, an aeration chamber, a clarification chamber and a polishing chamber, in accordance with one or more embodiments of the disclosed subject matter. In FIG. 5, a mixing bar 510, such as, for example the mixing bar 127 of FIG. 1 includes two substantially equal body portions 512 that are connected together by a "T"-shaped junction 514 at a first end and a second end of each body portion 512 is sealed with an end cap 516. The body portions 512 are made from plastic pipe, the "T"-shaped junction 514 and the end caps 516 are also made from plastic. In general, on the mixing bar 510, the body portions 512 each have multiple inch openings 513, for example, but not limited to, about ⅜", ½", ⅝", and ¾" diameter, as well as diameters in between extending through an exterior wall of and into an inside of each body portion 512. In general, the openings 513 are below a midline 515 of each body portion 512 and are angled downwardly away from the midline at an angle α of, for example, but not limited to about, 10 degrees, 15 degrees, and 20 degrees, as well as angles in between. In addition, the openings are equally spaced apart along a length of the mixing bar 510, however, they may also be spaced unequally along the length of the mixing bar 510, have different diameter openings, be angled at different downward angles, as well as various combinations thereof. The downward angle provides a more complete mixing of the sludge provided from the clarification chamber with the wastewater in the anoxic chamber, especially any material that is settled on the bottom of the anoxic chamber.

Figure 6:
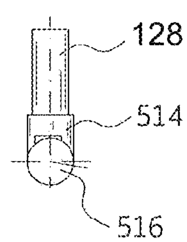
FIG. 6 is an end view of the mixing bar of FIG. 5, in accordance with one or more embodiments of the disclosed subject matter.

FIG. 6 is an end view of the mixing bar of FIG. 5, in accordance with one or more embodiments of the disclosed subject matter. In FIG. 6, a front face of the end cap 516 is seen below a top portion of the "T"-shaped junction 514 in which a portion of the sludge return pipe 128 is fixed.

Figure 7:
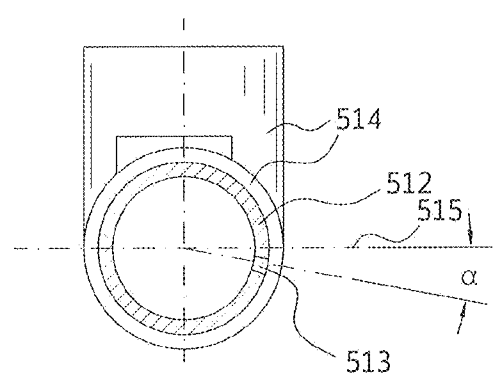
FIG. 7 is a cross-sectional, end view along line E-E of the mixing bar of FIG. 5, in accordance with one or more embodiments of the disclosed subject matter.

FIG. 7 is a cross-sectional, end view along line E-E of the mixing bar of FIG. 5, in accordance with one or more embodiments of the disclosed subject matter. In FIG. 7, the downward angled a of the opening 513 below the midline 515 is shown.

Figure 8:
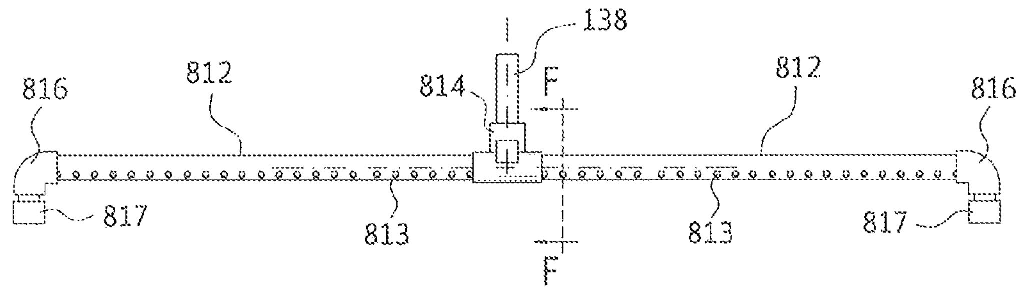
FIG. 8 is a side view of a diffusion bar of a wastewater treatment system tank with a pretreatment chamber, an anoxic chamber, an aeration chamber, a clarification chamber and a polishing chamber, in accordance with one or more embodiments of the disclosed subject matter.

FIG. 8 is a longitudinal side view of a diffusion bar of a wastewater treatment system tank with a pretreatment chamber, an anoxic chamber, an aeration chamber, a clarification chamber and a polishing chamber, in accordance with one or more embodiments of the disclosed subject matter. In FIG. 8, a diffusion bar 810, such as, for example the diffusion bar 137 of FIG. 1, includes two substantially equal body portions 812 that are connected together by a "T"-shaped junction 814 at a first end and a second end of each body portion 812 is connected to an elbow joint 816, which is sealed at its other end with an end cap 817. The body portions 812 are made from plastic pipe, the "T"-shaped junction 814, the elbow joints 816 and the end caps 817 are also made from plastic. In general, the mixing bar body portions 812 each have multiple openings 813 with, for example, but not limited to, about 1/16", ⅛", 3/32", and ¼" diameters, as well as diameters in between extending through an exterior wall of and into an inside of each body portion 812. In general, the openings 813 are below a midline 815 of each body portion 512 and equally spaced apart and are angled downwardly below the midline 815 at an angle 1 of, for example, but not limited to, about 35 degrees, 40 degrees, 45 degrees, 50 degrees, 55 degrees, as well as angles in between. The downward angle of the openings 813 ensures proper aeration of substantially all of the contents of the aeration chamber 130. The openings 813 may also be differently-sized, spaced unequally and/or at a single different uniform and/or multiple different downward angles.

Figure 9:
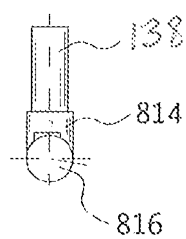
FIG. 9 is an end view of the diffusion bar of FIG. 8, in accordance with one or more embodiments of the disclosed subject matter.

FIG. 9 is an end view of the diffusion bar of FIG. 8, in accordance with one or more embodiments of the disclosed subject matter. In FIG. 9, a front surface of the elbow joint 816 is seen below a top portion of the "T"-shaped junction 814 in which a portion of the air supply pipe 138 is fixed.

Figure 10:
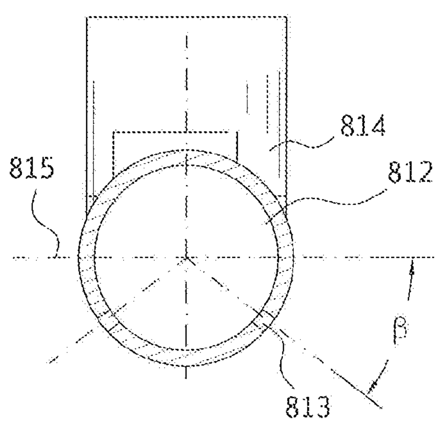
FIG. 10 is a cross-sectional, end view along line F-F of the diffusion bar of FIG. 8, in accordance with one or more embodiments of the disclosed subject matter.

FIG. 10 is a cross-sectional, end view along line F-F of the diffusion bar of FIG. 8, in accordance with one or more embodiments of the disclosed subject matter. In FIG. 10, the downward angle β of the opening 813 below the midline 815 is shown.

Figure 11:
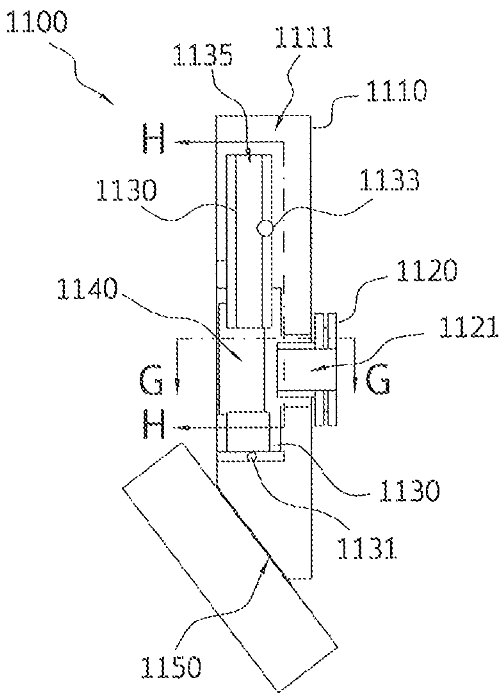
FIG. 11 is a close-up, cross-sectional side view of a flow equalization apparatus in the clarification chamber, in accordance with one or more embodiments of the disclosed subject matter.

FIG. 11 is a close-up, cross-sectional side view of a flow equalization apparatus in the clarification chamber of FIG. 1, in accordance with one or more embodiments of the disclosed subject matter. In FIG. 11, a flow equalization apparatus 1100 includes an outer housing or main body 1110, which is made from plastic pipe with a spill tube 1120 having a passageway 1121 and inserted through a side wall of the main body 1110 to provide fluid communication from the clarification chamber 140 to an inside 1111 of the main body 1110. An inner body 1130, which is made from plastic pipe with a sealed bottom end, is affixed to an inside of the main body 1110 that is opposite to the side on which the spill tube 1120 is affixed. The inner body 1130 has a substantially conical flow equalization port 1131 extending through a bottom end of the inner body 1140. The flow equalization port 1131 has an opening on the outside of the bottom end of the inner body 1130 and reduces down inside of the bottom end of the inner body 1130. Located about 5 to 8 inches above the flow equalization port 1131 is a sustained flow port 1133, which has a generally greater outer diameter opening on the outside wall of inner body 1130 and reduces down on the inside of the inner body 1130. A top of the inner body 1130 is open and acts as a peak flow or overflow port 1135. A portion of the bottom of the main body 1110 is cut on a diagonal and covered with a baffle 1150.

Figure 12:
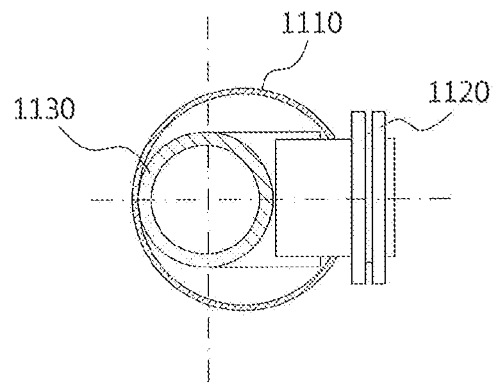
FIG. 12 is a cross-sectional, top view along line G-G of the flow equalization apparatus of FIG. 11, in accordance with one or more embodiments of the disclosed subject matter.

FIG. 12 is a cross-sectional, top view along line G-G of the flow equalization apparatus of FIG. 11, in accordance with one or more embodiments of the disclosed subject matter. In FIG. 12, the positioning of the spill tube 1120 and the inner body 1130 within the main body 1110 is shown.

Figure 13:
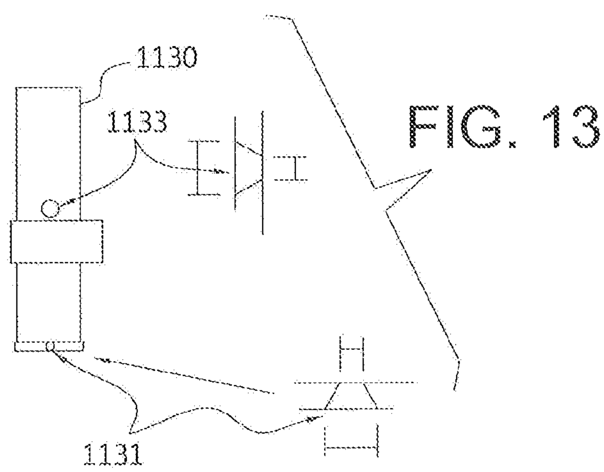
FIG. 13 is a partially cut away, front view along line H-H of the flow equalization apparatus of FIG. 11, in accordance with one or more embodiments of the disclosed subject matter.

FIG. 13 is a partially cut away, front view along line H-H of the flow equalization apparatus of FIG. 11, in accordance with one or more embodiments of the disclosed subject matter. In FIG. 13, the positioning, configurations and sizes of the flow equalization port 1131 and the sustained flow port 1133 of the inner body 1130 are detailed.

Figure 14:
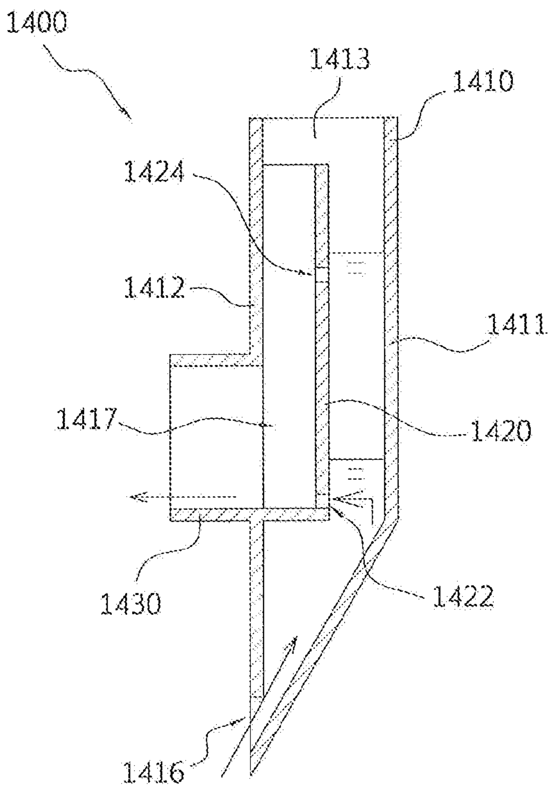
FIG. 14 is a cross-sectional, side view of another flow equalization apparatus for use in a clarification chamber, in accordance with one or more other embodiments of the disclosed subject matter.

FIG. 14 is a cross-sectional, side view of another flow equalization apparatus for use in a clarification chamber, in accordance with one or more other embodiments of the disclosed subject matter. In FIG. 14 a flow equalization apparatus 1400 is shown to include a substantially rectangular main body 1410 with a front wall 1411, a back wall 1412, a right side wall 1413 and a left side wall (not shown, but see left side wall 1414 in FIG. 15). The top of main body 1410 is open and the bottom portion of the front wall 1411 angles back toward and connects with the back wall 1412. At the bottom of the back wall 1412 a substantially rectangular inlet opening 1416 is located that provides for fluid communication into the inside of the main body 1410. Attached to the back wall 1412 is a substantially square inner body 1420 in which a flow equalization port 1422 is located near the bottom of a front wall 1421 of the inner body 1420. A sustained flow port 1424 is located above the flow equalization port 1422 toward the top of the front wall 1421 of the inner body 1420. A substantially cylindrical outlet pipe 1430 is attached to the back wall 1412 of main body 1410 and is in fluid communication with the inside of the inner body 1420 via an outlet opening 1417 in the back of the inner body 1420 and the back wall 1412.

Figure 15:
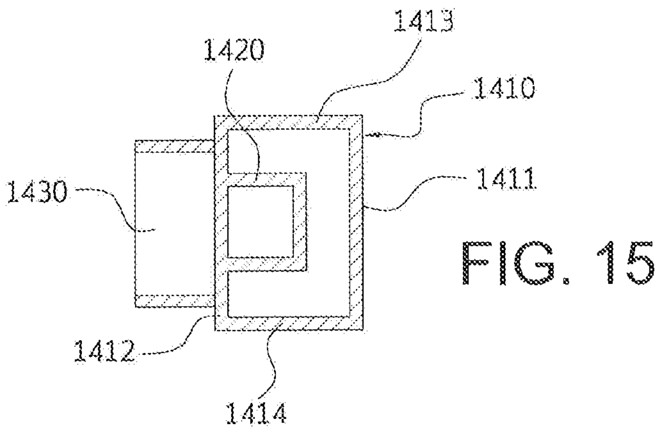
FIG. 15 is a top view of the flow equalization apparatus of FIG. 14, in accordance with one or more embodiments of the disclosed subject matter.

FIG. 15 is a top view of the flow equalization apparatus of FIG. 14, in accordance with one or more embodiments of the disclosed subject matter. In FIG. 15, the location of the inner body 1420 on the back wall 1412 is shown as well as its position relative to the front wall 1411, the right side wall 1413 and the left side wall 1414.

Figure 16:
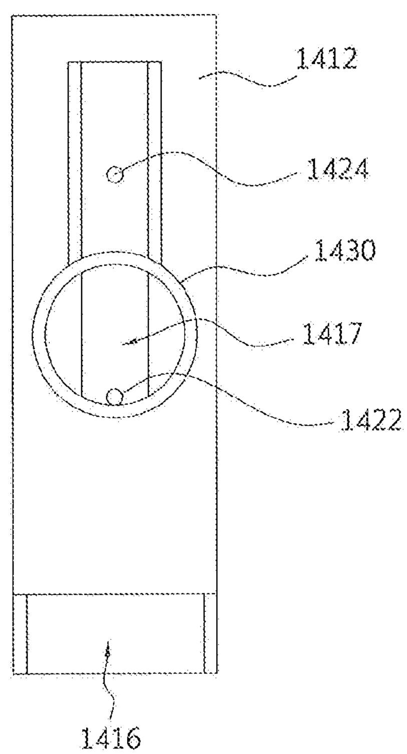
FIG. 16 is a front view of the flow equalization apparatus of FIG. 14, in accordance with one or more embodiments of the disclosed subject matter.

FIG. 16 is a front view of the flow equalization apparatus of FIG. 14, in accordance with one or more embodiments of the disclosed subject matter. In FIG. 16, the positions in the back wall 1412 of the substantially rectangular inlet opening 1416 and the outlet opening 1417 are shown.

Figure 17:
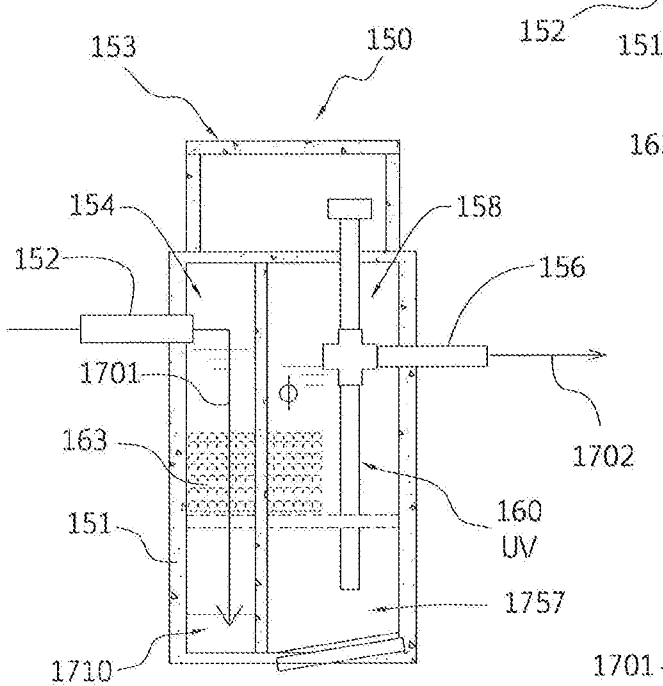
FIG. 17 is a detailed cross-sectional, side view of the polishing chamber of FIG. 1, in accordance with one or more other embodiments of the disclosed subject matter.

FIG. 17 is a detailed cross-sectional, side view of a polishing chamber that can be used in, for example, the system shown in FIG. 1, in accordance with one or more other embodiments of the disclosed subject matter. In FIG. 17, the polishing chamber 150 includes the finishing treatment system 160, which in FIG. 17 is an Ultra Violet (UV) light disinfection system 160. Although the finishing treatment system 160 in FIG. 17 is the UV light disinfection system 160, in other embodiments it can be a chlorination system with or without a de-chlorination system, a phosphorus removal system, a heavy metal removal system, and/or a nitrogen/nitrate removal system. In FIG. 17, influent treated wastewater 1701 flows through polishing chamber inlet pipe 152 and into influent well 154 and a final effluent 1702 passes out of the polishing chamber 150 via effluent outlet pipe 156. Influent well 154 has two outlet openings 1710 at the bottom of and that pass through opposite influent well side walls to permit fluid communication with two filtration wells 1757 on each side of the polishing chamber 150 (see also FIGS. 18 and 19).

Figure 18:
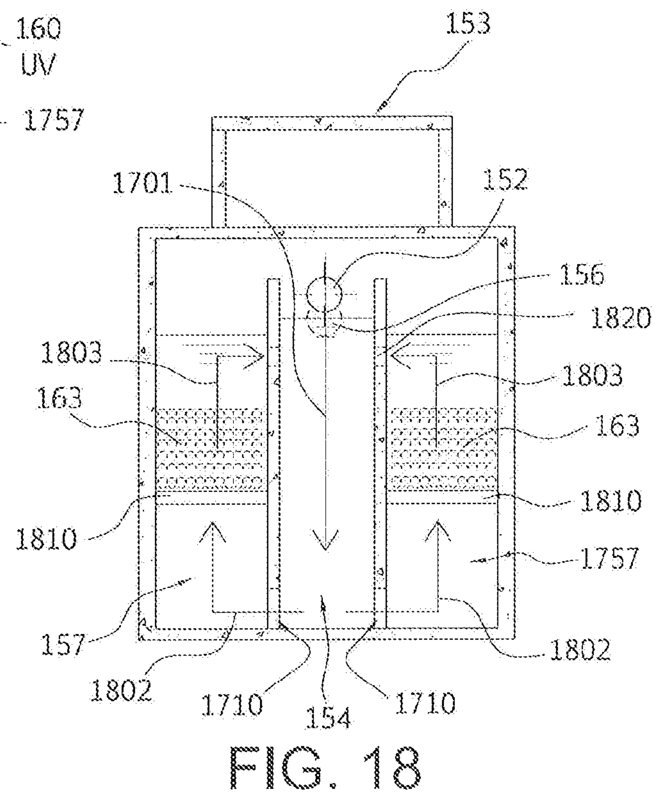
FIG. 18 is a cross-sectional, back view along line I-I of the polishing chamber of FIG. 17, in accordance with one or more embodiments of the disclosed subject matter.

FIG. 18 is a cross-sectional, back view along line I-I of the polishing chamber of FIG. 17, in accordance with one or more embodiments of the disclosed subject matter. After the influent 1701 passes into each of the filtration wells 1757 it moves up through a porous filtration bed 1810 that is covered with filtration media 163 and the filtered water 1803 that exits the filtration media 163 flows through a spill port 1820 in a side wall of each effluent well 158. The filtered water 1803 is then treated by the finishing treatment system 160 to produce the final effluent 1702 that passes out a polishing chamber outlet pipe 156. The filtration media 163 can include gravel, plastic, rubber, ceramic and closed cell foam (e.g., Styrofoam) filtration elements.

Figure 19:
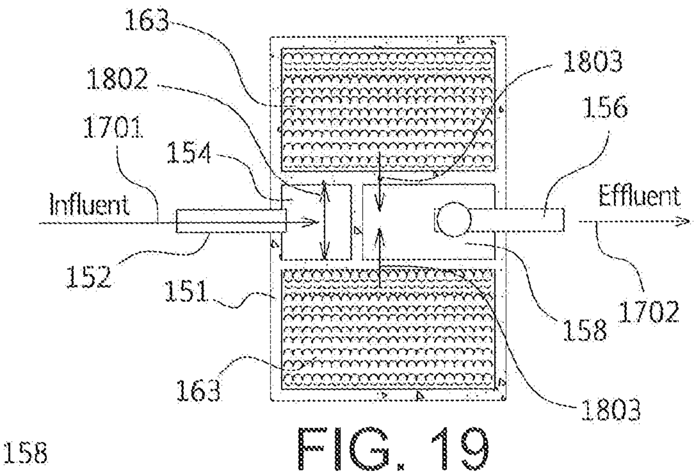
FIG. 19 is a cross-sectional, top view of the polishing chamber of FIG. 17, in accordance with one or more embodiments of the disclosed subject matter.

FIG. 19 is a cross-sectional, top view of the polishing chamber of FIG. 17, in accordance with one or more embodiments of the disclosed subject matter. In FIG. 19, the top of the filtration media 163 can be seen completely occupying the area between the walls of each filtration well 157 to ensure all the water that passes out of each filtration well 157 has been filtered.

Figure 20:
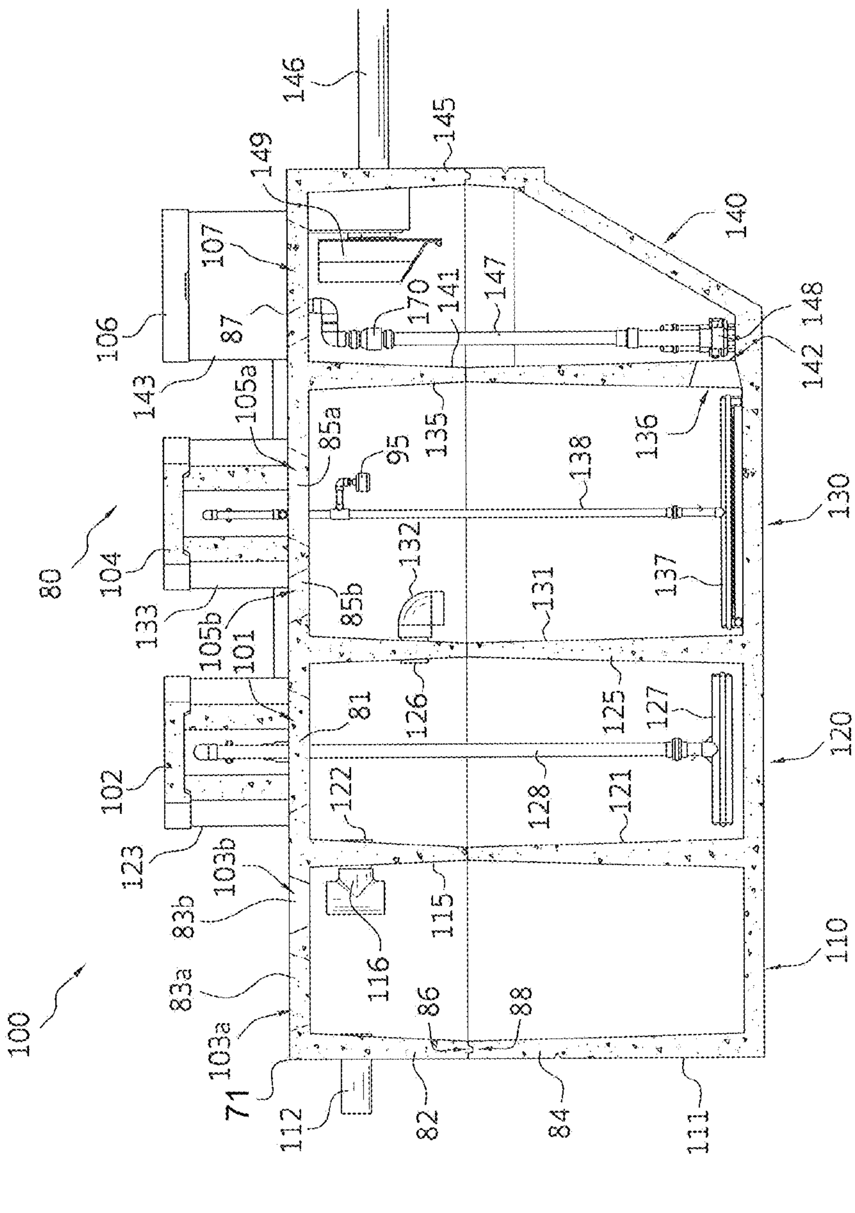
FIG. 20 is a cross-sectional, side perspective view of the wastewater treatment system tank of FIG. 1 without the polishing chamber, in accordance with one or more embodiments of the disclosed subject matter.

FIG. 20 is a cross-sectional, side perspective view of the wastewater treatment system tank of FIG. 1 without the polishing chamber, in accordance with one or more embodiments of the disclosed subject matter. In FIG. 20, the first component 80 of FIG. 1 is shown without the second component 90. The first component 80 includes the pretreatment chamber 110, the anoxic chamber 120 in fluid communication with the pretreatment chamber 110, the aeration chamber 130 in fluid communication with the anoxic chamber 120, and the clarification chamber 140 in fluid communication with the aeration chamber 130 and the anoxic chamber 120.

In FIG. 20, the pretreatment chamber 110 has the front wall 111 through which the influent inlet pipe 112 is located in the upper left corner of the front wall 111 and provides access for the incoming flow of wastewater to be treated. The pretreatment chamber 110 also has the back wall 115 through which the outlet pipe 116 is located in the upper right corner of the back wall 115 and permits pretreated wastewater to flow into the anoxic chamber 120. In general, the pretreatment chamber outlet pipe 116 is located at a height that is slightly below the pretreatment chamber influent inlet pipe 112. The anoxic chamber 120 has the front wall 121 through which the inlet pipe 122 is located in the upper right corner of the front wall 121, when viewed from the back wall 125, and provides access for the incoming flow of pretreated wastewater from the pretreatment chamber 110. In fact, the anoxic chamber front wall 121 is also the pretreatment chamber back wall 115 and the anoxic chamber inlet pipe 122 is directly connected to and in fluid communication with the pretreatment chamber outlet pipe 116. The anoxic chamber 120 also has the back wall 125 through which the outlet pipe 126 is located in the upper left corner of the back wall 125, when viewed from the front wall 121, and permits anoxically treated wastewater to flow into the aeration chamber 130. In general, the anoxic chamber outlet pipe 126 is located at a height that is below the anoxic chamber influent inlet pipe 122.

In FIG. 20, the aeration chamber 130 has the front wall 131 through which the inlet pipe 132 is located in the upper right corner of the front wall 131, when viewed from the back wall 135, and provides access for the incoming flow of anoxically treated wastewater from the anoxic chamber 120. In fact, the aeration chamber front wall 131 is also the anoxic chamber back wall 125 and the aeration chamber inlet pipe 132 is directly connected to and in fluid communication with the anoxic chamber outlet pipe 126. The aeration chamber 130 also has a back wall 135 through which an outlet opening 136 is located in a bottom center of the back wall 135 and permits aerated wastewater to flow into the clarification chamber 140. In general, the aeration chamber outlet opening 136 is located at a height that is well below the aeration chamber inlet pipe 132 and permits a back and forth flow of wastewater between the aeration chamber 130 and the clarification chamber 140. The clarification chamber 140 has a front wall 141 through which an inlet opening 142 is located in a bottom center of the clarification chamber front wall 141 and provides access for an incoming flow of aerated wastewater from the aeration chamber 130. In fact, the clarification chamber front wall 141 is also the aeration chamber back wall 135 and the clarification chamber inlet opening 142 is directly connected to and in fluid communication with the aeration chamber outlet opening 136. The clarification chamber 140 also has a back wall 145 through which an outlet pipe 146 is located in a top center of the back wall 145 and permits clarified wastewater to flow out. In general, the clarification chamber outlet pipe 146 is located at a height that is well above the clarification chamber inlet opening 142 and permits a one way flow of wastewater out of the clarification chamber 140.

In FIG. 20, the first component 80 also includes the pretreatment chamber access openings 103*a* and 103*b* in the top wall 71 of the first component 80. The first component 80 also includes an anoxic chamber access opening 101 in the top wall 71 of the first component 80 and on the side opposite the anoxic chamber inlet pipe 122. The anoxic chamber access opening 101 is covered by the anoxic chamber riser section 123 and top 102. Above the first aeration chamber access opening 105*a* can be mounted the air pump 139 that pumps air to the diffusion bar 137 via riser tube 138 and all are covered by the aeration chamber riser section 133 and top 104. The first component 80 further includes a clarification chamber access opening 107 in the top wall 71 of the first component 80 in substantially the center of the clarification chamber 140. The clarification chamber access opening 107 is covered by the clarification chamber riser section 143 and top 106.

Figure 21:
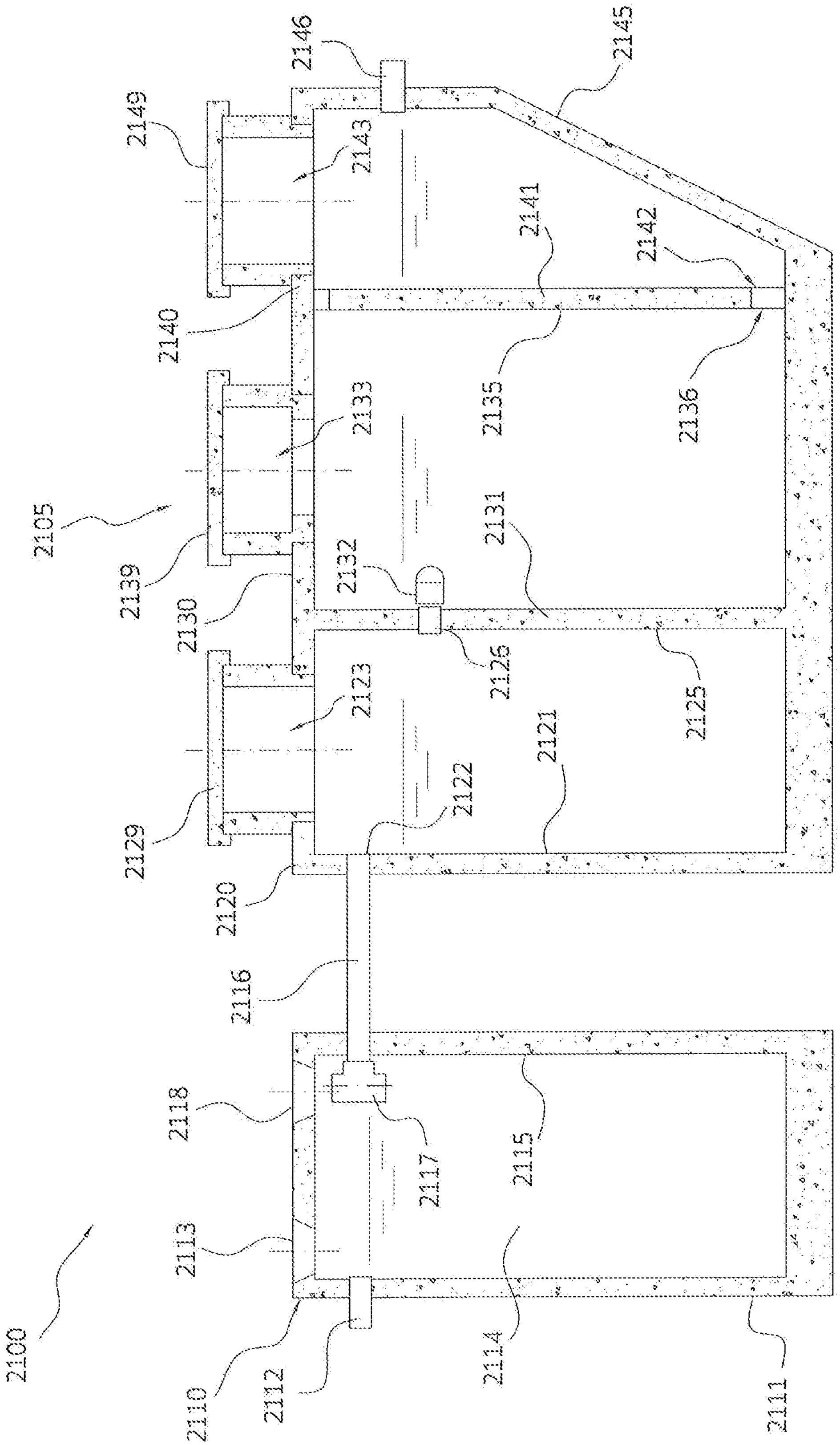
FIG. 21 is a side-perspective view of a wastewater treatment system tank with a pretreatment chamber, an anoxic chamber, an aeration chamber, and a clarification chamber, in accordance with one or more other embodiments of the disclosed subject matter.

FIG. 21 is a side-perspective view of a wastewater treatment system tank with a pretreatment chamber, an anoxic chamber, an aeration chamber, and a clarification chamber, in accordance with one or more other embodiments of the disclosed subject matter. In FIG. 21, a wastewater treatment plant 2100 includes a standalone pretreatment chamber 2110 that is connected to and in fluid communication with an anoxic chamber 2120 that is adjacent to and in fluid communication with an aeration chamber 2130 that is adjacent to and in fluid communication with a clarification chamber 2140. The anoxic, aeration and clarification chambers 2120, 2130, 2140 are part of a single treatment component 2105 that is connected to and in fluid communication with the pretreatment chamber via a pretreatment chamber outlet pipe 2116 that extends through a back wall 2115 of the pretreatment chamber 2110 and an anoxic chamber inlet pipe 2122 that extends through a front wall 2121 of the anoxic chamber 2120 and connects to and is in fluid communication with the pretreatment chamber outlet pipe 2116. The end of the pretreatment outlet pipe 2116 has a "T"-shaped intake 2117 that permits pretreated wastewater to enter into the pretreatment chamber outlet pipe 2116 and flow into the anoxic chamber 2120 through the anoxic chamber inlet pipe 2122. The pretreatment chamber 2110 has an inlet pipe 2112 through a front wall 2111 of the pretreatment chamber 2110 through which incoming wastewater flows into an inside 2114 of the pretreatment chamber 2110. The pretreatment chamber 2110 also has a first top access opening 2113 positioned over the end of the pretreatment chamber inlet pipe 2112 and a second top access opening 2118 positioned over the pretreatment outlet pipe 2116 and the "T"-shaped intake 2117. In general, both access openings 2113, 2118 have slightly conical shapes to permit reciprocally-shaped access opening covers (not shown) to seat in and close the openings 2113, 2118.

In FIG. 21, the anoxic chamber 2120 includes an anoxic chamber outlet pipe 2126 in a back wall 2125 of the anoxic chamber 2120 that is connected to and in fluid communication with an aeration chamber inlet pipe 2132 in a front wall 2131 of the aeration chamber 2130 and the anoxic chamber outlet pipe 2126 is positioned below the anoxic chamber inlet pipe 2122. The anoxic chamber 2120 has a top access opening 2123 located in a top wall of the anoxic chamber 2120 and that is located above the anoxic chamber inlet pipe 2122 and covered by an anoxic chamber riser 2129.

In FIG. 21, the aeration chamber 2130 includes an aeration chamber outlet opening 2136 in a back wall 2135 of the aeration chamber 2130 that is connected to and in fluid communication with clarification chamber inlet opening 2142 in a front wall 2141 of the clarification chamber 2140 and the aeration chamber outlet opening 2136 is positioned below the aeration chamber inlet pipe 2132. In fact, the aeration chamber outlet opening 2136 is located at the bottom of the back wall 2135 of the aeration chamber 2130. The aeration chamber 2130 has a top access opening 2133 located in a top wall of the aeration chamber 2130 and that is located in the top wall of the aeration chamber 2130 on the side opposite of the aeration chamber inlet pipe 2132 and covered by an aeration chamber riser 2139.

Figure 22:
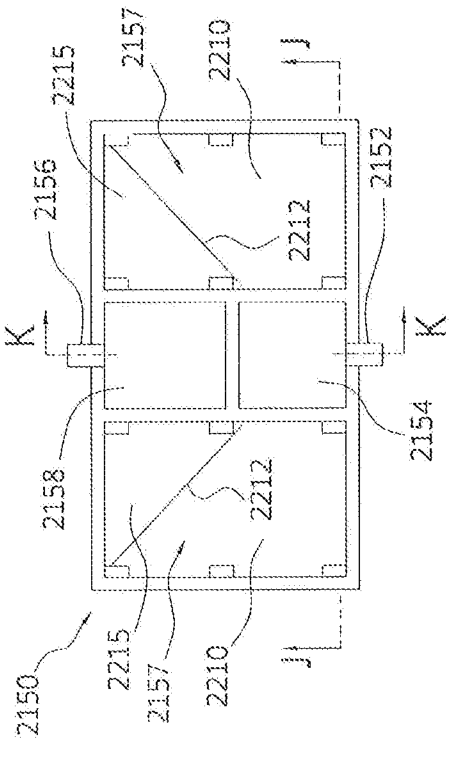
FIG. 22 is a plan view of a polishing chamber for the wastewater treatment system tank with a pretreatment chamber, an anoxic chamber, an aeration chamber, and a clarification chamber of FIG. 21, in accordance with the one or more other embodiments of the disclosed subject matter.

In FIG. 21, the clarification chamber 2140 includes an clarification chamber outlet opening 2146 in a back wall 2145 of the clarification chamber 2140 that is connected to and in fluid communication with either a drain field feeder pipe (not shown), a wastewater storage tank (not show) and/or a polishing chamber (see FIG. 22). The clarification chamber 2140 also includes a clarification chamber inlet opening 2142 in a front wall 2141 of the clarification chamber 2140 and the clarification chamber outlet opening 2146 is positioned above the clarification chamber inlet opening 2142. The clarification chamber 2140 has a top access opening 2143 located in a top wall of the clarification chamber 2140 and that is located in the top wall of the clarification chamber 2140 in substantially a center of the top wall of the clarification chamber 2140 and above the clarification chamber outlet pipe 2146 and is covered by a clarification chamber riser 2149.

The wastewater treatment system tank of FIG. 21 can be constructed using concrete and/or a molded plastic. Although not explicitly shown in FIG. 21, the positioning of the inlet and outlet pipes and openings is essentially the same as the positions shown in FIG. 2 for the similar elements. One or more of the various embodiments of the wastewater treatment system 2100 can include up to a 1,500 gallon per day ("gpd") plant.

FIG. 22 is a plan view of a polishing chamber for the wastewater treatment system tank with a pretreatment chamber, an anoxic chamber, an aeration chamber, and a clarification chamber of FIG. 21, in accordance with the one or more other embodiments of the disclosed subject matter. In FIG. 22, a polishing chamber 2150 is shown as a separate system/component that can be connected to and in fluid communication with the clarification chamber 2140 via the clarification chamber outlet pipe 2146 of FIG. 21 which connects to and is in fluid communication with a polishing chamber inlet pipe 2152 in a front wall 2151 of the polishing chamber 2150 of FIG. 22. The clarification chamber inlet pipe 2152 is located in a top center of the polishing chamber front wall 2151 and provides access for an incoming flow of clarified wastewater from the clarification chamber 2140 into an influent well 2154. The polishing chamber 2150 also has a back wall 2155 through which an effluent outlet pipe 156 is located in a top center of the back wall 2155 and permits fully treated wastewater to flow out of an effluent well 2158. In general, the polishing chamber outlet pipe 2156 is located at a height that is below the polishing chamber inlet opening 2152 and permits a one way flow of wastewater from the clarification chamber 2140 into and out of the polishing chamber 2150. In each filtration well 2157 there is a two-piece angled floor with a front angled piece 2210 that is raised at an outside front corner and angles downwardly toward a joint 2212 and a back angled piece 2215 that is raised at a diagonally opposite back corner and likewise angles downwardly to the joint 2212.

One or more of the various embodiments of the wastewater treatment system 2100 in FIG. 22 can include up to a 1,500 gpd plant.

Figure 23:
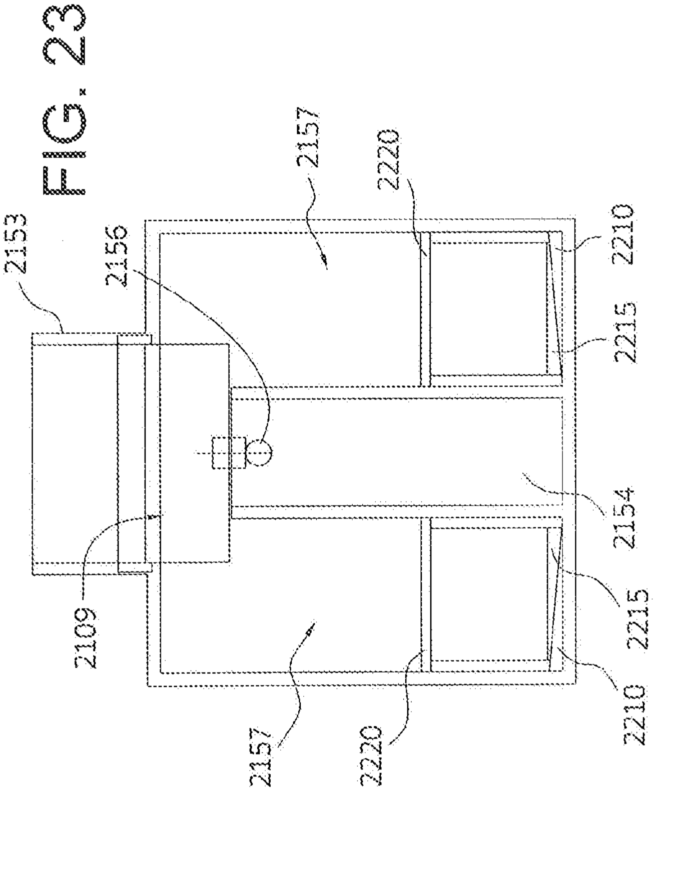
FIG. 23 is a cross-sectional, side view along line J-J of polishing chamber of FIG. 22, in accordance with the one or more other embodiments of the disclosed subject matter.

FIG. 23 is a cross-sectional, side view along line J-J of polishing chamber of FIG. 22, in accordance with the one or more other embodiments of the disclosed subject matter. In FIG. 23, a riser 2153 is seen to have a rectangular shape that covers polishing chamber access opening 2109, both of which extend across a portion of each filtration well 2157, the influent well 2154 and the effluent well 2158. A porous filtration bed 2220 similar to the porous filtration bed 1810 in FIG. 18 is located about one-third of the way up each filtration well 2157 in FIG. 23 and is used to support a depth of a filtration media (not shown) such as for example, gravel, plastic, rubber, ceramic, and/or Styrofoam filtration media elements (not shown here, but see, the filtration media 163 in FIGS. 1 and 17-19).

Figure 24:
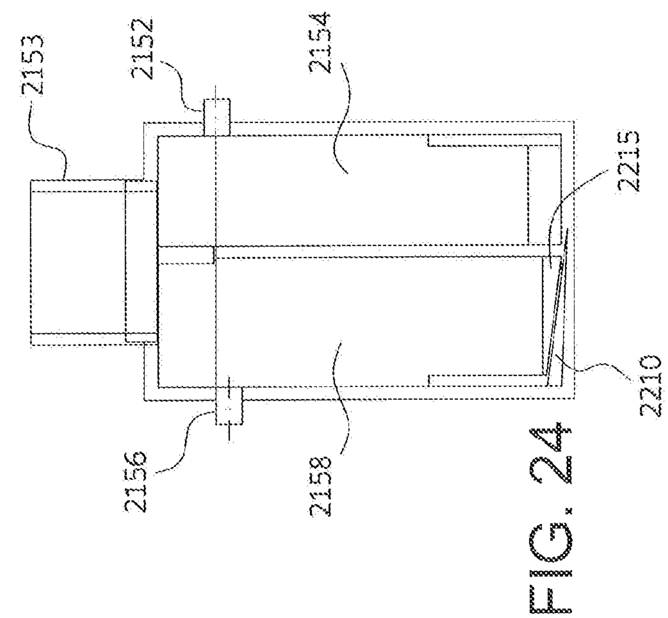
FIG. 24 is a cross-sectional, side view along line K-K of polishing chamber of FIG. 22, in accordance with the one or more other embodiments of the disclosed subject matter.

FIG. 24 is a cross-sectional, side view along line K-K of polishing chamber of FIG. 22, in accordance with the one or more other embodiments of the disclosed subject matter.

Figure 25:
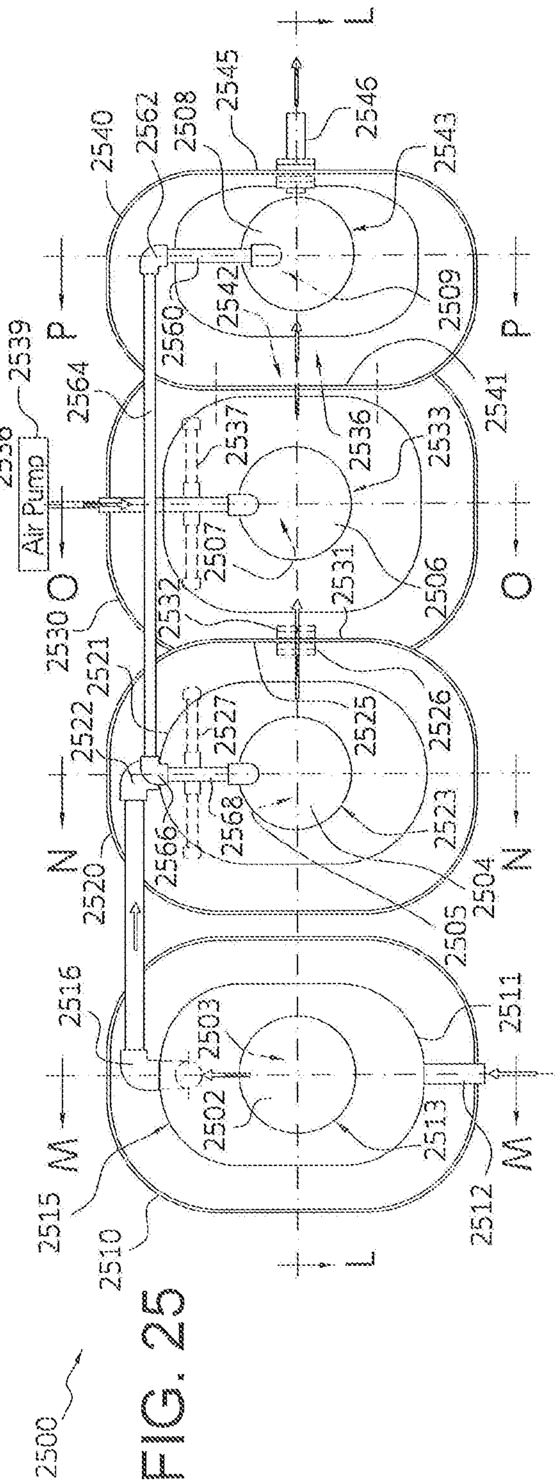
FIG. 25 is a top view of a wastewater treatment system tank with a pretreatment chamber, an anoxic chamber, an aeration chamber, and a clarification chamber, in accordance with an another one or more embodiments of the disclosed subject matter.

FIG. 25 is a top view of a wastewater treatment system tank with a pretreatment chamber, an anoxic chamber, an aeration chamber, and a clarification chamber, all with risers, in accordance with an another one or more embodiments of the disclosed subject matter. In FIG. 25, a four chamber wastewater plant 2500 includes four separate chambers, a pretreatment chamber 2510, an anoxic chamber 2520, an aeration chamber 2530 and a clarification chamber 2540, that are either directly connected together or connected to and in fluid communication via one or more pipes and/or openings. Each chamber has a substantially ellipsoid shape with a portion of the bottom being generally flat. The design and construction of each chamber can be of, for example, a plastic material, both with and without ribs. For example, an embodiment having ribs can be constructed similar to the system disclosed in U.S. Pat. No. 8,137,544 ("the '544 patent") to the inventor of this application, the entire disclosure of which is hereby incorporated in its entirety. Specifically, the pretreatment chamber 2510 is separate from but connected to and in fluid communication with the anoxic chamber 2520 via a pretreatment chamber outlet pipe 2516 that exits the pretreatment chamber 2510 near a top of a first side wall 2515 and that connects to an anoxic chamber inlet pipe 2522 that enters an inside 2524 of the anoxic chamber 2520 near a top of a first side wall 2521. The pretreatment chamber 2510 also has an inlet pipe 2512 that enters through a second side wall 2511 into an inside 2514 of the pretreatment chamber 2510 that is opposite the first side wall 2515 to receive influent wastewater and a pretreatment chamber riser 2513 and a pretreatment chamber riser lid 2502 covering an access opening 2503 in a top of the pretreatment chamber 2510. In the embodiment in FIG. 25, the anoxic, aeration and clarification chambers 2520, 2530, 2540 are directly connected to each other to form a multi-chamber unit.

Figure 26:
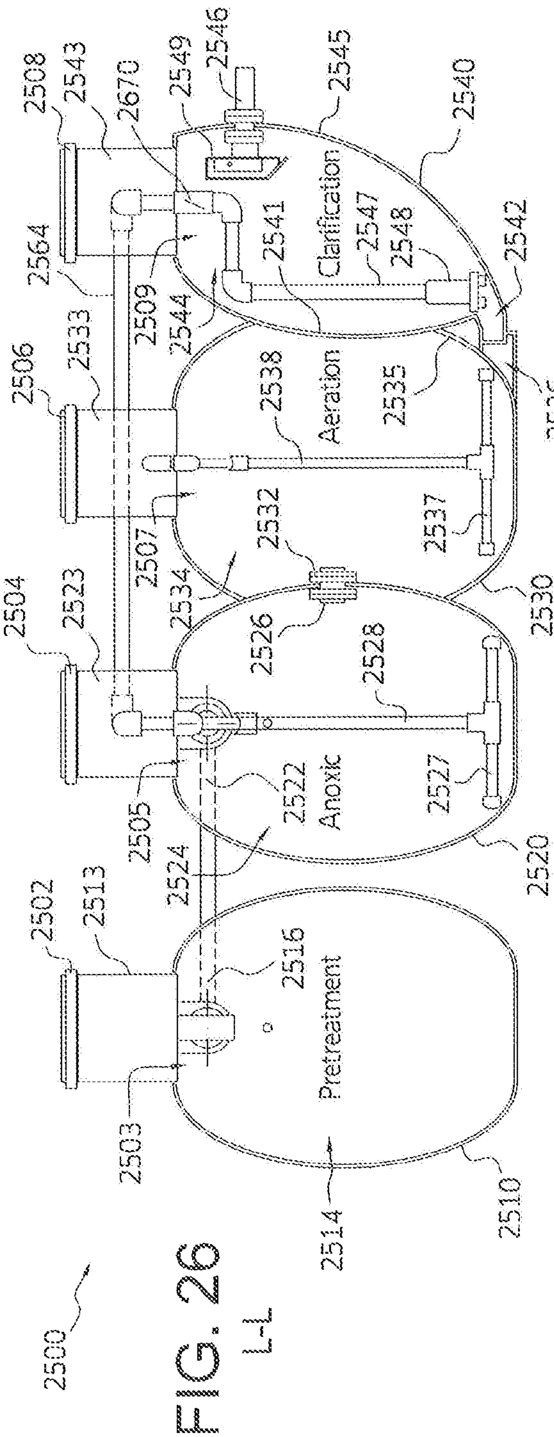
FIG. 26 is a cross-sectional, side view along line L-L of the wastewater treatment system tank with a pretreatment chamber, an anoxic chamber, an aeration chamber, and a clarification chamber of FIG. 25, in accordance with the another one or more embodiments of the disclosed subject matter.

In FIGS. 25 and 26, the anoxic chamber 2520 has an outlet pipe 2526 that exits through a back wall 2525 of the anoxic chamber and the outlet pipe 2526 is directly connected to and in fluid communication with an aeration chamber inlet pipe 2532 that enters through an aeration chamber front wall 2531 to receive anoxically treated wastewater from the anoxic chamber 2520 and an anoxic chamber riser 2523 and an anoxic chamber riser lid 2504 covering an anoxic chamber access opening 2505 in a top of the anoxic chamber 2530. A mixing bar 2527 is seen in broken line inside of the anoxic chamber 2520 and connected to a pump 2548 in the clarification chamber. Details on the diffusion bar design and operation are provided herein in relation to FIGS. 5-7 and 33.

In FIG. 25, the aeration chamber 2530 has an outlet opening 2536 that exits through a bottom of a back wall 2535 of the aeration chamber and that is directly connected to and in fluid communication with a clarification chamber inlet opening 2542 that enters through a clarification chamber front wall 2541 to receive aerated wastewater from the aeration chamber 2530 and an aeration chamber riser 2533 and an aeration chamber riser lid 2506 covering an aeration chamber access opening 2507 in a top of the aeration chamber 2530. An air diffusion bar 2537 is seen in broken line inside of the aeration chamber 2530 and connected to an air pump 2539. Details on the diffusion bar design are provided herein in relation to FIGS. 8-10 and 34.

In FIG. 25, the clarification chamber 2540 has an outlet pipe 2546 that exits through a top half of a back wall 2545 of the clarification chamber 2540 and that is directly connected to and in fluid communication with either an optional polishing chamber (not shown, but see FIGS. 17 to 19 and 22 to 24 and their related description herein) or a final disposal location. For example, the final disposal location could include a final holding tank and/or a drain field (not shown). A flow equalization apparatus 2549 is located on an intake end of the outlet pipe 2546 to control the amount and rate of the outflow of the treated wastewater. Embodiments of the possible designs of the flow equalization apparatus 2549 are shown and described in relation to FIGS. 14 to 16, 11 to 12, 31 and 32. The clarification chamber 2540 also includes a clarification chamber riser 2543 and a clarification chamber riser lid 2508 covering a clarification chamber access opening 2509 in a top of the clarification chamber 2540. The clarification chamber 2540 further includes a sludge return system that is connected to and in fluid communication with the mixing bar 2527 in the anoxic chamber 2520 via plastic pipe, for example, but not limited to, a first lateral pipe 2560 extending from the clarification chamber access opening 2509 and connected to a first end of a first elbow 2562, a longitudinal pipe 2564 connected to a second end of the first elbow 2562 and extending back toward the anoxic chamber 2520 and connecting to a first end of a second elbow 2566, and a second lateral pipe 2568 extending toward the anoxic chamber access opening 2505 and connecting to a second end of the second elbow 2566. The sludge pump 2545 is located in a bottom of the clarification chamber 2540 adjacent to the clarification chamber inlet opening 2542 and, when operated, pumps sludge, other sediment and settled wastewater up through a clarification sludge return pipe 2547 (see FIG. 26), the first lateral pipe 2560, the longitudinal pipe 2564, the second lateral pipe 2568, and an anoxic sludge return pipe 2528 (see FIG. 26) to the mixing bar 2527 in the anoxic chamber 2520.

FIG. 26 is a cross-sectional, side view along line L-L of the wastewater treatment system tank with a pretreatment chamber, an anoxic chamber, an aeration chamber, and a clarification chamber of FIG. 25, showing the risers on each chamber, in accordance with the another one or more embodiments of the disclosed subject matter. In FIG. 26, the positions of a recirculation pump 2548 and a check valve 2670 in the clarification chamber 2540, the position of the mixing bar 2527 in the anoxic chamber 2520, and the position of the diffusion bar 2537 in the aeration chamber 2530 are clearly illustrated.

Figure 27:
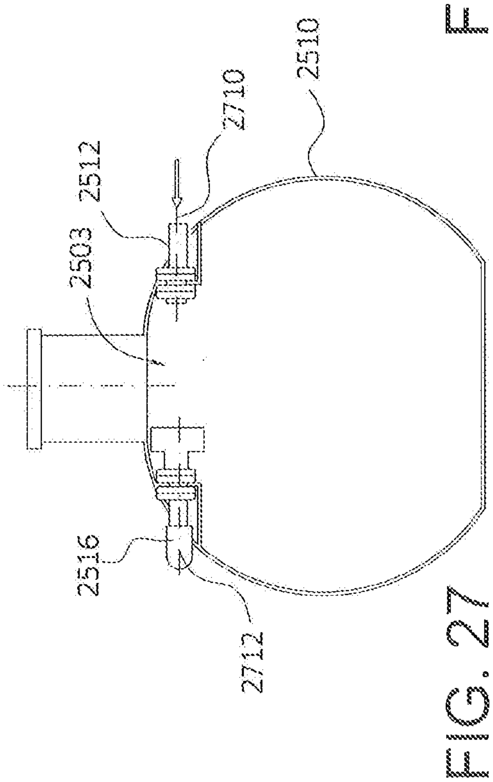
FIG. 27 is a cross-sectional, side view along line M-M of the pretreatment chamber of the wastewater treatment system tank of FIG. 25, in accordance with the another one or more embodiments of the disclosed subject matter.

FIG. 27 is a cross-sectional, side view along line M-M of the pretreatment chamber of the wastewater treatment system tank of FIG. 25, in accordance with the another one or more embodiments of the disclosed subject matter. In FIG. 27, a center line 2710 of the pretreatment chamber inlet pipe 2512 is positioned above a center line 2712 of the pretreatment chamber outlet pipe 2516.

Figure 28:
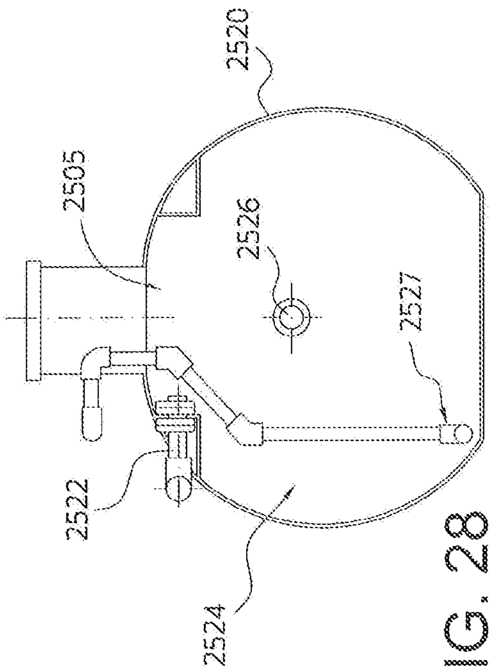
FIG. 28 is a cross-sectional, side view along line N-N of the anoxic chamber of the wastewater treatment system tank of FIG. 25, in accordance with the one or more embodiments of the disclosed subject matter.

FIG. 28 is a cross-sectional, side view along line N-N of the anoxic chamber of the wastewater treatment system tank of FIG. 25, in accordance with the another, one or more embodiments of the disclosed subject matter. In FIG. 28, the anoxic chamber inlet pipe 2522 is shown to be at approximately the same height as the pretreatment chamber outlet pipe 2516 of FIG. 27. Returning to FIG. 28, the mixing bar 2527 is shown to be located adjacent to the bottom of the anoxic chamber 2520 and below the end of anoxic chamber inlet pipe 2522 located in the inside 2524 of the anoxic chamber 2520.

Figure 29:
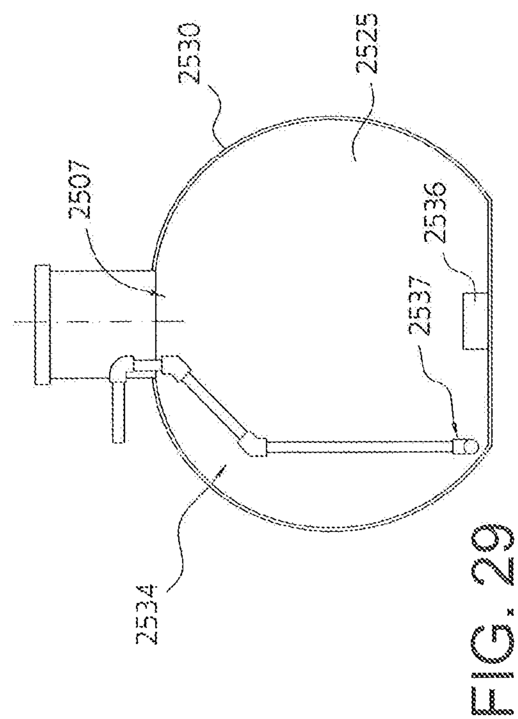
FIG. 29 is a cross-sectional, side view along line O-O of the aeration chamber of the wastewater treatment system tank of FIG. 25, in accordance with the another one or more embodiments of the disclosed subject matter.

FIG. 29 is a cross-sectional, side view along line O-O of the aeration chamber of the wastewater treatment system tank of FIG. 25, in accordance with the another one or more embodiments of the disclosed subject matter. In FIG. 29, the diffusion bar 2537 is shown to be located adjacent to the bottom of the aeration chamber 2530 and, although not illustrated in FIG. 29, it is also below the end of aeration chamber inlet pipe 2532 located in the inside 2534 of the aeration chamber 2530. Also illustrated in FIG. 29 is the location of the aeration chamber outlet opening 2536 through the back wall 2535 and adjacent the bottom of the aeration chamber 2530.

Figure 30:
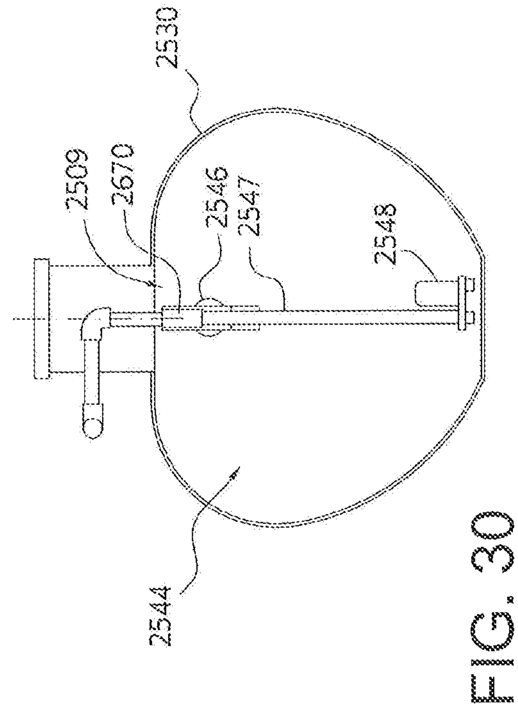
FIG. 30 is a cross-sectional, side view along line P-P of the clarification chamber of the wastewater treatment system tank of FIG. 25, in accordance with the another one or more embodiments of the disclosed subject matter.

FIG. 30 is a cross-sectional, side view along line P-P of the clarification chamber of the wastewater treatment system tank of FIG. 25, in accordance with the another one or more embodiments of the disclosed subject matter. In FIG. 30, the location of a recirculation pump 2548 in the inside 2544 and adjacent the bottom of the clarification chamber 2540 and the sludge return pipe 2547 extending upwardly from the sludge return pump 2548 to and the check valve 2670 are clearly illustrated.

Figure 31:
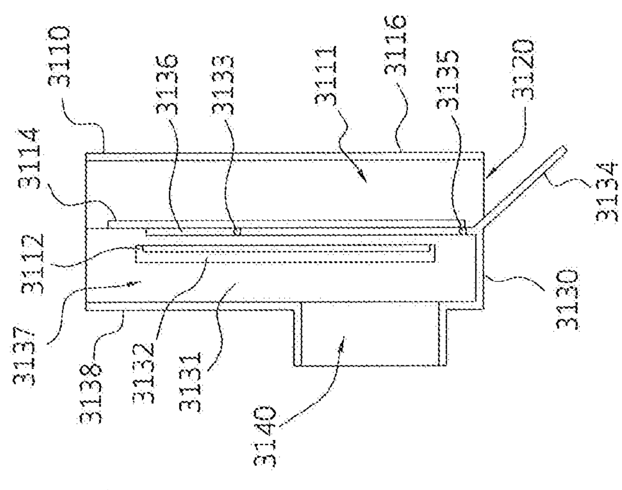
FIG. 31 is a cross-sectional, side view of a flow equalization apparatus, in accordance with yet other one or more embodiments of the disclosed subject matter.
Figure 32B:
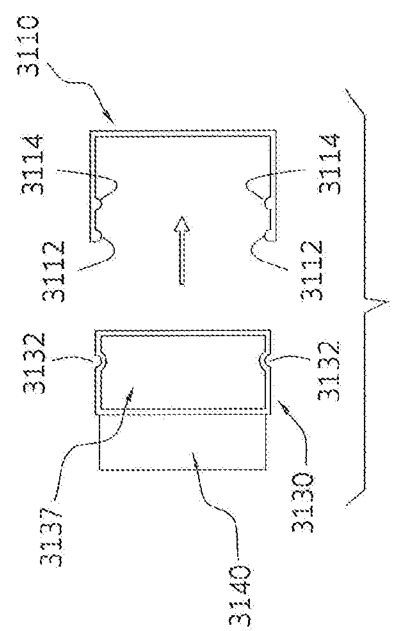
FIG. 32B is a top view of FIG. 32A, in accordance with the yet another one or more embodiments of the disclosed subject matter.

FIG. 31 is a cross-sectional, side view of a flow equalization apparatus, in accordance with yet another, one or more embodiments of the disclosed subject matter. In FIG. 31, a flow equalization apparatus 3100. In FIG. 31, a flow equalization apparatus 3100 includes an outer housing or main body 3110, which is made from molded plastic to form a "U" shape with an open top and bottom ends, with an outer vertical rib 3112 and an inner vertical rib 3114 located on the outer vertical edges of the ends of the "U". The main body 3110 has an open bottom 3120 to provide fluid communication from the clarification chamber 2540 to an inside 3111 of the main body 3110. An inner body 3130, which is a substantially closed rectangular portion made from molded plastic with a width of about 4½ inches and a depth of about 1¾ inches and with an open top end and a closed bottom end and an inside 3131, is affixed to the main body 3110 using the vertical ribs 3112, 3114 and a reciprocally-shaped vertical groove 3132 in each side of the inner body 3130 into which the outer vertical rib 3112 is removably positioned and the inner vertical rib 3114 rests against a front wall 3136 of the inner body. The inner body 3130 has an outlet pipe 3140 connected through a back wall of the inner body 3130 and in fluid communication with the inside 3131 of the inner body 3130 to permit clarified wastewater to drain from the inside 3131 of the inner body 3130. The inner body 3130 has a substantially conical flow equalization port 3135 extending through the bottom end of the front wall 3136 of the inner body 3130. The flow equalization port 3135 has a generally greater diameter opening on the outside of the bottom end of the inner body 3130 and reduces down on the inside of the bottom end of the inner body 3130. Located above the flow equalization port 3135 is a sustained flow port 3133, which has a generally greater diameter opening on the outside wall of inner body 3130 and reduces down on the inside of the inner body 3130. The two ports 3133, 3135 are similar to the structure shown in FIG. 13. Returning to FIG. 31, a downwardly depending flange 3134 extends downwardly from the bottom edge of the inner body 3130 closest to the main body 3110 and toward the main body 3110 and partially obstructs the open bottom 3120 of the main body 3110. This flange 3134 serves to reduce the amount of solids that enter into the interior 3111 of the main body 3110, which helps reduce clogging of the flow equalization port 3135 and the sustained flow port 3133. An overflow port 3137 is formed by an open top of the inner body 3120 as defined by a top of the front wall 3136, which is below the height of a back wall 3138. Although not shown, an optional screen, a mesh or a filter element may be positioned to cover the flow equalization, sustained and overflow ports to provide further filtration of the wastewater. Examples of the types of mesh, screen, or filter, as well as alternative flow equalization apparatus designs, that may be used are described in U.S. Pat. No. 5,413,706 issued on May 9, 1995, and U.S. Pat. No. 7,674,372, also issued to Jan D. Graves, but on Mar. 9, 2010, both of which are incorporated herein in their entireties. As shown in the '706 and '372 patents, the mesh can be a single layer having a single density as well as two or more layers with different densities.

Figure 32A:
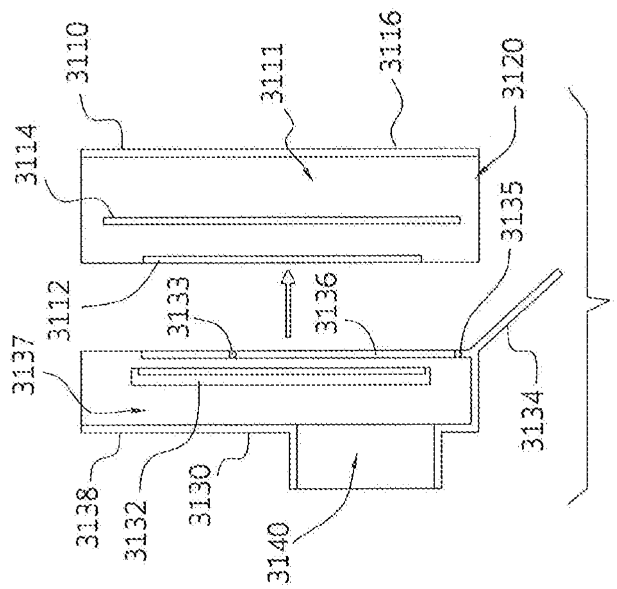
FIG. 32A is an exploded, cross-sectional, side view of a flow equalization apparatus, in accordance with the yet another one or more embodiments of the disclosed subject matter.

FIG. 32A is an exploded, cross-sectional, side view of the flow equalization apparatus of FIG. 31, in accordance with the yet another one or more embodiments of the disclosed subject matter.

Figure 33:
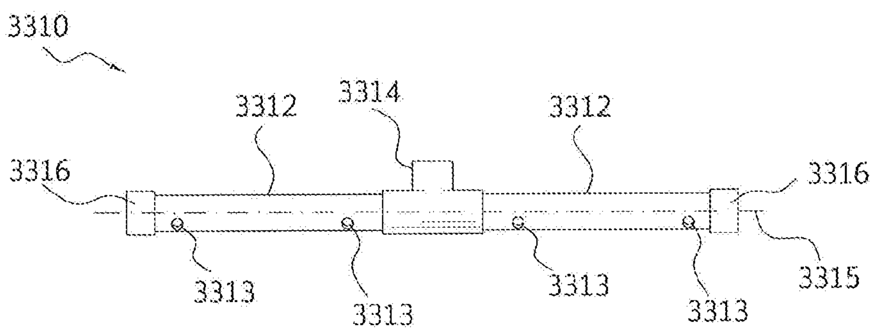
FIG. 33 is a longitudinal side view of a mixing bar of a wastewater treatment system tank with a pretreatment chamber, an anoxic chamber, an aeration chamber, a clarification chamber and a polishing chamber, in accordance with yet other one or more embodiments of the disclosed subject matter.

FIG. 33 is a longitudinal side view of a mixing bar of a wastewater treatment system tank with a pretreatment chamber, an anoxic chamber, an aeration chamber, a clarification chamber and a polishing chamber, in accordance with yet another, one or more embodiments of the disclosed subject matter. In FIG. 33, a mixing bar 3310, such as, for example the mixing bar 2527 of FIG. 25 includes two substantially equal body portions 3312 that are connected together by a "T"-shaped junction 3314 at a first end and a second end of each body portion 3312 is sealed with an end cap 3316. The body portions 3312 are made from plastic pipe, the "T"-shaped junction 3314 and the end caps 3316 are also made from plastic. In general, the mixing bar 3310 has multiple openings 3313 extending through an exterior wall of and into an inside of each body portion 3312. The openings can range in size from about ⅜" to ¾" diameter. In general, the openings 3313 are below a midline 3315 of each body portion 3312 and are angled downwardly at about 10 to 25 degrees below the midline 3315 to maximize the mixing effect of the pumped in sludge from the clarification chamber with the sediment in the anoxic chamber. In the embodiment in FIG. 33, four 12" openings 3313 are shown with one adjacent each end of each body portion 3312 with a downward angle of about 15 degrees. In addition, the openings 3313 can be equally or alternatively spaced apart along a length of the mixing bar 3310.

Figure 34:
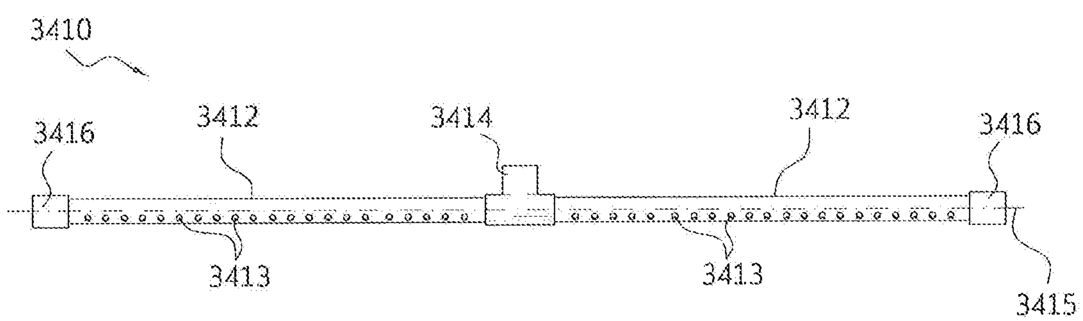
FIG. 34 is a side view of a diffusion bar of a wastewater treatment system tank with a pretreatment chamber, an anoxic chamber, an aeration chamber, a clarification chamber and a polishing chamber, in accordance with yet other one or more embodiments of the disclosed subject matter.

FIG. 34 is a side view of a diffusion bar of a wastewater treatment system tank with a pretreatment chamber, an anoxic chamber, an aeration chamber, a clarification chamber and a polishing chamber, in accordance with yet another, one or more embodiments of the disclosed subject matter. In FIG. 34, a diffusion bar 3410, such as, for example the diffusion bar 2537 of FIG. 25, includes two substantially equal body portions 3412 that are connected together by a "T"-shaped junction 3414 at a first end and a second end of each body portion 3412 is connected to an end cap 3416. The body portions 3412 are made from plastic pipe, the "T"-shaped junction 3414 and the end caps 3417 are also made from plastic, for example, PVC, however, other materials, for example, nylon and HDPE can also be used. In general, the diffusion bar 3410 has multiple openings 3413 extending through an exterior wall of and into an inside of each body portion 3412. The openings 3413 can range in size from about 1/16" to 3/16" diameter. In general, the openings 3413 are below a midline 3415 of each body portion 3412 and are angled downwardly at about between 35 degrees and 55 degrees below the midline 3415. In addition, the openings are equally spaced apart along a length of each body portion 3412 to achieve uniform airflow into the aeration chamber 3420. In the embodiment in FIG. 34, the multiple openings 3413 each have a 3/32" diameter opening and are angled downwardly below the midline 3415 at about 45 degrees. In other embodiments the openings 3413 can be of various different sizes as well as being oriented at different downward angles.

Figure 35:
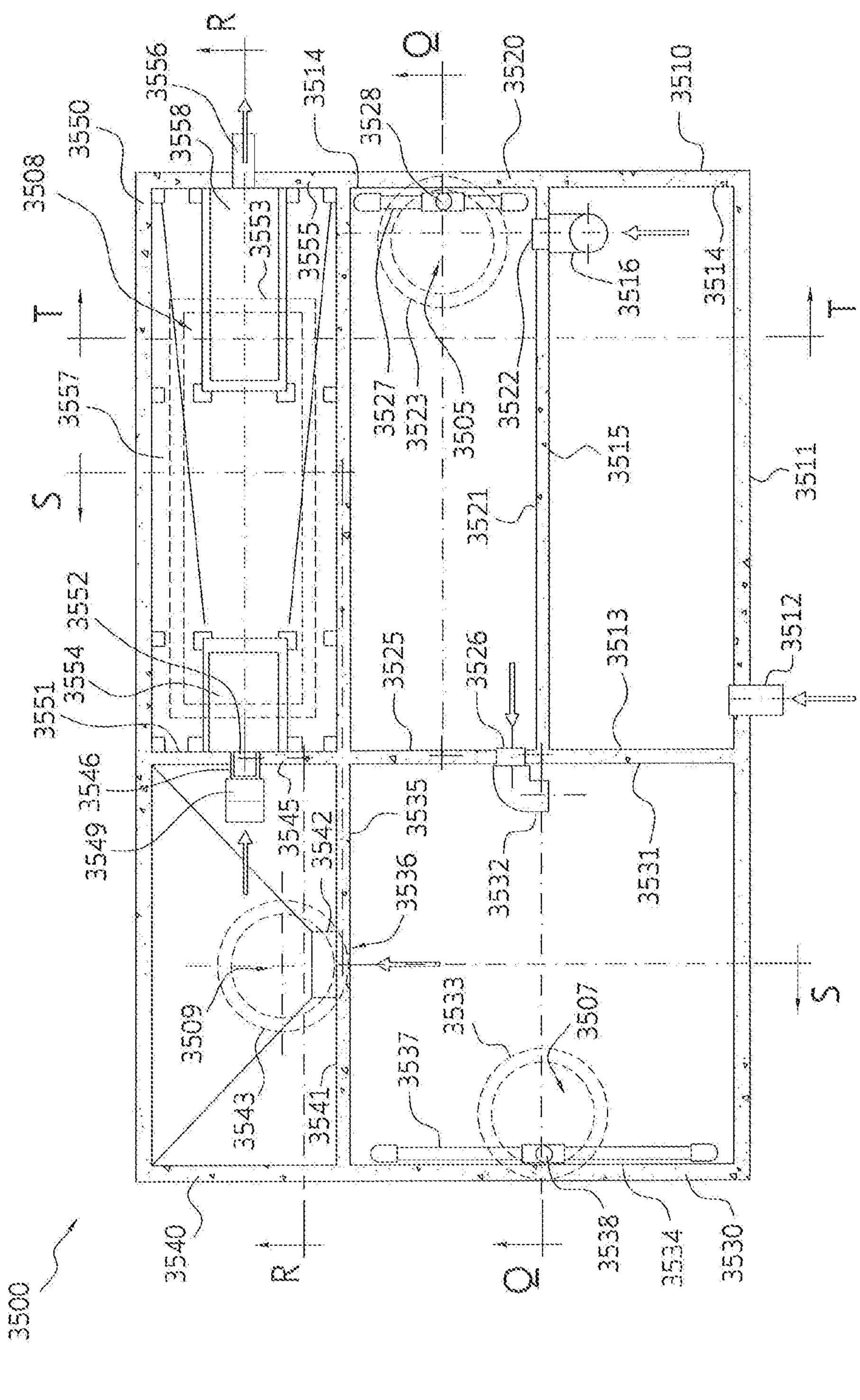
FIG. 35 is a plan view of a single unit wastewater treatment system tank with a pretreatment chamber, an anoxic chamber, an aeration chamber, a clarification chamber and a polishing chamber, in accordance with the another one or more embodiments of the disclosed subject matter.

FIG. 35 is a plan view of a single unit wastewater treatment system tank with a pretreatment chamber 3510, an anoxic chamber 3520, an aeration chamber 3530, a clarification chamber 3540 and a polishing chamber 3550, in accordance with still another, one or more embodiments of the disclosed subject matter. In FIG. 35, a single unit wastewater treatment system tank 3500 includes five separate chambers. First in the lower right corner of the tank 3500 is located a pretreatment chamber 3510 with an inlet pipe 3512 extending through a first pretreatment chamber longitudinal wall 3511 adjacent a left wall 3513 to permit the passage of wastewater into the pretreatment chamber. A pretreatment outlet pipe 3516 extends through a second pretreatment chamber longitudinal wall 3515 adjacent a right wall 3514 and connects to and is in fluid communication with an anoxic chamber inlet pipe 3522 in and extending through a first anoxic chamber longitudinal wall 3521. Below the anoxic chamber inlet pipe 3522 and adjacent the bottom of the right wall 3514 of the anoxic chamber 3520 is located a mixing bar 3527 that, although not shown, is in fluid communication with the clarification chamber 3540 via a sludge return pipe 3528. Above the mixing bar 3527 is located an anoxic chamber access opening 3505 in a top of the tank and the anoxic chamber access opening 3505 is covered by an anoxic chamber riser 3523 (shown in broken line). At the opposite end of the anoxic chamber 3520 is an anoxic chamber outlet pipe 3526 that extends through a left anoxic chamber wall 3525 adjacent the first anoxic chamber longitudinal wall 3521 and connects to and is in fluid communication with an aeration chamber inlet pipe 3532 in and extending through a right aeration chamber wall 3531.

In FIG. 35, the aeration chamber inlet pipe 3532 has an elbow shape and is substantially almost horizontal to the bottom of the tank 3500, but with a slight downward tilt to aid in the flow of anoxically treated wastewater into the aeration chamber 3530. On an opposite left aeration chamber wall 3534 a diffusion bar 3537 is located adjacent a bottom of the left aeration chamber wall 3534 and is in fluid communication with an air pump (not shown, but see, for example, air pump 139 in FIG. 2 via an air supply pipe 3538. Above the diffusion bar 3537 is located an aeration chamber access opening 3507 in a top of the tank and the aeration chamber access opening 3507 is covered by an aeration chamber riser 3533 (shown in broken line). An aeration chamber outlet opening 3536 is located in a bottom center of and extends through a first longitudinal wall 3535 and connects to and is in fluid communication with a clarification chamber inlet opening 3542 that is located in a bottom center of a first clarification chamber longitudinal wall 3541. Above the clarification chamber inlet opening 3542 is located a clarification chamber access opening 3509 in a top of the tank and the clarification chamber access opening 3509 is covered by an clarification chamber riser 3543 (shown in broken line). A clarification chamber outlet pipe 3546 is located adjacent a top of and extends through a first right wall 3545 and connects to and is in fluid communication with a polishing chamber inlet opening 3552 that is adjacent a top of and extends through a left wall 3551 and into an influent well 3554. Attached to a front of the clarification chamber outlet pipe 3546 is a flow equalization apparatus 3549, which in this embodiment includes the flow equalization apparatus design shown and described herein in relation to FIGS. 31 and 32. In addition, the other flow equalization apparatus designs shown and described herein can also be used.

In FIG. 35, and adjacent and surrounding the influent well 3554 on three sides is a filtration well 3557. Unlike prior designs of the polishing chamber, in polishing chamber 3550 the influent well 3554 and the effluent well 3558 are not immediately adjacent to each other. In addition, the filtration well 3557 is a single well that extends from end to end of the polishing chamber 3550 and between the influent well 3554 and the effluent well 3558 and not two separate wells as seen, for example, in FIGS. 2 and 19. Above part of the influent well 3554, a filtration well 3557 and an effluent well 3558 is located a polishing chamber access opening 3508 in a top of the tank and the polishing chamber access opening 3508 is covered by a polishing chamber riser 3553 (shown in broken line). A polishing chamber outlet pipe 3556 extends from the effluent well 3558 through a right wall 3555 to permit the discharge of a final treated wastewater effluent.

Figure 36:
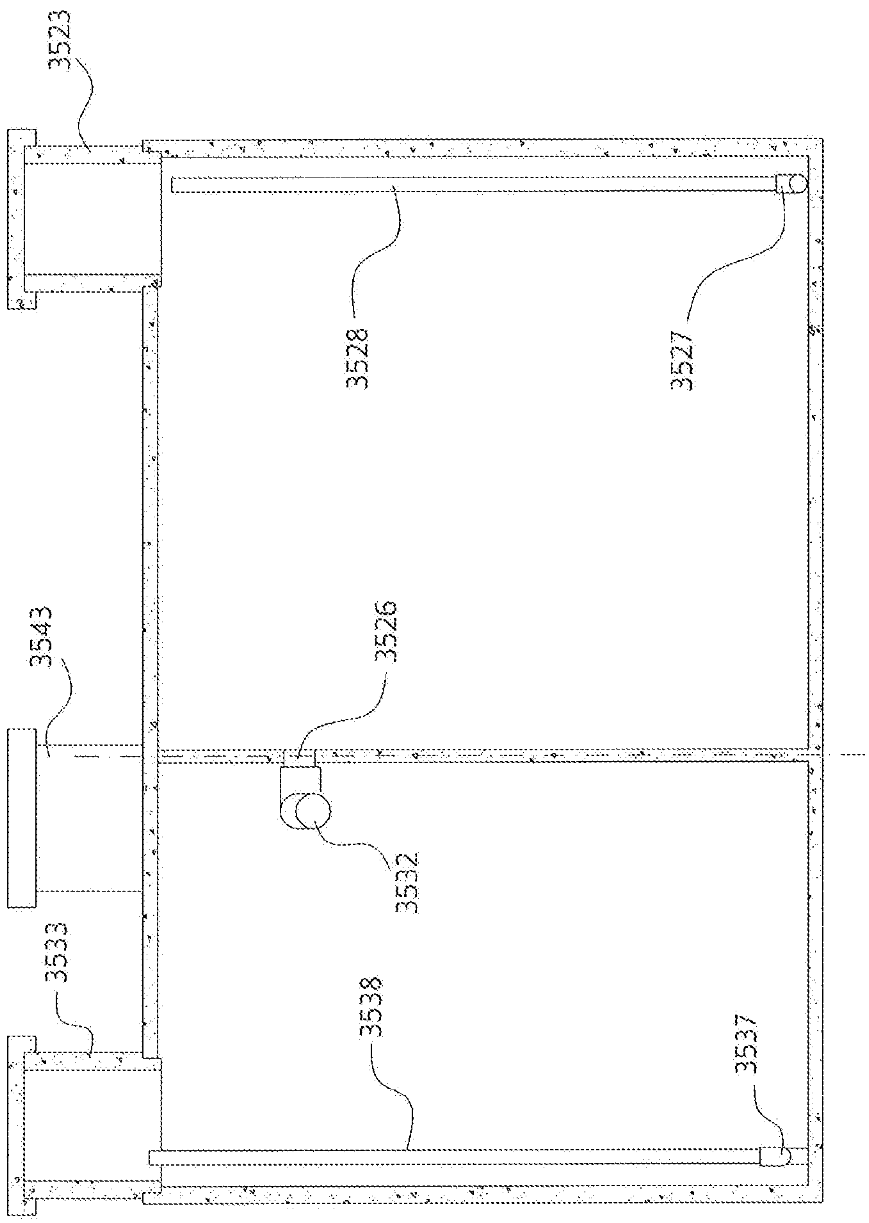
FIG. 36 is a cross-sectional, side view along line Q-Q of the aeration and anoxic chambers of the wastewater treatment system tank of FIG. 35, in accordance with the another one or more embodiments of the disclosed subject matter.

FIG. 36 is a cross-sectional, side view along line Q-Q of the aeration and anoxic chambers of the wastewater treatment system tank of FIG. 35, in accordance with the still another one or more embodiments of the disclosed subject matter. In FIG. 36, the downward tilt of the aeration chamber inlet pipe 3532 is illustrated.

Figure 37:
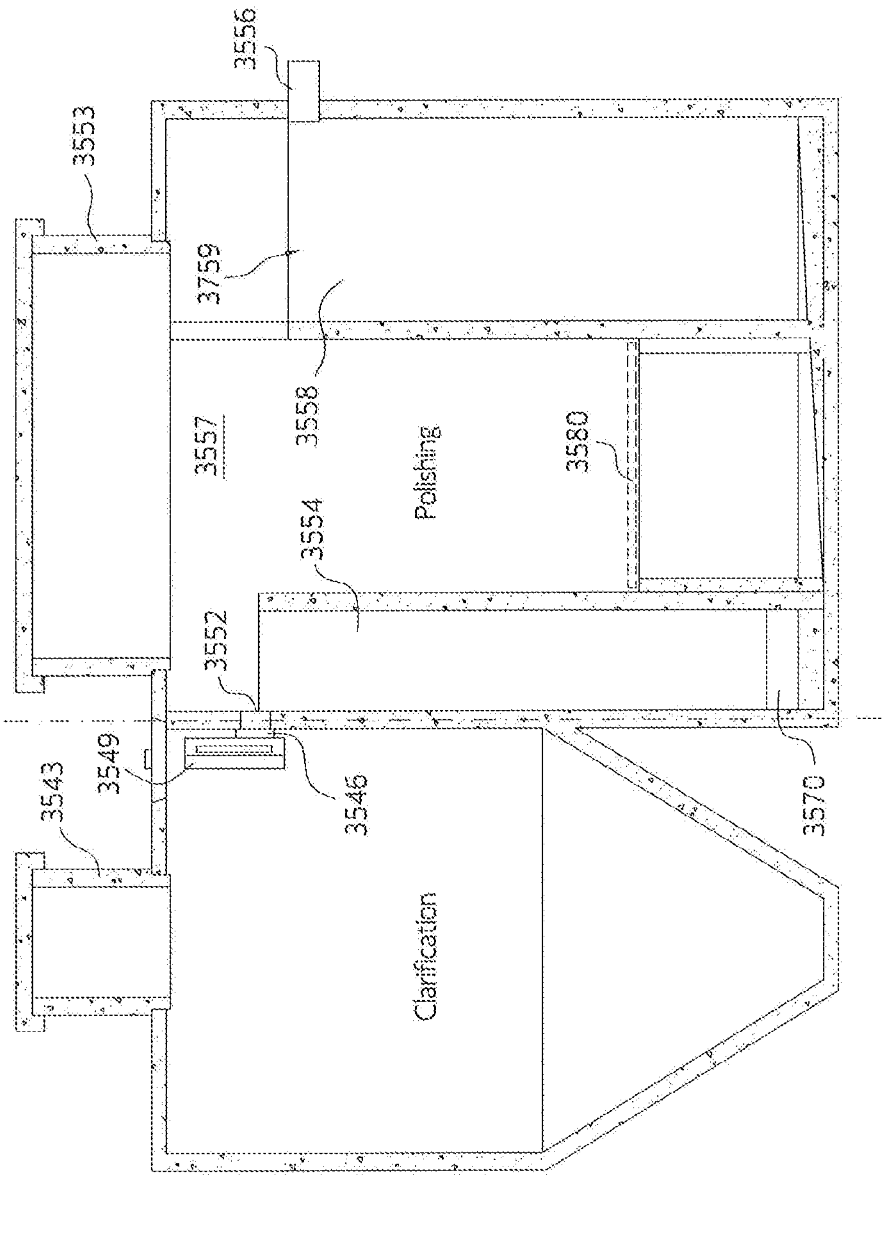
FIG. 37 is a cross-sectional, side view along line R-R of the clarification and polishing chambers of the wastewater treatment system tank of FIG. 35, in accordance with the another one or more embodiments of the disclosed subject matter.

FIG. 37 is a cross-sectional, side view along line R-R of the clarification and polishing chambers of the wastewater treatment system tank of FIG. 35, in accordance with the still another one or more embodiments of the disclosed subject matter. In FIG. 37, the polishing chamber inlet opening 3552 opens into a top end of the influent well 3554, and the influent well 3554 has openings 3570 at the bottom and on each side to permit the flow of water from the influent well 3554 into the filtration well 3557. A porous filtration bed 3580 is shown on which a plurality of filtration media (not shown) are placed to filter the water as it rises up in the filtration well 3557 and spills over an opening 3759 in a top of and into the effluent well 3558.

Figure 38:
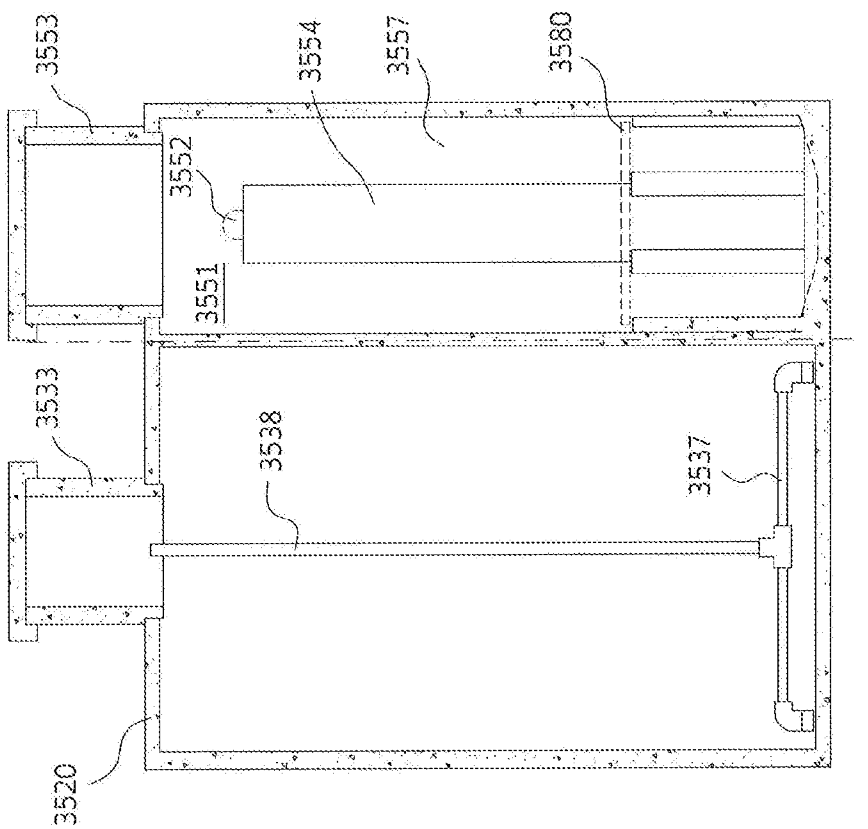
FIG. 38 is a cross-sectional, side view along line S-S of the aeration and polishing chambers of the wastewater treatment system tank of FIG. 35, in accordance with another one or more embodiments of the disclosed subject matter.

FIG. 38 is a cross-sectional, side view along line S-S of the aeration and polishing chambers of the wastewater treatment system tank of FIG. 35, in accordance with the still another one or more embodiments of the disclosed subject matter. In FIG. 38, the polishing chamber inlet pipe 3552 is shown positioned in polishing chamber left wall 3551 *t* partially above the top of the influent well 3554. The diffusion bar 3557 and air supply pipe 3538 are shown in the aeration chamber 3520.

Figure 39:
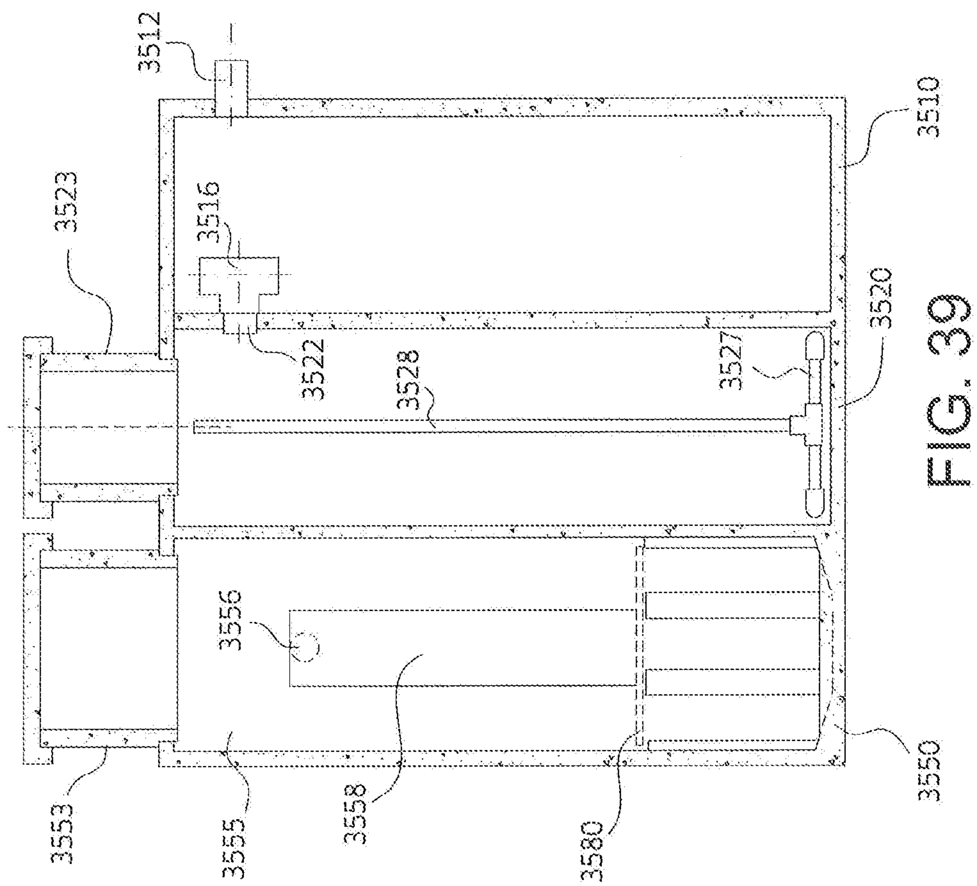
FIG. 39 is a cross-sectional, side view along line T-T of the pretreatment, anoxic and polishing chambers of the wastewater treatment system tank of FIG. 31, in accordance with the another one or more embodiments of the disclosed subject matter.

FIG. 39 is a cross-sectional, side view along line T-T of the pretreatment, anoxic and polishing chambers of the wastewater treatment system tank of FIG. 35, in accordance with the another one or more embodiments of the disclosed subject matter. In FIG. 39, the polishing chamber outlet pipe 3556 is shown positioned in the polishing chamber 3550 left wall 3555 to be below the top of the effluent well 3558.

Figure 40:
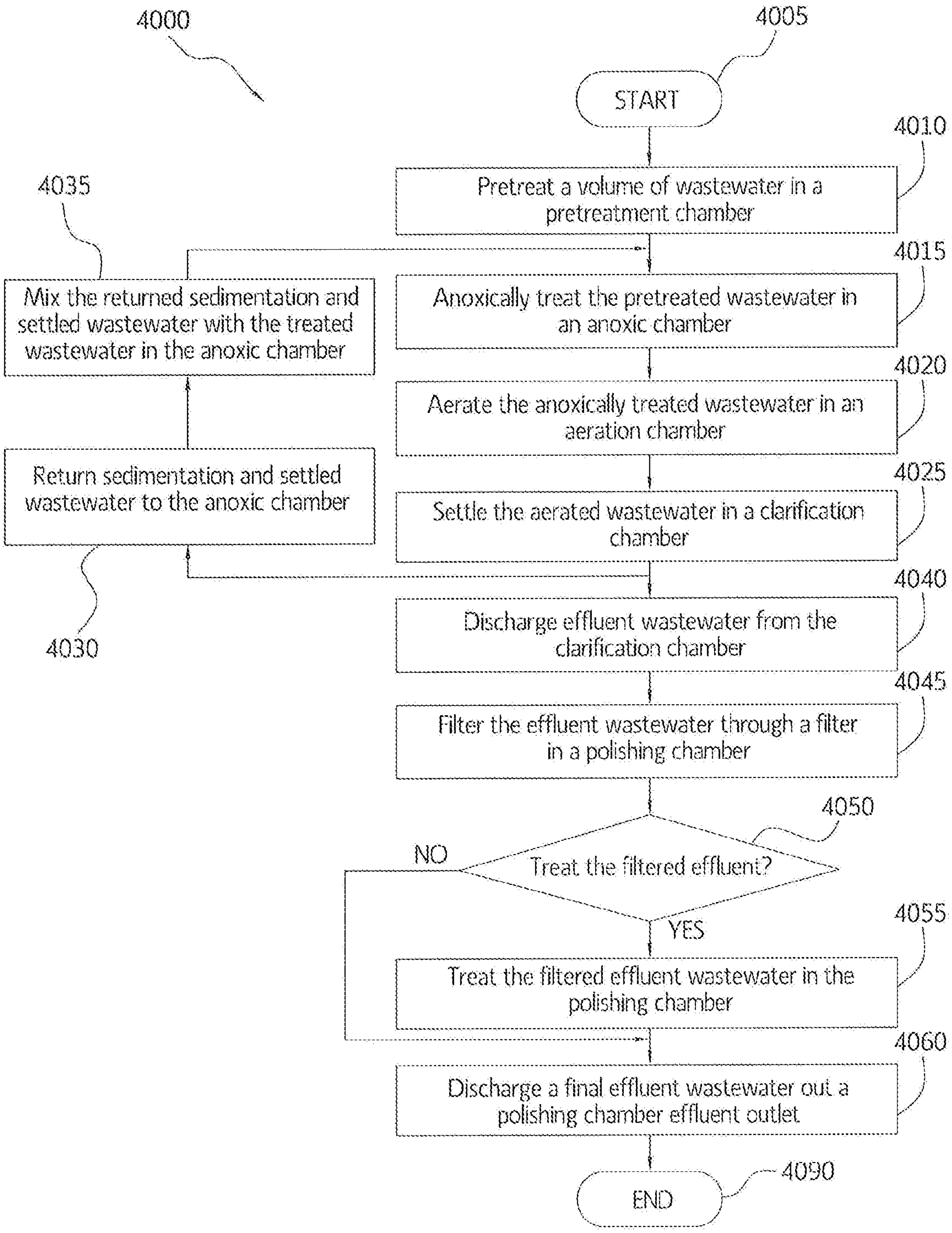
FIG. 40 is flow chart of the method of operation of a wastewater treatment system tank with a pretreatment chamber, an anoxic chamber, an aeration chamber, a clarification chamber and a polishing chamber, in accordance with one or more of the many embodiments of the disclosed subject matter.

FIG. 40 is flow chart of the method of operation of a wastewater treatment system tank with a pretreatment chamber, an anoxic chamber, an aeration chamber, a clarification chamber and a polishing chamber, in accordance with one or more of the many embodiments of the disclosed subject matter. In FIG. 40, the method starts (4005) with the receipt of an influent wastewater volume into a pretreatment chamber. The system pretreats (4010) the volume of wastewater contained in the pretreatment chamber and as the level of pretreated waste water rises to the required level, it spills into an anoxic chamber. The system then anoxically treats (4015) the wastewater in the anoxic chamber and as the level of anoxically treated waste water rises to the required level, it spills into an aeration chamber. The system then aerates (4020) the wastewater in the aeration chamber and the aerated waste water passes into a clarification chamber where the aerated wastewater is settled (4025). As the wastewater is settling (4025), some of the sedimentation and settled wastewater is returned (4030) to the anoxic chamber to be mixed (4035) with the treated wastewater in the anoxic chamber and then further anoxically treated (4015), aerated (4020) and settled (4025). The wastewater that floats to the top of the clarification chamber is discharged (4040) from the clarification chamber, in general, by passing through a flow equalization apparatus, and into a polishing chamber. In the polishing chamber the wastewater is filtered (4045) and then, if determined to be required (4055), it is finally treated (4055), for example, using a disinfection treatment system and/or a phosphorus, nitrogen/nitrate or heavy metal removal system. After either being finally treated (4055) or not, a final effluent wastewater is discharged (4060) from the polishing chamber. The method is ongoing based on the amount and level of wastewater in the system and the extent and concentration of sediment and impurities in the wastewater.

Figure 41:
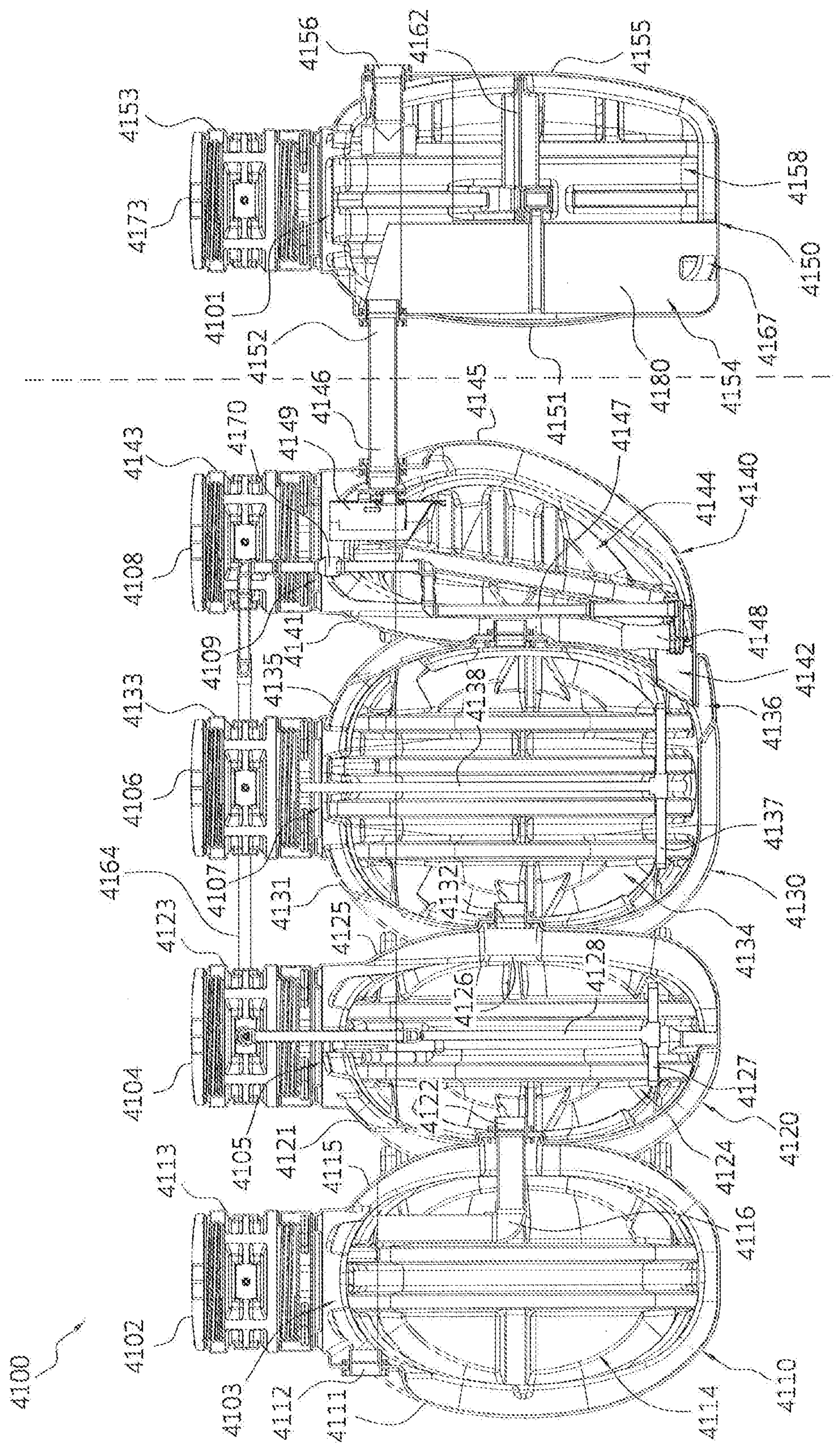
FIG. 41 is a side view of a wastewater treatment system tank with a pretreatment chamber, an anoxic chamber, an aeration chamber, a clarification chamber, and optionally, a polishing chamber, all with risers, in accordance with yet another, one or more embodiments of the disclosed subject matter.

FIG. 41 is a cross-sectional, side view of a wastewater treatment system tank with a pretreatment chamber, an anoxic chamber, an aeration chamber, a clarification chamber, and optionally, a polishing chamber, all with risers, in accordance with yet another, one or more embodiments of the disclosed subject matter. In FIG. 41, a four to five chamber wastewater plant 4100 is shown that is similar to but with some differences from the wastewater plant 2500 shown in FIG. 25. In FIG. 41, the four chamber wastewater plant 4100 includes four separate chambers, a pretreatment chamber 4110, an anoxic chamber 4120, an aeration chamber 4130 and a clarification chamber 4140, that are directly connected together while the five chamber plant includes the above-noted and directly connected four chambers connected to and in fluid communication via a pipe with a polishing chamber 4150. The design and construction of each chamber is similar to that disclosed in the '544 patent. Specifically, the pretreatment chamber 4110 is connected to and in fluid communication with the anoxic chamber 4120 via a pretreatment chamber outlet pipe 4116 that exits the pretreatment chamber 4110 near a middle of a first side wall 4115 and that connects to an anoxic chamber inlet pipe 4122 that enters into an inside 4124 of the anoxic chamber 4120 near a middle of a first side wall 4121. The pretreatment chamber 4110 also has an inlet pipe 4112 that enters through a second side wall 4111 into an inside 4114 of the pretreatment chamber and that is opposite the first side wall 4115 to receive influent wastewater and a pretreatment chamber riser 4113 and a pretreatment chamber riser lid 4102 covering an access opening 4103 in a top of the pretreatment chamber 4110. In the embodiment in FIG. 41, the pretreatment, anoxic, aeration and clarification chambers 4110, 4120, 4130, 4140 are directly connected to each other to form a multi-chamber unit.

In FIG. 41, the anoxic chamber 4120 has an outlet pipe 4126 that exits through a back wall 4125 of the anoxic chamber and the outlet pipe 4126 is directly connected to and in fluid communication with an aeration chamber inlet pipe 4132 that enters through an aeration chamber front wall 4131 into an inside 4134 of the aeration chamber 4130 to receive anoxically treated wastewater from the anoxic chamber 4120 and an anoxic chamber riser 4123 and an anoxic chamber riser lid 4104 covering an anoxic chamber access opening 4105 in a top of the anoxic chamber 4130. A mixing bar 4127 is seen inside of the anoxic chamber 4120 and connected to a pump 4148 in the clarification chamber. Details on the diffusion bar design and operation are provided herein in relation to FIGS. 5-7 and 33.

In FIG. 41, the aeration chamber 4130 has an outlet opening 4136 that exits through a bottom of a back wall 4135 of the aeration chamber and that is directly connected to and in fluid communication with a clarification chamber inlet opening 4142 that enters through a clarification chamber front wall 4141 into an inside 4144 of the clarification chamber 4140 to receive aerated wastewater from the aeration chamber 4130 and an aeration chamber riser 4133 and an aeration chamber riser lid 4106 covering an aeration chamber access opening 4107 in a top of the aeration chamber 4130. An air diffusion bar 4137 is seen inside of the aeration chamber 4130 and connected to an air pump (not shown, but see, 4139 in FIG. 42) via an air supply pipe 4138 and an air inlet line (not shown, but see, 4174 in FIG. 42). Details on the diffusion bar design are provided herein in relation to FIGS. 8-10 and 34. In one or more other embodiments, the air pump 4139 can be located within aeration chamber riser 4133.

In FIG. 41, the clarification chamber 4140 has an outlet pipe 4146 that exits through a top half of a back wall 4145 of the clarification chamber 4140 and that is directly connected to and in fluid communication with either an optional polishing chamber 4150 or a final disposal location. For example, the final disposal location could include a final holding tank and/or a drain field (not shown). A flow equalization apparatus 4149 is located on an intake end of the outlet pipe 4146 to control the amount and rate of the outflow of the treated wastewater. Embodiments of the possible designs of the flow equalization apparatus 4149 are shown and described in relation to FIGS. 14 to 16, 11 to 12, 31 and 32. The clarification chamber 4140 also includes a clarification chamber riser 4143 and a clarification chamber riser lid 4108 covering a clarification chamber access opening 4109 in a top of the clarification chamber 4140. The clarification chamber 4140 further includes a sludge return system that is connected to and in fluid communication with the mixing bar 4137 in the anoxic chamber 4120 via plastic pipe, for example, but not limited to, a first lateral pipe (not shown, but see, 4160 in FIG. 42) extending from the clarification chamber access opening 4109, a longitudinal pipe 4164 extending back toward the anoxic chamber 4120, and a second lateral pipe 4168 extending toward the anoxic chamber access opening 4105. A sludge pump 4148 is located in a bottom of the clarification chamber 4140 adjacent to the clarification chamber inlet opening 4142 and when operated pumps sludge, other sediment and settled wastewater up through a clarification sludge return pipe 4147 (see FIG. 42) and a check valve 4170, the first lateral pipe 4160, the longitudinal pipe 4164, the second lateral pipe 4168, and an anoxic sludge return pipe 4128 (see FIG. 42) to the mixing bar 4127 in the anoxic chamber 4120.

In FIG. 41, the polishing chamber 4150 is shown as a separate system/component that is connected to and in fluid communication with the clarification chamber 4140 via the clarification chamber outlet pipe 4146, which connects to and is in fluid communication with a polishing chamber inlet pipe 4152 in a front wall 4151 of the polishing chamber 4150. The clarification chamber inlet pipe 4152 is located in a top center of the polishing chamber front wall 4151 and provides access for an incoming flow of clarified wastewater from the clarification chamber 4140. The polishing chamber 4150 also has a back wall 4155 through which an effluent outlet pipe 4156 is located in a top center of the back wall 4155 and permits fully treated wastewater to flow out of the polishing chamber 4150. In general, the polishing chamber effluent outlet pipe 4156 is located at a height that is below the polishing chamber inlet opening 4152 and permits a one way flow of wastewater from the clarification chamber 4140 into and out of the polishing chamber 4150. The polishing chamber 4150 also includes a polishing chamber riser 4153 and a polishing chamber riser lid 4173 covering a polishing chamber access opening 4101 in a top of the polishing chamber 4150.

In FIG. 41, the internal structure of the polishing chamber is more clearly illustrated. For example, the inlet pipe 4152 is seen attached to the front wall 4151 of the polishing chamber and in fluid communication with an influent well 4154 in the polishing chamber 4150. The influent well 4154 is located adjacent to and on three sides of and in fluid communication with an effluent well 4158. The influent well 4154 is defined by three walls 4180, 4181 (see, FIG. 49), 4182 (see, FIG. 43) and the front wall of the polishing chamber 4151 and each of the three walls 4180, 4181, 4182 have an opening 4167 to provide fluid communication with the effluent well 4158. A filtration media support tray 4162 is shown generally in the middle of the effluent well 4158 upon which a filtration media (not shown), for example, but not limited to, gravel, plastic elements, natural elements, synthetic elements, rubber elements, ceramic elements and Styrofoam elements.

Figure 42:
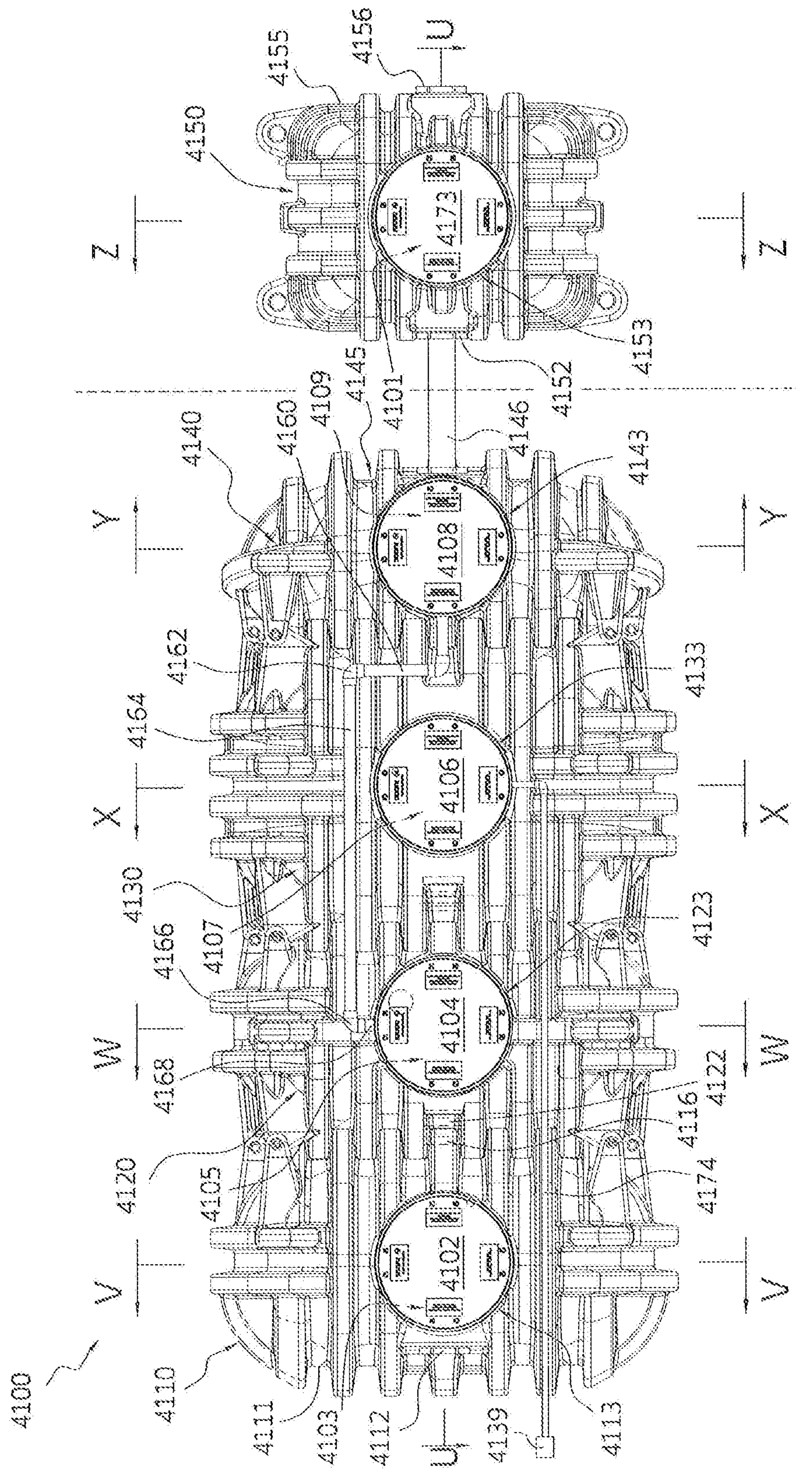
FIG. 42 is a top view of the wastewater treatment system tank with a pretreatment chamber, an anoxic chamber, an aeration chamber, and a clarification chamber of FIG. 41, but with risers on each chamber, in accordance with the another one or more embodiments of the disclosed subject matter.

FIG. 42 is a top view of the wastewater treatment system tank with the pretreatment chamber 4110, the anoxic chamber 4120, the aeration chamber 4130, the clarification chamber 4140, and optionally, the polishing chamber 4150, of FIG. 41, but with risers on each chamber, in accordance with the another one or more embodiments of the disclosed subject matter. In FIG. 42, unlike FIG. 26, the pretreatment chamber 4110 is directly attached to the anoxic chamber 4120, which is in turn directly attached to the aeration chamber 4130, which is directly attached to the clarification chamber 4140. In FIG. 42, the polishing chamber 4150 is not directly attached to the other chambers, but is connected to and in fluid communication with the clarification chamber 4140 via outlet pipe 4146 and inlet pipe 4152. As seen in FIG. 42, the sludge return pipe 4164 is connected to and provides for fluid communication between the pump 4148 in the clarification chamber 4140 and the mixing bar 4127 in the anoxic chamber 4120. An air inlet line 4174 is shown extending from below the pretreatment chamber riser 4113 toward and connecting to the aeration chamber riser 4133. An air pump 4139 is connected to the air inlet line 4174 to supply air to the diffusion bar 4137 in the aeration chamber 4130.

Figure 43:
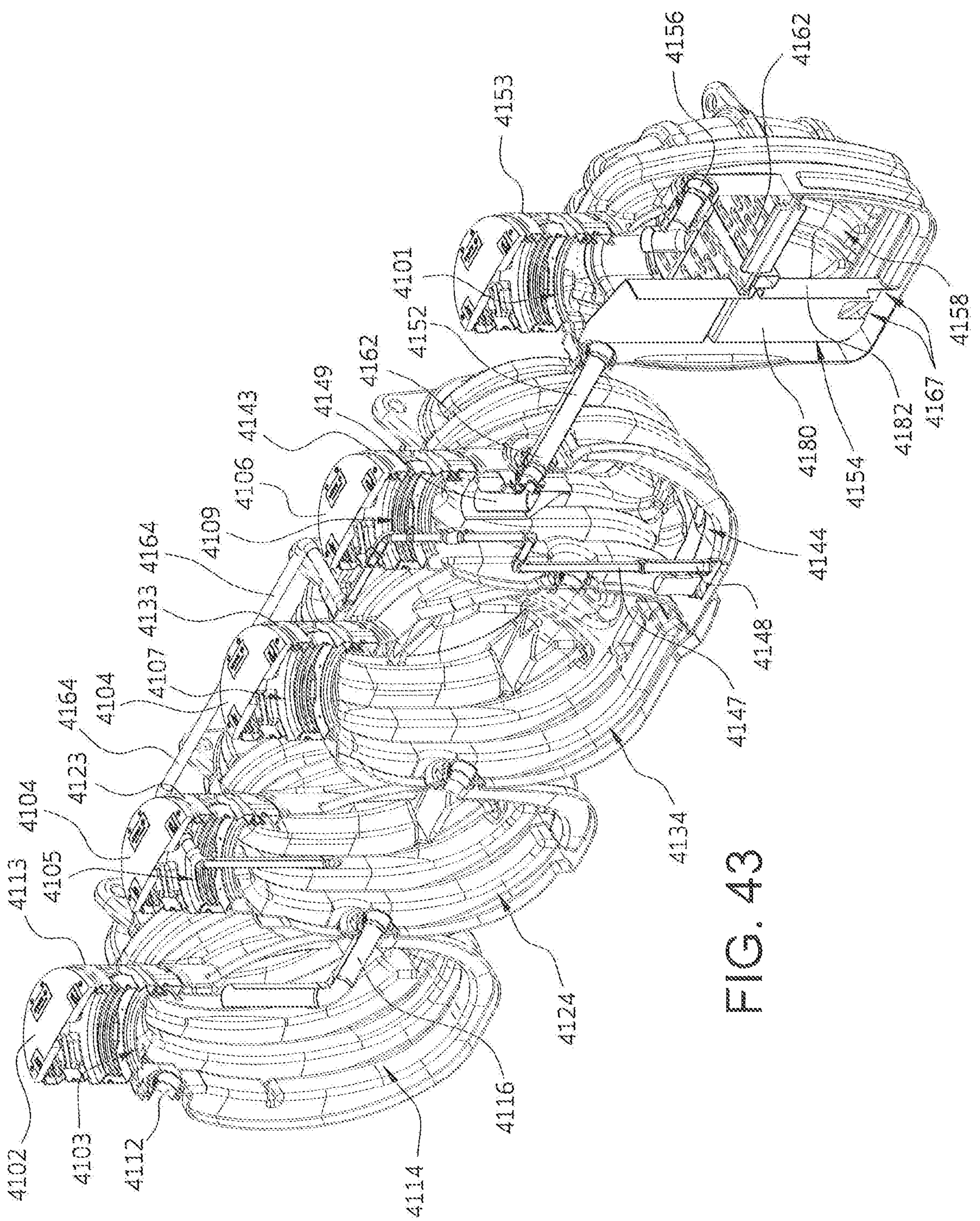
FIG. 43 is a cross-sectional, top front perspective view along line U-U of the wastewater treatment system tank with a pretreatment chamber, an anoxic chamber, an aeration chamber, a clarification chamber and a polishing chamber of FIG. 42, in accordance with the another one or more embodiments of the disclosed subject matter.

FIG. 43 is a cross-sectional, top front perspective view along line U-U of the wastewater treatment system tank with a pretreatment chamber, an anoxic chamber, an aeration chamber, a clarification chamber and a polishing chamber of FIG. 42, in accordance with the another one or more embodiments of the disclosed subject matter. Not all internal elements/features are shown in FIG. 43.

Figure 44:
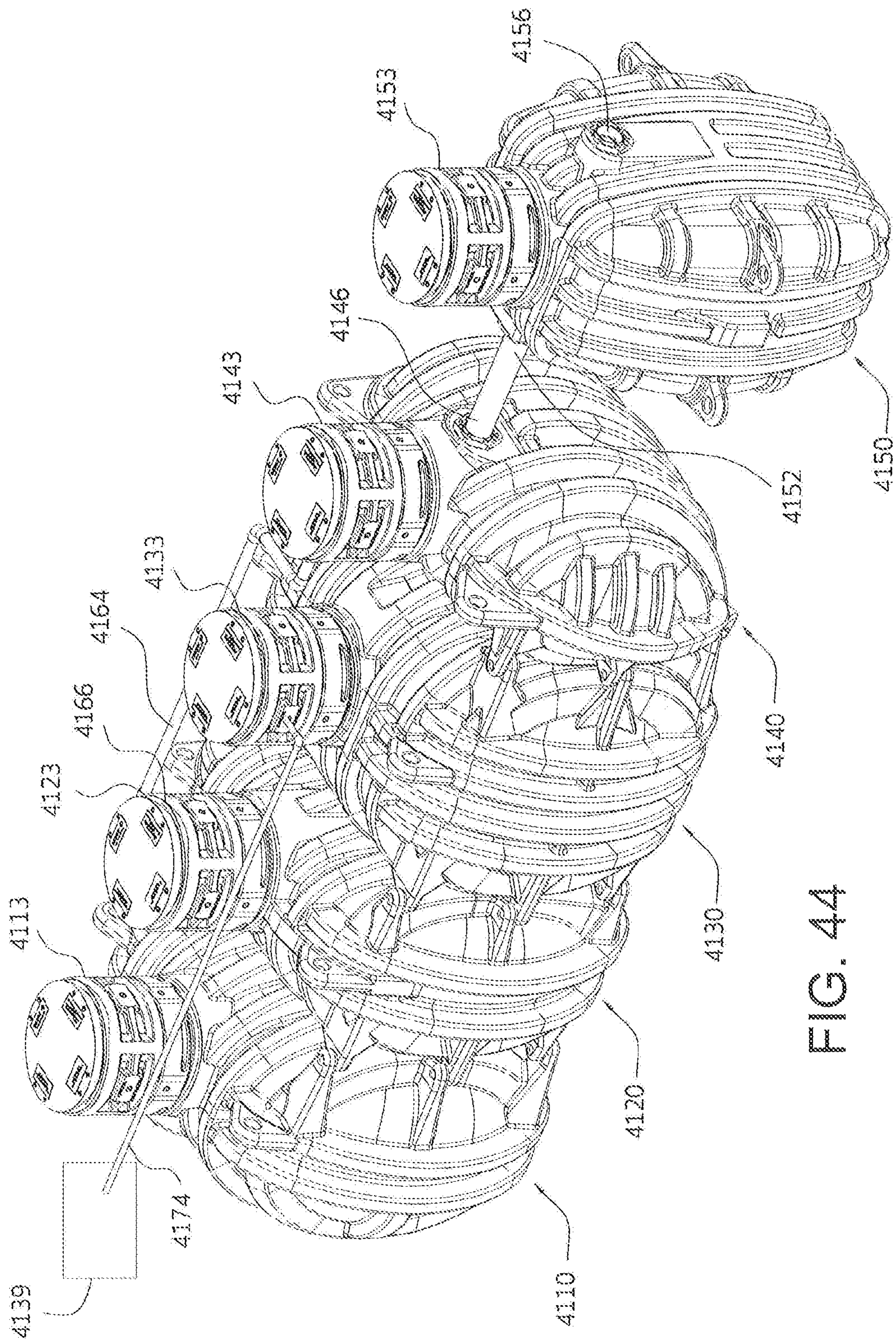
FIG. 44 is a top front perspective view of the wastewater treatment system tank with a pretreatment chamber, an anoxic chamber, an aeration chamber, a clarification chamber and a polishing chamber of FIG. 41, in accordance with the another one or more embodiments of the disclosed subject matter.

FIG. 44 is a top front perspective view of the wastewater treatment system tank with a pretreatment chamber, an anoxic chamber, an aeration chamber, a clarification chamber and a polishing chamber of FIG. 41, in accordance with the another one or more embodiments of the disclosed subject matter. In FIG. 44, and the air pump 4139 is shown connected to the air inlet pipe 4174, which is in turn connected to the air supply pipe 4138 and the diffuser bar 4137 in the aeration chamber 4130.

Figure 45:
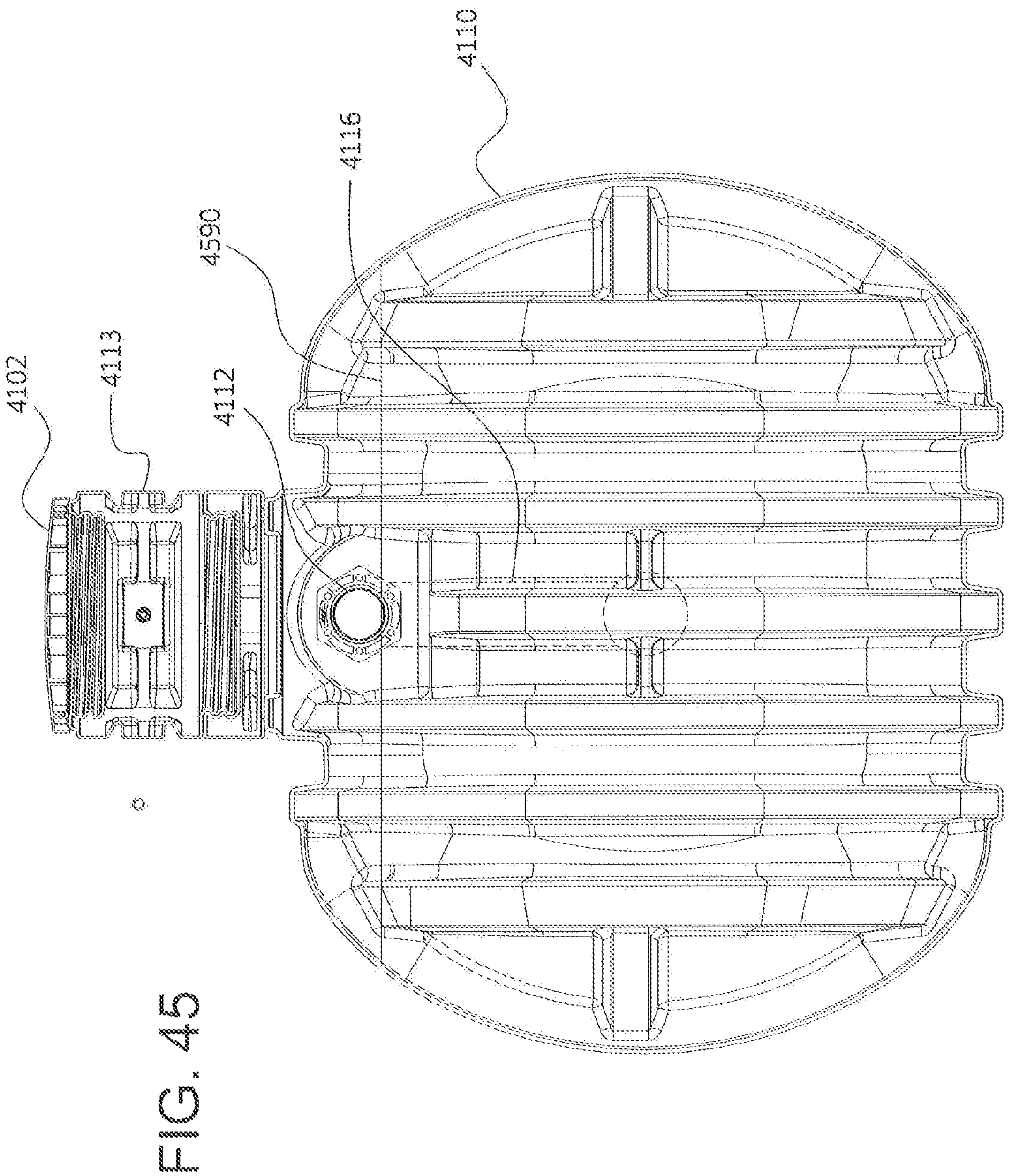
FIG. 45 is a cross-sectional, side view along line V-V of the pretreatment chamber of the wastewater treatment system tank of FIG. 42, in accordance with the another one or more embodiments of the disclosed subject matter.

FIG. 45 is a cross-sectional, side view along line V-V of the pretreatment chamber 4110 of the wastewater treatment system tank of FIG. 42, in accordance with the another one or more embodiments of the disclosed subject matter. In FIG. 45, a water line 4590 of the pretreatment chamber is shown at bottom of inlet pipe 4112 and at a top of is positioned pretreatment chamber outlet pipe 4116 (shown in broken line).

Figure 46:
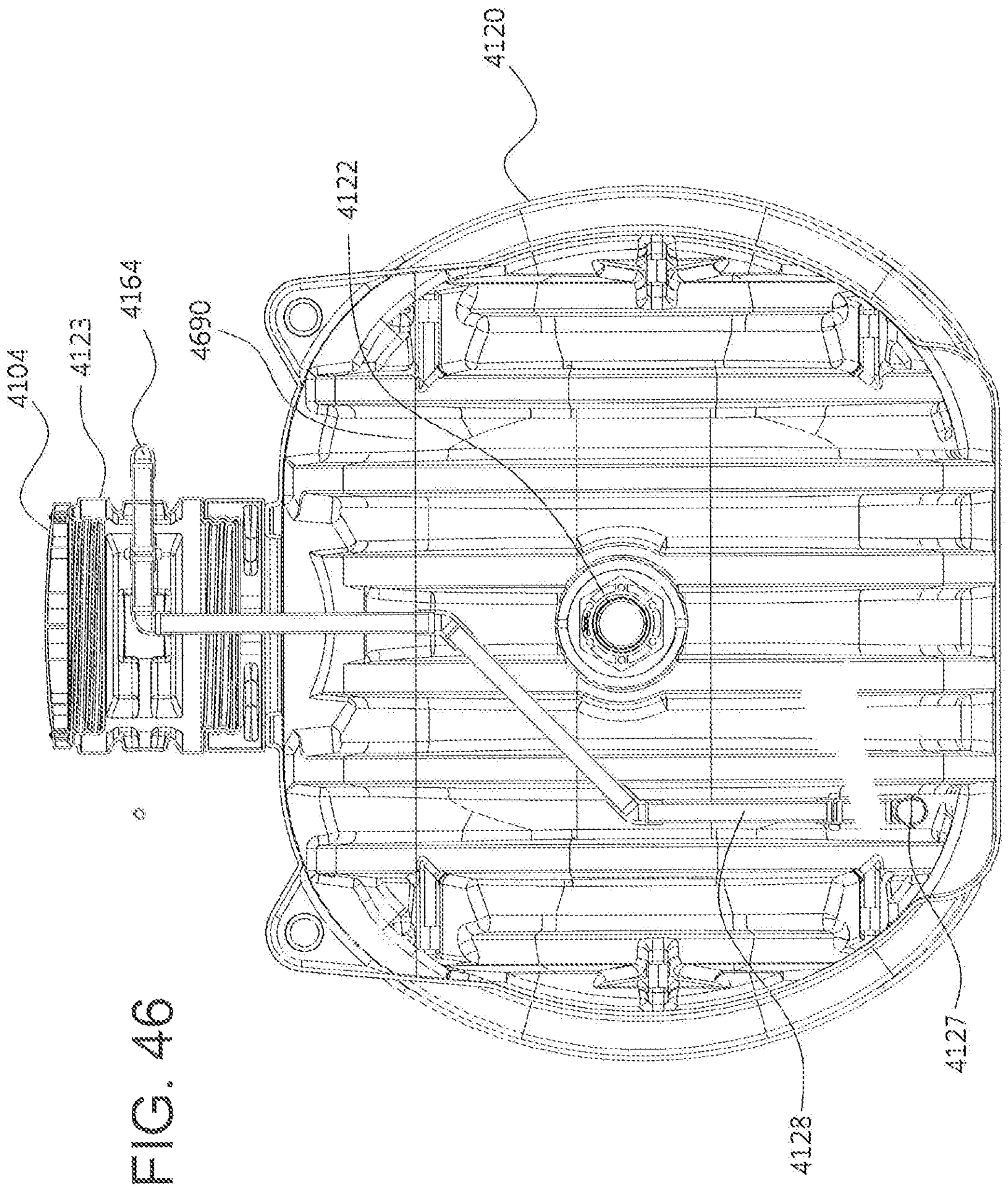
FIG. 46 is a cross-sectional, side view along line W-W of the anoxic chamber of the wastewater treatment system tank of FIG. 42, in accordance with the one or more embodiments of the disclosed subject matter.

FIG. 46 is a cross-sectional, side view along line W-W of the anoxic chamber 4120 of the wastewater treatment system tank of FIG. 42, in accordance with the one or more embodiments of the disclosed subject matter. In FIG. 46, an anoxic chamber water line 4690 is shown above the anoxic chamber inlet pipe 4122, which is at approximately the same height as an outlet end of the pretreatment chamber outlet pipe 4116 of FIG. 45. Returning to FIG. 46, the mixing bar 4127 is shown to be located adjacent, but generally, above, the bottom of the anoxic chamber 4120 and below the end of anoxic chamber inlet pipe 4122 located inside the anoxic chamber 4120.

Figure 47:
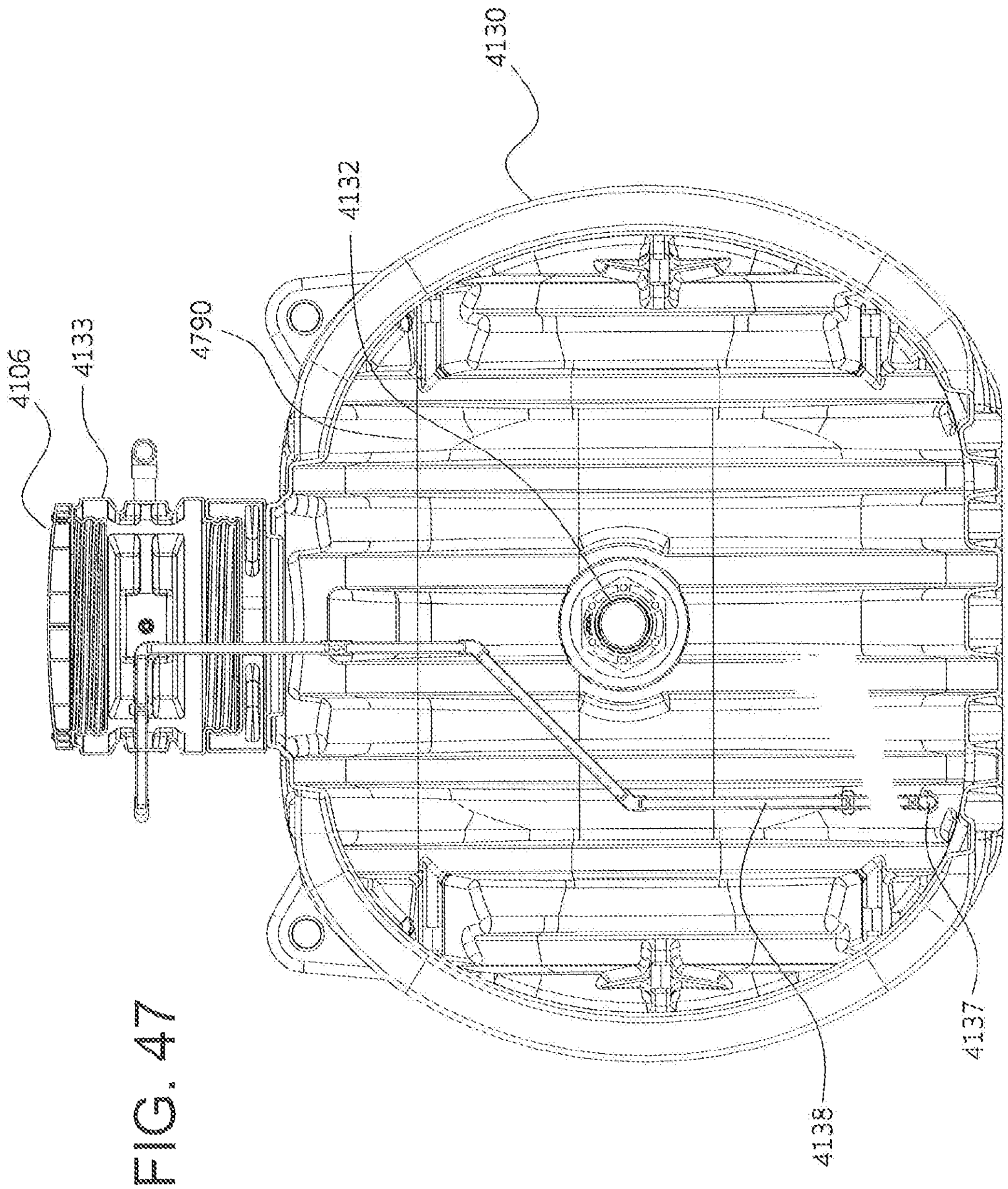
FIG. 47 is a cross-sectional, side view along line X-X of the aeration chamber of the wastewater treatment system tank of FIG. 42, in accordance with the another one or more embodiments of the disclosed subject matter.

FIG. 47 is a cross-sectional, side view along line X-X of the aeration chamber 4130 of the wastewater treatment system tank of FIG. 42, in accordance with the another one or more embodiments of the disclosed subject matter. In FIG. 47, an aeration chamber water line 4790 is shown above the aeration chamber inlet pipe 4132, while the diffusion bar 4137 is located adjacent the bottom of the aeration chamber 4130 and below the end of aeration chamber inlet pipe 4132 located inside the aeration chamber 4130.

Figure 48:
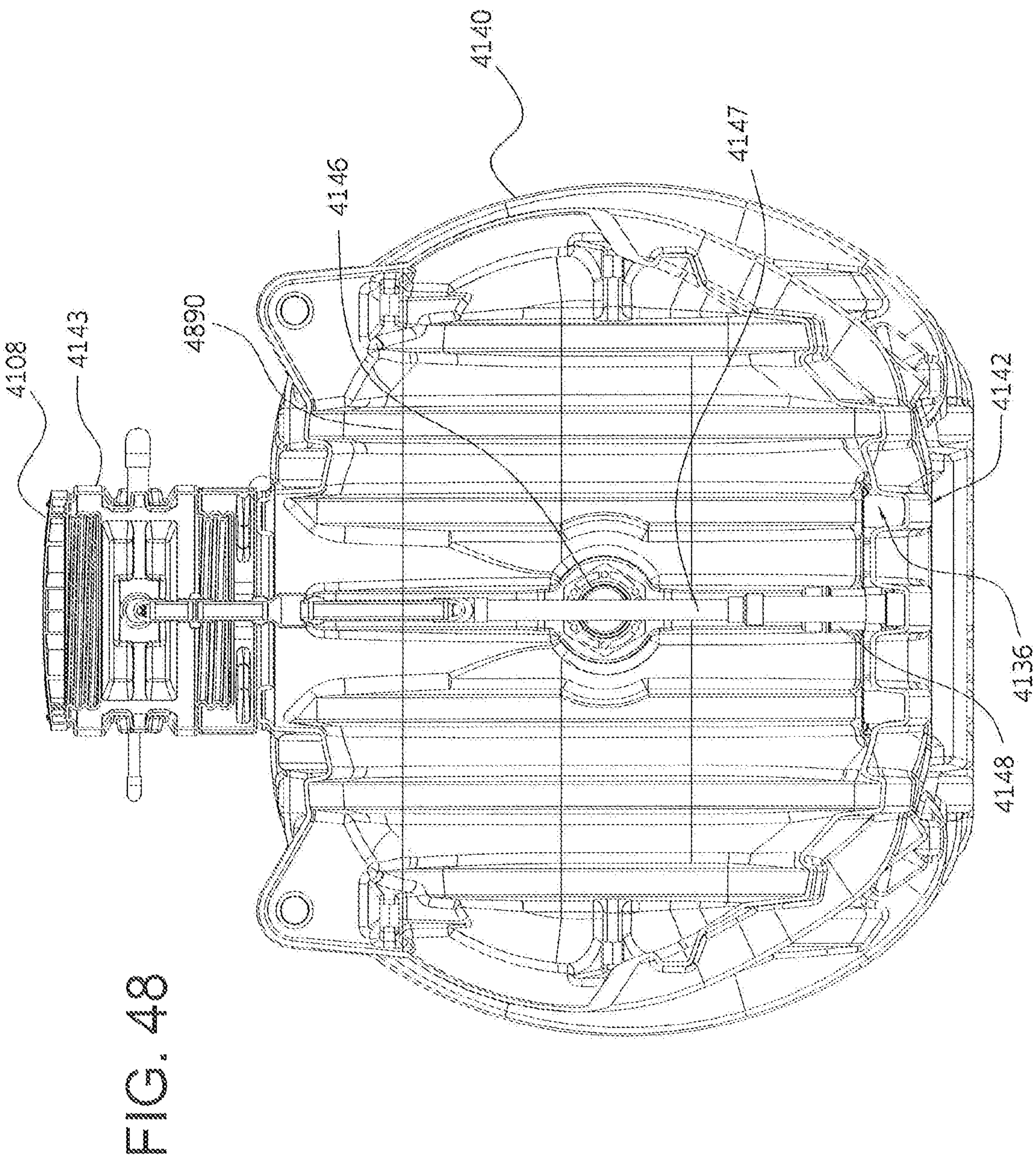
FIG. 48 is a cross-sectional, side view along line Y-Y of the clarification chamber of the wastewater treatment system tank of FIG. 42, in accordance with the another one or more embodiments of the disclosed subject matter.

FIG. 48 is a cross-sectional, side view along line Y-Y of the clarification chamber of the wastewater treatment system tank of FIG. 42, in accordance with the another one or more embodiments of the disclosed subject matter. In FIG. 48, a clarification chamber water line 4890 is shown above the clarification chamber outlet pipe 4146; while the return sludge pump 4148 is located adjacent the bottom of the clarification chamber 4140 and the sludge return pipe 4147 extends upwardly away from the sludge return pump 4148 and to the check valve 4170.

Figure 49:
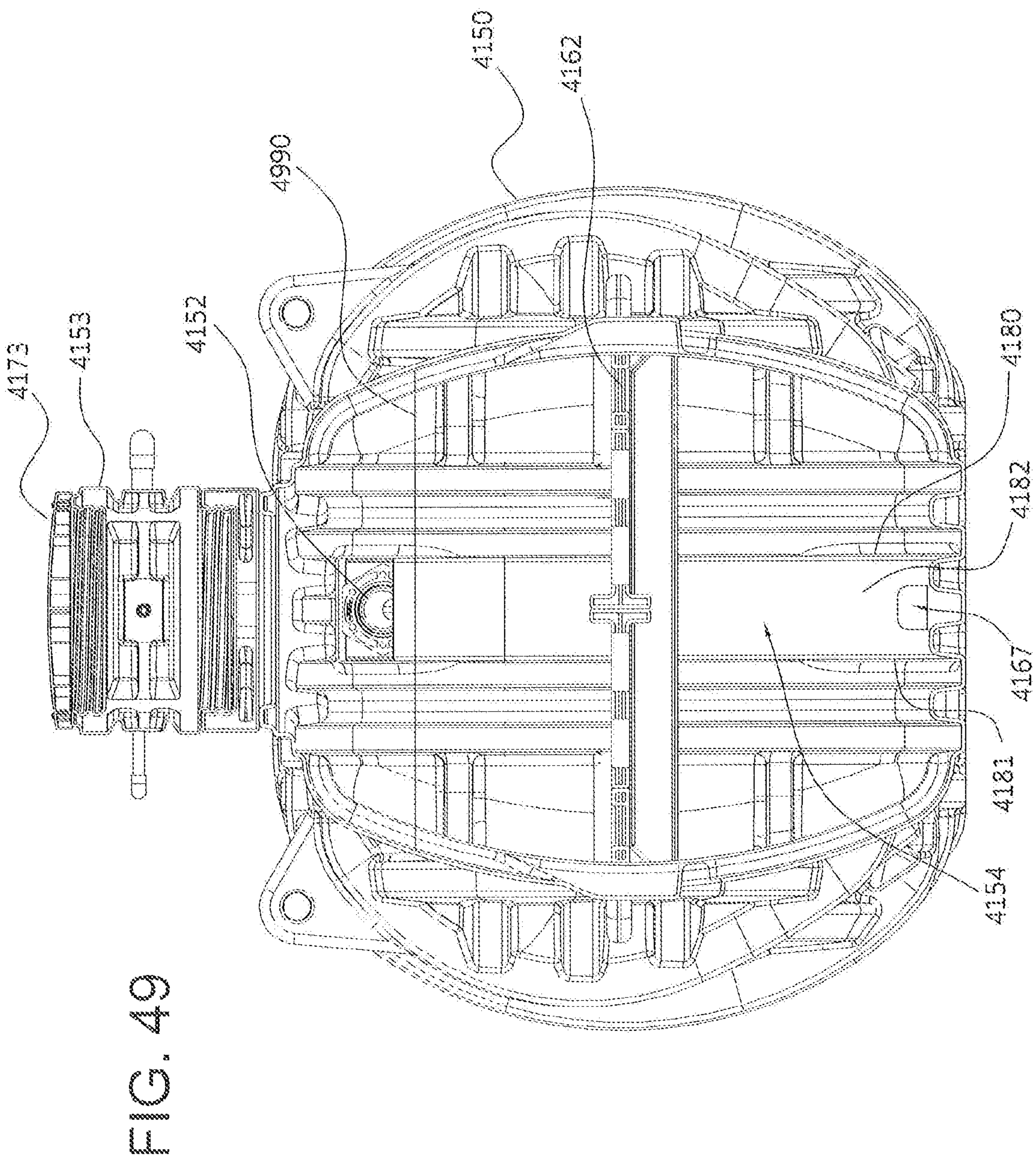
FIG. 49 is a cross-sectional, side view along line Z-Z of the polishing chamber of the wastewater treatment system tank of FIG. 42, in accordance with the another one or more embodiments of the disclosed subject matter.

FIG. 49 is a cross-sectional, side view along line Z-Z of the polishing chamber of the wastewater treatment system tank of FIG. 42, in accordance with the another one or more embodiments of the disclosed subject matter. In FIG. 49, location of the influent well 4154 and one of the influent well exits 4167 adjacent the bottom of the influent well 4154 in the polishing chamber 4150 and the filtration media tray 4162 are clearly illustrated. In addition, the polishing chamber inlet pipe 4152 is shown above atop of the influent well 4154 and a water line 4990 is shown slightly below the top of the influent well 4154.

Figure 50:
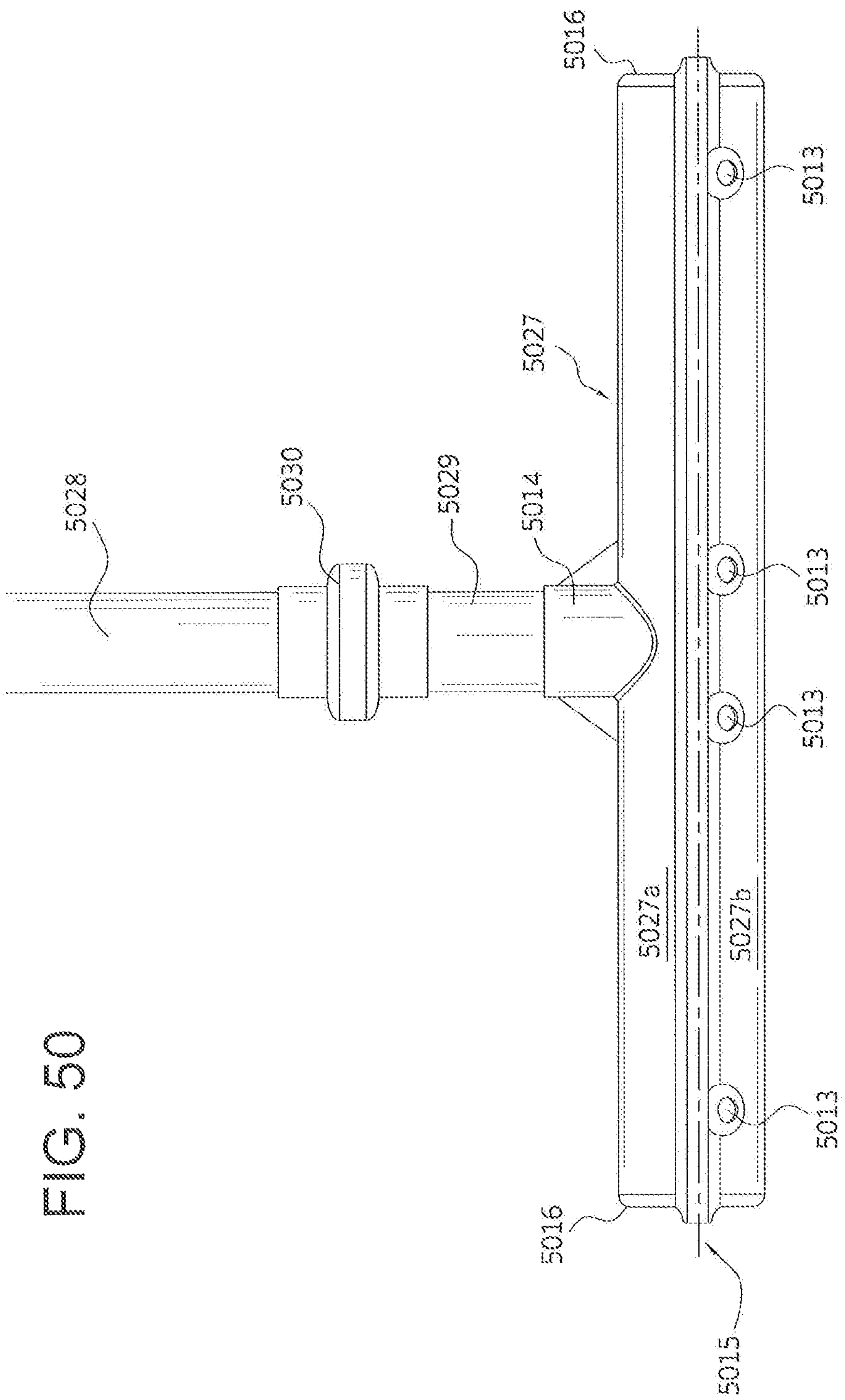
FIG. 50 is a longitudinal front view of another mixing bar of a wastewater treatment system tank with a pretreatment chamber, an anoxic chamber, an aeration chamber, a clarification chamber and a polishing chamber, in accordance with one or more embodiments of the disclosed subject matter.

FIG. 50 is a longitudinal front view of another mixing bar of a wastewater treatment system tank with a pretreatment chamber, an anoxic chamber, an aeration chamber, a clarification chamber and a polishing chamber, in accordance with one or more embodiments of the disclosed subject matter. In FIG. 50, a mixing bar 5027, which may be similar to and used the same as the mixing bar 127 in FIG. 1, is shown in FIG. 50 being connected to a short supply pipe 5029 that is in turn connected to a bottom end of a connector 5030 that is connected at a top of the connector 5030 to a long supply pipe 5028. The mixing bar includes two body portions, a top portion **5027*a* and a bottom portion 5027*b* that are connected together longitudinally. The top portion 5027*a* has a "T"-shaped junction 5014 located about in a middle of the top portion 5027*a* and that connects with a bottom end of the short supply pipe 5029. Each end of the mixing bar 5027 is sealingly covered with an end cap 5016. The body portions 5027*a*, 5027*b* and the end caps 5016 are made from plastic. In general, on the mixing bar 5027, the bottom portion 5027*b* has multiple openings 5013 extending through an exterior wall of and into an inside of the bottom portion 5027*b*. In general, the openings 5013 are below a midline 5015 between the top and bottom portions 5027*a*, 5027*b* and are angled downwardly away from the midline 5015. In the embodiment in FIG. 50, the openings are about ½" in diameter and at about a 15 degree downward angle measured from the midline 5015. In FIG. 50, four openings 5013 are shown on the front side of and in the bottom portion 5027*b* with the two inner openings being located below and to either side of where the short supply pipe 5029 connects to the top portion 5027*b*. The other two openings 5013 are located on the same front side and in line with the inner openings, but adjacent opposite ends of the bottom portion 5027*b*. The openings 5013 may also include more than four openings and be equally spaced apart along a length of the mixing bar 5027**.

Figure 51:
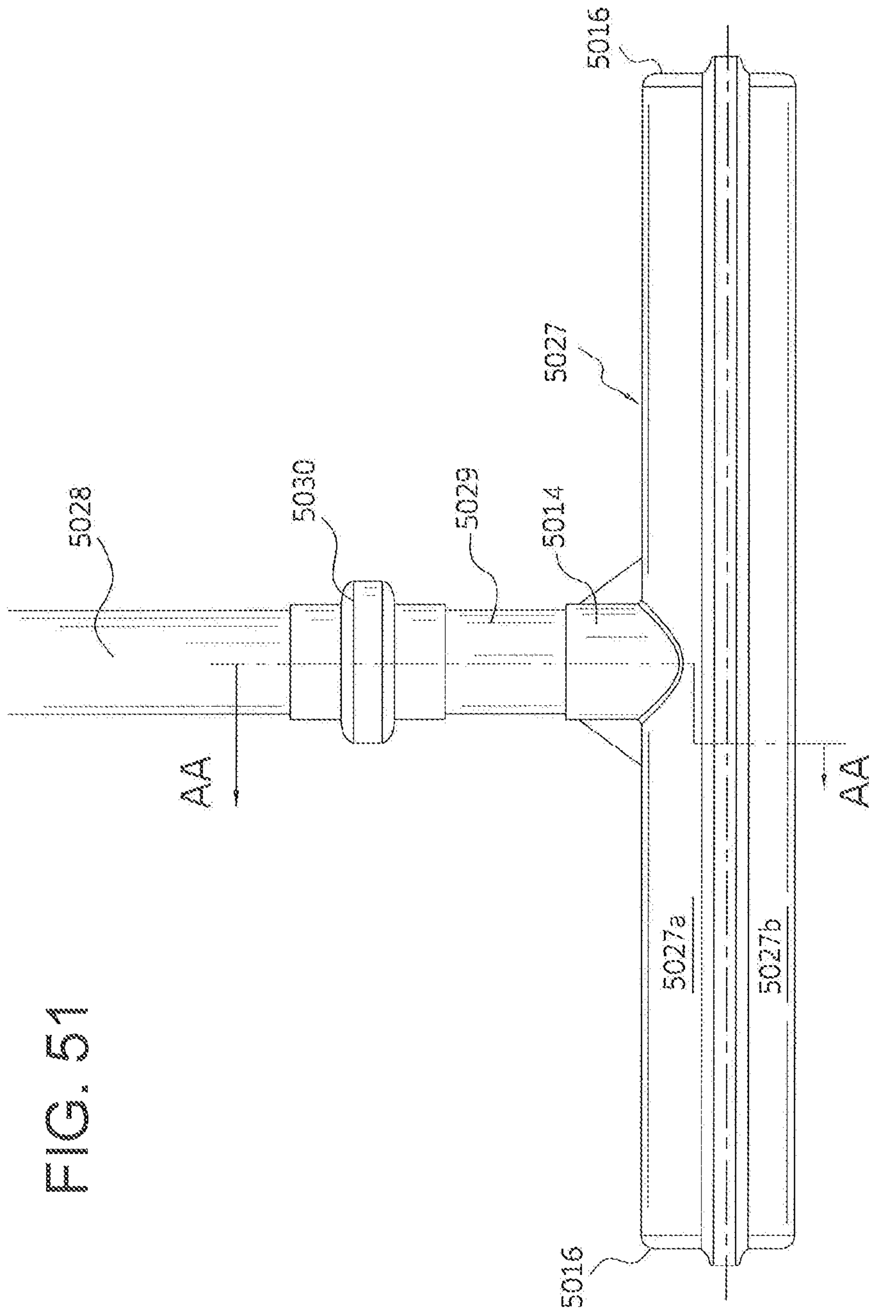
FIG. 51 is a longitudinal back view of the mixing bar of FIG. 50, in accordance with one or more embodiments of the disclosed subject matter.

FIG. 51 is a longitudinal back view of the mixing bar of FIG. 50, in accordance with one or more embodiments of the disclosed subject matter. In FIG. 51, the back side of the bottom portion **5027*b*** is shown not to include openings.

Figure 52:
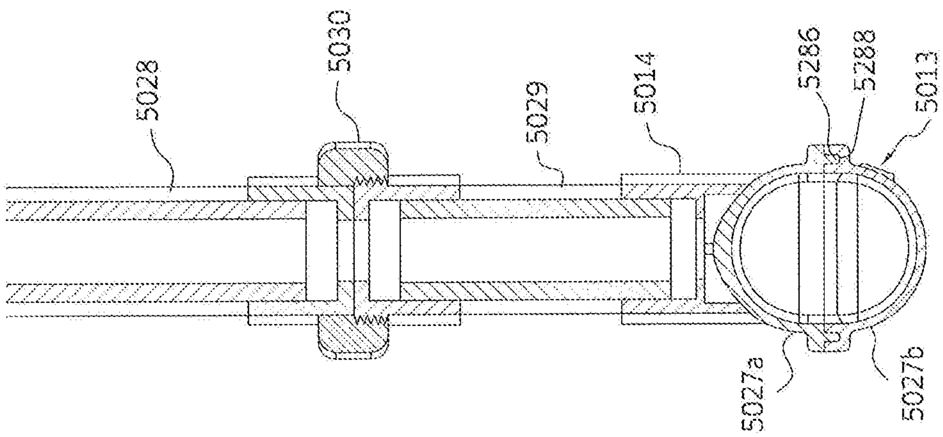
FIG. 52 is a cross-sectional end view of the mixing bar of FIG. 51 along line AA-AA, in accordance with one or more embodiments of the disclosed subject matter.

FIG. 52 is a cross-sectional end view of the mixing bar of FIG. 51 along line AA-AA, in accordance with one or more embodiments of the disclosed subject matter. In FIG. 52, the two-piece construction of the mixing bar 5027 is illustrated. Specifically, the top portion **5027*a* is shown to have a ridge 5286 downwardly depending from a bottom surface of the top portion 5027*a*. The bottom portion 5027*b* is shown to have a groove 5288 downwardly depending from a top surface of the bottom portion 5027*b* where the groove 5288 is reciprocally shaped to receive and mate with the ridge 5286 of the top portion 5027*a*. The top and bottom portions may be permanently affixed to each other with glue, adhesive or other method, or they may be removably connected by the end caps 5016, which could be removably affixed at each end of the top and bottom portions 5027*a*, 5027*b***.

Figure 53:
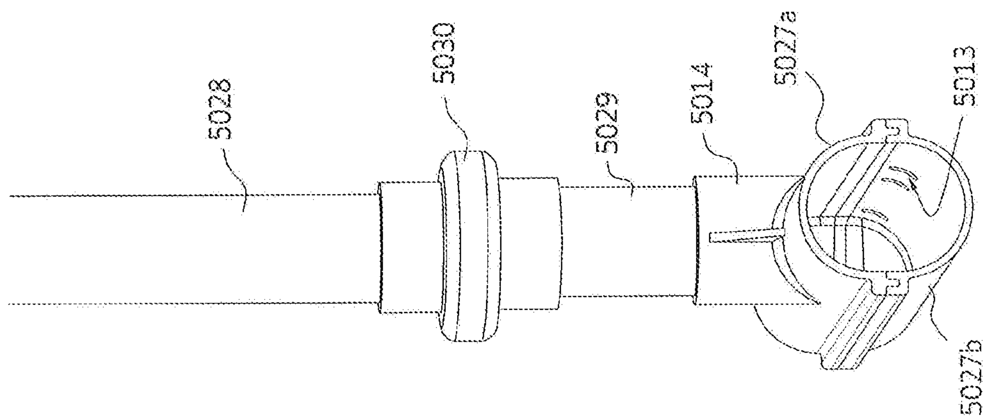
FIG. 53 is a top perspective, cross-sectional, end view along line AA-AA of the mixing bar of FIG. 51, in accordance with one or more embodiments of the disclosed subject matter.

FIG. 53 is a top perspective, cross-sectional, end view along line AA-AA of the mixing bar of FIG. 51, in accordance with one or more embodiments of the disclosed subject matter. In FIG. 53, the inside ends of three of the openings 5013 is shown.

Figure 54:
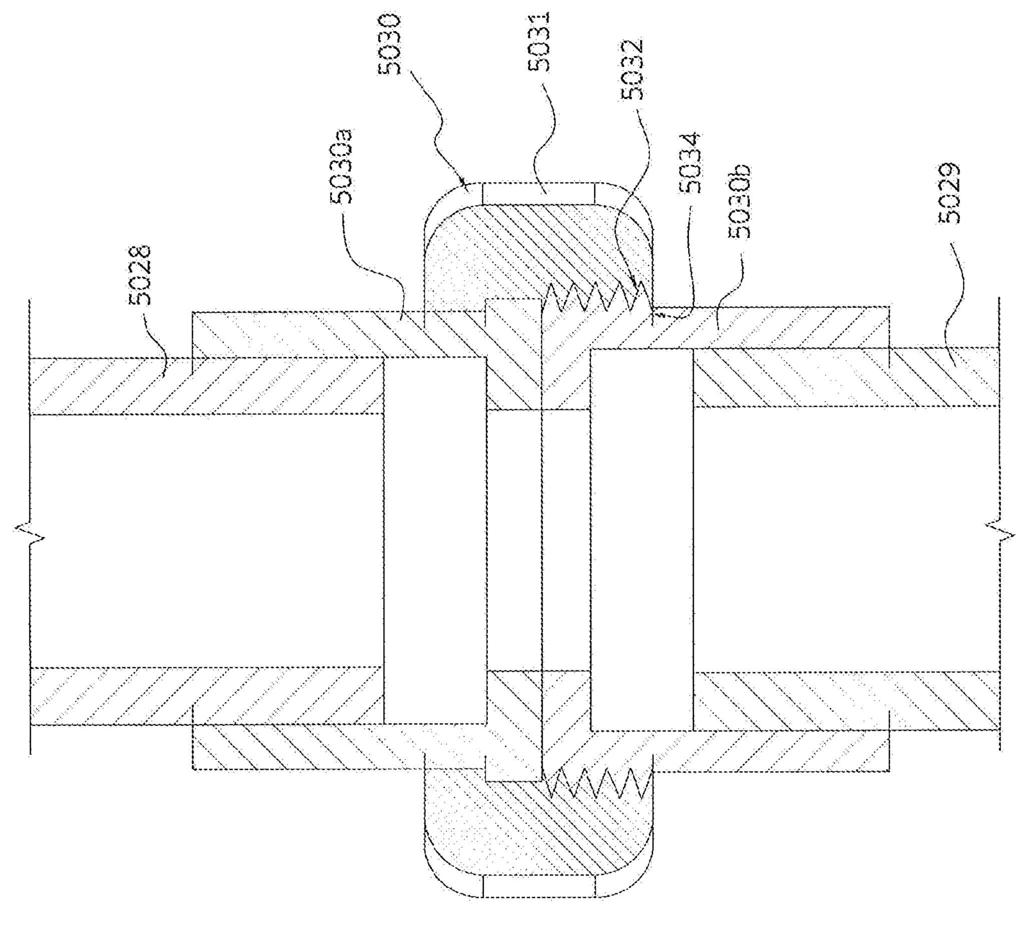
FIG. 54 is close up, cross-sectional view of the connector of FIG. 52, in accordance with one or more embodiments of the disclosed subject matter.

FIG. 54 is close up, cross-sectional view of the connector of FIG. 52, in accordance with one or more embodiments of the disclosed subject matter. In FIG. 54, the connector 5030 is shown to include a top section **5030*a* with a circumferential center section 5031 with internal threads 5032 located at a bottom of the circumferential center section 5031 and a bottom portion 5030*b* with a top end with reciprocally threaded threads 5034 for threadingly connecting with circumferential center section 5031**.

Figure 55:
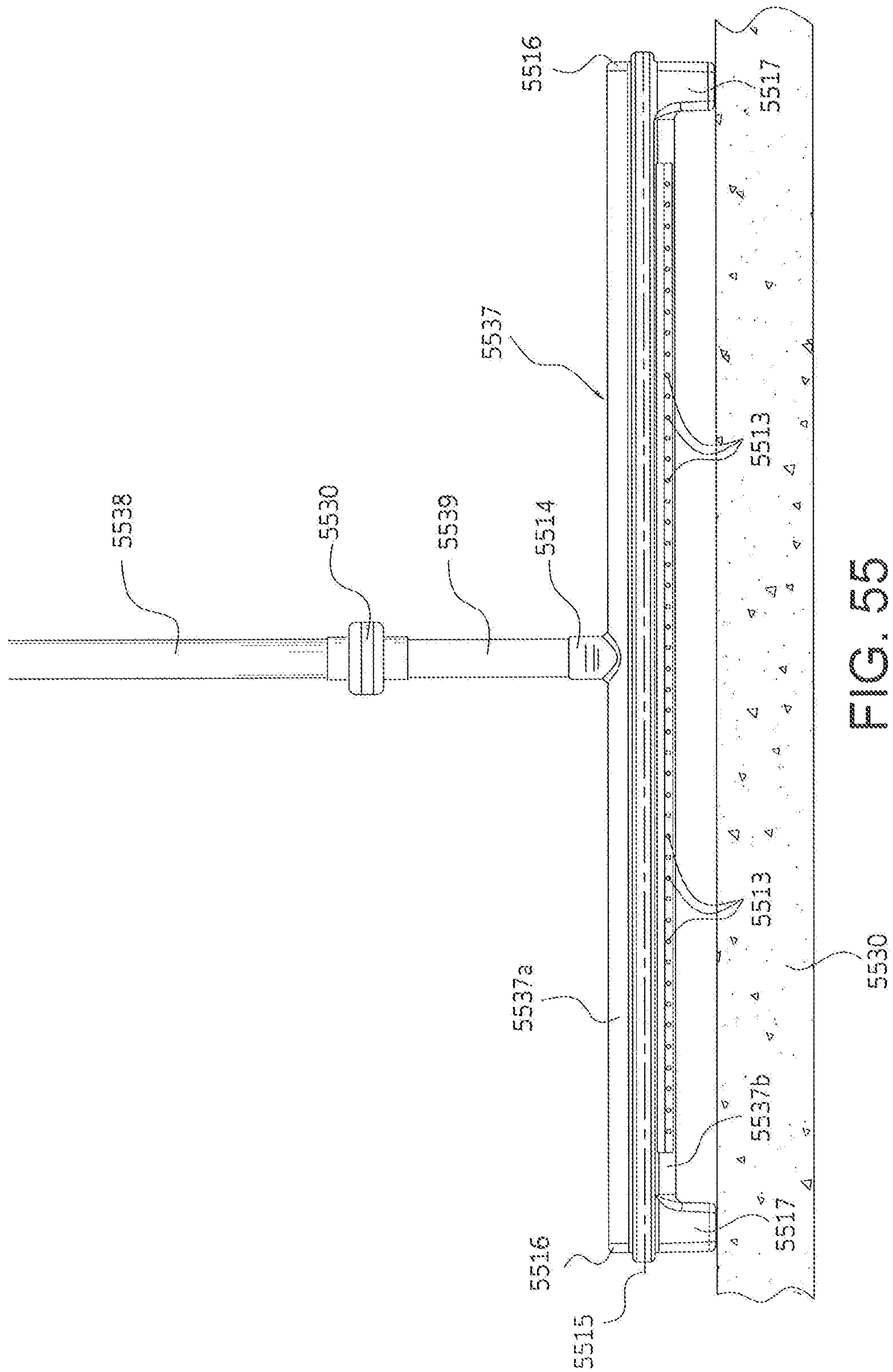
FIG. 55 is a front view of a diffusion bar of a wastewater treatment system tank with a pretreatment chamber, an anoxic chamber, an aeration chamber, a clarification chamber and a polishing chamber, in accordance with one or more embodiments of the disclosed subject matter.

FIG. 55 is a front view of a diffusion bar of a wastewater treatment system tank with a pretreatment chamber, an anoxic chamber, an aeration chamber, a clarification chamber and a polishing chamber, in accordance with one or more embodiments of the disclosed subject matter. In FIG. 55, a diffusion bar 5537, such as, for example the diffusion bar 137 of FIG. 1, is shown in FIG. 55 being connected to a short supply pipe 5539 that is in turn connected to a bottom end of a connector 5530 that is connected at a top of the connector 5530 to a long supply pipe 5538. The diffusion bar 5537 includes two body portions, a top portion **5537*a* and a bottom portion 5537*b* that are connected together longitudinally. The top portion 5537***a* has a "T"-shaped junction 5514 located about in a middle of the top portion and that connects with a bottom end of the short supply pipe 5539. Each end of the diffusion bar 5537 is sealingly covered with an end cap 5516. The body portions 5537*a*, 5537*b* and the end caps 5516 are made from plastic. In general, on the diffusion bar 5537, the bottom portion 5537*b* has multiple air openings 5513 extending through an exterior wall of and into an inside of the bottom portion 5537*b* to rest on a bottom of aeration chamber 5530. In general, the openings 5513 are below a midline 5515 between the top and bottom portions 5537*a*, 5537*b* and are angled downwardly away from the midline 5515. The bottom portion 5037*b* also includes two supports 5517 that extend downwardly from opposite ends of the bottom portion 5037*b*. In FIG. 55, the bottom portion 5037*b* further includes multiple openings 5513 that are equally spaced apart along a length of the bottom portion of the diffusion bar 5537. In FIG. 55, the multiple air openings 5513 are about 3⁄32" in diameter and angled downwardly at about 45 degrees below the midline 5515.

Figure 56:
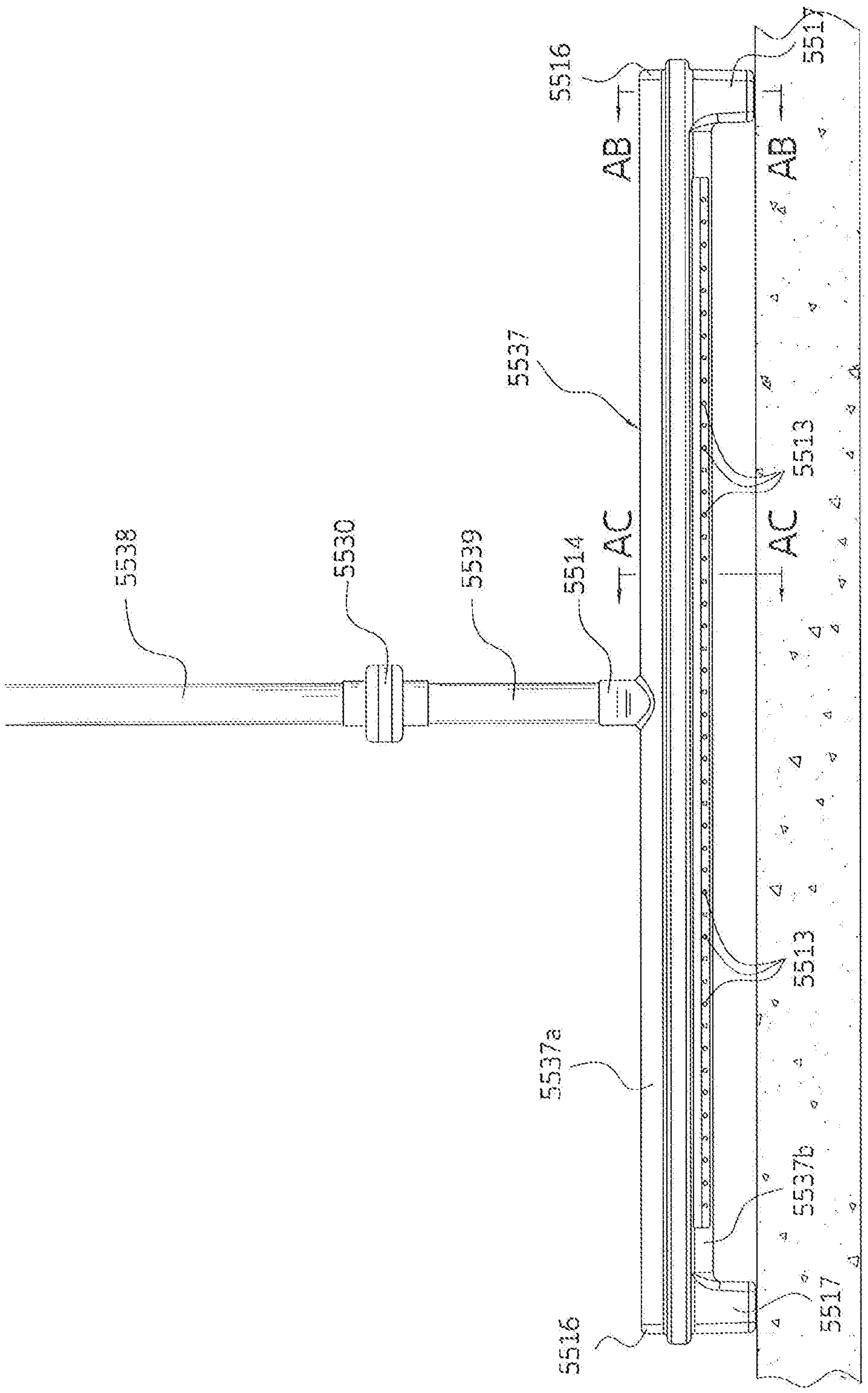
FIG. 56 is a back view of the diffusion bar of FIG. 55, in accordance with one or more embodiments of the disclosed subject matter.

FIG. 56 is a back view of the diffusion bar of FIG. 55, in accordance with one or more embodiments of the disclosed subject matter. In FIG. 56, the back side of the bottom portion 5027*b* is also shown to include openings 5513.

Figure 57:
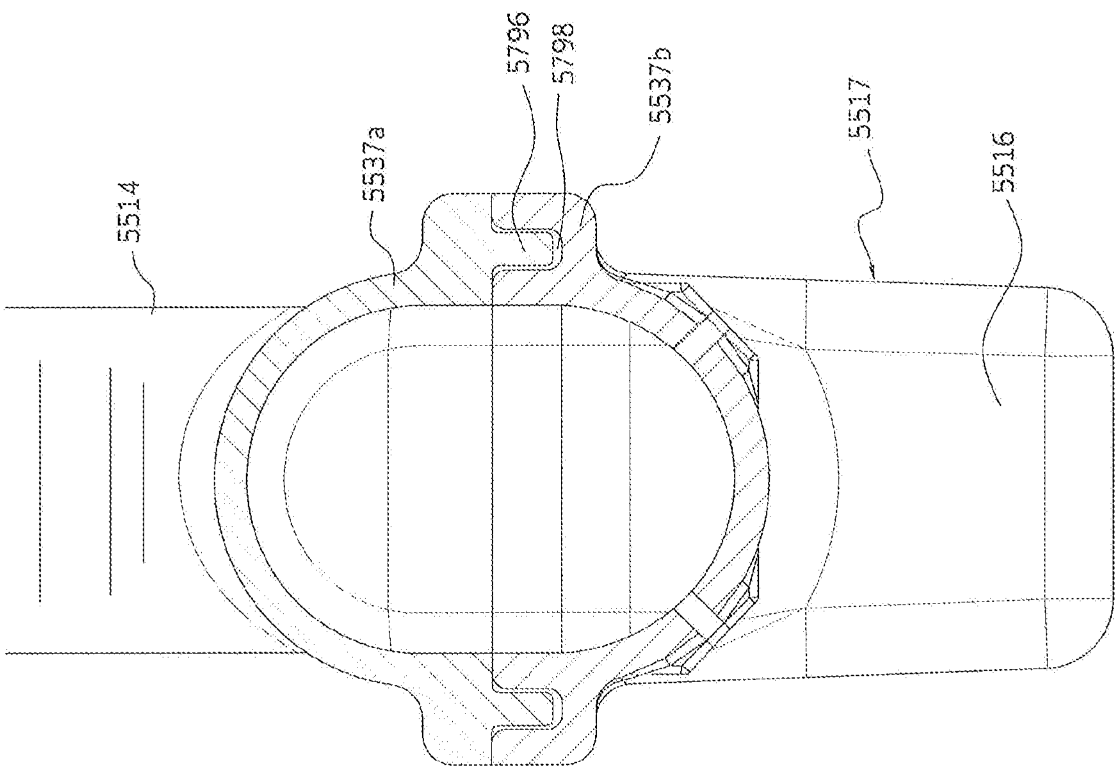
FIG. 57 is a partial cross-sectional, end view of the diffusion bar of FIG. 56 along line AB-AB, in accordance with one or more embodiments of the disclosed subject matter.

FIG. 57 is a partial cross-sectional, end view of the diffusion bar of FIG. 56 along line AB-AB, in accordance with one or more embodiments of the disclosed subject matter. In FIG. 57, the two-piece construction of the diffusion bar 5537 is illustrated. Specifically, the top portion 5537*a* is shown to have a ridge 5796 downwardly depending from a bottom surface of the top portion 5537*a*. The bottom portion 5537*b* is shown to have a groove 5798 downwardly depending from a top surface of the bottom portion 5537*b* where the groove 5798 is reciprocally shaped to receive and mate with the ridge 5796 of the top portion 5537*a*. The top and bottom portions may be permanently affixed to each other with glue, adhesive or other method, or they may be removably connected by the end caps 5516, which could be removably affixed at each end of the top and bottom portions 5537*a*, 5537*b*.

Figure 58:
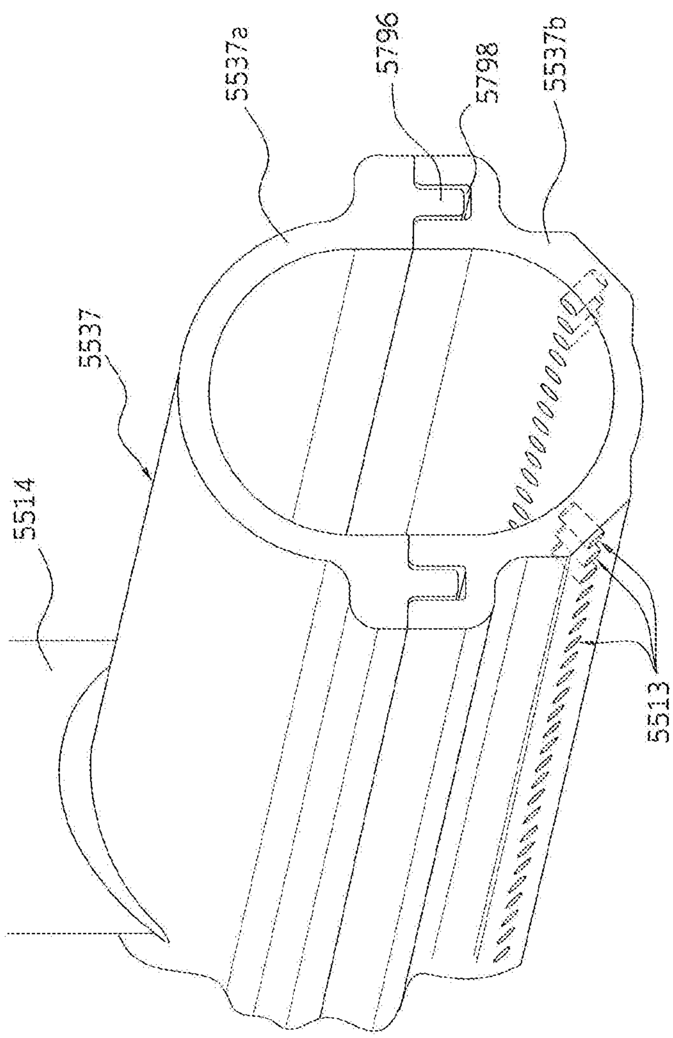
FIG. 58 is a cross-sectional, end view along line AC-AC of the diffusion bar of FIG. 56, in accordance with one or more embodiments of the disclosed subject matter.

FIG. 58 is a cross-sectional, end view along line AC-AC of the diffusion bar of FIG. 56, in accordance with one or more embodiments of the disclosed subject matter. In FIG. 55, the orientation and path of the openings 5513 are shown.

Figure 59:
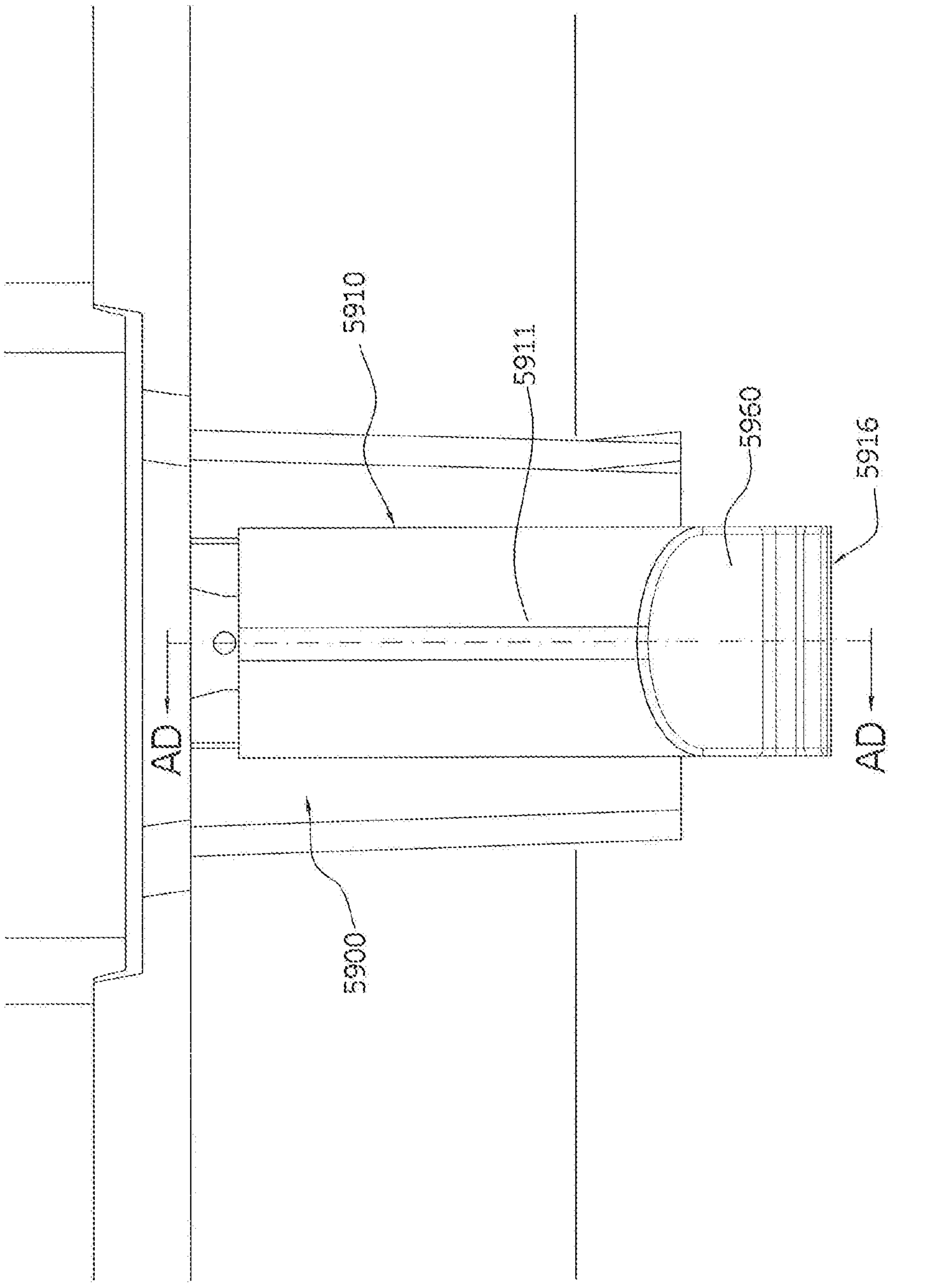
FIG. 59 is a front view of a flow equalization apparatus in a clarification chamber, in accordance with one or more embodiments of the disclosed subject matter.

FIG. 59 is a front view of a flow equalization apparatus in a clarification chamber, in accordance with one or more embodiments of the disclosed subject matter. In FIG. 59, a flow equalization apparatus 5900 is shown to include an outer shell 5910 with a front wall 5911, an angled bottom wall 5960 and a baffle opening 5916 at a junction of a bottom of the bottom wall 5960 and a bottom of a back wall (not shown) of the flow equalization apparatus 5900. The baffle opening 5916 permits effluent from the clarification chamber to flow into the outer shell 5910.

Figure 60:
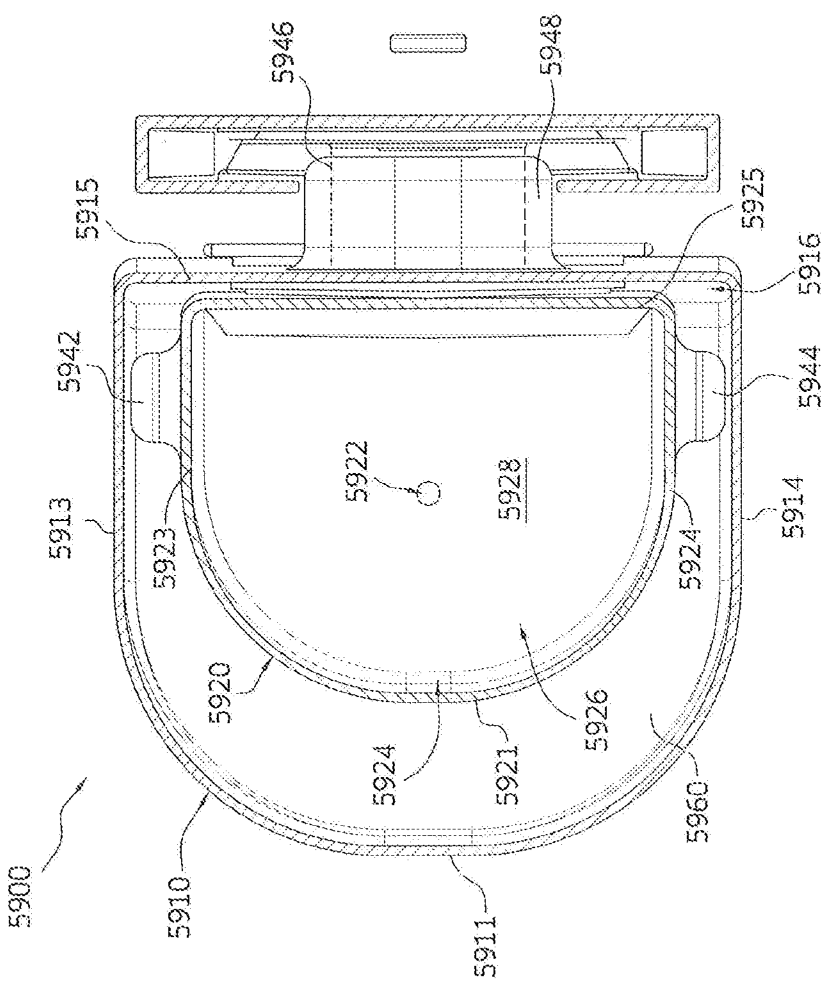
FIG. 60 is a top view of the flow equalization apparatus of FIG. 59, in accordance with one or more embodiments of the disclosed subject matter.

FIG. 60 is a top view of the flow equalization apparatus of FIG. 59, in accordance with one or more embodiments of the disclosed subject matter. In FIG. 60, the outer shell 5910 is also shown to include a left side wall 5913 connected to the front wall 5911, which is also connected to a right side wall 5914, a back wall 5915 that is connected to both the left side wall 5913 and the right side wall 5914, and the bottom wall 5960 is sealingly connected around the bottoms of the front, left and right walls 5911, 5913, 5914. The baffle opening 5916 is formed between a downwardly depending portion 5962 of the bottom wall 5960 and the back wall 5915. Also shown in FIG. 60 is an inner shell 5920, which is shaped similarly to the outer shell 5910, but with smaller dimensions and a substantially flat bottom 5928. The inner shell 5920 includes a front wall 5921; a left side wall 5923, a right side wall 5924 and a back wall 5925, all of which form a substantially upright continuous inner shell 5920 body with an open top 5926 and that is sealingly connected to the bottom wall 5928. Located in about the center of the bottom wall 5928 is a flow equalization port 5922 to allow the effluent in the outer shell 5910 to flow into the inner shell 5920 under normal system flow conditions. Also shown located in and near a top of the inner shell front wall 5921 is a sustained flow port 5924, which is larger than the flow equalization port 5922 and becomes operational when the flow reaches a sustained volume that is above the capacity of the flow equalization port 5922. The open top 5926 of the inner shell 5920 operates as an overflow port 5926 when the volume of effluent exceeds the capacity of the flow equalization port 5922 and the sustained flow port 5924. The flow equalization port 5922 and the sustained flow port can have diameters ranging between about 1⁄4" to 1⁄2". In the embodiment in FIG. 60, the size is shown as 3⁄8".

In FIG. 60, the outer shell 5910 is shown to have a back support 5948 extending substantially perpendicularly away from and about in the middle of the back wall 5915 of the outer shell 5910. An outlet tube 5946 is shown in broken line below the back support 5948 that extends substantially perpendicularly away from and adjacent to the bottom of both the back wall 5915 of the outer shell 5910 and the bottom of the back wall 5925 of the inner shell 5920 to be in fluid communication with clarification outlet 146 to permit effluent from the flow equalization apparatus 5900 to flow out of the clarification chamber 140. In the system of FIG. 1, the effluent flows to the polishing chamber 150, while in the system of FIG. 20, the effluent flows to a drain field or other receiving apparatus. The positioning of the back support 5948 and the outlet tube 5946 is better shown in FIGS. 62-64. The inner shell 5920 has a left support 5942 extending outwardly from the left side wall 5923 to rest against the left side wall 5913 of the outer shell 5910. Similarly, the inner shell 5120 has a right support 5944 extending outwardly from the right side wall 5924 to rest against the right sided wall 5914 of the outer shell 5910.

Figure 61:
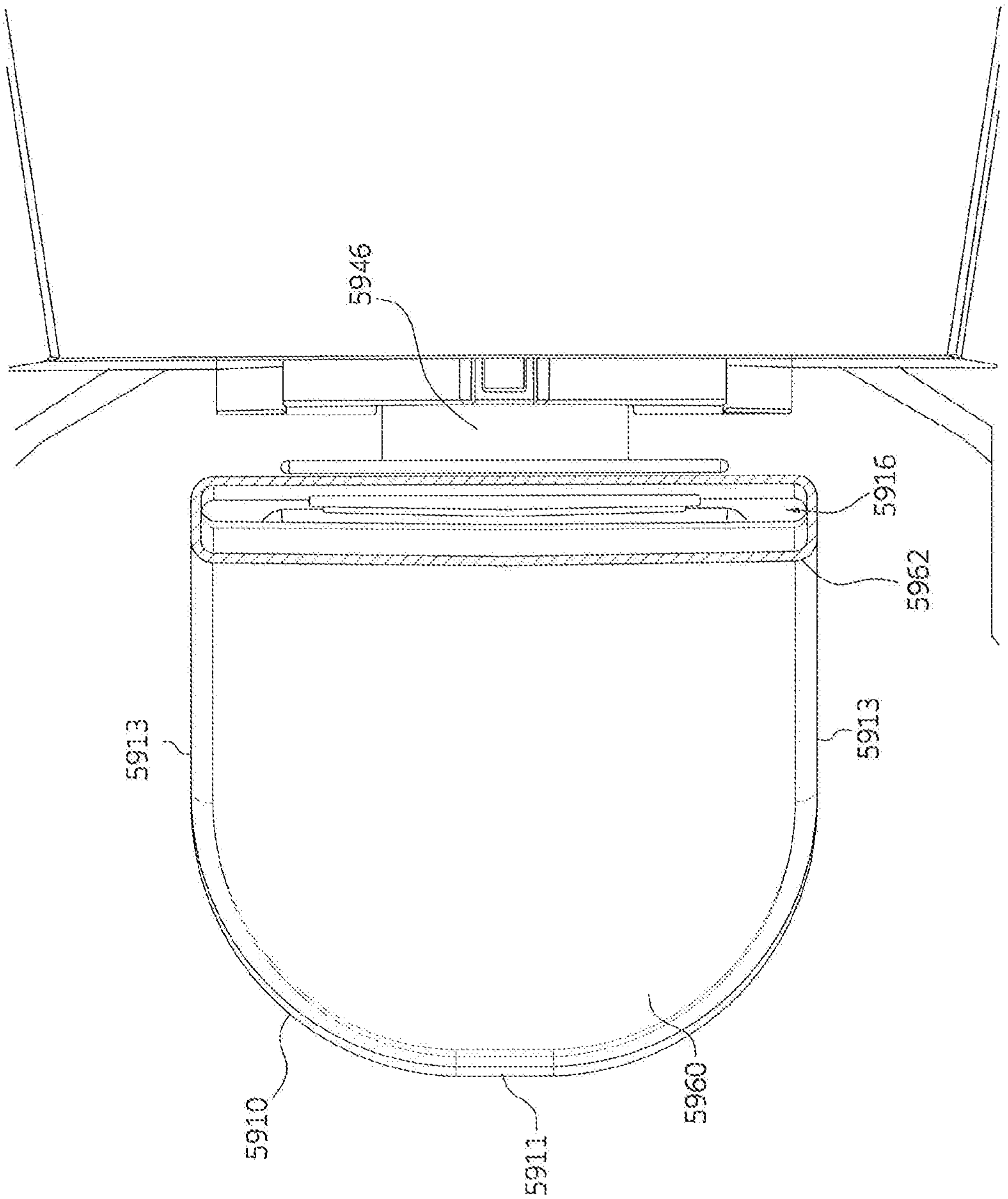
FIG. 61 is a bottom view of the flow equalization apparatus of FIG. 59, in accordance with one or more embodiments of the disclosed subject matter.

FIG. 61 is a bottom view of the flow equalization apparatus of FIG. 59, in accordance with one or more embodiments of the disclosed subject matter. In FIG. 61, the narrowing of baffle opening 5916 as it extends upwardly into the inside of the outer shell 5910 is shown.

Figure 62:
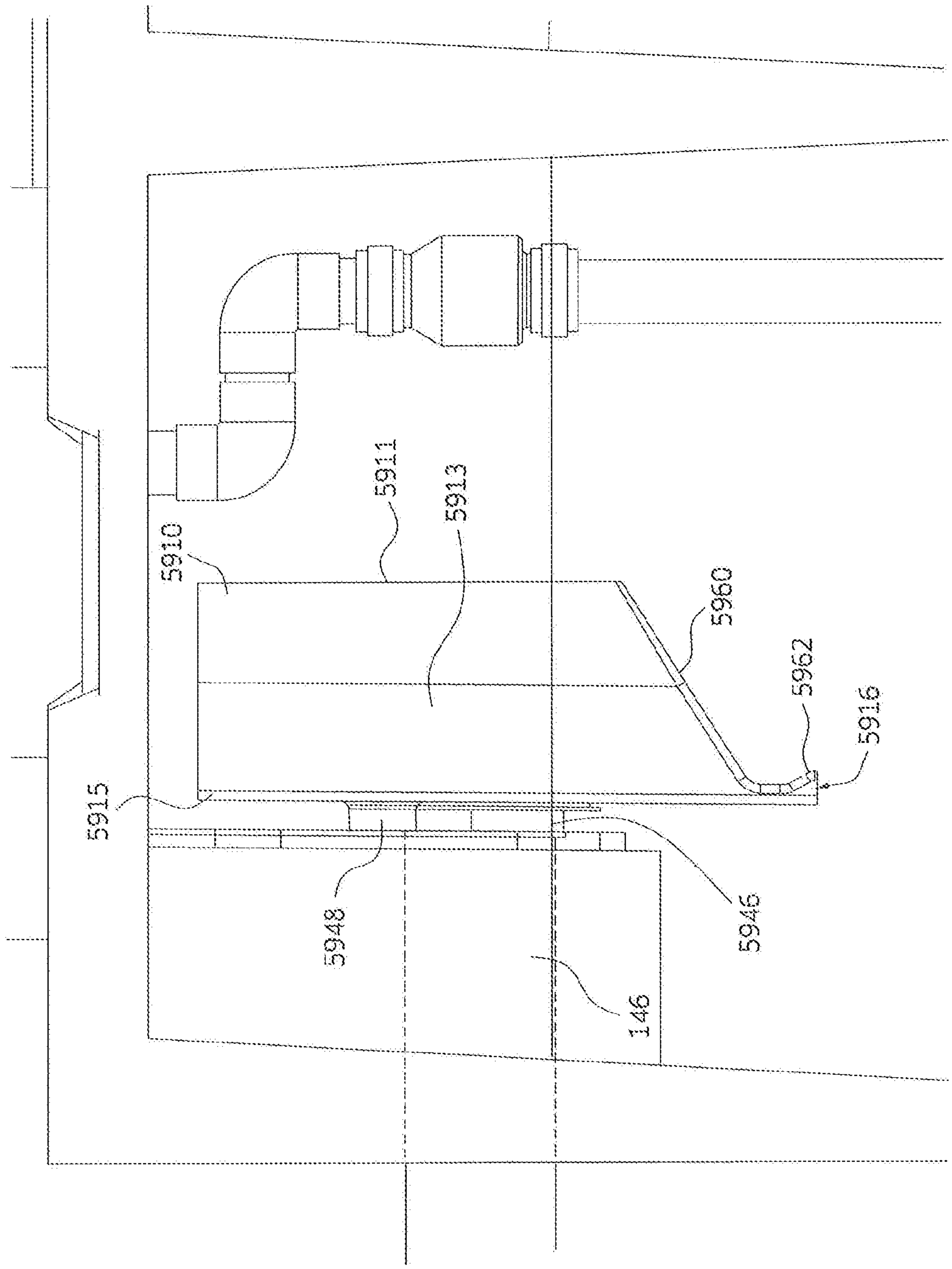
FIG. 62 is a left side view of the flow equalization apparatus of FIG. 59, in accordance with one or more embodiments of the disclosed subject matter.

FIG. 62 is a left side view of the flow equalization apparatus of FIG. 59, in accordance with one or more embodiments of the disclosed subject matter. In FIG. 62, the location of clarification chamber outlet pipe 146 is shown in broken line.

Figure 63:
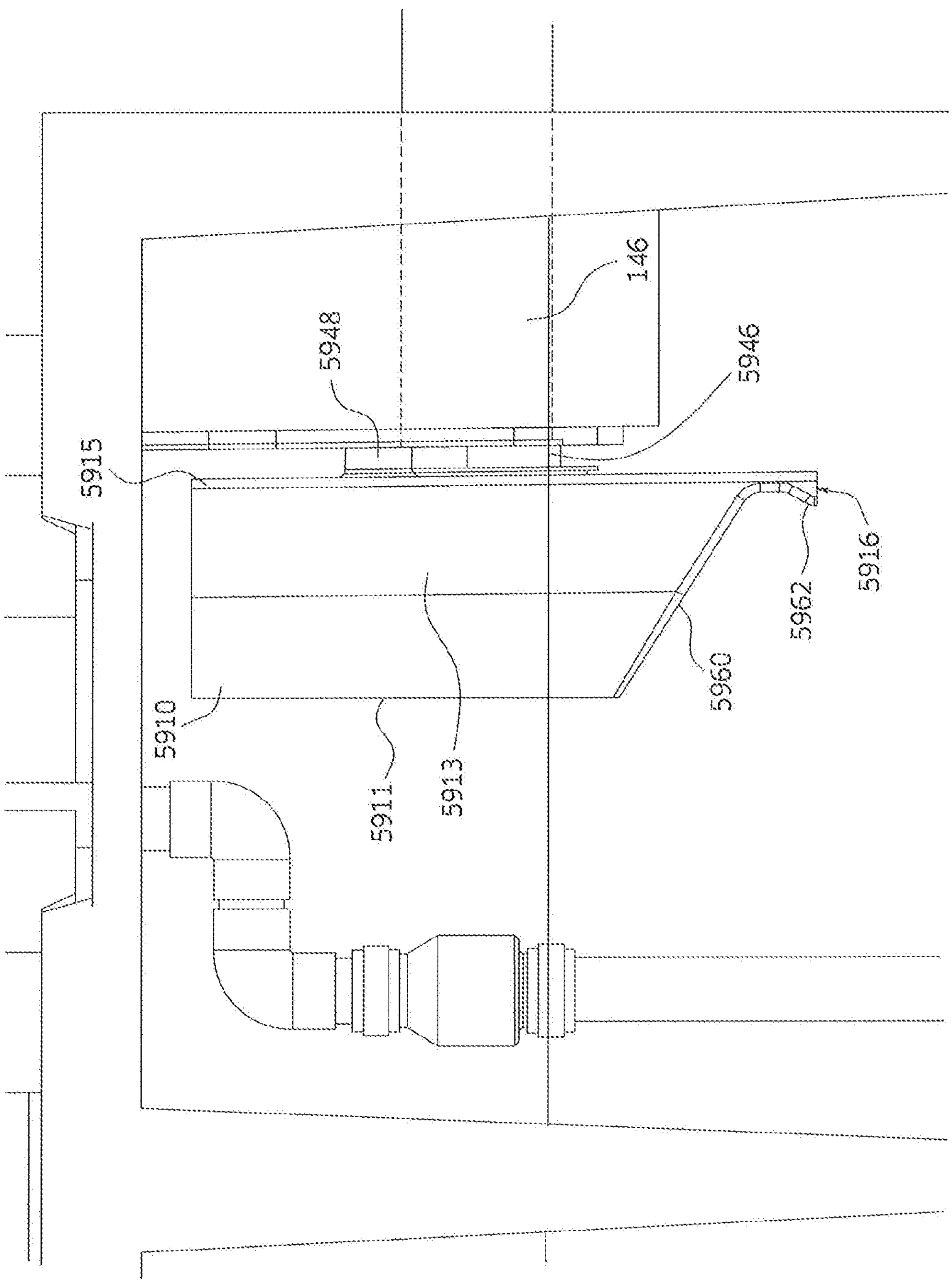
FIG. 63 is a right side view of the flow equalization apparatus of FIG. 59, in accordance with one or more embodiments of the disclosed subject matter.

FIG. 63 is a right side view of the flow equalization apparatus of FIG. 59, in accordance with one or more embodiments of the disclosed subject matter. In FIG. 63, the location of clarification chamber outlet pipe 146 is also shown in broken line.

Figure 64:
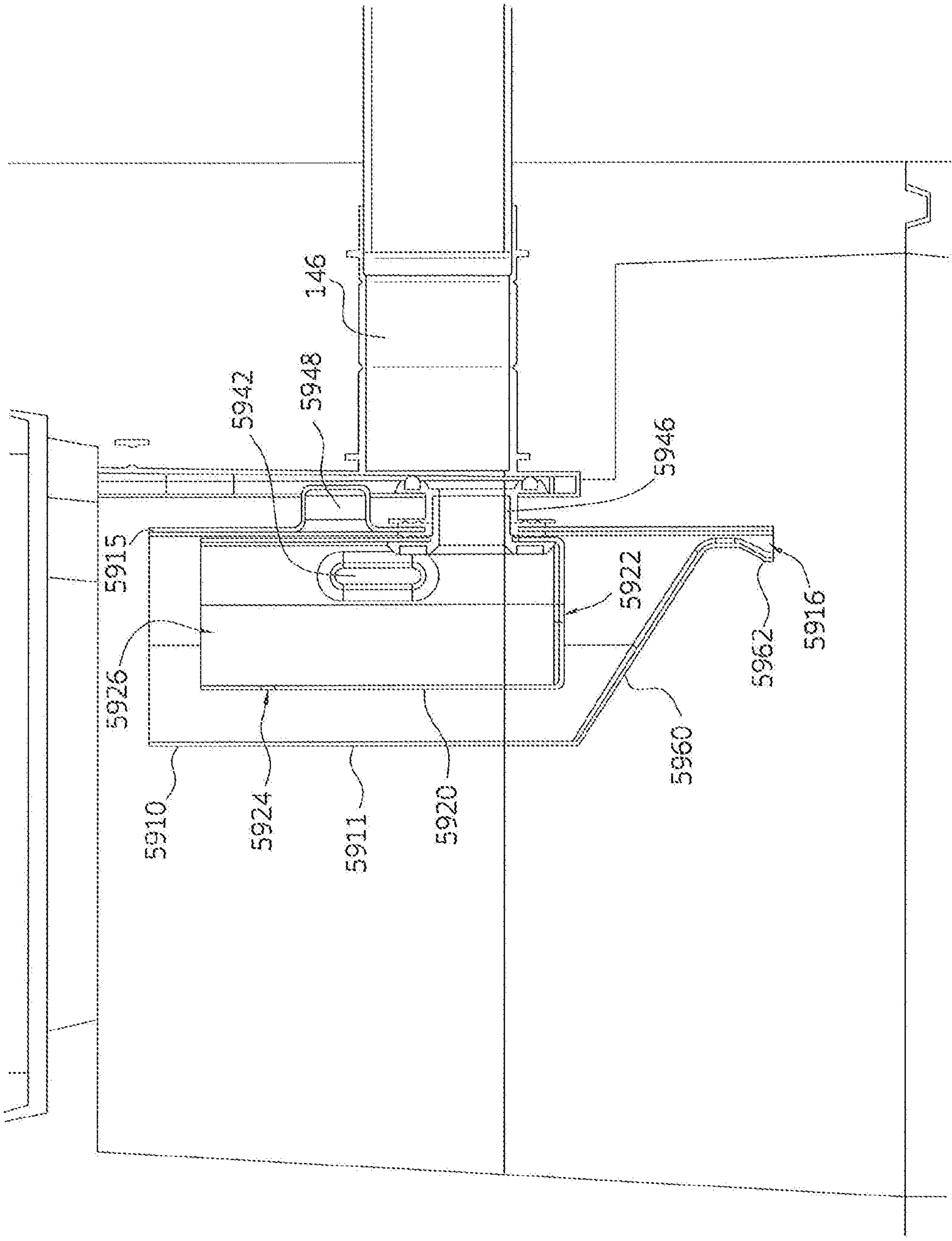
FIG. 64 is a cross-sectional, side view along line AD-AD of the flow equalization apparatus of FIG. 11, in accordance with one or more embodiments of the disclosed subject matter.

FIG. 64 is a cross-sectional, side view along line AD-AD of the flow equalization apparatus of FIG. 59, in accordance with one or more embodiments of the disclosed subject matter.

Figure 65:
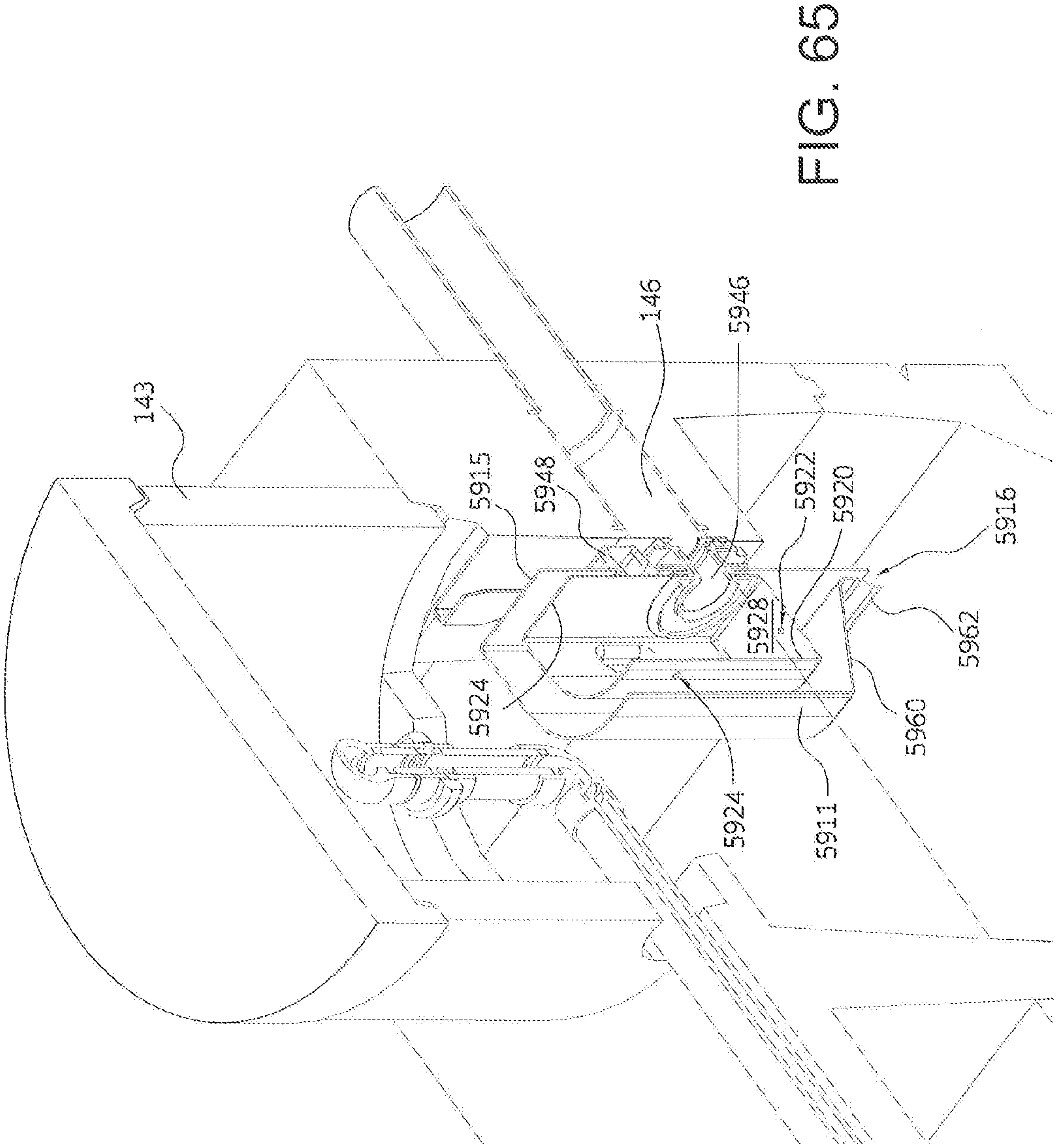
FIG. 65 is a top, right-front perspective, cross-sectional view along line AD-AD, of the flow equalization apparatus of FIG. 59, in accordance with one or more embodiments of the disclosed subject matter.

FIG. 65 is a top, right-front perspective, cross-sectional view along line AD-AD, of the flow equalization apparatus of FIG. 59, in accordance with one or more embodiments of the disclosed subject matter.

Figure 66:
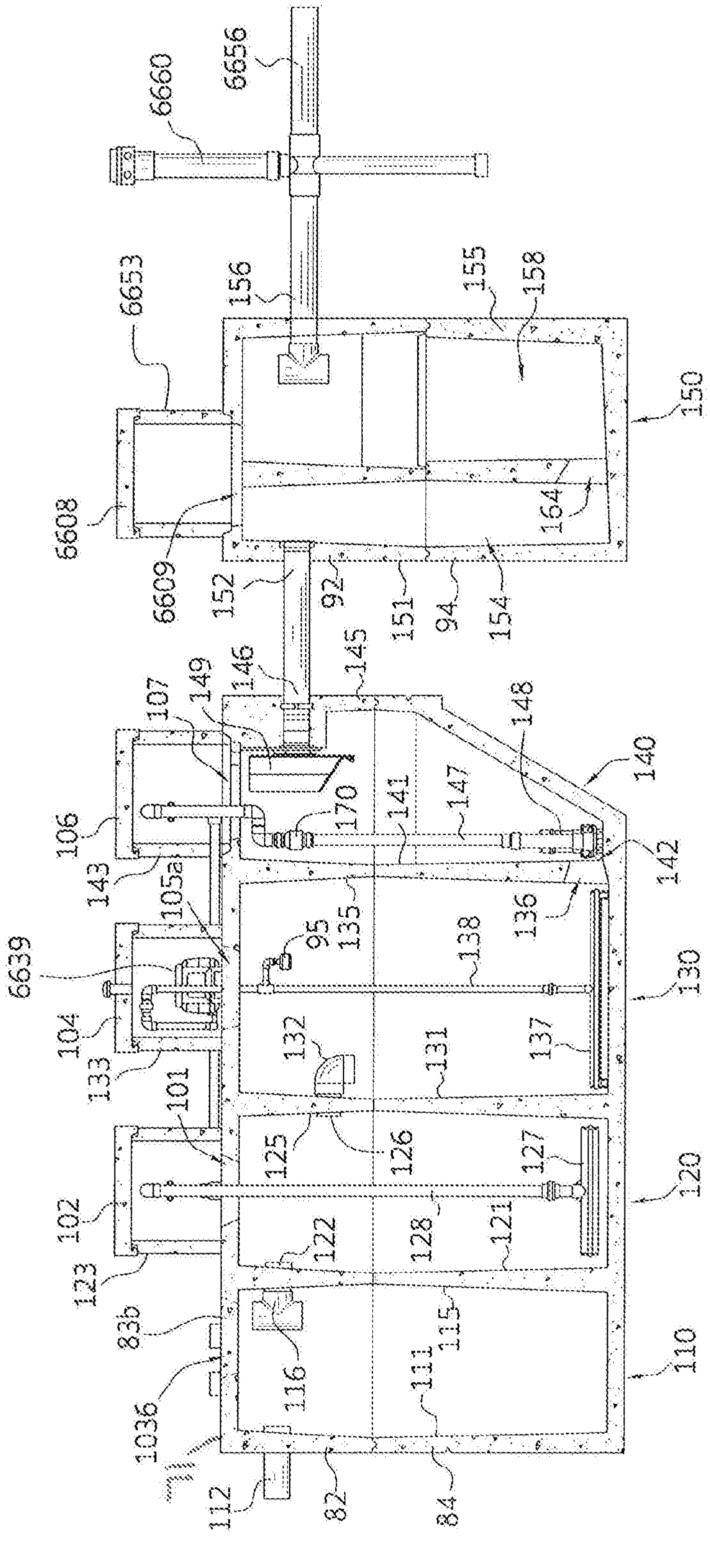
FIG. 66 is a cross-sectional, side view of the wastewater treatment system of FIG. 1 with the addition of an external ultra-violet (UV) light disinfection treatment system, in accordance with one or more embodiments of the disclosed subject matter.

FIG. 66 is a cross-sectional, side view of the wastewater treatment system of FIG. 1 with the addition of an external ultra-violet (UV) light disinfection system, in accordance with one or more embodiments of the disclosed subject matter. In FIG. 66, the description of FIG. 1 will not be repeated, but it is understood that the description of like elements in FIG. 1 applies to the system in FIG. 66, with the exception of the following noted differences. In FIG. 66, an air pump 6639 is shown inside aeration riser 133 instead of being located externally. A single polishing chamber riser 6653 with a riser top 6608 is shown over a single polishing chamber access opening 6609. In addition, the polishing chamber outlet pipe 156 is shown connected to and in fluid communication with a UV light disinfection system 6660 for treatment of the effluent water from the polishing chamber and passage through a UV light disinfection system outlet pipe 6656 for reuse or final disposal of a final effluent water from the UV light disinfection system 6660.

Figure 67:
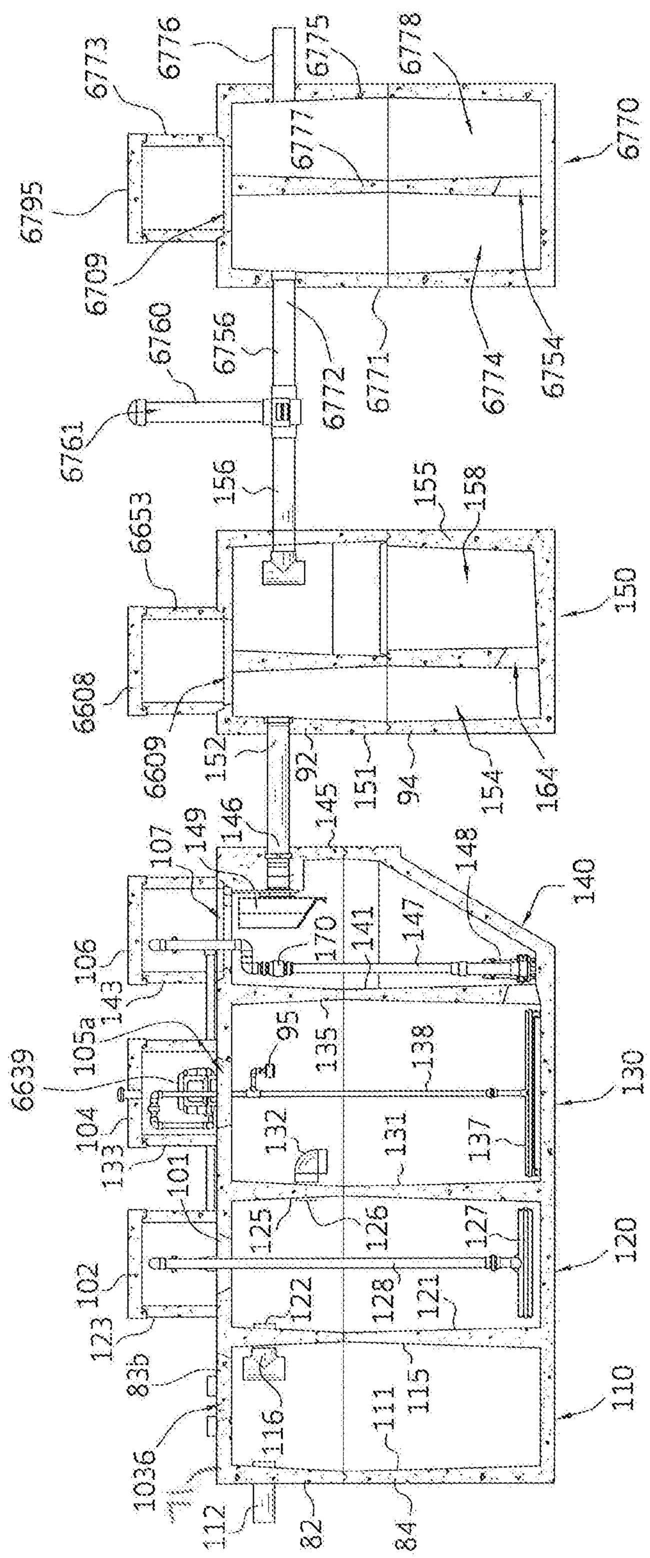
FIG. 67 is a cross-sectional, side view of the wastewater treatment system of FIG. 1 with the addition of an external chlorination disinfection treatment system with contact tank, in accordance with one or more embodiments of the disclosed subject matter.

FIG. 67 is a cross-sectional, side view of the wastewater treatment system of FIG. 1 with the addition of an external chlorination disinfection system and contact tank, in accordance with one or more embodiments of the disclosed subject matter. In FIG. 67, the description of FIG. 1 will not be repeated, but it is understood that the description of like elements in FIGS. 1 and 66 applies to the system in FIG. 67, with the exception of the following noted differences. In FIG. 67, the polishing chamber outlet pipe 156 is shown connected to and in fluid communication with a chlorination disinfection system 6760 for treatment of the effluent water from the polishing chamber and passage through a chlorination disinfection system outlet pipe 6756 and into a contact tank 6770 via contact tank inlet pipe 6772. For example, the chlorination disinfection system 6760 can include a linear-feed chlorine tablet feeder system 6760, which can be resupplied from above ground through opening 6761. Specifically, after a chlorine tablet is dispensed into the water as it passes through the chlorine tablet feeder system 6760, into the chlorination disinfection system outlet pipe 6756 and contact tank inlet pipe 6772 and into a first contact chamber 6774 to allow time for the chlorine tablet to dissolve and disinfect the water. The water in the first contact chamber 6774 passes through an outlet opening 6754 located in a bottom of a middle wall 6777 and into a second contact chamber 6778 in the contact tank 6770. The water in the second contact chamber 6778 exits the contact tank 6770 through a contact tank outlet pipe 6776 for reuse or final disposal of a final effluent water from the contact tank 6770.

Figure 68:
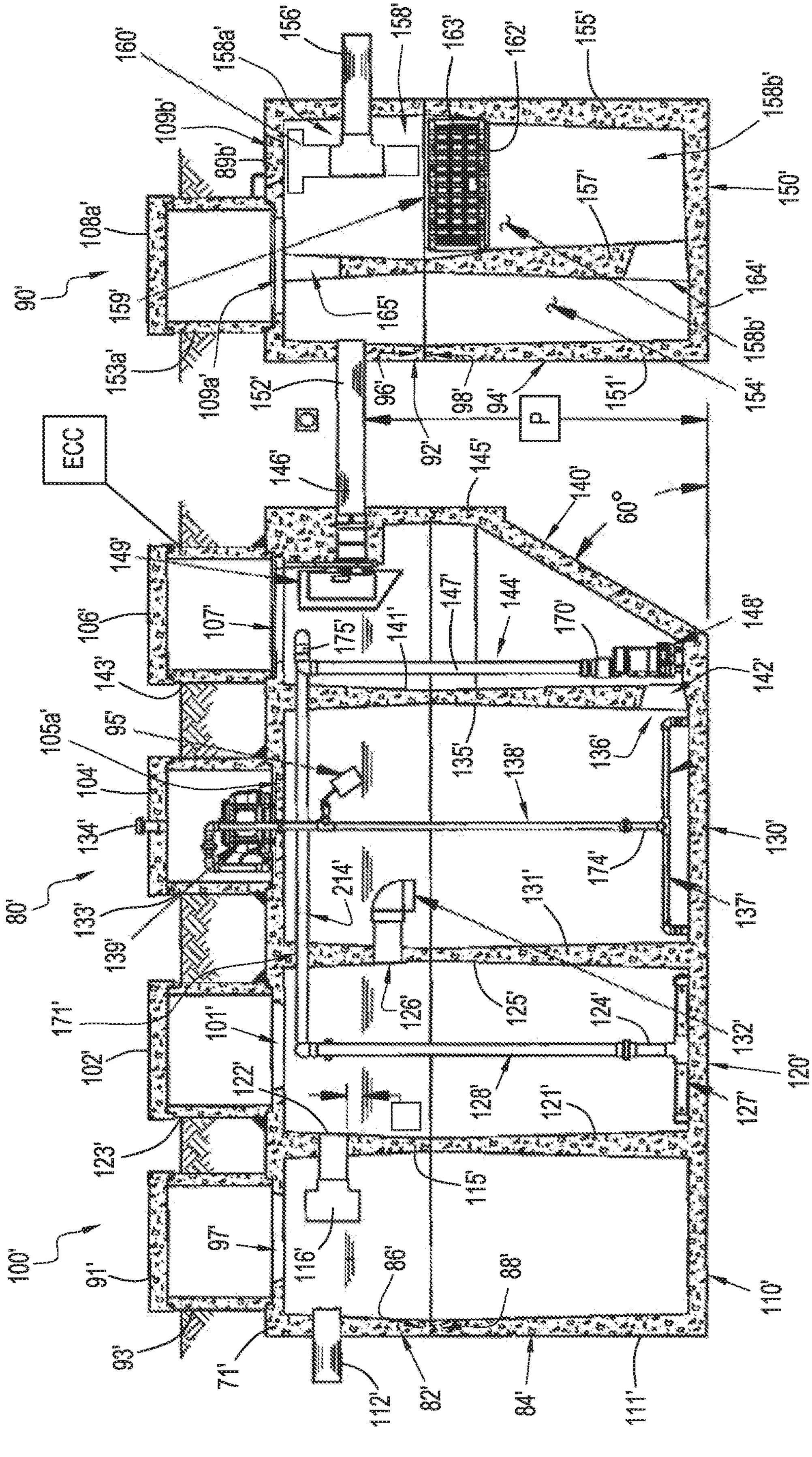
FIG. 68 is a cross-sectional, side view of a wastewater treatment system tank with a pretreatment chamber, an anoxic chamber, an aeration chamber, a clarification chamber and a polishing chamber, in accordance with one or more embodiments of the disclosed subject matter.

FIG. 68 is a cross-sectional, side view of a wastewater treatment system with a pretreatment chamber, an anoxic chamber, an aeration chamber, a clarification chamber and a polishing chamber, in accordance with one or more embodiments of the disclosed subject matter. In FIG. 68, a wastewater treatment system 100' includes a first component 80' and a second component 90' and is only turned on for a total of about 12 hours or less each day. In the embodiment illustrated in FIG. 68, the first and second components 80', 90' each include a top half 82', 92' and a bottom half 84', 94', respectively. In general, the top components 82', 92' have a ridge 86', 96' extending from a bottom edge and the bottom components 84', 92' have a reciprocally shaped groove 88', 98', respectively, to receive the appropriate top component ridge 86', 96' when the two components are assembled together. The first component 80' includes a pretreatment chamber 110', an anoxic chamber 120' in fluid communication with the pretreatment chamber 110', an aeration chamber 130' in fluid communication with the anoxic chamber 120', a clarification chamber 140' in fluid communication with the aeration chamber 130' and the anoxic chamber 120'. The second component 90' includes a polishing chamber 150' in fluid communication with the clarification chamber 140' of the first component 80' and an effluent well **158*b*' in fluid communication with the influent well 154' and also outside of the polishing chamber 150'**. System operation, monitoring, compliance and diagnostic functions area provided by an external control center ECC using MCD technology with pre-wired controls mounted in a lockable NEMA rated enclosure designed specifically for outdoor use. The control center ECC is a UL Listed assembly that includes a time clock, alarm light, reset button, power switch, power light, phone/network light, recirculation pump light, air pump light, high water light and auxiliary alarm light. A pre-programmed time clock controls the recirculation pump to insure that approximately 400% of the average daily flow is returned to the anoxic chamber. The control center ECC monitors recirculation pump current, air pump operation, high water and auxiliary alarm circuitry. In the event of an alarm from the air pump or auxiliary input, audible and visual alarms are activated and an optional telemetry system can report the condition to a monitoring center (not shown), which can be accessed over the Internet on a website using user-specific login information. The telemetry system can also communicate using landlines and/or wireless communications systems. If abnormal operation of the recirculation pump is detected, a diagnostic sequence can begin and the visual alarm activates. After a factory programmed recovery interval, an automatic restart attempt is initiated and, if normal pump operation does not resume during 24 programmed recovery and restart cycles, the audible alarm activates and the optional telemetry system can report the condition to a monitoring center. In addition, the control center ECC can include a telemetry system with a heartbeat feature that is used to ensure the system is operating properly. In operation, at predefined or predetermined intervals, for example, but not limited to at least one minute, hourly, daily, weekly, bi-weekly or monthly, etc., the telemetry system initiates a call to a monitoring system. The monitoring system can include, for example, but not limited to, a remote, online monitoring system at a monitoring center, to confirm proper operation of the system. If a call is not received at any of the predefined or predetermined times and/or a negative operation report is received, the monitoring center notifies a service technician of the possible need for service to repair the system. If the lack of contact is only temporary due to a phone, internet or cellular connection being temporarily being offline, once it is back online, the normal reporting cycle will resume.

In FIG. 68, the pretreatment chamber 110' has a front wall 111' through which an influent inlet pipe 112' is located in an upper left corner of the front wall 111', when viewed from the outside and facing the front wall 111' (see FIG. 70), and provides access for an incoming flow of wastewater to be treated. The pretreatment chamber 110' also has a back wall 115' through which an outlet pipe 116' is located in an upper right corner of the back wall 115' (see FIG. 71) and permits pretreated wastewater to flow into the anoxic chamber 120'. The "T"-shape of the outlet pipe 116' permits wastewater to flow from the bottom in normal flow conditions and from the bottom and top in overflow conditions. Located in a top wall 71' of the pretreatment chamber 110' and above an exit of the influent inlet pipe 112' is a frustoconical first access opening **103*a*' with a reciprocal frustoconical first access opening cover 83*a*' (see FIG. 69). Also located in the top wall 71' of the pretreatment chamber 110' and above an entrance of the outlet pipe 116' is a frustoconical second access opening 103*b*' with a reciprocal frustoconical second access opening cover 83*b*'. In general, the bottom of the pretreatment chamber outlet pipe 116' is located at a height that is slightly below, for example, about 1 inch below, the pretreatment chamber influent inlet pipe 112'. Located in the top wall 71' between the first and second access openings 103***a*', 103*b*' is a first riser opening 97' that is aligned generally along a longitudinal center line of the first component 80'. A riser 93' having a substantially cylindrical exterior and internal opening extending there through and a base of the first riser 93' is seated and sealed around the first riser opening 97' and a substantially circular riser cover 91' is removably seated on top end of the first riser cover 93'.

In FIG. 68, the anoxic chamber 120' has a front wall 121' through which an inlet pipe 122' is located in an upper right corner of the front wall 121', when looking back toward the pretreatment chamber 110', and provides access for an incoming flow of pretreated wastewater from the pretreatment chamber 110'. In fact, the anoxic chamber front wall 121' is also the pretreatment chamber back wall 115' and the anoxic chamber inlet pipe 122' is directly connected to and in fluid communication with the pretreatment chamber outlet pipe 116'. The anoxic chamber 120' also has a back wall 125' through which an outlet pipe 126' is located in an upper left corner of the back wall 125' (see FIG. 72) and permits anoxically treated wastewater to flow into the aeration chamber 130'. In general, the anoxic chamber outlet pipe 126' is located at a height that is below the anoxic chamber influent inlet pipe 122'. The difference in the heights of the pipes 112', 116', 122' and 126' helps to maintain the operating water levels in the pretreatment chamber 110', the anoxic chamber 120' and the aerobic chamber 130' to maintain an anoxic operational environment in the anoxic chamber 120'. As seen in FIG. 68, a distance between the bottom of influent inlet pipe 122' and a top of the water level M in the anoxic chamber is about 3" in standard operating conditions. In general, the height of the water level is highest in the pretreatment chamber 110 and lower in the anoxic, aeration and clarification chambers 120', 130', 140'. Located in a top wall of the anoxic chamber 120' and adjacent to the anoxic chamber inlet pipe 122' is a frustoconical first access opening 101', which can include a reciprocal frustoconical first access opening cover 81'. An anoxic chamber riser 123' is sealingly affixed around and extends upwardly away from the first access opening 101' and the anoxic chamber riser 123' is covered by a removable anoxic chamber riser cover 102'. An air-tight seal coupling/connector 171' is affixed in and through the anoxic chamber back wall 125' and connects to an interior sludge return pump 148' located in a bottom of the clarification chamber 150' and that is connected to and configured to pump sludge back to the anoxic chamber 120' via an internally installed pipe system 144'.

In FIG. 68, the aeration chamber 130' has a front wall 131' through which an inlet pipe 132' is located in an upper left corner of the front wall 131', when looking back toward the anoxic chamber 120', and provides access for an incoming flow of anoxically treated wastewater from the anoxic chamber 120'. In fact, the aeration chamber front wall 131' is also the anoxic chamber back wall 125' and the aeration chamber inlet pipe 132' is directly connected to and in fluid communication with the anoxic chamber outlet pipe 126'. The aeration chamber 130' also has a back wall 135' through which an outlet opening 136' is located in a bottom center of the back wall 135' (see FIG. 74) and permits aerated wastewater to flow into the clarification chamber 140'. In general, the aeration chamber outlet opening 136' is located at a height that is well below the aeration chamber inlet pipe 132' and permits a back and forth flow of wastewater between the aeration chamber 130' and the clarification chamber 140'. Located in a top wall of the aeration chamber 130' and adjacent to the aeration chamber inlet pipe 132' is a frustoconical access opening 105*b*' with a reciprocal frustoconical first access opening cover 85*b*' (both best seen in FIG. 69). Also located in the top wall of the aeration chamber 130' on the same side as and in-line with access openings 97' and 101' is a frustoconical third access opening 105*a*' which can include a reciprocal frustoconical second access opening cover 85*a*' (both best seen in FIG. 69). An aeration chamber riser 133' is sealingly affixed around and extends upwardly away from opening 105*a*' and riser 133' is covered by an aeration chamber riser cover 104' in which an air intake valve 134' extends through the riser cover 104' to provide air for an air pump 139' located inside riser 133'.

The clarification chamber 140' has a front wall 141' through which an inlet opening 142' is located in a bottom center of the clarification chamber front wall 141' and provides access for an incoming flow of aerated wastewater from the aeration chamber 130'. In fact, the clarification chamber front wall 141' is also the aeration chamber back wall 135' and the clarification chamber inlet opening 142' is directly connected to and in fluid communication with the aeration chamber outlet opening 136'. The clarification chamber 140' also has a back wall 145' through which an outlet pipe 146' is located in a top center of the back wall 145' and permits clarified wastewater to flow into the polishing chamber 150'. A flow equalization device 149' is positioned in front of and controls the flow to the clarification chamber outlet pipe 146'. In general, the clarification chamber outlet pipe 146' is located at a height that is well above the clarification chamber inlet opening 142' and permits a one way flow of wastewater from the clarification chamber 140' to the polishing chamber 150'. Located in substantially the center of a top wall of the clarification chamber 140' and above the clarification chamber inlet pipe 142', the flow equalization unit 149' and the clarification chamber outlet pipe 146' is a frustoconical access opening 107', which can include a reciprocal frustoconical first access opening cover 87'. A clarification chamber riser 143' is sealingly affixed around and extends upwardly away from opening 107' and riser 143' is covered by a clarification chamber riser cover 106'.

In FIG. 68, the polishing chamber 150' is shown as a separate system/component that is connected to and in fluid communication with the clarification chamber 140' via the clarification chamber outlet pipe 146', which connects to and is in fluid communication with a polishing chamber inlet pipe 152' in a front wall 151' of the polishing chamber 150'. The polishing chamber inlet pipe 152' is located in a top center of the polishing chamber front wall 151' and provides access for an incoming flow of clarified wastewater from the clarification chamber 140'. The polishing chamber 150' also has a back wall 155' through which an effluent outlet pipe 156' is located in a top center of the back wall 155' and permits fully treated wastewater to flow out of the polishing chamber 150'. In general, the polishing chamber outlet pipe 156' is located at a height that is below the polishing chamber inlet opening 152' and permits a one way flow of wastewater from the clarification chamber 140' into and out of the polishing chamber 150'. Located in a top wall of the polishing chamber 150' and above the polishing chamber inlet pipe 152' is a fifth frustoconical access opening 109*a*', which can include a fifth reciprocal frustoconical first access opening cover 89*a*'. Also located in the top wall of the polishing chamber 150' and between the fifth frustoconical access opening 109*a*' and the back wall 155' is a small polishing chamber frustoconical access opening 109*b*' with a reciprocally shaped opening cover 89$b$'. The small polishing chamber access opening 109$b$' is substantially aligned along the mid-line of the system 100'. Although not shown in FIG. 68, located in the top wall of the polishing chamber 150', but on the back wall 155' side of the top wall and on either side of the polishing chamber outlet pipe, are a first rectangular access opening 109$b$' (see FIG. 69), which can include a first reciprocal rectangular access opening cover 89$b$' (see FIG. 69). The first and second access openings 109$b$' and 109$c$' are substantially aligned with each other along the polishing chamber back wall 155' and offset from the first access opening 109$a$'. A first polishing chamber riser 153$a$' is sealingly affixed around and extending upwardly away from opening 109$a$' and is covered by a polishing chamber riser cover 108$a$'.

The embodiment of the system 100' in FIG. 68 is divided into two systems. In order to meet different application treatment requirements, the system is designed in different combinations to meet the different discharge requirements. For example, if a local authority requires a treatment plant to meet regular discharge limits or stringent discharge limits, a system including the first component 80' having the pretreatment, anoxic, aeration and clarification chambers 110', 120', 130', 140' can be applied to meet the discharge limits. If water reuse or a water recycling program is required, the second component 90' including the polishing chamber 150' can be added after the clarification chamber. Under such a situation or application, the system can be used as the first treatment step. Some additional polishing processes can be considered after the polishing chamber filtration. For example, chlorination, de-chlorination, de-nitrification, nitrogen/nitrate removal, phosphorus removal, carbon filtration and an ultra-filtration process or a similar process can be applied to enhance the water quality. After the polishing filtration treatment, the water quality meets the requirements for non-potable reuse. The function of the pretreatment chamber 110' is to remove grit, floating material and large suspended particles from domestic wastewater. The wastewater is preconditioned by passing through the pretreatment chamber 110' prior to being introduced to the anoxic chamber 120'. The outlet pipe 116' of the pretreatment chamber is equipped with a discharge tee or a baffle that extends vertically into the liquid so that only supernatant is displaced to the anoxic chamber 120'. The distance between the inlet 112' and outlet 116' of the pretreatment chamber is designed to be as far apart as possible. This design creates a good settling condition and improves solids removal efficiency.

As described above, the system 100' is different from any residential sewage treatment system. Not only does it use an aeration process, but it also uses anoxic and anaerobic processes. The purpose of using the anoxic chamber 120' in the system is to remove nitrate and total nitrogen. In a regular aeration treatment system, ammonia nitrogen is converted into nitrate by nitrifiers under an aerobic condition. A de-nitrification process must be applied to remove nitrate from treated effluent. Since the nitrate removal process (de-nitrification) needs certain organic nutrition, alkalinity and an anoxic condition for de-nitrifiers, this anoxic chamber receives the returned mixture of clarification chamber liquid and settled activated sludge containing nitrate from clarification chamber, and effluent containing certain amounts of organic nutrition from pretreatment chamber. Under the anoxic environment and mixing condition, the incubated de-nitrification bacteria in the anoxic chamber converts nitrate into nitrogen gas. Nitrate and organic matters measured as BOD are partially removed from sewage in the de-nitrification process.

In FIG. 68, the nitrate sources from the effluent are pumped from the bottom of the clarification chamber 140' to the anoxic chamber 120' periodically. A mixing bar 127', which is further shown in and described above in relation to FIG. 5, is installed at the end of a sludge return pipe 128' and located near the bottom of the anoxic chamber 120'. The end of the sludge return pipe is connected to a top end of a flexible pipe section 124' and a bottom end of the flexible pipe section 124' is connected to the mixing bar 127'. The flexible pipe section 124' permits the mixing bar 127' and the sludge return pipe 128' to be folded so as to be substantially parallel to each other to permit the easy installation of the sludge return pipe 128' and mixing bar 127' assembly in to the anoxic chamber 120'. An energy saving concept has been applied to design this system. Specifically, while a submersible sludge return pump 148' (i.e., a recirculation pump) is pumping the mixture of liquid and sludge up a sludge return pipe 147' of the internally installed pipe system 144' and back to the anoxic chamber 120', the current flows through holes (see FIG. 50) on the mixing bar 127'. As a result, the settled sludge and liquid in the anoxic chamber 120' are mixed by the current to form a mixed liquor. Mixing also creates a contact condition for de-nitrifiers and pollutants. Since fresh air is prohibited in the anoxic chamber, the mixture presents an anoxic condition that is essential for the de-nitrification process. When the sludge or solids in the anoxic chamber 120' settle down to a certain level, the sludge return pump 148' in the clarification chamber 140' starts its pumping cycle and creates a mixing condition in the anoxic chamber 120'. Frequent pumping keeps sludge in a suspension condition in the anoxic chamber. The pumping frequency can be selected based on the strength of the wastewater.

The sludge return pump 148' and the mixing bar 127' play two functions: 1) sending settled aerobic sludge and nitrate from the clarification chamber 140' to the anoxic chamber 120 and, 2) the current mixes the liquid simultaneously. In the de-nitrification process, nitrates from the clarification chamber and nutrition from pretreatment are mixed together, and the de-nitrification process is conducted under this anoxic condition.

Usually, the sludge return pump 148' is turned on from 1 to 10 percent of the system operating time. The pumping duration and frequency are based upon the flow rate of the submersible sludge return pump 148' and the strength of the influent wastewater. The flow rate of the sludge return pump 148' is adjustable for a return flow rate of between 100 to 1,000 percent of system flow rate depending on the organic and hydraulic load.

Because the sludge in the treatment system 100' is not allowed to be discarded, all the solids or sludge produced during the treatment period is kept in the system 100'. If a simple aeration system is operated under this kind of condition, floating sludge or scum is found at the surface of the clarification chamber 140'. In other words, the settleability of the aerobic sludge is not good after a certain length of operation. In long term aeration it is easy to cause a sludge expansion problem when dead microorganisms are pushed to the clarification chamber by a slow current in the system. Then, the sludge floats to the water surface of the clarification chamber 140' by tiny bubbles inside of the sludge particles. The floating solids or sludge affects the solids separation process. Some solids flow out of the clarification chamber 140' with effluent and cause high suspended solids in the effluent. Therefore, in order to combat this sludge expansion problem, the present system, alternatively applies an anoxic condition and an aerobic condition to the microorganisms. This improves the settleability of the sludge, and the floating sludge has been dramatically reduced. Therefore, the effluent quality from the clarification chamber is enhanced. The addition of an anoxic chamber not only removes total nitrogen, but also improves the effluent quality in both BOD and SS.

Figure 69:
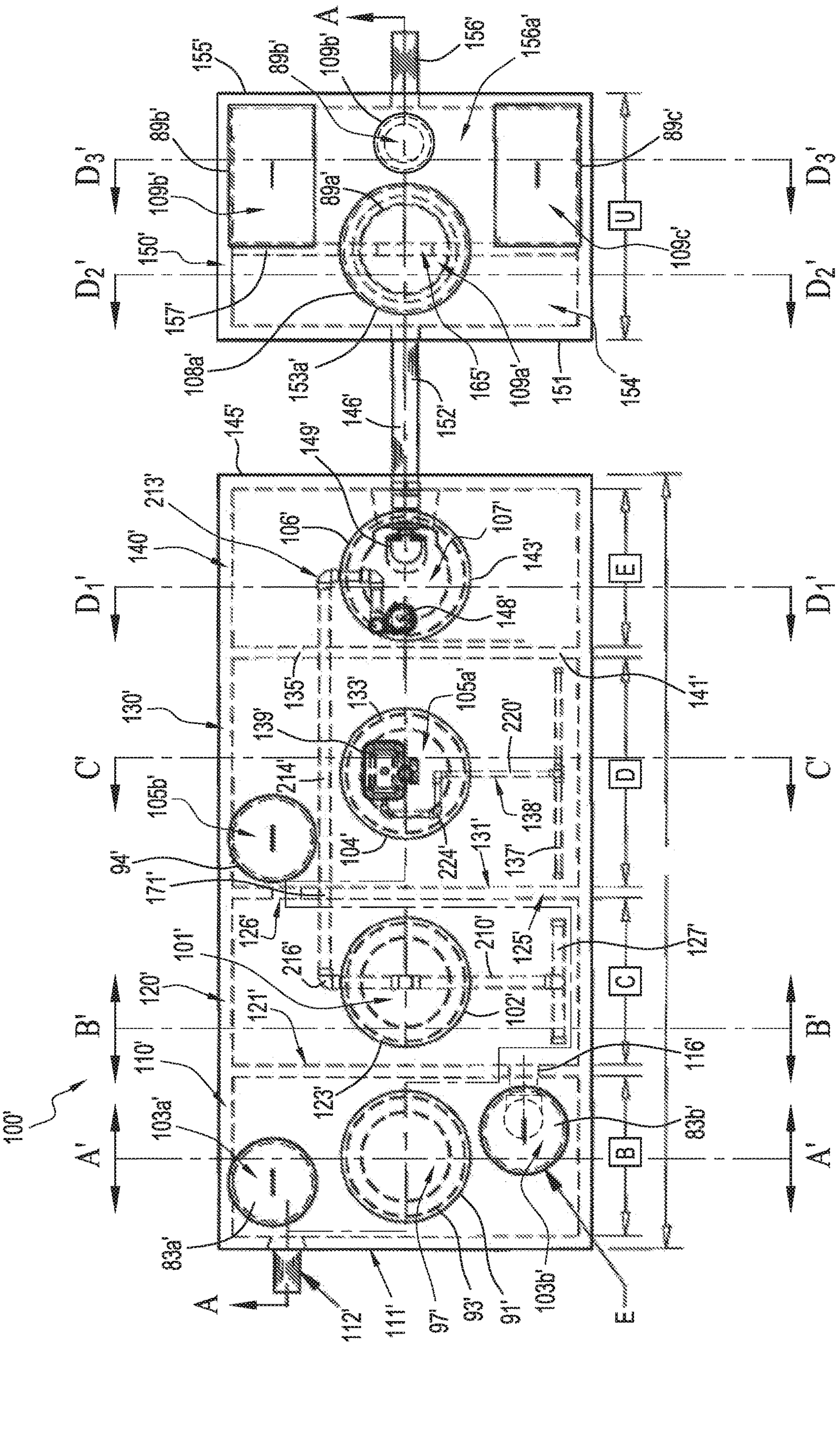
FIG. 69 is a partially exposed, top view of a wastewater treatment system tank with a pretreatment chamber, an anoxic chamber, an aeration chamber, a clarification chamber and a polishing chamber, in accordance with one or more embodiments of the disclosed subject matter.

In the system 100' of FIG. 68, the denitrified domestic wastewater contains certain amounts of suspended solids, $BOD_5$ and nitrogen pollutants and flows through an elbow at an outlet end of the aeration chamber inlet tube 132' on that and enters the aeration chamber 130'. A low energy consumption air pump 139' is used to inject air into the mixed liquor and the aerobic bio-organisms in the aeration chamber 130' digest and remove organic pollutants, and convert TKN and ammonia to nitrate under the aerobic condition. The aeration process is completed by the air pump 139', which can be located within the aeration chamber riser 133' as shown in FIG. 69 as reference number 139' or externally as shown and described in relation to FIG. 2, a diffusion bar 137' and an air supply pipe 138'. The end of the air supply pipe 138' is connected to a top end of a flexible air pipe section 174' and a bottom end of the flexible air pipe section 174' is connected to the diffusion bar 137'. The flexible air pipe section 174' permits the diffusion bar 137' and the air supply pipe 138' to be folded so as to be substantially parallel to each other to permit the easy installation of the air supply pipe 138' and diffusion bar 137' assembly in to the aeration chamber 130'. At least two different sizes of the air pump 139' can be used depending on the desired or required flow rates. For example, with the larger air pump 139' the system 100' can process at about a 600 gallons per day flow rate and with the smaller air pump 139', it can process at about a 330 gallons per day flow rate. In addition, although the air pump 139' is shown inside of riser 133', it also can be located outside of the riser and up to 75 feet away from the system 100'. The diffusion bar 137' is made from plastic pipe and tiny holes are distributed along the length of the pipe. Air bubbles released from the diffusion bar 137' are injected into the wastewater and mix and aerate the mixed liquor. In this and subsequent embodiments, the diffusion bar 137', the general design of which can be seen, generally, in FIG. 8, but that includes additional holes to increase the number of bubbles produced to aid in the aeration process. Activated sludge that is constructed by biomass plays a key role to treat domestic wastewater in the aeration chamber. An overflow level detector 95' is connected to the air supply pipe 138' adjacent aeration chamber access opening **105*a'***.

After the aeration process in the aeration chamber 130', although the pollutants in the domestic wastewater are reduced to a low level, the activated sludge needs to be separated from mixed liquor before entering the polishing chamber 150' for final treatment and discharge. The clarification chamber 140' is used to remove the solids from the treated wastewater. The mixed liquor flows through the opening 136' at the bottom of the wall that is constructed between the aeration chamber 130' and the clarification chamber 140'. This small opening regulates flow from the aeration chamber 130' to the clarification chamber 140'. Solids in the treated wastewater are separated from the liquid and settle down to the bottom of the clarification chamber 140' and form a sludge layer or pile. The sludge return pump 148' that is installed at the bottom of the clarification chamber 140' pumps settled activated sludge and liquid from the clarification chamber 140' through a check valve 170' and a pipe system 147' to the mixing bar 127' in the anoxic chamber 120' to be mixed with the wastewater and further treated in the anoxic chamber 120'. Because the hydraulic detention time of the clarification chamber is more than 4 hours during a peak flow period, the accumulated sludge separated in the clarification chamber is gradually turned into an anoxic condition before entering the anoxic chamber 120'. After returning to the anoxic chamber 120', the de-nitrification bacteria in the returned sludge are mixed with the existing sludge in the anoxic chamber 120'. The de-nitrifiers in the sludge start to be active to digest nitrate and organics. Similar to the air pump, the sludge pump 148' also can be provided in more than one size, for example, a large pump for high flow rates and a small pump for low flow rates.

In order to improve the solids removal efficiency, a flow equalization apparatus 149' is installed on an inlet end of the outlet pipe 146' of the clarification chamber 140'. At least one flow equalization port regulates the peak flow from the clarification chamber 140' to the polishing chamber 150' and improves solids removal efficiency. The purpose of using this flow equalization apparatus 149' is to average the effluent flow rate and enhance settling efficiency. This system was experimentally tested for a 6 month period with the influent waste water being heated to a temperature of 11° C.+/−1° C., when necessary, to ensure a minimum temperature of 10° C. without discarding any sludge. Sometimes, small amounts of sludge turned into light weight sludge that cannot be removed by the settling process. The sludge usually floats from the bottom of the chamber to the water surface in the clarification chamber 140'. To separate floating sludge and supernatant, an outer housing is structured at the outside of the flow equalization port to keep floating solids away from effluent flow. At least one overflow port is located above the at least one flow equalization port. If the at least one flow equalization port is plugged, treated wastewater flows to the polishing chamber 150' through the at least one overflow port. Usually, the at least one flow equalization port is not plugged by solids easily. If sludge accumulates inside the flow equalization port and plugs the flow, the water level in the clarification chamber 140' will be raised to achieve the water level at the at least one overflow port. During the water level elevating time, the plugged at least one flow equalization port will be self-cleaned under the pressure of the water. If the plugged flow equalization port cannot be cleaned, the at least one overflow port allows liquid to flow into the polishing chamber 150'. The diameter of the at least one flow equalization port varies from 0.25 to 0.5 inches. Additional details on embodiments of the flow equalization apparatus 149' are shown in and described in relation to FIGS. 11-14, 31, 32 and 59-65.

In FIG. 68, the polishing chamber 150' consists of an influent well 154' and an effluent well 158' separated by a central wall 157', all located transversely across the polishing chamber 150' with a filtration bed 159' horizontally located in and dividing the effluent well 158' of the polishing chamber 150' into upper and lower sections **158*a'*, 158*b'*. The effluent from the clarification chamber 140' flows into the influent well 154' of the polishing chamber 150'. The flow is then distributed to the effluent well 158' through an opening 164' located at and formed through a bottom center of the central wall 167' and moves up through the filtration bed 159' where the treated wastewater passes through a filtration bed base 162' and a filtration media 163'** to perform a coarse filtration function. The biomass accumulated inside of the filtration material performs three functions: 1) further settling, 2) filtering, and 3) polishing treatment. The filter removes suspended solids (SS), BOD and total nitrogen from the clarification chamber effluent. The anoxic condition inside of the settled sludge and filtration beds allows de-nitrification bacteria to grow and remove certain amounts of nitrate.

The filtrate from the two filtration beds 159' is collected from two submerged holes and directed to the upper section of the effluent well 158*a*', in which, a finishing treatment system 160', such as shown in FIG. 2 as the finishing treatment system 160', can be installed to perform a final treatment on the effluent water before being discharged from the polishing chamber 150'. For example, the finishing treatment system 160' can include, but is not limited to, an UV assembly, a chlorination system, a de-chlorination system, a phosphorus removal system, a heavy metal removal system, a nitrogen/nitrate removal system and any combination of the above and is installed for disinfecting of the effluent from the filter. Because the filter is designed and structured very well and the filtrate is clear and contains less BOD and SS, disinfection performance of the UV assembly is excellent.

Several different types of material can be used as the filtration media for the system 100' of FIG. 68. For example, gravel, ceramic, closed cell Styrofoam, natural, synthetic, rubber and plastic materials in certain sizes can be used as the filtration media 163' in the filter. Specifically, the diameter of the filtration media 163' varies from 0.5 to 5 inches. Because coarse filtration media 163' and a thin filtration bed are used in this design, it is easy to clean the filtration media during maintenance services. After the liquid in the filter is pumped out though the influent well 154', an operator can rinse the filtration media 163' with a garden hose, the sloughed biofilm is washed down to the bottom of the filter and flows along the slope to the influent well with accumulated sludge. A service pump pumps all the solids out of the filter. The filter cleaning process can be completed easily.

The wastewater treatment system tank of FIG. 68 can be constructed using concrete and/or a molded plastic, as will be seen and described in subsequent figures and paragraphs herein.

FIG. 69 is a partially exposed, top view of the wastewater treatment system tank of FIG. 68, in accordance with one or more embodiments of the disclosed subject matter. In FIG. 69, the positions of the access openings 101', 103*a*', 103*b*', 105*a*', 105*b*', 107' in the top wall 71' of the first component 80' are shown in dashed line. In addition, the internally installed pipe system 144' of the sludge return system extend from beneath the clarification chamber access opening 107' back toward the anoxic chamber 120'. Specifically, a first cross piece 214' is seen extending out of the clarification chamber 140' through the clarification chamber front wall 141' into and across the aeration chamber 130' to connect with a first end of an air-tight sealed coupling/connector tube 171' that extends through the aeration chamber front wall 131' and into the anoxic chamber 120' and is connected to a first end of a first elbow 216'. A second end of the first elbow 216' is connected to a first end of a return piece 210', which connects to the mixing bar 127' via the mixing bar riser tube 128'. An air pump 139' is connected to a first pipe section 224', which connects to and is in fluid communication with a diffuser bar return piece 220', which connects to and is in fluid communication with the diffuser bar riser 138', which connects to and is in fluid communication with the diffuser bar 137'. The pipe sections form an air-tight fluid connection between the air pump 139' and the diffuser. Although, in FIG. 69, the pipe components of the sludge return system are connected on one end to the sludge return pump 148', extend up toward a top of the clarification chamber 140' then bend and extend toward the back wall 145' of the clarification chamber 140' at a substantially orthogonal angle to the sludge return pipe 147' to form a "U"-shaped loop 175' with the first cross piece 214', they can also be configured to form an orthogonal angle with the first cross piece 214' (see FIG. 79 for the alternative design.)

In FIG. 69, the internal structure of the polishing chamber is more clearly illustrated. For example, inlet pipe 152' is seen attached to the front wall 151' of the polishing chamber 150' and in fluid communication with an influent well 154'. Adjacent to the influent well 154' is an effluent well 158' in which the filtration bed base 162' is located.

Figure 70:
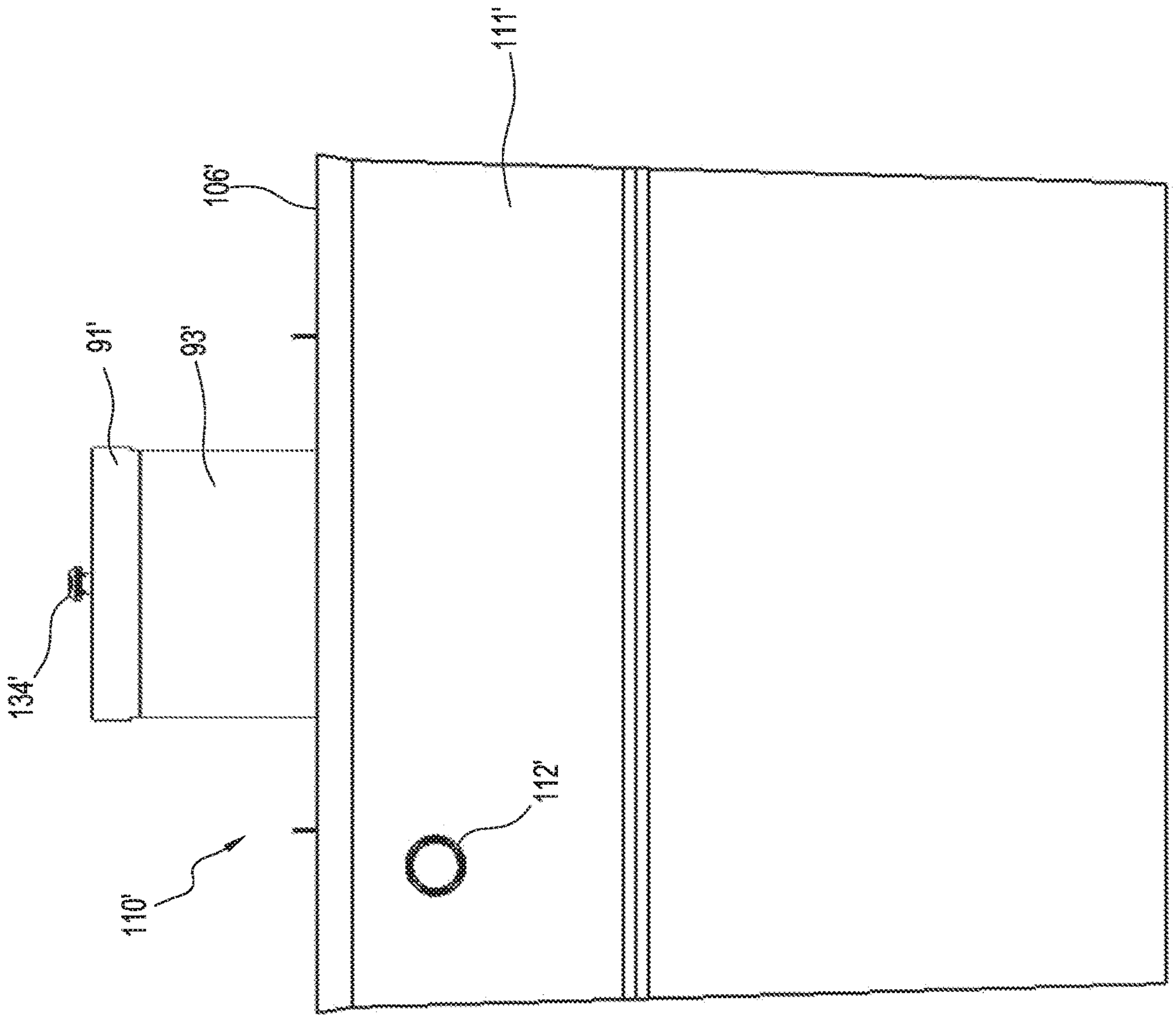
FIG. 70 is a front view of the pretreatment chamber in FIGS. 68 and 69, in accordance with one or more embodiments of the disclosed subject matter.

FIG. 70 is a front view of the pretreatment chamber 100' in FIGS. 68 and 69, in accordance with one or more embodiments of the disclosed subject matter. In FIG. 70, the pretreatment chamber inlet opening 112' is seen in the upper left corner of the front wall 111' of the pretreatment chamber 110'.

Figure 71:
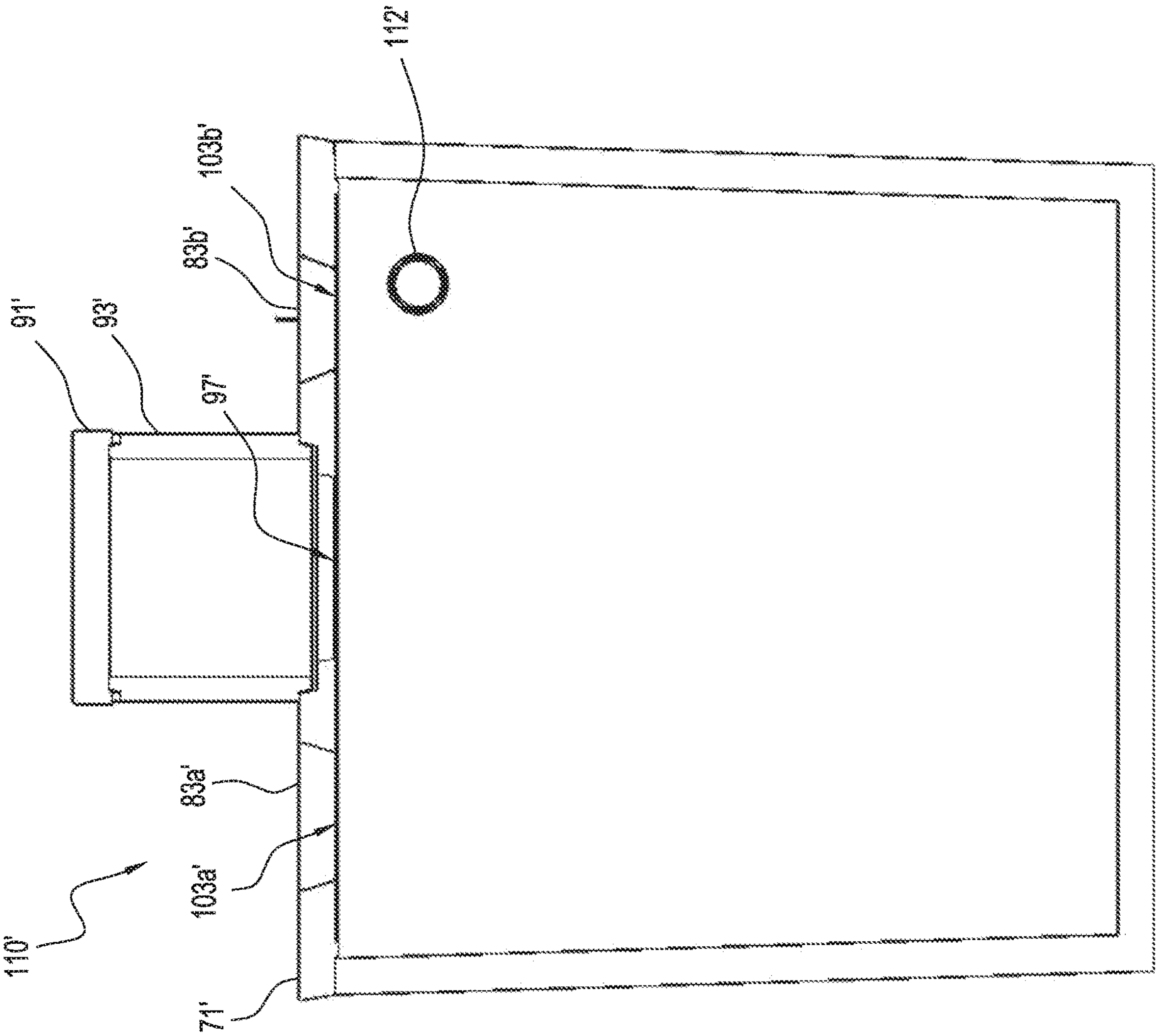
FIG. 71 is a lateral cross-sectional view along line A'-A' of the pretreatment chamber in FIG. 69, in accordance with one or more embodiments of the disclosed subject matter.

FIG. 71 is a lateral cross-sectional view along line A'-A' of the pretreatment chamber 110' in FIG. 69, in accordance with one or more embodiments of the disclosed subject matter. In FIG. 71, the pretreatment chamber 110' inlet pipe 112' is shown in the upper right corner of the pretreatment chamber front wall 111'.

Figure 72:
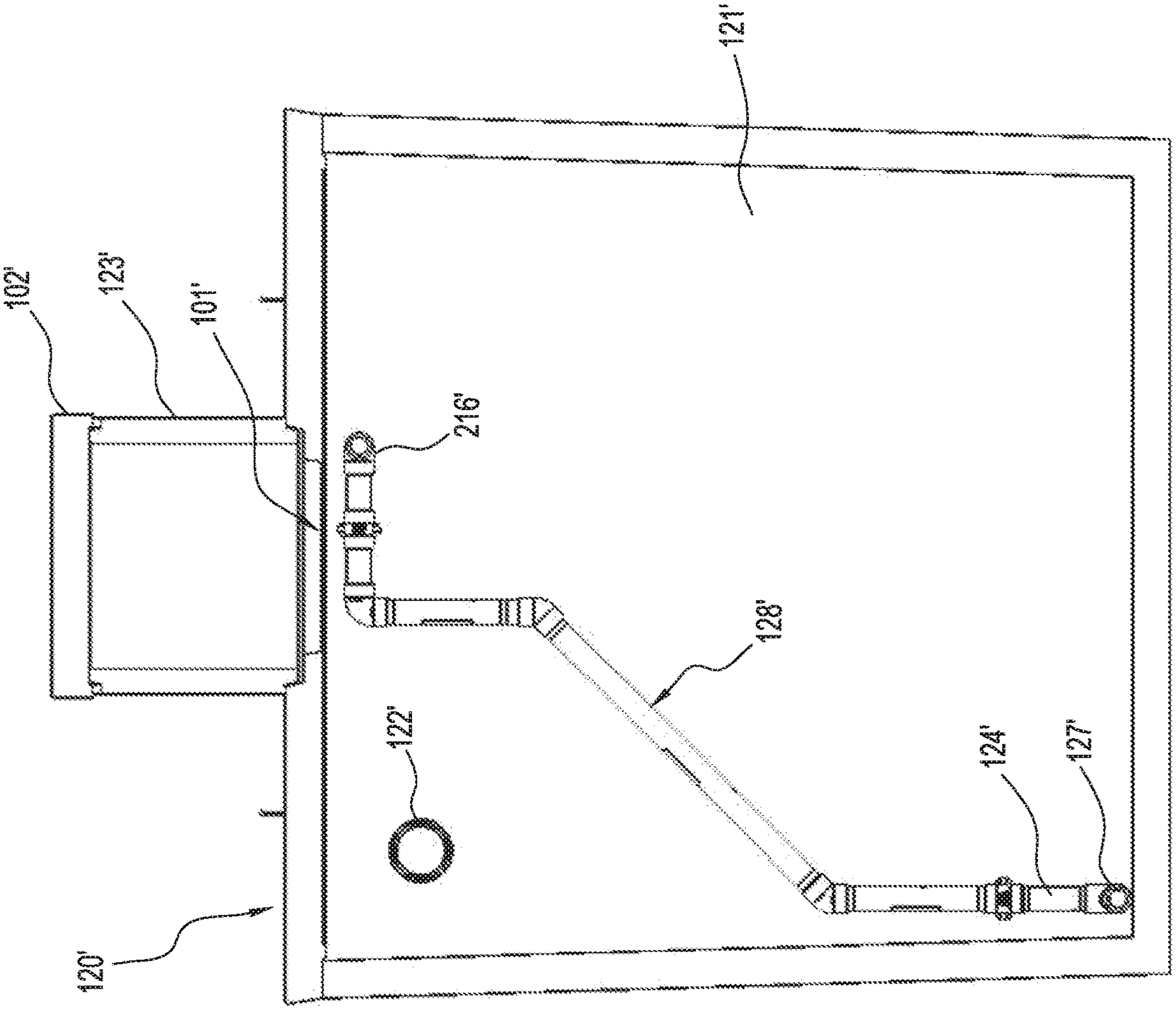
FIG. 72 is a lateral cross-sectional view along line B'-B' of the anoxic chamber in FIG. 69, in accordance with one or more embodiments of the disclosed subject matter.

FIG. 72 is a lateral cross-sectional view along line B'-B' of the anoxic chamber 120' in FIG. 69, in accordance with one or more embodiments of the disclosed subject matter. In FIG. 72, the inlet pipe 122' is seen in the upper left corner of the anoxic chamber 120' front wall 121' and a top end of the sludge return piping 128' is connected to connection joint 216' and a bottom end of the sludge return piping 128' is connected to the diffuser bar 127' near the bottom of the anoxic chamber 120'.

Figure 73:
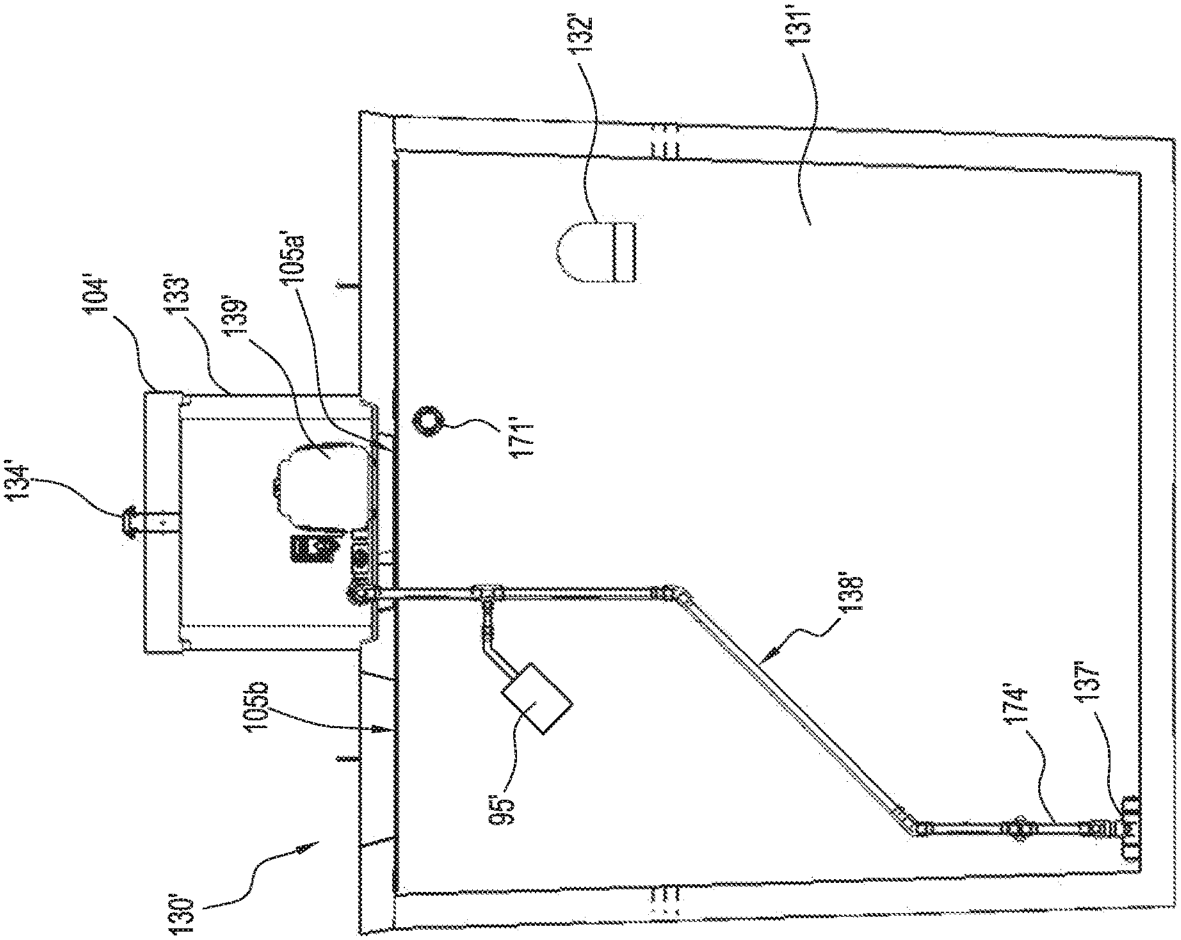
FIG. 73 is a lateral cross-sectional view along line C'-C' of the aerobic chamber in FIG. 69, in accordance with one or more embodiments of the disclosed subject matter.

FIG. 73 is a lateral cross-sectional view along line C'-C' of the aerobic chamber 130' in FIG. 69, in accordance with one or more embodiments of the disclosed subject matter. In FIG. 73, the aeration chamber inlet opening 132' is seen at the adjacent an upper right corner of the front wall 131' of the aeration chamber 130'. The air-tight sealed coupling/connector 171' is seen in the front wall 131' just below the right side of the riser 133' and, during operation of the system 100', prevents fresh air brought in by air pump 139' and air valve 134' the aeration chamber 130' from passing from the aeration chamber 130' into the anoxic chamber 120'. The outlet opening 136' is located at the bottom of the back wall 135' of the aeration chamber 130', which is best seen in FIG. 74, is rectangular in shape with dimension of about 18 inches wide by about 6 inches high on the aeration chamber side and tapers down on all four sides to an opening in the clarification chamber front wall 141' of the about 16 inches wide and about 4 inches high.

Figure 74:
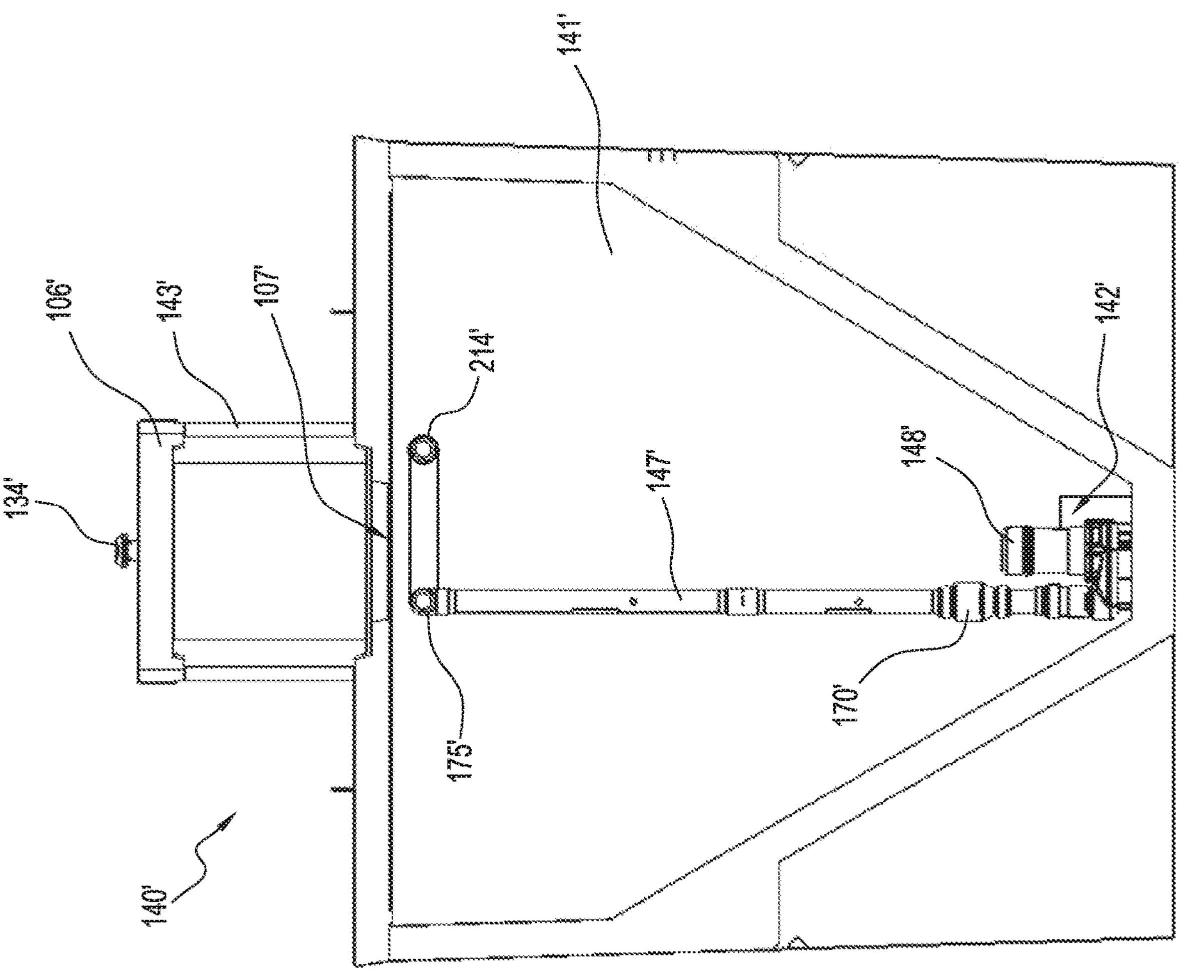
FIG. 74 is a lateral cross-sectional view along line $D_1$'-$D_1$' of the clarification chamber in FIG. 69, in accordance with one or more embodiments of the disclosed subject matter.

FIG. 74 is a lateral cross-sectional view along line $D_1$'-$D_1$' of the clarification chamber 140' in FIG. 69, in accordance with one or more embodiments of the disclosed subject matter. In FIG. 74, the clarification chamber 140' inlet opening 142' is shown at the bottom center of the front wall 141' of the clarification chamber 140' behind the sludge return pump 148'. The sludge return piping element 214' is seen passing through the clarification chamber front wall 141' just below the right side of the riser 143', which extends through the front wall 141' into and through the aeration chamber 130' and connects to the air-tight sealed coupling/connector 171' in the front wall 131' of the aeration chamber 130'.

Figure 75:
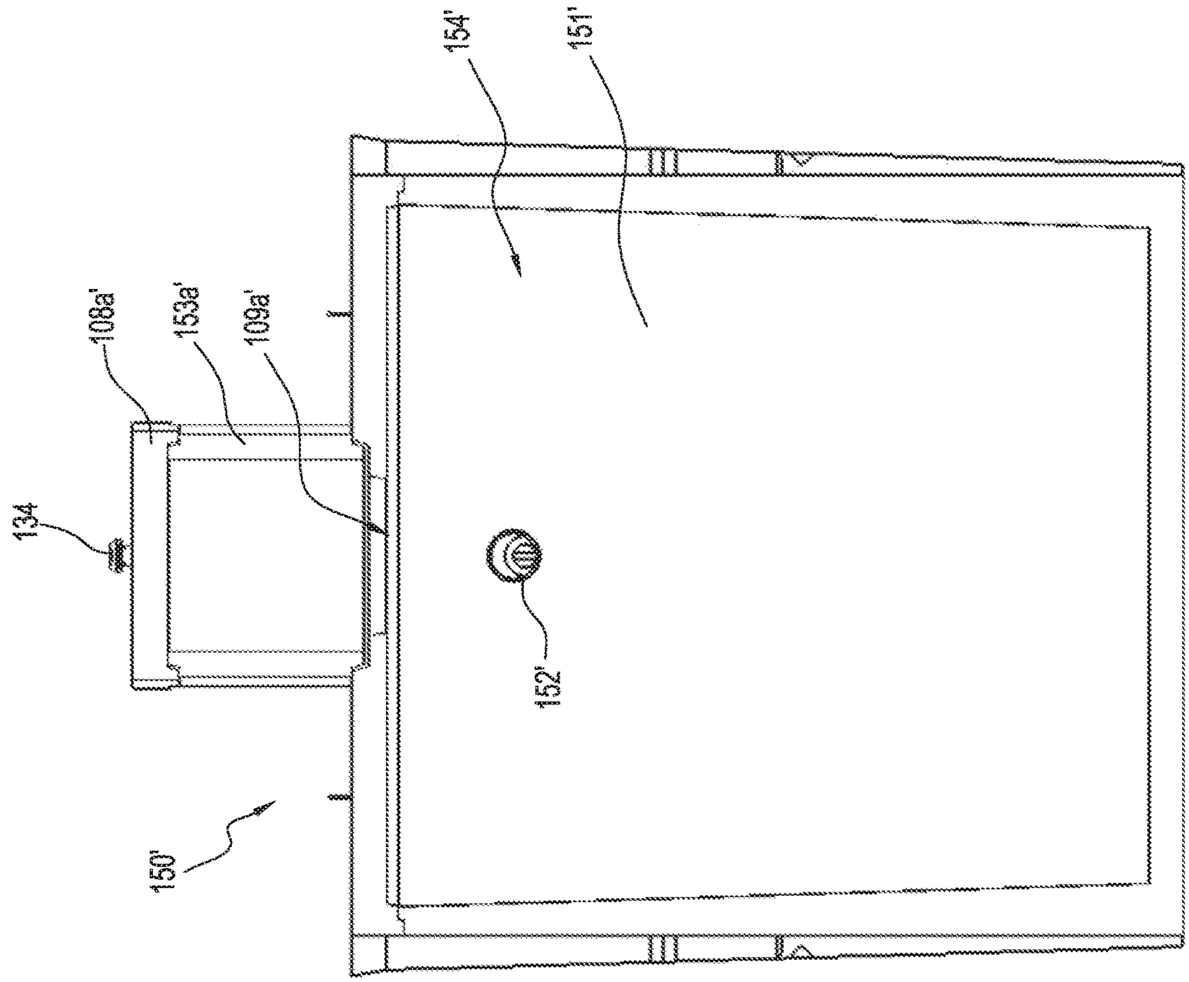
FIG. 75 is a lateral cross-sectional view along line $D_2$'-$D_2$' of the polishing chamber in FIG. 69, in accordance with one or more embodiments of the disclosed subject matter.

FIG. 75 is a lateral cross-sectional view along line $D_2$'-$D_2$' of the polishing chamber 150' in FIG. 69, in accordance with one or more embodiments of the disclosed subject matter. In FIG. 75, the influent well inlet opening 152' is shown in an upper middle portion of the front wall 151' and below the first frustoconical access opening 109*a*' of the polishing chamber 150'.

Figure 76:
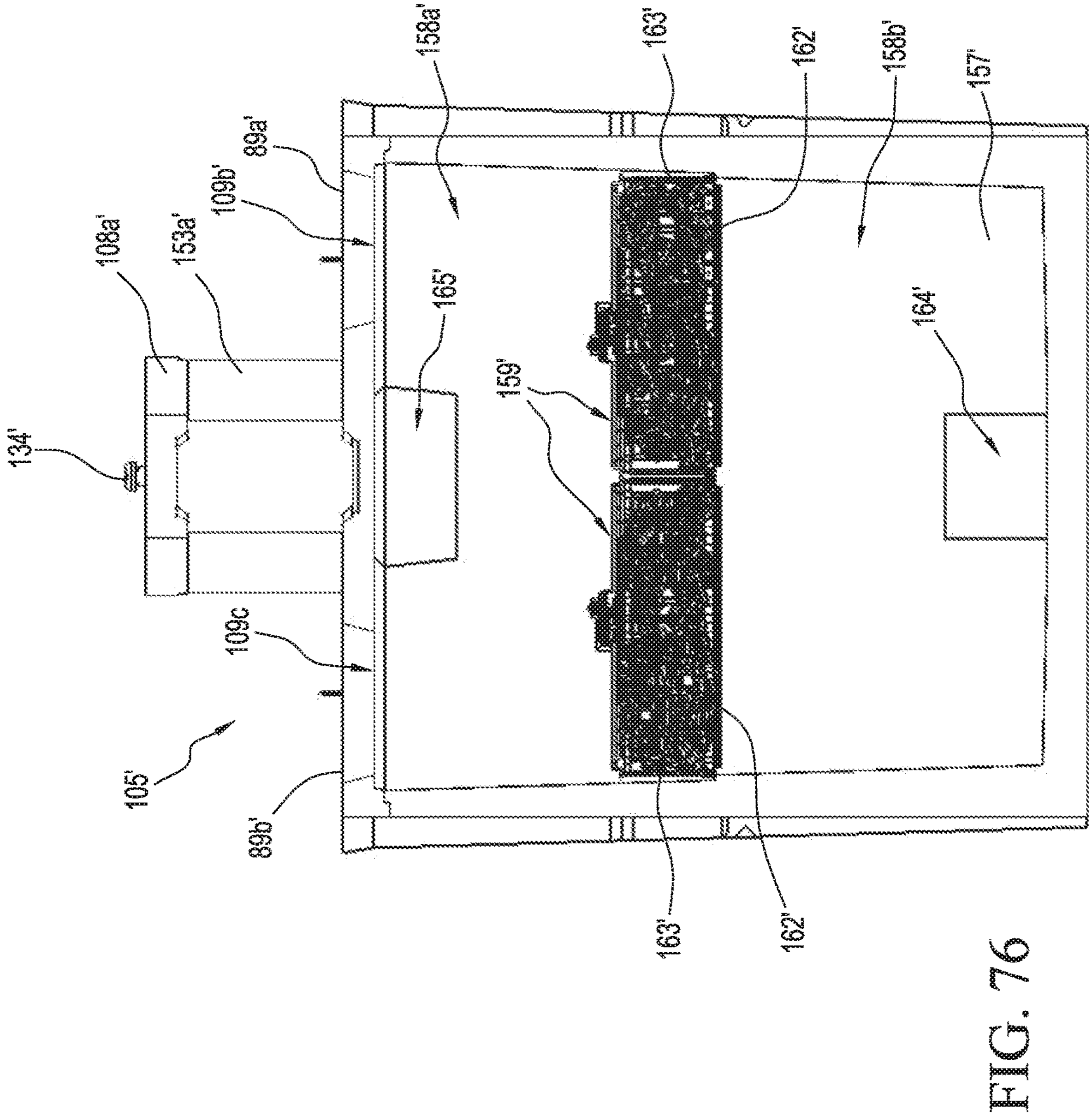
FIG. 76 is a lateral cross-sectional view along line $D_3$'-$D_3$' of the polishing chamber in FIG. 69, in accordance with one or more embodiments of the disclosed subject matter.

FIG. 76 is a lateral cross-sectional view along line $D_3$'-$D_3$' of the polishing chamber 150' in FIG. 69, in accordance with one or more embodiments of the disclosed subject matter. In FIG. 76, the effluent well inlet opening 164' is shown in and extending through the central wall 157' adjacent the bottom of the effluent well 158*b*' to be in fluid communication with and receive flow from the influent well 154'. The overflow opening 165' is shown substantially directly above the inlet opening 164' in and extending through a top center section of the central wall 157' to be in fluid communication with and send overflow water back into the influent well 154' in overflow conditions. As seen in FIG. 76, there are two separate filtration beds 159' positioned side-by-side in about a middle of the effluent well 158' and through which the cleaned wastewater passes up and through for its final, or almost final, treatment before being discharged from the polishing chamber 150'. Optionally, if the finishing treatment system 160' is installed, it may be used to further treat the about to be discharged treated wastewater.

The details of the system 100 shown and described in relation to FIGS. 4-20 are also applicable to the present system 100' of FIGS. 68-76 and subsequent other embodiments described below, but are not repeated separately here or below.

Figure 77:
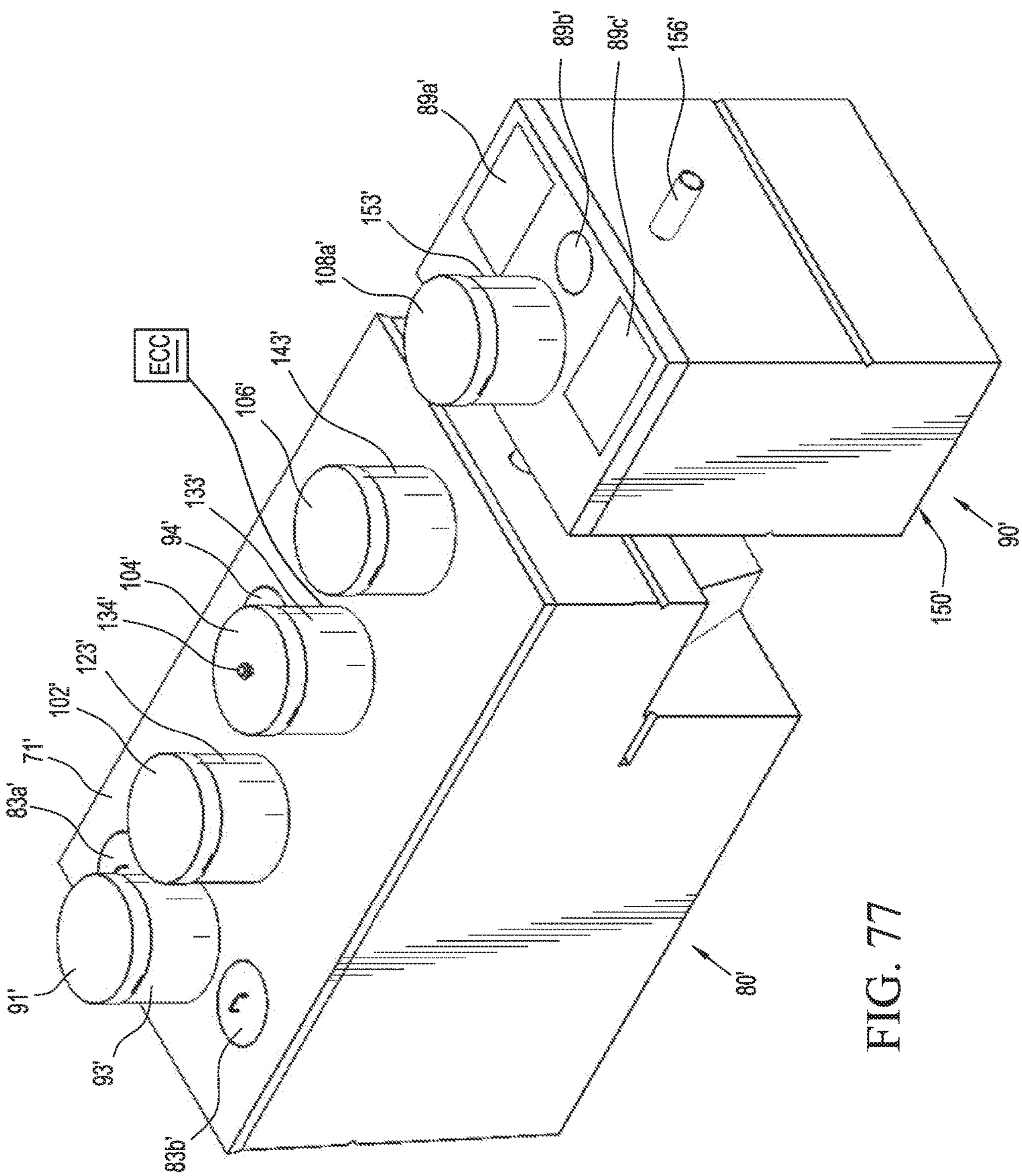
FIG. 77 is a top right rear perspective view of the wastewater treatment system in FIGS. 68 and 69, in accordance with one or more embodiments of the disclosed subject matter.

FIG. 77 is a top right, rear perspective view of the system 100' in FIGS. 68 and 69, in accordance with one or more embodiments of the disclosed subject matter.

Figure 78:
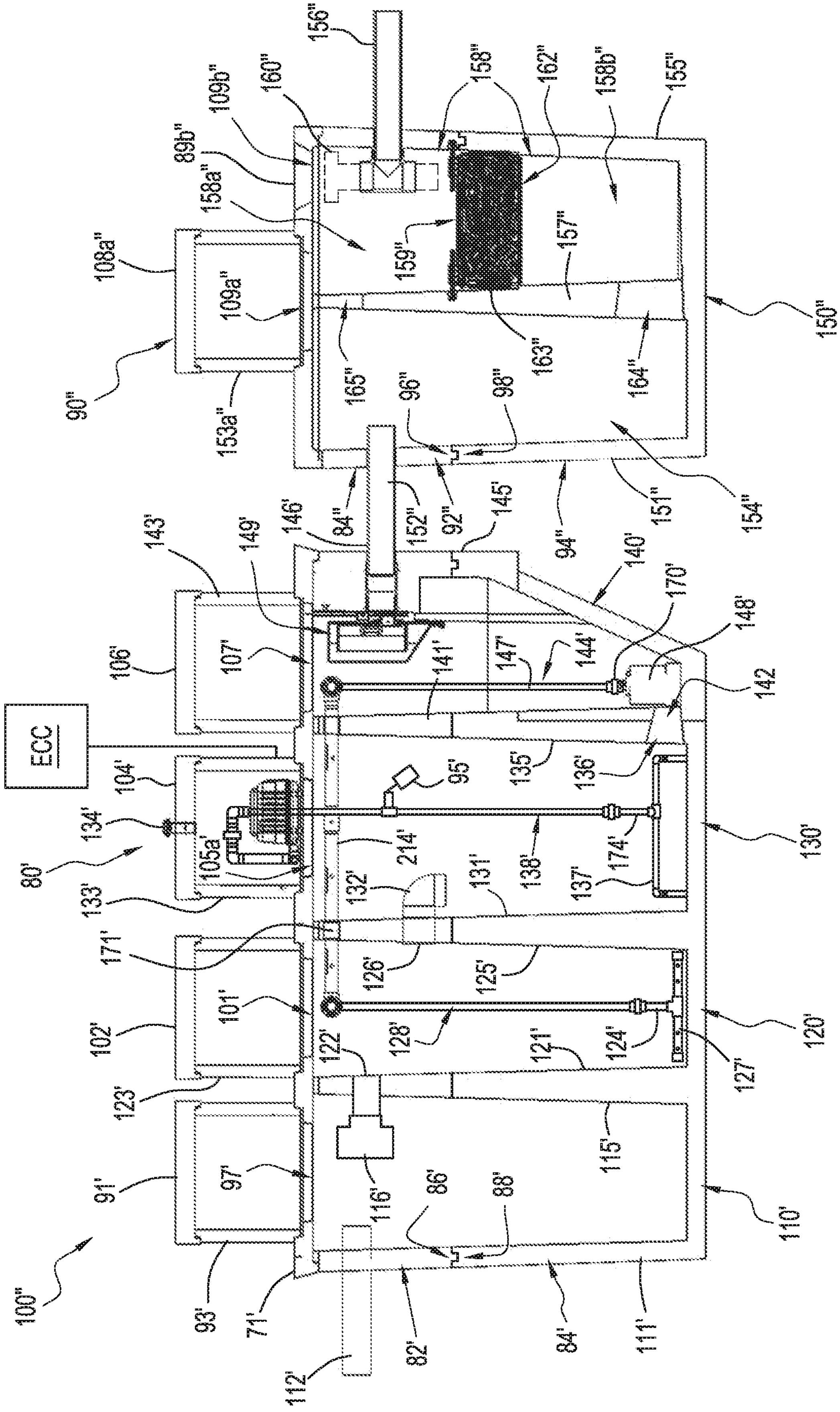
FIG. 78 is a cross-sectional, side view of a wastewater treatment system tank with a pretreatment chamber, an anoxic chamber, an aeration chamber, a clarification chamber and a polishing chamber, in accordance with one or more embodiments of the disclosed subject matter.

FIG. 78 is a cross-sectional, side view of a wastewater treatment system with a pretreatment chamber, an anoxic chamber, an aeration chamber, a clarification chamber and a polishing chamber, in accordance with one or more embodiments of the disclosed subject matter. In FIG. 78, a wastewater treatment system 100" includes the first component 80' as in FIGS. 68 and 69 and a second component 90" that is smaller than the second component 90' in FIGS. 68 and 69, and the wastewater treatment system 100" is only turned on for a total of about 12 hours or less each day. In the embodiment illustrated in FIG. 78, the first and second components 80', 90" each include a top half 82', 92" and a bottom half 84', 94", respectively. In general, the top components 82', 92" have a ridge 86', 96" extending from a bottom edge and the bottom components 84', 92" have a reciprocally shaped groove 88', 98", respectively, to receive the appropriate top component ridge 86', 96" when the two components are assembled together. The first component 80' includes a pretreatment chamber 110', an anoxic chamber 120' in fluid communication with the pretreatment chamber 110', an aeration chamber 130' in fluid communication with the anoxic chamber 120', a clarification chamber 140' in fluid communication with the aeration chamber 130' and the anoxic chamber 120'. The second component 90" includes a polishing chamber 150" in fluid communication with the clarification chamber 140' of the first component 80' and an effluent well 158*b*" in fluid communication with the influent well 154" and also outside of the polishing chamber 150". System operation, monitoring, compliance and diagnostic functions area provided by an external control center ECC, which is also referred to as the control center, using MCD technology with pre-wired controls mounted in a lockable NEMA rated enclosure designed specifically for outdoor use. The control center ECC is a UL Listed assembly that includes a time clock, alarm light, reset button, power switch, power light, phone/network light, recirculation pump light, air pump light, high water light and auxiliary alarm light. A pre-programmed time clock controls the recirculation pump to insure that approximately 400% of the average daily flow is returned to the anoxic chamber. The control center ECC monitors recirculation pump current, air pump operation, high water and auxiliary alarm circuitry. In the event of an alarm from the air pump or auxiliary input, audible and visual alarms are activated and an optional telemetry system can report the condition. If abnormal operation of the recirculation pump is detected, a diagnostic sequence can begin and the visual alarm activates. After a factory programmed recovery interval, an automatic restart attempt is initiated and, if normal pump operation does not resume during 24 programmed recovery and restart cycles, the audible alarm activates and the optional telemetry system can report the condition to a monitoring center. In addition, the control center ECC can include a telemetry system with a heartbeat feature that is used to ensure the system is operating properly. In operation, at predefined intervals, for example, but not limited to, weekly, bi-weekly or monthly, the telemetry system initiates a call to a monitoring system, for example, but not limited to, a remote, online monitoring system at a monitoring center, to confirm proper operation of the system. If a call is not received at any of the predefined times and/or a negative operation report is received, the monitoring center notifies a service technician of the possible need for service to repair the system. If the lack of contact is only temporary due to a phone, internet or cellular connection being temporarily being offline, once it is back online, the normal reporting cycle will resume.

In FIG. 78, the pretreatment chamber 110' has a front wall 111' through which an influent inlet pipe 112' is located in an upper left corner of the front wall 111', when viewed from the outside and facing the front wall 111' (see FIG. 80), and provides access for an incoming flow of wastewater to be treated. The pretreatment chamber 110' also has a back wall 115' through which an outlet pipe 116' is located in an upper right corner of the back wall 115' (see FIG. 81) and permits pretreated wastewater to flow into the anoxic chamber 120'. The "T"-shape of the outlet pipe 116' permits wastewater to flow from the bottom in normal flow conditions and from the bottom and top in overflow conditions. Located in a top wall 71' of the pretreatment chamber 110' and above an exit of the influent inlet pipe 112' is a frustoconical first access opening 103*a*' with a reciprocal frustoconical first access opening cover 83*a*' (see FIG. 79). Also located in the top wall 71' of the pretreatment chamber 110' and above an entrance of the outlet pipe 116' is a frustoconical second access opening 103*b*' with a reciprocal frustoconical second access opening cover 83*b*'. In general, the bottom of the pretreatment chamber outlet pipe 116' is located at a height that is slightly below, for example, about 1 inch below, the pretreatment chamber influent inlet pipe 112'. Located in the top wall 71' between the first and second access openings 103*a*', 103*b*' is a first riser opening 97' that is aligned generally along a longitudinal center line of the first component 80'. A riser 93' having a substantially cylindrical exterior and internal opening extending there through and a base of the first riser 93' is seated and sealed around the first riser opening 97' and a substantially circular riser cover 91' is removably seated on top end of the first riser cover 93'.

In FIG. 78, the anoxic chamber 120' has a front wall 121' through which an inlet pipe 122' is located in an upper right corner of the front wall 121', when looking back toward the pretreatment chamber 110', and provides access for an incoming flow of pretreated wastewater from the pretreatment chamber 110'. In fact, the anoxic chamber front wall 121' is also the pretreatment chamber back wall 115' and the anoxic chamber inlet pipe 122' is directly connected to and in fluid communication with the pretreatment chamber outlet pipe 116'. The anoxic chamber 120' also has a back wall 125' through which an outlet pipe 126' is located in an upper left corner of the back wall 125' (see FIG. 82) and permits anoxically treated wastewater to flow into the aeration chamber 130'. In general, the anoxic chamber outlet pipe 126' is located at a height that is below the anoxic chamber influent inlet pipe 122'. The difference in the heights of the pipes 112', 116', 122' and 126' helps to maintain the operating water levels in the pretreatment chamber 110', the anoxic chamber 120' and the aerobic chamber 130' to maintain an anoxic operational environment in the anoxic chamber 120'. Although not shown the water levels are not explicitly shown in FIG. 78, 88 or 98, the distance between the bottom of the influent inlet pipe 122' and the top of the water level M in the pretreatment chamber 110' (as seen in FIG. 68) and water heights in the next three chambers 120', 130', 140' is the same as shown in and described in regard to FIG. 68 above. In FIG. 78, located in a top wall of the anoxic chamber 120' and adjacent to the anoxic chamber inlet pipe 122' is a frustoconical first access opening 101', which can include a reciprocal frustoconical first access opening cover 81'. An anoxic chamber riser 123' is sealingly affixed around and extends upwardly away from the first access opening 101' and the anoxic chamber riser 123' is covered by a removable anoxic chamber riser cover 102'. An air-tight seal coupling/connector 171' is affixed in and through the anoxic chamber back wall 125' and connects to an interior sludge return pump system located in a bottom of the clarification chamber 150' and that is configured to pump sludge back to the anoxic chamber 120' via an internally installed pipe system 144'.

In FIG. 78, the aeration chamber 130' has a front wall 131' through which an inlet pipe 132' is located in an upper left corner of the front wall 131', when looking back toward the anoxic chamber 120', and provides access for an incoming flow of anoxically treated wastewater from the anoxic chamber 120'. In fact, the aeration chamber front wall 131' is also the anoxic chamber back wall 125' and the aeration chamber inlet pipe 132' is directly connected to and in fluid communication with the anoxic chamber outlet pipe 126'. The aeration chamber 130' also has a back wall 135' through which an outlet opening 136' is located in a bottom center of the back wall 135' (see FIG. 84) and permits aerated wastewater to flow into the clarification chamber 140'. In general, the aeration chamber outlet opening 136' is located at a height that is well below the aeration chamber inlet pipe 132' and permits a back and forth flow of wastewater between the aeration chamber 130' and the clarification chamber 140'. Located in a top wall of the aeration chamber 130' and adjacent to the aeration chamber inlet pipe 132' is a frustoconical access opening **105*b*' with a reciprocal frustoconical first access opening cover 85*b*' (both best seen in FIG. 79). Also located in the top wall of the aeration chamber 130' on the same side as and in-line with access openings 97' and 101' is a frustoconical third access opening 105*a*' which can include a reciprocal frustoconical second access opening cover 85*a*' (both best seen in FIG. 79). An aeration chamber riser 133' is sealingly affixed around and extends upwardly away from opening 105*a*' and riser 133' is covered by an aeration chamber riser cover 104' in which an air intake valve 134' extends through the riser cover 104' to provide air for an air pump 139' located inside riser 133'**.

The clarification chamber 140' has a front wall 141' through which an inlet opening 142' is located in a bottom center of the clarification chamber front wall 141' and provides access for an incoming flow of aerated wastewater from the aeration chamber 130'. In fact, the clarification chamber front wall 141' is also the aeration chamber back wall 135' and the clarification chamber inlet opening 142' is directly connected to and in fluid communication with the aeration chamber outlet opening 136'. The clarification chamber 140' also has a back wall 145' through which an outlet pipe 146' is located in a top center of the back wall 145' and permits clarified wastewater to flow into the polishing chamber 150'. A flow equalization device 149' is positioned in front of and controls the flow to the clarification chamber outlet pipe 146'. In general, the clarification chamber outlet pipe 146' is located at a height that is well above the clarification chamber inlet opening 142' and permits a one way flow of wastewater from the clarification chamber 140' to the polishing chamber 150'. Located in substantially the center of a top wall of the clarification chamber 140' and above the clarification chamber inlet pipe 142', the flow equalization unit 149' and the clarification chamber outlet pipe 146' is a frustoconical access opening 107', which can include a reciprocal frustoconical first access opening cover 87'. A clarification chamber riser 143' is sealingly affixed around and extends upwardly away from opening 107' and riser 143' is covered by a clarification chamber riser cover 106'.

In FIG. 78, the polishing chamber 150" is shown as a separate system/component that is connected to and in fluid communication with the clarification chamber 140' via the clarification chamber outlet pipe 146', which connects to and is in fluid communication with a polishing chamber inlet pipe 152" in a front wall 151' of the polishing chamber 150'. The polishing chamber inlet pipe 152" is located in a top center of the polishing chamber front wall 151" and provides access for an incoming flow of clarified wastewater from the clarification chamber 140'. The polishing chamber 150" also has a back wall 155" through which an effluent outlet pipe 156" is located in a top center of the back wall 155" and permits fully treated wastewater to flow out of the polishing chamber 150". In general, the polishing chamber outlet pipe 156" is located at a height that is below the polishing chamber inlet opening 152" and permits a one way flow of wastewater from the clarification chamber 140' into and out of the polishing chamber 150". Located in a top wall of the polishing chamber 150" and above the polishing chamber inlet pipe 152" is a fifth frustoconical access opening **109*a*", which can include a fifth reciprocal frustoconical first access opening cover 89*a*". Also located in the top wall of the polishing chamber 150" and between the fifth frustoconical access opening 109*a*" and the back wall 155" is a small polishing chamber frustoconical access opening 109*b*" with a reciprocally shaped opening cover 89*b*". The small polishing chamber access opening 109*b*" is substantially aligned along the mid-line of the system 100". A first polishing chamber riser 153*a*" is sealingly affixed around and extending upwardly away from opening 109*a*' and is covered by a polishing chamber riser cover 108*a*'**.

The embodiment of the system 100" in FIG. 78 is divided into two systems. In order to meet different application treatment requirements, the system is designed in different combinations to meet the different discharge requirements. For example, if a local authority requires a treatment plant to meet regular discharge limits or stringent discharge limits, a system including the first component 80' having the pretreatment, anoxic, aeration and clarification chambers 110', 120', 130', 140' can be applied to meet the discharge limits. If water reuse or a water recycling program is required, the second component 90" including the polishing chamber 150" can be added after the clarification chamber. Under such a situation or application, the system can be used as the first treatment step. Some additional polishing processes can be considered after the polishing chamber filtration. For example, chlorination, de-chlorination, de-nitrification, nitrogen/nitrate removal, phosphorus removal, carbon filtration and an ultra-filtration process or a similar process can be applied to enhance the water quality. After the polishing filtration treatment, the water quality meets the requirements for non-potable reuse. The function of the pretreatment chamber 110' is to remove grit, floating material and large suspended particles from domestic wastewater. The wastewater is preconditioned by passing through the pretreatment chamber 110' prior to being introduced to the anoxic chamber 120'. The outlet pipe 116' of the pretreatment chamber is equipped with a discharge tee or a baffle that extends vertically into the liquid so that only supernatant is displaced to the anoxic chamber 120'. The distance between the inlet 112' and outlet 116' of the pretreatment chamber is designed to be as far apart as possible. This design creates a good settling condition and improves solids removal efficiency.

As described above, the system 100" is different from any residential sewage treatment system. Not only does it use an aeration process, but it also uses anoxic and anaerobic processes. The purpose of using the anoxic chamber 120' in the system is to remove nitrate and total nitrogen. In a regular aeration treatment system, ammonia nitrogen is converted into nitrate by nitrifiers under an aerobic condition. A de-nitrification process must be applied to remove nitrate from treated effluent. Since the nitrate removal process (de-nitrification) needs certain organic nutrition, alkalinity and an anoxic condition for de-nitrifiers, this anoxic chamber receives the returned mixture of clarification chamber liquid and settled activated sludge containing nitrate from clarification chamber, and effluent containing certain amounts of organic nutrition from pretreatment chamber. Under the anoxic environment and mixing condition, the incubated de-nitrification bacteria in the anoxic chamber converts nitrate into nitrogen gas. Nitrate and organic matters measured as BOD are partially removed from sewage in the de-nitrification process.

In FIG. 78, the nitrate sources from the effluent are pumped from the bottom of the clarification chamber 140' to the anoxic chamber 120' periodically. A mixing bar 127', which is further shown in and described above in relation to FIG. 5, is installed at the end of a sludge return pipe 128' and located near the bottom of the anoxic chamber 120'. The end of the sludge return pipe is connected to a top end of a flexible pipe section 124' and a bottom end of the flexible pipe section 124' is connected to the mixing bar 127'. The flexible pipe section 124' permits the mixing bar 127' and the sludge return pipe 128' to be folded so as to be substantially parallel to each other to permit the easy installation of the sludge return pipe 128' and mixing bar 127' assembly in to the anoxic chamber 120'. An energy saving concept has been applied to design this system. Specifically, while a submersible sludge return pump 148' (i.e., a recirculation pump) is pumping the mixture of liquid and sludge up a sludge return pipe 147' of the internally installed pipe system 144' and back to the anoxic chamber 120', the current flows through holes (see FIG. 50) on the mixing bar 127'. As a result, the settled sludge and liquid in the anoxic chamber 120' are mixed by the current to form a mixed liquor. Mixing also creates a contact condition for de-nitrifiers and pollutants. Since fresh air is prohibited in the anoxic chamber, the mixture presents an anoxic condition that is essential for the de-nitrification process. When the sludge or solids in the anoxic chamber 120' settle down to a certain level, the sludge return pump 148' in the clarification chamber 140' starts its pumping cycle and creates a mixing condition in the anoxic chamber 120'. Frequent pumping keeps sludge in a suspension condition in the anoxic chamber. The pumping frequency can be selected based on the strength of the wastewater.

The sludge return pump 148' and the mixing bar 127' play two functions: 1) sending settled aerobic sludge and nitrate from the clarification chamber 140' to the anoxic chamber 120 and, 2) the current mixes the liquid simultaneously. In the de-nitrification process, nitrates from the clarification chamber and nutrition from pretreatment are mixed together, and the de-nitrification process is conducted under this anoxic condition.

Usually, the sludge return pump 148' is turned on from 1 to 10 percent of the system operating time. The pumping duration and frequency are based upon the flow rate of the submersible sludge return pump 148' and the strength of the influent wastewater. The flow rate of the sludge return pump 148' is adjustable for a return flow rate of between 100 to 1,000 percent of system flow rate depending on the organic and hydraulic load.

Because the sludge in the treatment system 100' is not allowed to be discarded, all the solids or sludge produced during the treatment period is kept in the system 100'. If a simple aeration system is operated under this kind of condition, floating sludge or scum is found at the surface of the clarification chamber 140'. In other words, the settleability of the aerobic sludge is not good after a certain length of operation. In long term aeration it is easy to cause a sludge expansion problem when dead microorganisms are pushed to the clarification chamber by a slow current in the system. Then, the sludge floats to the water surface of the clarification chamber 140' by tiny bubbles inside of the sludge particles. The floating solids or sludge affects the solids separation process. Some solids flow out of the clarification chamber 140' with effluent and cause high suspended solids in the effluent. Therefore, in order to combat this sludge expansion problem, the present system, alternatively applies an anoxic condition and an aerobic condition to the microorganisms. This improves the settleability of the sludge, and the floating sludge has been dramatically reduced. Therefore, the effluent quality from the clarification chamber is enhanced. The addition of an anoxic chamber not only removes total nitrogen, but also improves the effluent quality in both BOD and SS.

In the system 100" of FIG. 78, the denitrified domestic wastewater contains certain amounts of suspended solids, $BOD_5$ and nitrogen pollutants and flows through an elbow at an outlet end of the aeration chamber inlet tube 132' on that and enters the aeration chamber 130'. A low energy consumption air pump 139' is used to inject air into the mixed liquor and the aerobic bio-organisms in the aeration chamber 130' digest and remove organic pollutants, and convert TKN and ammonia to nitrate under the aerobic condition. The aeration process is completed by the air pump 139', which can be located within the aeration chamber riser 133' as shown in FIG. 69 as reference number 139' or externally as shown and described in relation to FIG. 2, a diffusion bar 137' and an air supply pipe 138'. The end of the air supply pipe 138' is connected to a top end of a flexible air pipe section 174' and a bottom end of the flexible air pipe section

174' is connected to the diffusion bar 137'. The flexible air pipe section 174' permits the diffusion bar 137' and the air supply pipe 138' to be folded so as to be substantially parallel to each other to permit the easy installation of the air supply pipe 138' and diffusion bar 137' assembly in to the aeration chamber 130'. At least two different sizes of the air pump 139' can be used depending on the desired or required flow rates. For example, with the larger air pump 139' the system 100' can process at about a 600 gallons per day flow rate and with the smaller air pump 139', it can process at about a 330 gallons per day flow rate. In addition, although the air pump 139' is shown inside of riser 133', it also can be located outside of the riser and up to 75 feet away from the system 100'''. The diffusion bar 137' is made from plastic pipe and tiny holes are distributed along the length of the pipe. Air bubbles released from the diffusion bar 137' are injected into the wastewater and mix and aerate the mixed liquor. In this and subsequent embodiments, the diffusion bar 137', the general design of which can be seen, generally, in FIG. 8, but that includes additional holes to increase the number of bubbles produced to aid in the aeration process. Activated sludge that is constructed by biomass plays a key role to treat domestic wastewater in the aeration chamber. An overflow level detector 95' is connected to the air supply pipe 138' adjacent aeration chamber access opening **105*a'***.

After the aeration process in the aeration chamber 130', although the pollutants in the domestic wastewater are reduced to a low level, the activated sludge needs to be separated from mixed liquor before entering the polishing chamber 150" for final treatment and discharge. The clarification chamber 140' is used to remove the solids from the treated wastewater. The mixed liquor flows through the opening 136' at the bottom of the wall that is constructed between the aeration chamber 130' and the clarification chamber 140'. This small opening regulates flow from the aeration chamber 130' to the clarification chamber 140'. Solids in the treated wastewater are separated from the liquid and settle down to the bottom of the clarification chamber 140' and form a sludge layer or pile. The sludge return pump 148' that is installed at the bottom of the clarification chamber 140' pumps settled activated sludge and liquid from the clarification chamber 140' through a check valve 170' and a pipe system 147' to the mixing bar 127' in the anoxic chamber 120' to be mixed with the wastewater and further treated in the anoxic chamber 120'. Because the hydraulic detention time of the clarification chamber is more than 4 hours during a peak flow period, the accumulated sludge separated in the clarification chamber is gradually turned into an anoxic condition before entering the anoxic chamber 120'. After returning to the anoxic chamber 120', the de-nitrification bacteria in the returned sludge are mixed with the existing sludge in the anoxic chamber 120'. The de-nitrifiers in the sludge start to be active to digest nitrate and organics. Similar to the air pump, the sludge pump 148' also can be provided in more than one size, for example, a large pump for high flow rates and a small pump for low flow rates.

In order to improve the solids removal efficiency, a flow equalization apparatus 149' is installed on an inlet end of the outlet pipe 146' of the clarification chamber 140'. At least one flow equalization port regulates the peak flow from the clarification chamber 140' to the polishing chamber 150" and improves solids removal efficiency. The purpose of using this flow equalization apparatus 149' is to average the effluent flow rate and enhance settling efficiency. This system was experimentally tested for a 6 month period with the influent waste water being heated to a temperature of 11° C.+/−1° C., when necessary, to ensure a minimum temperature of 10° C. without discarding any sludge. Sometimes, small amounts of sludge turned into light weight sludge that cannot be removed by the settling process. The sludge usually floats from the bottom of the chamber to the water surface in the clarification chamber 140'. To separate floating sludge and supernatant, an outer housing is structured at the outside of the flow equalization port to keep floating solids away from effluent flow. At least one overflow port is located above the at least one flow equalization port. If the at least one flow equalization port is plugged, treated wastewater flows to the polishing chamber 150' through the at least one overflow port. Usually, the at least one flow equalization port is not plugged by solids easily. If sludge accumulates inside the flow equalization port and plugs the flow, the water level in the clarification chamber 140' will be raised to achieve the water level at the at least one overflow port. During the water level elevating time, the plugged at least one flow equalization port will be self-cleaned under the pressure of the water. If the plugged flow equalization port cannot be cleaned, the at least one overflow port allows liquid to flow into the polishing chamber 150". The diameter of the at least one flow equalization port varies from 0.25 to 0.5 inches. Additional details on embodiments of the flow equalization apparatus 149' are shown in and described in relation to FIGS. 11-14, 31, 32 and 59-65.

Figure 79:
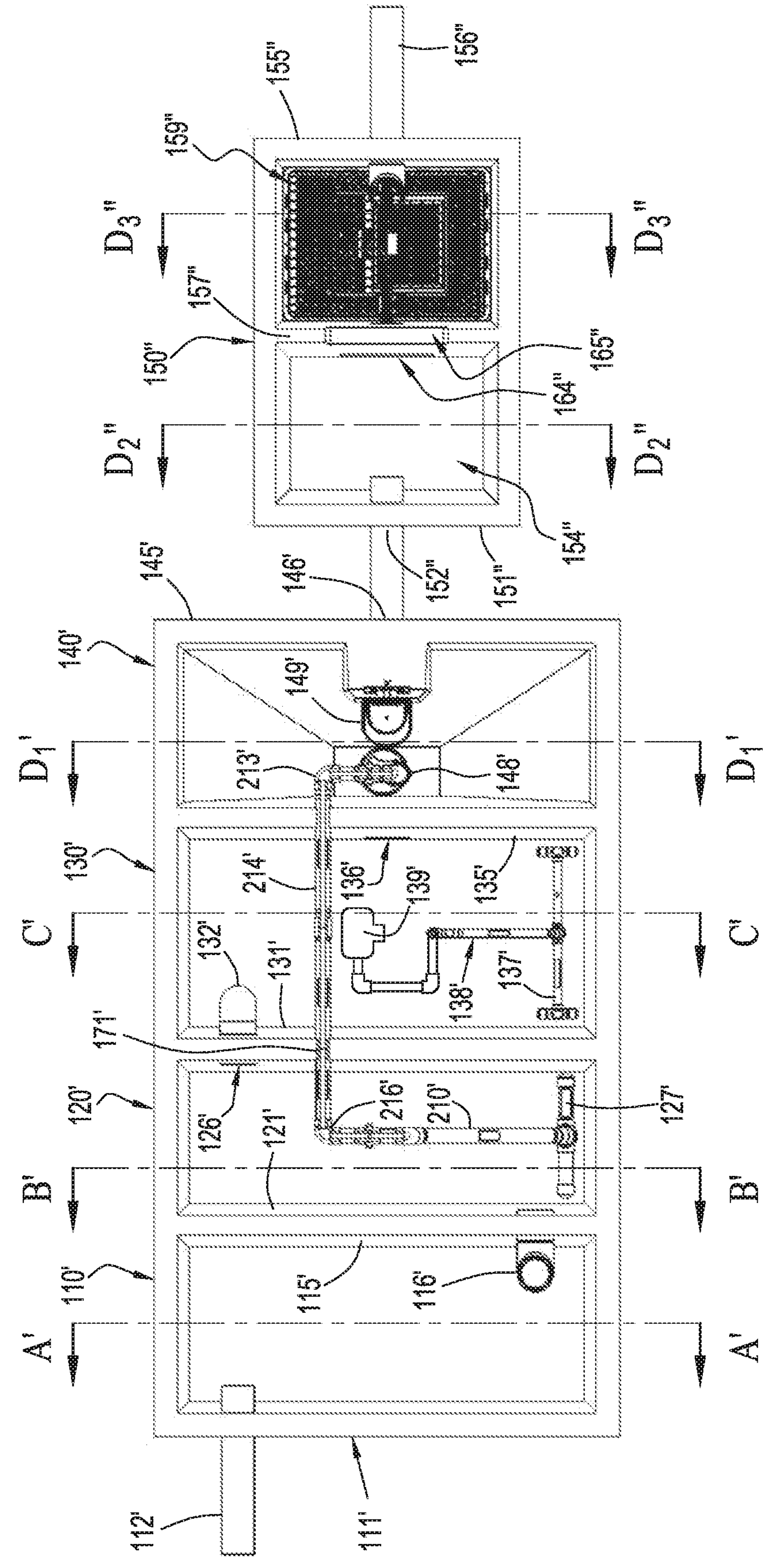
FIG. 79 is a partially exposed, top view of a wastewater treatment system tank with a pretreatment chamber, an anoxic chamber, an aeration chamber, a clarification chamber and a polishing chamber, in accordance with one or more embodiments of the disclosed subject matter.

In FIG. 78, the polishing chamber 150' consists of an influent well 154" and an effluent well 158" separated by a central wall 157', all located transversely across the polishing chamber 150" with a filtration bed 159" horizontally located in and dividing the effluent well 158" of the polishing chamber 150" into upper and lower sections **158*a*", 158*b*". Unlike the polishing chamber 150' of FIGS. 68 and 69, which had two filters 159', in FIGS. 78 and 79, the polishing chamber 150" only has a single filter 159" and consequently a narrower width. In addition, the polishing chamber 150" does not have the first and second rectangular access openings 109*b*', 109*c*' of the polishing chamber 150' in FIGS. 68 and 69. In FIGS. 78 and 79, the effluent from the clarification chamber 140' flows into the influent well 154" of the polishing chamber 150". The flow is then distributed to the effluent well 158" through an opening 164' located at and formed through a bottom center of the central wall 167' and moves up through the filtration bed 159" where the treated wastewater passes through a filtration bed base 162' and a filtration media 163'** to perform a coarse filtration function. The biomass accumulated inside of the filtration material performs three functions: 1) further settling, 2) filtering, and 3) polishing treatment. The filter removes suspended solids (SS), BOD and total nitrogen from the clarification chamber effluent. The anoxic condition inside of the settled sludge and filtration beds allows de-nitrification bacteria to grow and remove certain amounts of nitrate.

The filtrate from the single filtration bed 159" is collected from two submerged holes and directed to the upper section of the effluent well **158*a*", in which, the finishing treatment system 160', such as shown in FIG. 2 as the finishing treatment system 160, can be installed to perform a final treatment on the effluent water before being discharged from the polishing chamber 150'. For example, the finishing treatment system 160'** can include, but is not limited to, an UV assembly, a chlorination system, a de-chlorination system, a phosphorus removal system, a heavy metal removal system, a nitrogen/nitrate removal system and any combination of the above and is installed for disinfecting of the effluent from the filter. Because the filter is designed and structured very well and the filtrate is clear and contains less BOD and SS, disinfection performance of the UV assembly is excellent.

Several different types of material can be used as the filtration media for the system 100' of FIG. 78. For example, gravel, ceramic, closed cell Styrofoam, natural, synthetic, rubber and plastic materials in certain sizes can be used as the filtration media 163' in the filter. Specifically, the diameter of the filtration media 163' varies from 0.5 to 5 inches. Because coarse filtration media 163' and a thin filtration bed are used in this design, it is easy to clean the filtration media during maintenance services. After the liquid in the filter is pumped out though the influent well 154', an operator can rinse the filtration media 163' with a garden hose, the sloughed biofilm is washed down to the bottom of the filter and flows along the slope to the influent well with accumulated sludge. A service pump pumps all the solids out of the filter. The filter cleaning process can be completed easily.

The wastewater treatment system tank of FIG. 78 can be constructed using concrete and/or a molded plastic, as will be seen and described in subsequent figures and paragraphs herein.

FIG. 79 is a partially exposed, top view of the wastewater treatment system tank of FIG. 78, in accordance with one or more embodiments of the disclosed subject matter. In FIG. 79, the internally installed pipe system 144' of the sludge return system extend from beneath the clarification chamber access opening 107' back toward the anoxic chamber 120'. Specifically, a first cross piece 214' is seen extending out of the clarification chamber 140' through the clarification chamber front wall 141' into and across the aeration chamber 130' to connect with a first end of the air-tight sealed coupling/connector tube 171' that extends through the aeration chamber front wall 131' and into the anoxic chamber 120' and is connected to a first end of a first elbow 216'. A second end of the first elbow 216' is connected to a first end of a return piece 210', which connects to the mixing bar 127' via the mixing bar riser tube 128'. An air pump 139' is connected to a first pipe section 224', which to a first end of a diffuser bar return piece 220', which connects to the diffuser bar 137' the diffuser bar riser 138'. Although, in FIG. 79, the pipe components of the sludge return system are connected on one end to the sludge return pump 148', extend up toward a top of the clarification chamber 140' then bend toward a side wall to form an orthogonal angle with the first cross piece 214', the pipe can alternatively be configured to bend and extend toward the back wall 145' of the clarification chamber 140' at a substantially orthogonal angle to the sludge return pipe 147' to form a “U”-shaped loop 175' with the first cross piece 214' (see FIG. 69 for the alternative design.)

In FIG. 79, the internal structure of the polishing chamber is more clearly illustrated. For example, inlet pipe 152" is seen attached to the front wall 151" of the polishing chamber 150' and in fluid communication with an influent well 154". Adjacent to the influent well 154" is an effluent well 158" in which the filtration bed base 162" is located.

Figure 80:
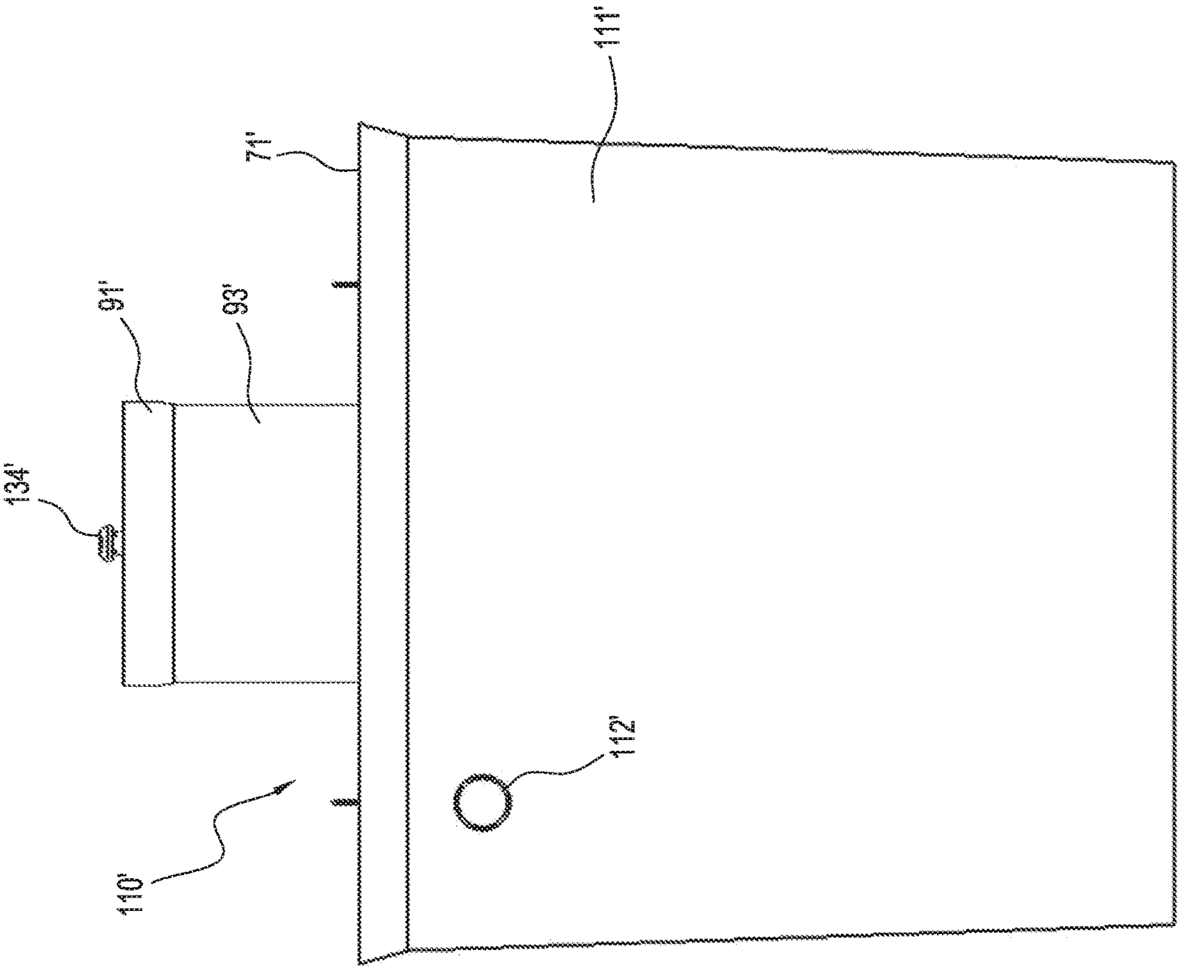
FIG. 80 is a front view of the pretreatment chamber in FIGS. 78 and 79, in accordance with one or more embodiments of the disclosed subject matter.

FIG. 80 is a front view of the pretreatment chamber 100" in FIGS. 78 and 79, in accordance with one or more embodiments of the disclosed subject matter. In FIG. 80, the pretreatment chamber inlet opening 112' is seen in the upper left corner of the front wall 111' of the pretreatment chamber 110'.

Figure 81:
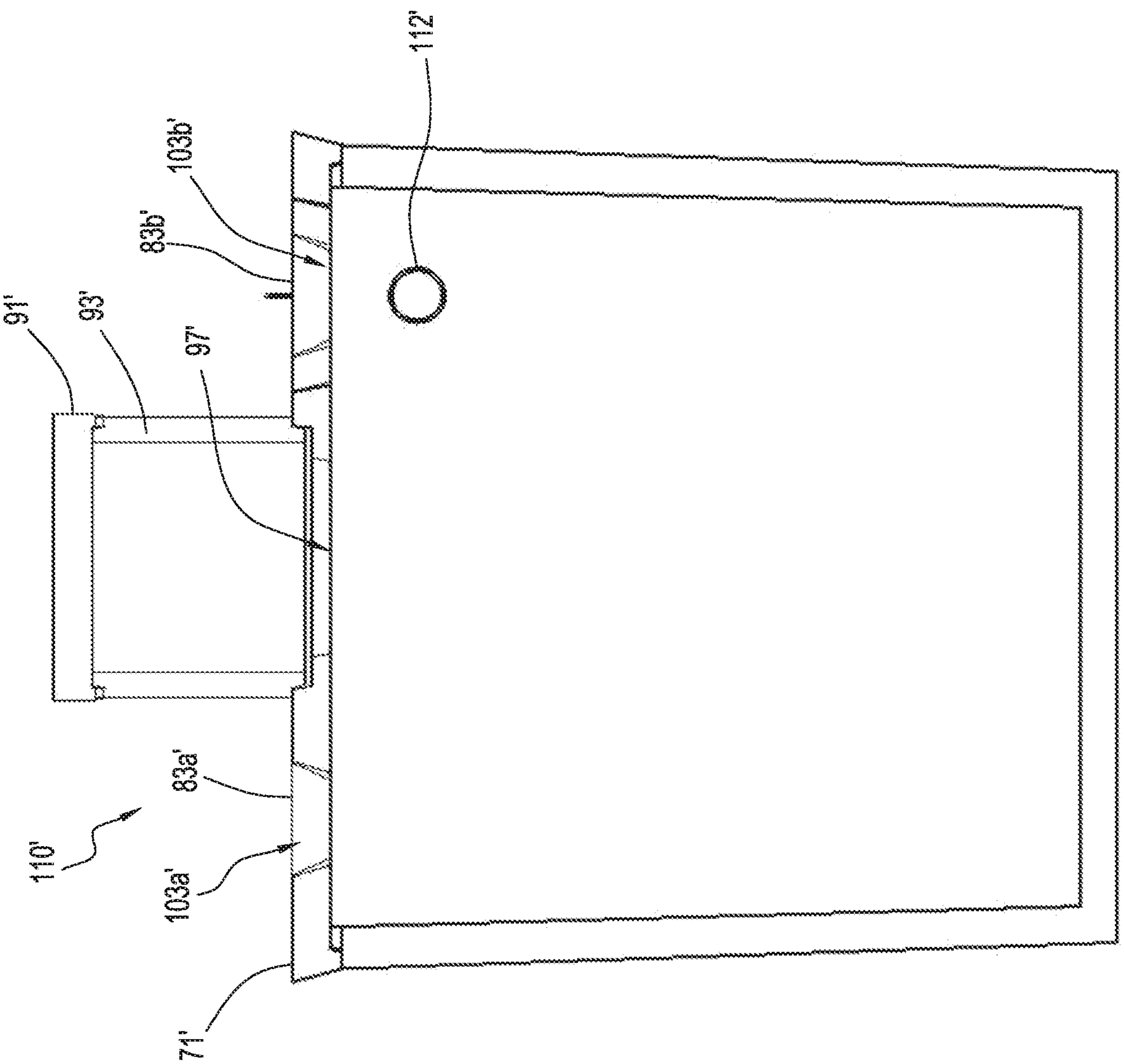
FIG. 81 is a lateral cross-sectional view along line A'-A' of the pretreatment chamber in FIG. 79, in accordance with one or more embodiments of the disclosed subject matter.

FIG. 81 is a lateral cross-sectional view along line A'-A' of the pretreatment chamber 110' in FIG. 79, in accordance with one or more embodiments of the disclosed subject matter. In FIG. 81, the pretreatment chamber 110' inlet pipe 112' is shown in the upper right corner of the pretreatment chamber front wall 111'.

Figure 82:
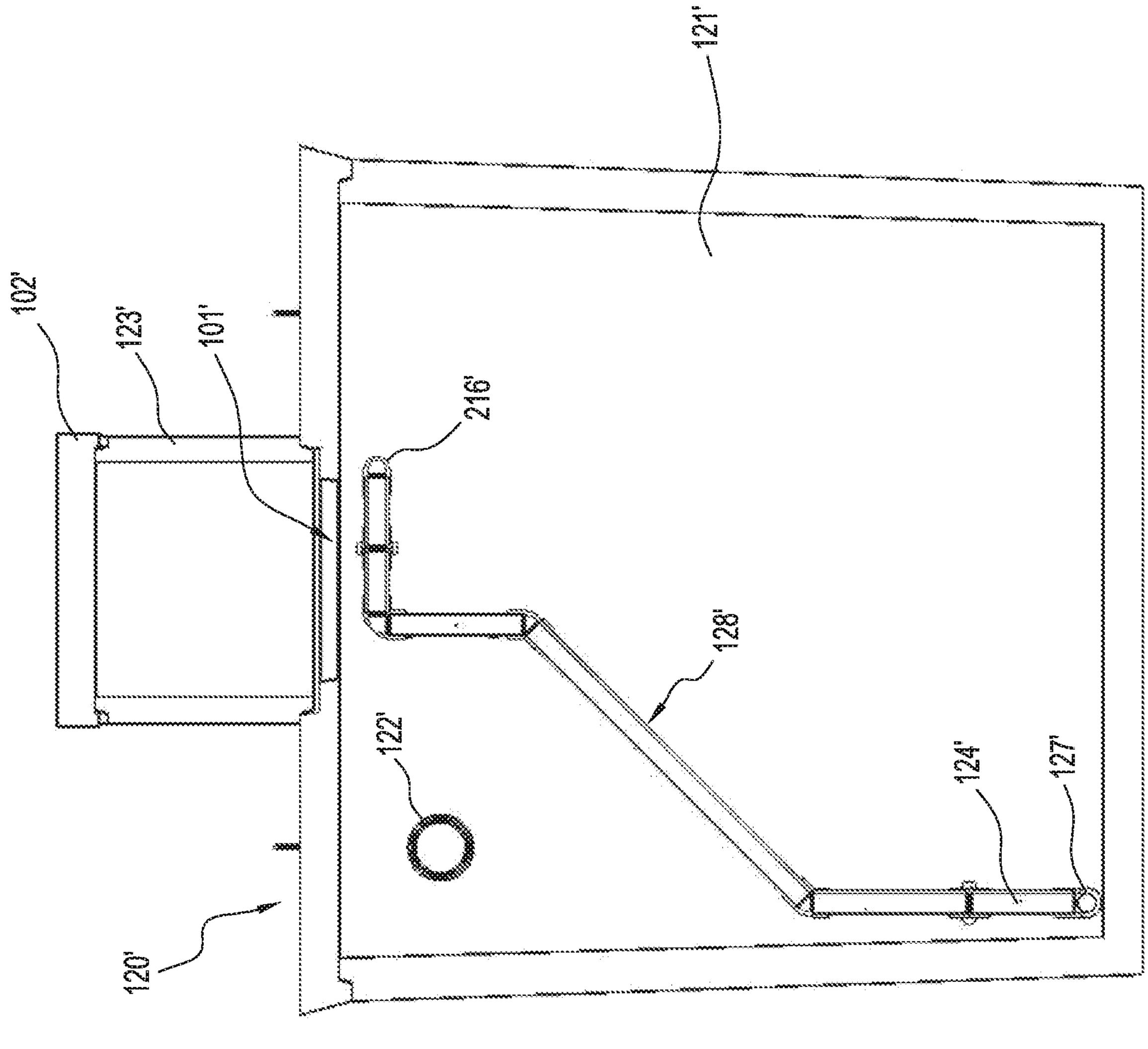
FIG. 82 is a lateral cross-sectional view along line B'-B' of the anoxic chamber in FIG. 79, in accordance with one or more embodiments of the disclosed subject matter.

FIG. 82 is a lateral cross-sectional view along line B'-B' of the anoxic chamber 120' in FIG. 69, in accordance with one or more embodiments of the disclosed subject matter. In FIG. 82, the inlet pipe 122' is seen in the upper left corner of the anoxic chamber 120' front wall 121' and a top end of the sludge return piping 128' is connected to connection joint 216' and a bottom end of the sludge return piping 128' is connected to the diffuser bar 127' near the bottom of the anoxic chamber 120'.

Figure 83:
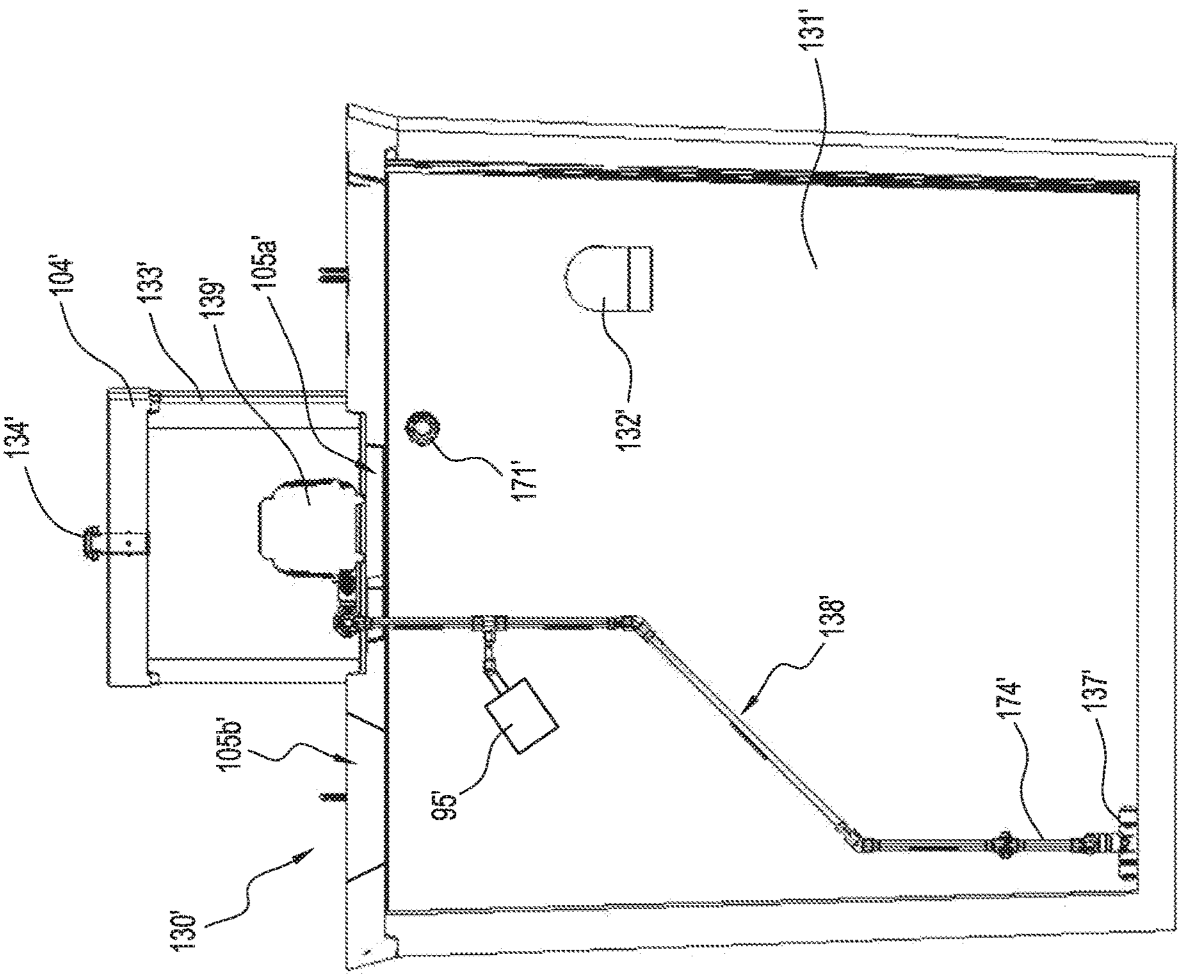
FIG. 83 is a lateral cross-sectional view along line C'-C' of the aerobic chamber in FIG. 79, in accordance with one or more embodiments of the disclosed subject matter.
Figure 84:
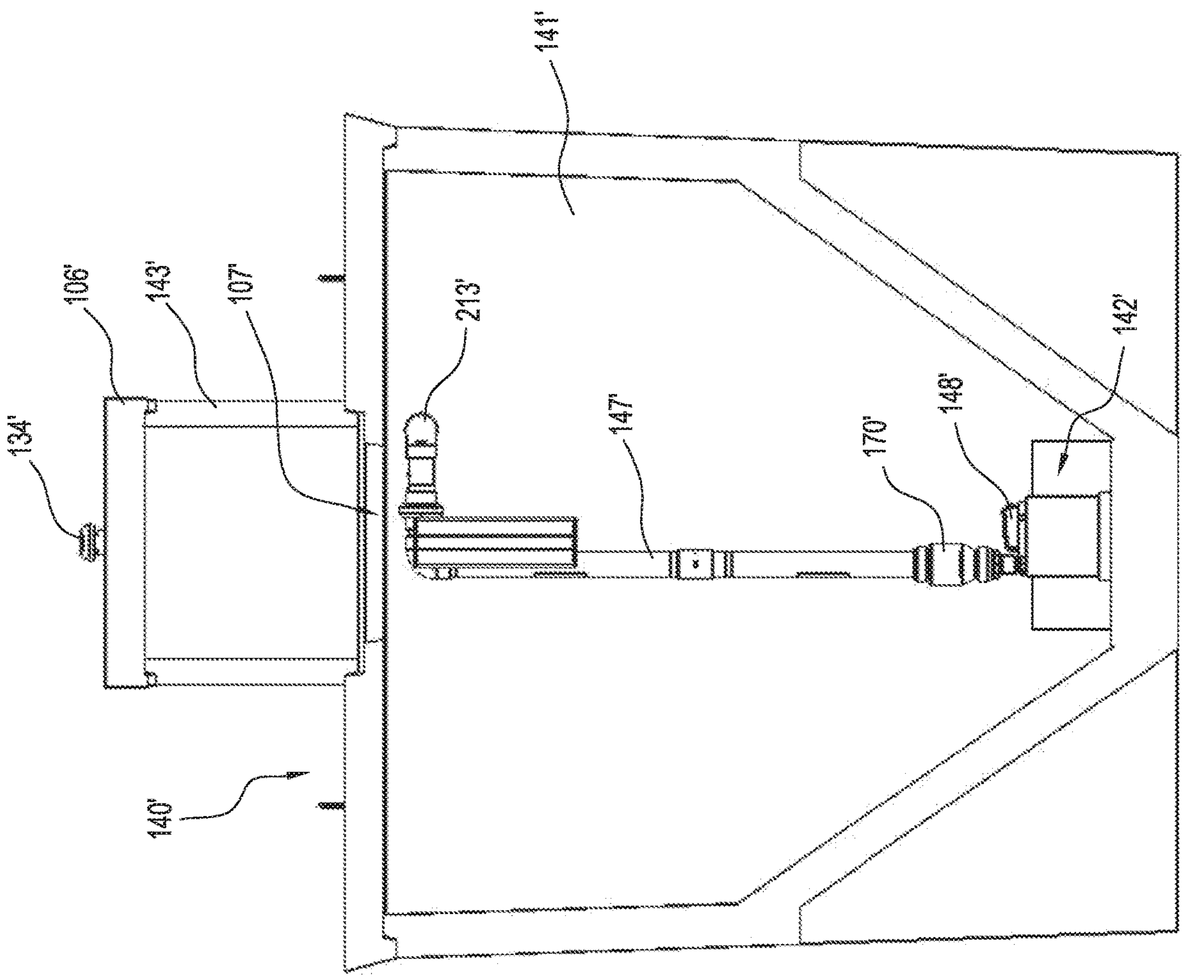
FIG. 84 is a lateral cross-sectional view along line $D_1$'-$D_1$' of the clarification chamber in FIG. 79, in accordance with one or more embodiments of the disclosed subject matter.

FIG. 83 is a lateral cross-sectional view along line C'-C' of the aerobic chamber 130' in FIG. 79, in accordance with one or more embodiments of the disclosed subject matter. In FIG. 83, the aeration chamber inlet opening 132' is seen at the adjacent an upper right corner of the front wall 131' of the aeration chamber 130'. The air-tight sealed coupling/connector 171' is seen in the front wall 131' just below the right side of the riser 133' and, during operation of the system 100', prevents fresh air brought in by air pump 139' and air valve 134' the aeration chamber 130' from passing from the aeration chamber 130' into the anoxic chamber 120'. The outlet opening 136' is located at the bottom of the back wall 135' of the aeration chamber 130', which is best seen in FIG. 84, is rectangular in shape with dimension of about 18 inches wide by about 6 inches high on the aeration chamber side and tapers down on all four sides to an opening in the clarification chamber front wall 141' of the about 16 inches wide and about 4 inches high. FIG. 84 is a lateral cross-sectional view along line $D_1$'-$D_1$' of the clarification chamber 140' in FIG. 79, in accordance with one or more embodiments of the disclosed subject matter. In FIG. 84, the clarification chamber 140' inlet opening 142' is shown at the bottom center of the front wall 141' of the clarification chamber 140' behind the sludge return pump 148'. The sludge return piping element 214' is seen passing through the clarification chamber front wall 141' just below the right side of the riser 143', which extends through the front wall 141' into and through the aeration chamber 130' and connects to the air-tight sealed coupling/connector 171' in the front wall 131' of the aeration chamber 130'.

Figure 85:
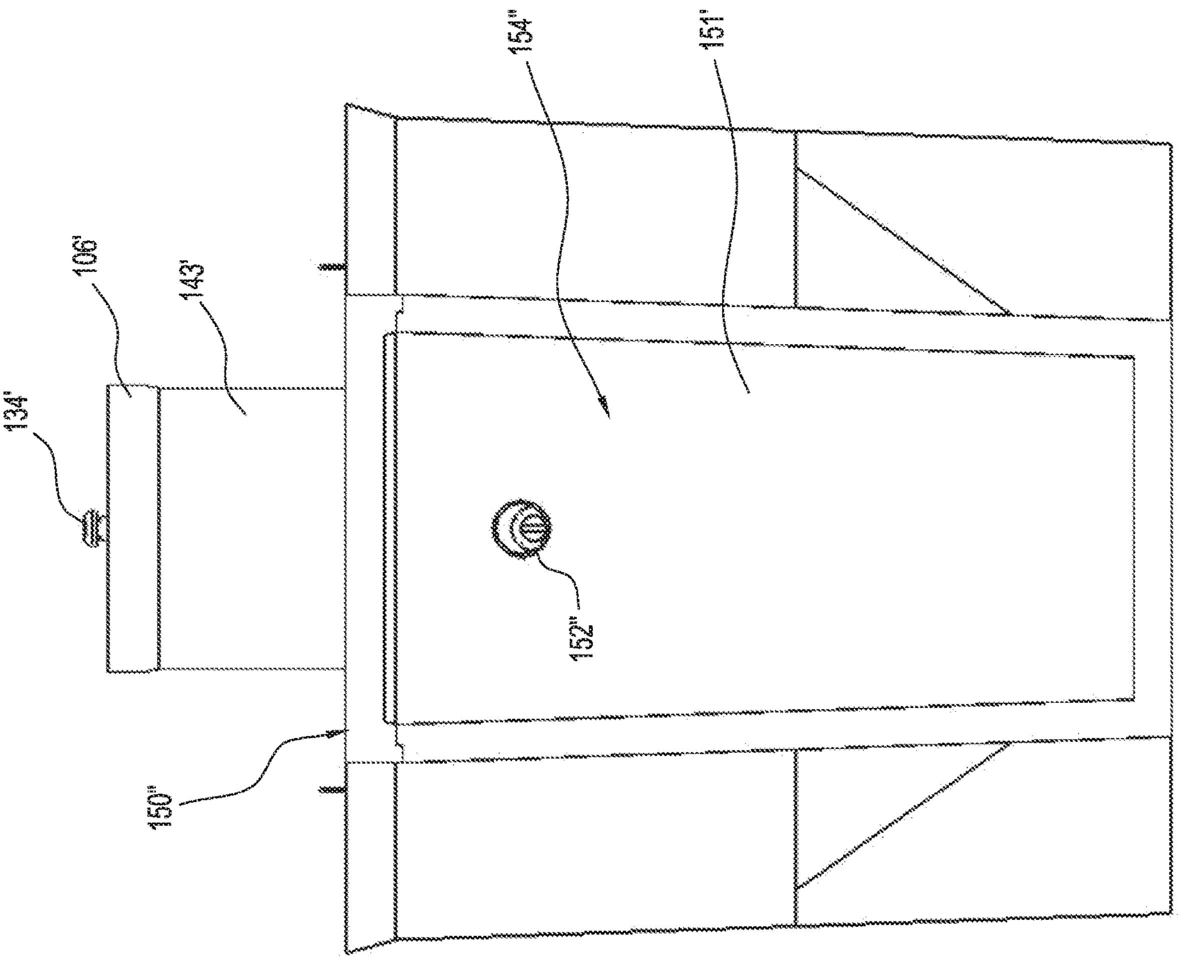
FIG. 85 is a lateral cross-sectional view along line $D_2$"-$D_2$" of the polishing chamber in FIG. 79, in accordance with one or more embodiments of the disclosed subject matter.

FIG. 85 is a lateral cross-sectional view along line $D_2$"-$D_2$" of the polishing chamber 150" in FIG. 79, in accordance with one or more embodiments of the disclosed subject matter. In FIG. 85, the influent well inlet opening 152" is shown in an upper middle portion of the front wall 151" and below the first frustoconical access opening **109*a*" of the polishing chamber 150"**.

Figure 86:
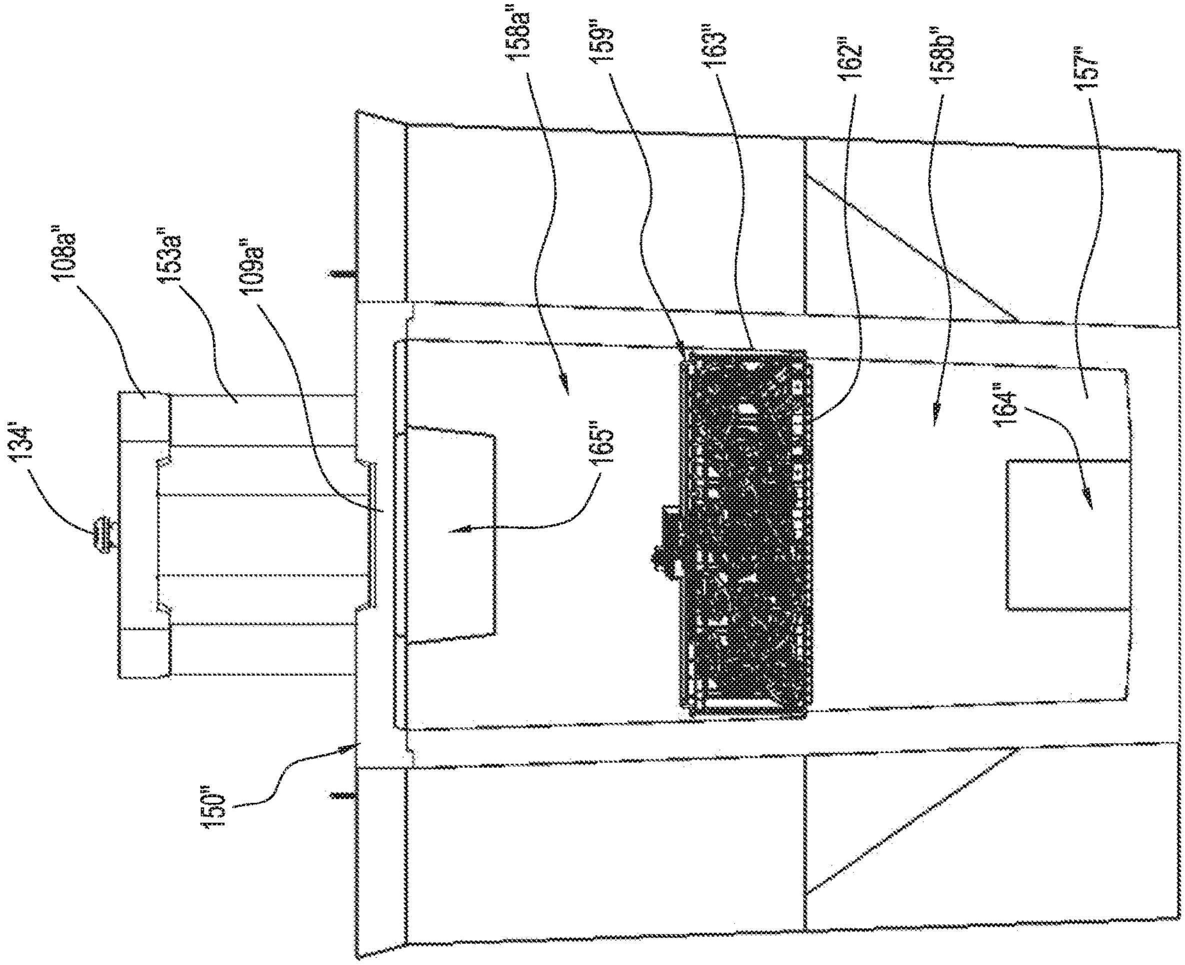
FIG. 86 is a lateral cross-sectional view along line $D_3$"-$D_3$" of the polishing chamber in FIG. 79, in accordance with one or more embodiments of the disclosed subject matter.

FIG. 86 is a lateral cross-sectional view along line $D_3$"-$D_3$" of the polishing chamber 150" in FIG. 79, in accordance with one or more embodiments of the disclosed subject matter. In FIG. 86, the effluent well inlet opening 164" is shown in and extending through the central wall 157" adjacent the bottom of the effluent well **158*b*" to be in fluid communication with and receive flow from the influent well 154". The overflow opening 165' is shown substantially directly above the inlet opening 164" in and extending through a top center section of the central wall 157" to be in fluid communication with and send overflow water back into the influent well 154" in overflow conditions. As seen in FIG. 86, there are two separate filtration beds 159" positioned side-by-side in about a middle of the effluent well 158" and through which the cleaned wastewater passes up and through for its final, or almost final, treatment before being discharged from the polishing chamber 150". Optionally, if the finishing treatment system 160''** is installed, it may be used to further treat the about to be discharged treated wastewater.

The details of the system 100 shown and described in relation to FIGS. 4-20 are also applicable to the system 100'' of FIGS. 78-86 and subsequent other embodiments described below, but are not repeated separately here or below.

Figure 87:
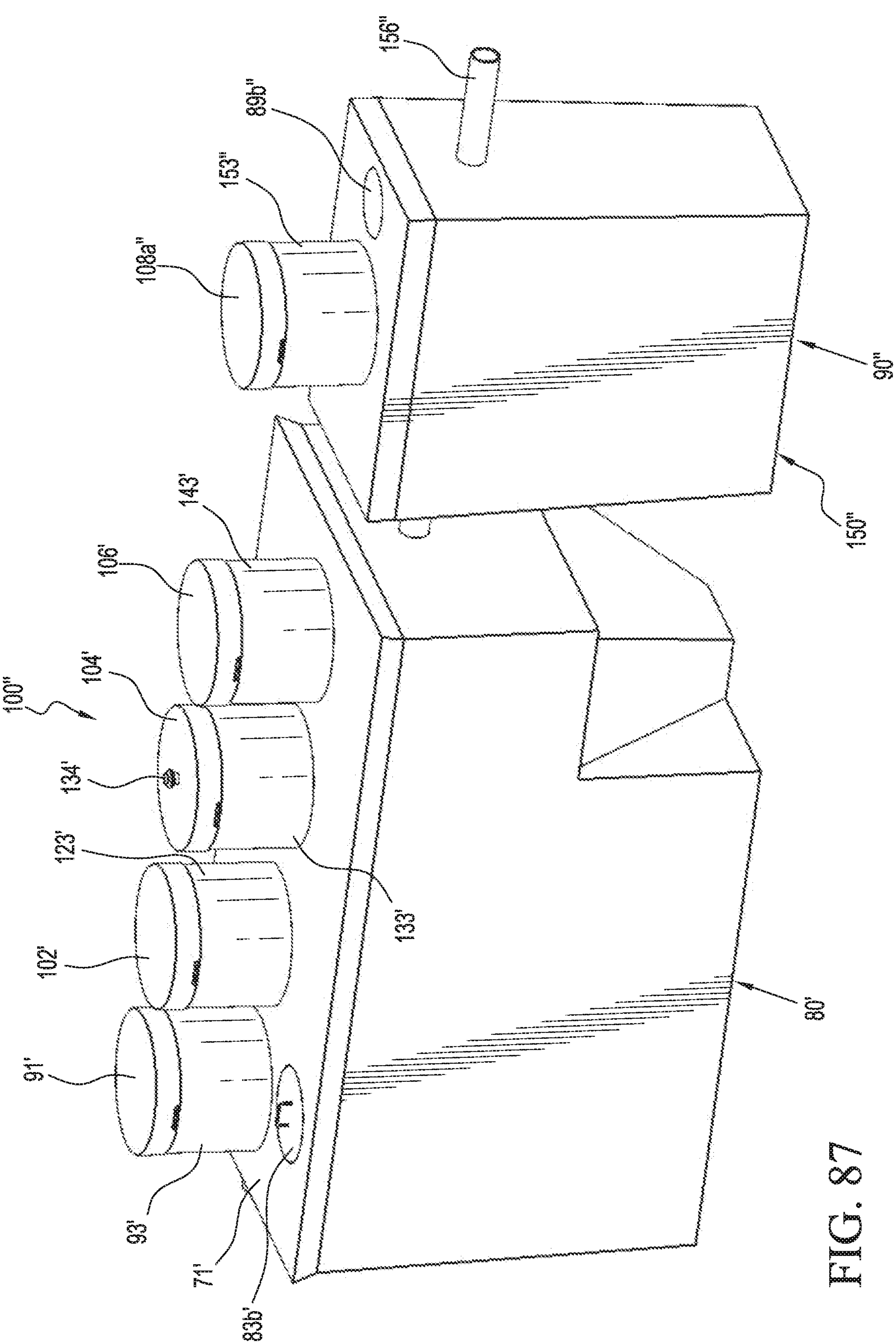
FIG. 87 is a top right rear perspective view of the wastewater treatment system in FIGS. 78 and 79, in accordance with one or more embodiments of the disclosed subject matter.

FIG. 87 is a top right, rear perspective view of the system 100'' in FIGS. 78 and 79, in accordance with one or more embodiments of the disclosed subject matter.

Figure 88:
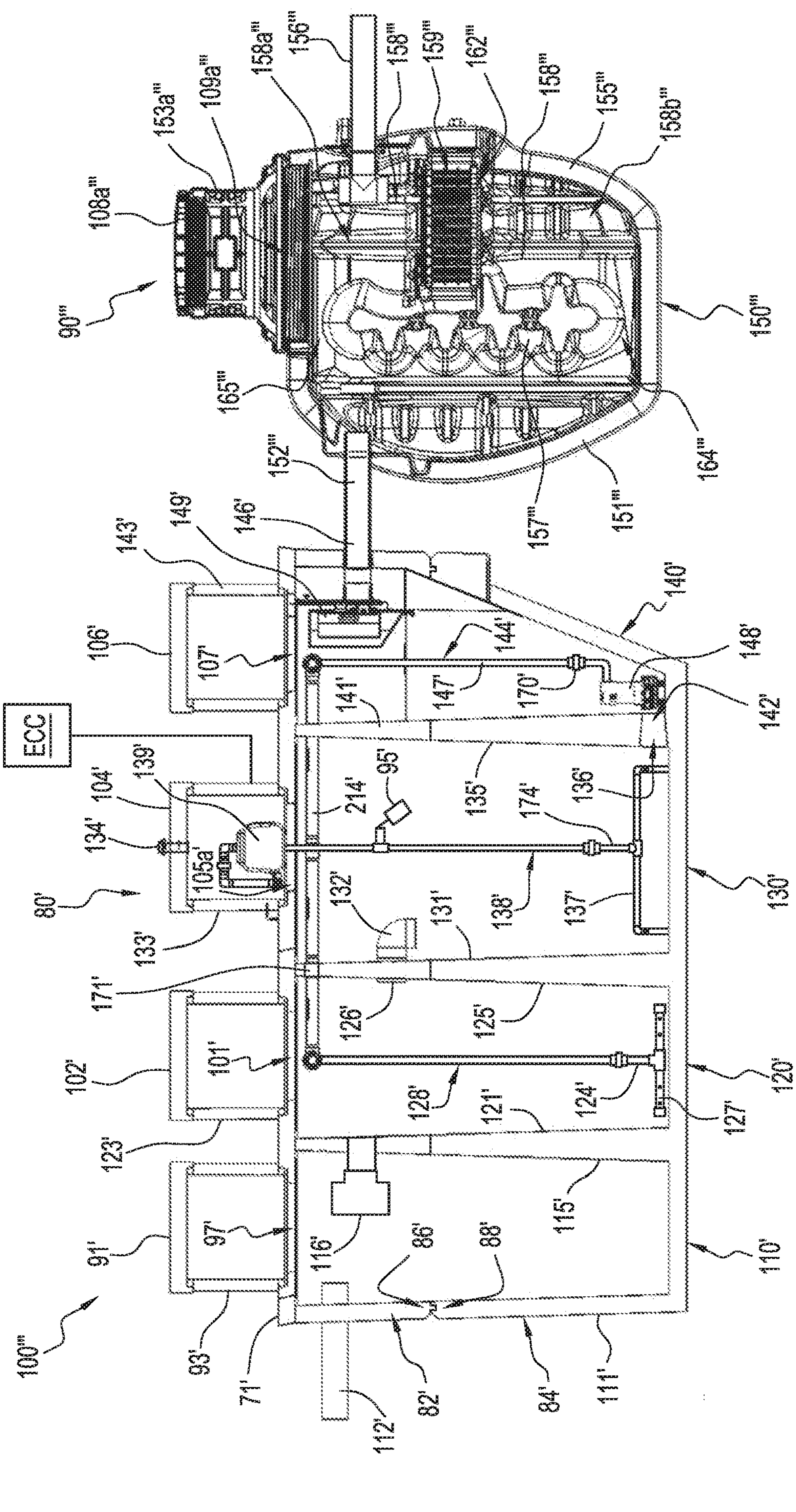
FIG. 88 is a cross-sectional, side view of a wastewater treatment system tank with a pretreatment chamber, an anoxic chamber, an aeration chamber, a clarification chamber and a polishing chamber, in accordance with one or more embodiments of the disclosed subject matter.

FIG. 88 is a cross-sectional, side view of a wastewater treatment system with a pretreatment chamber, an anoxic chamber, an aeration chamber, a clarification chamber and a polishing chamber, in accordance with one or more embodiments of the disclosed subject matter. In FIG. 88, a wastewater treatment system 100''' includes the first component 80' from FIGS. 68 to 87, and an alternative embodiment second component 90''', which is a molded plastic component with two filter elements, and, similar to the prior embodiments, is, generally, only turned on for a total of about 12 hours or less each day. In the embodiment illustrated in FIG. 88, the first and second components 80', 90''' each include a top half 82', 92''' and a bottom half 84', 94'', respectively. In general, the top components 82', 92''' have a ridge 86', 96''' extending from a bottom edge and the bottom components 84', 92''' have a reciprocally shaped groove 88', 98''', respectively, to receive the appropriate top component ridge 86', 96''' when the two components are assembled together. The first component 80' includes a pretreatment chamber 110', an anoxic chamber 120' in fluid communication with the pretreatment chamber 110', an aeration chamber 130' in fluid communication with the anoxic chamber 120', a clarification chamber 140' in fluid communication with the aeration chamber 130' and the anoxic chamber 120'. The second component 90'' includes a polishing chamber 150''' in fluid communication with the clarification chamber 140' of the first component 80' and an effluent well **158*b*''' in fluid communication with the influent well 154''' and also outside of the polishing chamber 150'''**. System operation, monitoring, compliance and diagnostic functions area provided by an external control center ECC using MCD technology with pre-wired controls mounted in a lockable NEMA rated enclosure designed specifically for outdoor use. The control center ECC is a UL Listed assembly that includes a time clock, alarm light, reset button, power switch, power light, phone/network light, recirculation pump light, air pump light, high water light and auxiliary alarm light. A pre-programmed time clock controls the recirculation pump to insure that approximately 400% of the average daily flow is returned to the anoxic chamber. The control center ECC monitors recirculation pump current, air pump operation, high water and auxiliary alarm circuitry. In the event of an alarm from the air pump or auxiliary input, audible and visual alarms are activated and an optional telemetry system can report the condition. If abnormal operation of the recirculation pump is detected, a diagnostic sequence can begin and the visual alarm activates. After a factory programmed recovery interval, an automatic restart attempt is initiated and, if normal pump operation does not resume during 24 programmed recovery and restart cycles, the audible alarm activates and the optional telemetry system can report the condition to a monitoring center. In addition, the control center ECC can include a telemetry system with a heartbeat feature that is used to ensure the system is operating properly. In operation, at predefined intervals, for example, but not limited to, weekly, bi-weekly or monthly, the telemetry system initiates a call to a monitoring system, for example, but not limited to, a remote, online monitoring system at a monitoring center, to confirm proper operation of the system. If a call is not received at any of the predefined times and/or a negative operation report is received, the monitoring center notifies a service technician of the possible need for service to repair the system. If the lack of contact is only temporary due to a phone, internet or cellular connection being temporarily being offline, once it is back online, the normal reporting cycle will resume.

In FIG. 88, the pretreatment chamber 110' has a front wall 111' through which an influent inlet pipe 112' is located in an upper left corner of the front wall 111', when viewed from the outside and facing the front wall 111' (see FIG. 90), and provides access for an incoming flow of wastewater to be treated. The pretreatment chamber 110' also has a back wall 115' through which an outlet pipe 116' is located in an upper right corner of the back wall 115' (see FIG. 91) and permits pretreated wastewater to flow into the anoxic chamber 120'. The "T"-shape of the outlet pipe 116' permits wastewater to flow from the bottom in normal flow conditions and from the bottom and top in overflow conditions. Located in a top wall 71' of the pretreatment chamber 110' and above an exit of the influent inlet pipe 112' is a frustoconical first access opening **103*a*' with a reciprocal frustoconical first access opening cover 83*a*' (see FIG. 89). Also located in the top wall 71' of the pretreatment chamber 110' and above an entrance of the outlet pipe 116' is a frustoconical second access opening 103*b*' with a reciprocal frustoconical second access opening cover 83*b*'. In general, the bottom of the pretreatment chamber outlet pipe 116' is located at a height that is slightly below, for example, about 1 inch below, the pretreatment chamber influent inlet pipe 112'. Located in the top wall 71' between the first and second access openings 103*a*', 103*b*' is a first riser opening 97' that is aligned generally along a longitudinal center line of the first component 80'. A riser 93' having a substantially cylindrical exterior and internal opening extending there through and a base of the first riser 93' is seated and sealed around the first riser opening 97' and a substantially circular riser cover 91' is removably seated on top end of the first riser cover 93'**.

In FIG. 88, the anoxic chamber 120' has a front wall 121' through which an inlet pipe 122' is located in an upper right corner of the front wall 121', when looking back toward the pretreatment chamber 110', and provides access for an incoming flow of pretreated wastewater from the pretreatment chamber 110'. In fact, the anoxic chamber front wall 121' is also the pretreatment chamber back wall 115' and the anoxic chamber inlet pipe 122' is directly connected to and in fluid communication with the pretreatment chamber outlet pipe 116'. The anoxic chamber 120' also has a back wall 125' through which an outlet pipe 126' is located in an upper left corner of the back wall 125' (see FIG. 92) and permits anoxically treated wastewater to flow into the aeration chamber 130'. In general, the anoxic chamber outlet pipe 126' is located at a height that is below the anoxic chamber influent inlet pipe 122'. The difference in the heights of the pipes 112', 116', 122' and 126' helps to maintain the operating water levels in the pretreatment chamber 110', the anoxic chamber 120' and the aerobic chamber 130' to maintain an anoxic operational environment in the anoxic chamber 120'. Located in a top wall of the anoxic chamber 120' and adjacent to the anoxic chamber inlet pipe 122' is a frustoconical first access opening 101', which can include a reciprocal frustoconical first access opening cover 81'. An anoxic chamber riser 123' is sealingly affixed around and extends upwardly away from the first access opening 101' and the anoxic chamber riser 123' is covered by a removable anoxic chamber riser cover 102'. The air-tight seal coupling/connector 171' is affixed in and through the anoxic chamber back wall 125' and connects to an interior sludge return pump system located in a bottom of the clarification chamber 150''' and that is configured to pump sludge back to the anoxic chamber 120' via an internally installed pipe system 144'.

In FIG. 88, the aeration chamber 130' has a front wall 131' through which an inlet pipe 132' is located in an upper left corner of the front wall 131', when looking back toward the anoxic chamber 120', and provides access for an incoming flow of anoxically treated wastewater from the anoxic chamber 120'. In fact, the aeration chamber front wall 131' is also the anoxic chamber back wall 125' and the aeration chamber inlet pipe 132' is directly connected to and in fluid communication with the anoxic chamber outlet pipe 126'. The aeration chamber 130' also has a back wall 135' through which an outlet opening 136' is located in a bottom center of the back wall 135' (see FIG. 94) and permits aerated wastewater to flow into the clarification chamber 140'. In general, the aeration chamber outlet opening 136' is located at a height that is well below the aeration chamber inlet pipe 132' and permits a back and forth flow of wastewater between the aeration chamber 130' and the clarification chamber 140'. Located in a top wall of the aeration chamber 130' and adjacent to the aeration chamber inlet pipe 132' is a frustoconical access opening **105*b*' with a reciprocal frustoconical first access opening cover 85*b*' (both best seen in FIG. 89). Also located in the top wall of the aeration chamber 130' on the same side as and in-line with access openings 97' and 101' is a frustoconical third access opening 105*a*' which can include a reciprocal frustoconical second access opening cover 85*a*' (both best seen in FIG. 89). An aeration chamber riser 133' is sealingly affixed around and extends upwardly away from opening 105*a*' and riser 133' is covered by an aeration chamber riser cover 104' in which an air intake valve 134' extends through the riser cover 104' to provide air for an air pump 139' located inside riser 133'**.

The clarification chamber 140' has a front wall 141' through which an inlet opening 142' is located in a bottom center of the clarification chamber front wall 141' and provides access for an incoming flow of aerated wastewater from the aeration chamber 130'. In fact, the clarification chamber front wall 141' is also the aeration chamber back wall 135' and the clarification chamber inlet opening 142' is directly connected to and in fluid communication with the aeration chamber outlet opening 136'. The clarification chamber 140' also has a back wall 145' through which an outlet pipe 146' is located in a top center of the back wall 145' and permits clarified wastewater to flow into the polishing chamber 150'. A flow equalization device 149' is positioned in front of and controls the flow to the clarification chamber outlet pipe 146'. In general, the clarification chamber outlet pipe 146' is located at a height that is well above the clarification chamber inlet opening 142' and permits a one way flow of wastewater from the clarification chamber 140' to the polishing chamber 150'''. Located in substantially the center of a top wall of the clarification chamber 140' and above the clarification chamber inlet pipe 142', the flow equalization unit 149' and the clarification chamber outlet pipe 146' is a frustoconical access opening 107', which can include a reciprocal frustoconical first access opening cover 87'. A clarification chamber riser 143' is sealingly affixed around and extends upwardly away from opening 107' and riser 143' is covered by a clarification chamber riser cover 106'.

In FIG. 88, the polishing chamber 150''' is shown as a separate molded plastic system/component that is connected to and in fluid communication with the clarification chamber 140' via the clarification chamber outlet pipe 146', which connects to and is in fluid communication with a polishing chamber inlet pipe 152''' in a front wall 151''' of the polishing chamber 150'''. The polishing chamber inlet pipe 152''' is located in a top center of the polishing chamber front wall 151''' and provides access for an incoming flow of clarified wastewater from the clarification chamber 140'. The polishing chamber 150' also has a back wall 155''' through which an effluent outlet pipe 156''' is located in a top center of the back wall 155''' and permits fully treated wastewater to flow out of the polishing chamber 150'''. In general, the polishing chamber outlet pipe 156''' is located at a height that is below the polishing chamber inlet opening 152''' and permits a one way flow of wastewater from the clarification chamber 140' into and out of the polishing chamber 150'''. Located in a top wall of the polishing chamber 150''' and above the polishing chamber inlet pipe 152''' is a polishing chamber access opening **109*a*''' and a first polishing chamber riser 153*a*''' is sealingly affixed around and extending upwardly away from opening 109*a*''' and is covered by a polishing chamber riser cover 108*a*'''**.

The embodiment of the system 100''' in FIG. 88 is divided into two systems. In order to meet different application treatment requirements, the system is designed in different combinations to meet the different discharge requirements. For example, if a local authority requires a treatment plant to meet regular discharge limits or stringent discharge limits, a system including the first component 80' having the pretreatment, anoxic, aeration and clarification chambers 110', 120', 130', 140' can be applied to meet the discharge limits. If water reuse or a water recycling program is required, the second component 90''' including the polishing chamber 150''' can be added after the clarification chamber. Under such a situation or application, the system can be used as the first treatment step. Some additional polishing processes can be considered after the polishing chamber filtration. For example, chlorination, de-chlorination, de-nitrification, nitrogen/nitrate removal, phosphorus removal, carbon filtration and an ultra-filtration process or a similar process can be applied to enhance the water quality. After the polishing filtration treatment, the water quality meets the requirements for non-potable reuse. The function of the pretreatment chamber 110' is to remove grit, floating material and large suspended particles from domestic wastewater. The wastewater is preconditioned by passing through the pretreatment chamber 110' prior to being introduced to the anoxic chamber 120'. The outlet pipe 116' of the pretreatment chamber is equipped with a discharge tee or a baffle that extends vertically into the liquid so that only supernatant is displaced to the anoxic chamber 120'. The distance between the inlet 112' and outlet 116' of the pretreatment chamber is designed to be as far apart as possible. This design creates a good settling condition and improves solids removal efficiency.

As described above, the system 100''' is different from any residential sewage treatment system. Not only does it use an aeration process, but it also uses anoxic and anaerobic processes. The purpose of using the anoxic chamber 120' in the system is to remove nitrate and total nitrogen. In a regular aeration treatment system, ammonia nitrogen is converted into nitrate by nitrifiers under an aerobic condition. A de-nitrification process must be applied to remove nitrate from treated effluent. Since the nitrate removal process (de-nitrification) needs certain organic nutrition, alkalinity and an anoxic condition for de-nitrifiers, this anoxic chamber receives the returned mixture of clarification chamber liquid and settled activated sludge containing nitrate from clarification chamber, and effluent containing certain amounts of organic nutrition from pretreatment chamber. Under the anoxic environment and mixing condition, the incubated de-nitrification bacteria in the anoxic chamber converts nitrate into nitrogen gas. Nitrate and organic matters measured as BOD are partially removed from sewage in the de-nitrification process.

In FIG. 88, the nitrate sources from the effluent are pumped from the bottom of the clarification chamber 140' to the anoxic chamber 120' periodically. A mixing bar 127', which is further shown in and described above in relation to FIG. 5, is installed at the end of a sludge return pipe 128' and located near the bottom of the anoxic chamber 120'. The end of the sludge return pipe is connected to a top end of a flexible pipe section 124' and a bottom end of the flexible pipe section 124' is connected to the mixing bar 127'. The flexible pipe section 124' permits the mixing bar 127' and the sludge return pipe 128' to be folded so as to be substantially parallel to each other to permit the easy installation of the sludge return pipe 128' and mixing bar 127' assembly in to the anoxic chamber 120'. An energy saving concept has been applied to design this system. Specifically, while a submersible sludge return pump 148' (i.e., a recirculation pump) is pumping the mixture of liquid and sludge up a sludge return pipe 147' of the internally installed pipe system 144' and back to the anoxic chamber 120', the current flows through holes (see FIG. 50) on the mixing bar 127'. As a result, the settled sludge and liquid in the anoxic chamber 120' are mixed by the current to form a mixed liquor. Mixing also creates a contact condition for de-nitrifiers and pollutants. Since fresh air is prohibited in the anoxic chamber, the mixture presents an anoxic condition that is essential for the de-nitrification process. When the sludge or solids in the anoxic chamber 120' settle down to a certain level, the sludge return pump 148' in the clarification chamber 140' starts its pumping cycle and creates a mixing condition in the anoxic chamber 120'. Frequent pumping keeps sludge in a suspension condition in the anoxic chamber. The pumping frequency can be selected based on the strength of the wastewater.

The sludge return pump 148' and the mixing bar 127' play two functions: 1) sending settled aerobic sludge and nitrate from the clarification chamber 140' to the anoxic chamber 120 and, 2) the current mixes the liquid simultaneously. In the de-nitrification process, nitrates from the clarification chamber and nutrition from pretreatment are mixed together, and the de-nitrification process is conducted under this anoxic condition.

Usually, the sludge return pump 148' is turned on from 1 to 10 percent of the system operating time. The pumping duration and frequency are based upon the flow rate of the submersible sludge return pump 148' and the strength of the influent wastewater. The flow rate of the sludge return pump 148' is adjustable for a return flow rate of between 100 to 1,000 percent of system flow rate depending on the organic and hydraulic load.

Because the sludge in the treatment system 100''' is not allowed to be discarded, all the solids or sludge produced during the treatment period is kept in the system 100'''. If a simple aeration system is operated under this kind of condition, floating sludge or scum is found at the surface of the clarification chamber 140'. In other words, the settleability of the aerobic sludge is not good after a certain length of operation. In long term aeration it is easy to cause a sludge expansion problem when dead microorganisms are pushed to the clarification chamber by a slow current in the system. Then, the sludge floats to the water surface of the clarification chamber 140' by tiny bubbles inside of the sludge particles. The floating solids or sludge affects the solids separation process. Some solids flow out of the clarification chamber 140' with effluent and cause high suspended solids in the effluent. Therefore, in order to combat this sludge expansion problem, the present system, alternatively applies an anoxic condition and an aerobic condition to the microorganisms. This improves the settleability of the sludge, and the floating sludge has been dramatically reduced. Therefore, the effluent quality from the clarification chamber is enhanced. The addition of an anoxic chamber not only removes total nitrogen, but also improves the effluent quality in both BOD and SS.

Figure 89:
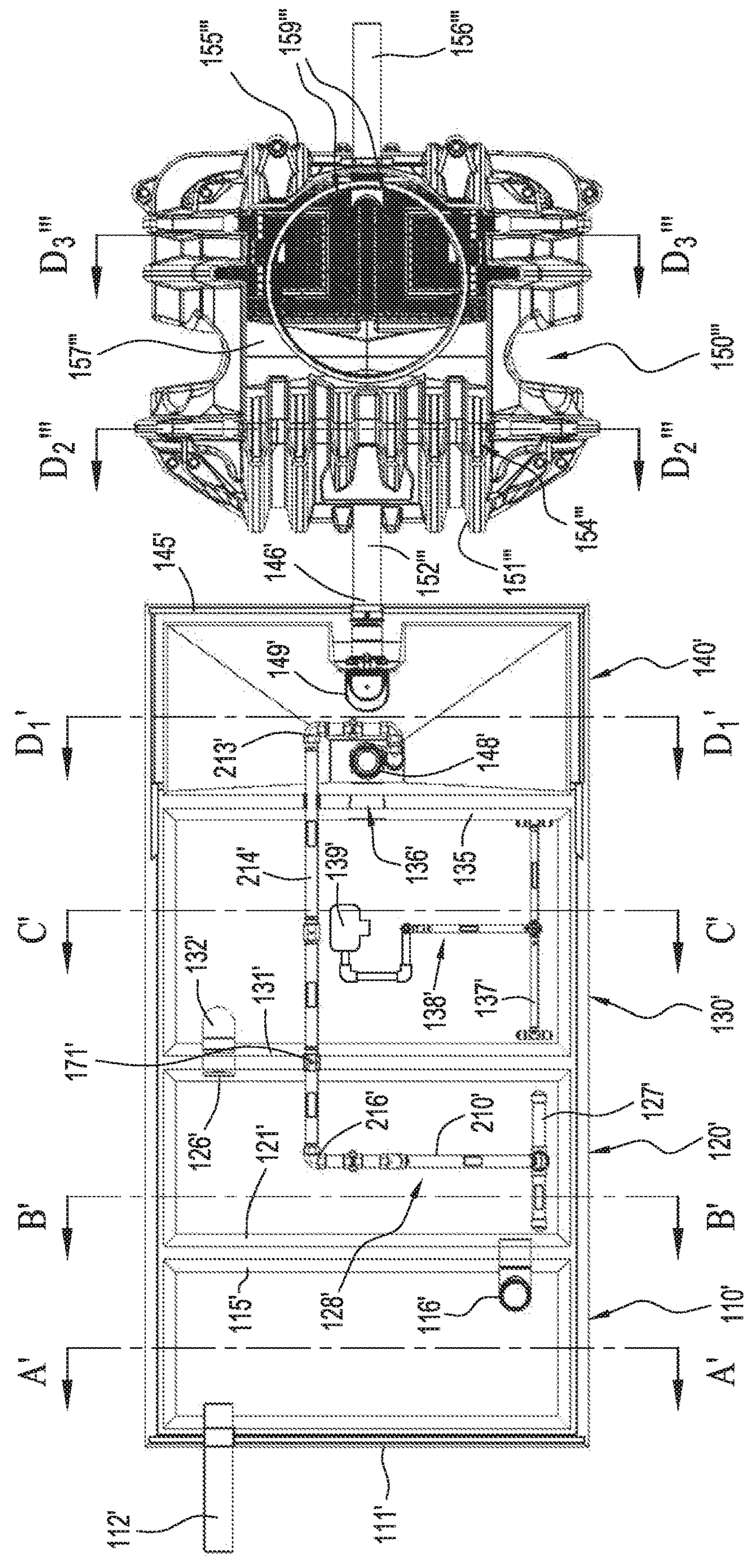
FIG. 89 is a partially exposed, top view of a wastewater treatment system tank with a pretreatment chamber, an anoxic chamber, an aeration chamber, a clarification chamber and a polishing chamber, in accordance with one or more embodiments of the disclosed subject matter.

In the system 100''' of FIG. 88, the denitrified domestic wastewater contains certain amounts of suspended solids, $BOD_5$ and nitrogen pollutants and flows through an elbow at an outlet end of the aeration chamber inlet tube 132' on that and enters the aeration chamber 130'. A low energy consumption air pump 139' is used to inject air into the mixed liquor and the aerobic bio-organisms in the aeration chamber 130' digest and remove organic pollutants, and convert TKN and ammonia to nitrate under the aerobic condition. The aeration process is completed by the air pump 139', which can be located within the aeration chamber riser 133' as shown in FIG. 89 as reference number 139' or externally as shown and described in relation to FIG. 2, a diffusion bar 137' and an air supply pipe 138'. The end of the air supply pipe 138' is connected to a top end of a flexible air pipe section 174' and a bottom end of the flexible air pipe section 174' is connected to the diffusion bar 137'. The flexible air pipe section 174' permits the diffusion bar 137' and the air supply pipe 138' to be folded so as to be substantially parallel to each other to permit the easy installation of the air supply pipe 138' and diffusion bar 137' assembly in to the aeration chamber 130'. At least two different sizes of the air pump 139' can be used depending on the desired or required flow rates. For example, with the larger air pump 139' the system 100''' can process at about a 600 gallons per day flow rate and with the smaller air pump 139', it can process at about a 330 gallons per day flow rate. In addition, although the air pump 139' is shown inside of riser 133', it also can be located outside of the riser and up to 75 feet away from the system 100'''. The diffusion bar 137' is made from plastic pipe and tiny holes are distributed along the length of the pipe. Air bubbles released from the diffusion bar 137' are injected into the wastewater and mix and aerate the mixed liquor. In this and subsequent embodiments, the diffusion bar 137', the general design of which can be seen, generally, in FIG. 8, but that includes additional holes to increase the number of bubbles produced to aid in the aeration process. Activated sludge that is constructed by biomass plays a key role to treat domestic wastewater in the aeration chamber. An overflow level detector 95' is connected to the air supply pipe 138' adjacent aeration chamber access opening **105*a'***.

After the aeration process in the aeration chamber 130', although the pollutants in the domestic wastewater are reduced to a low level, the activated sludge needs to be separated from mixed liquor before entering the polishing chamber 150' for final treatment and discharge. The clarification chamber 140' is used to remove the solids from the treated wastewater. The mixed liquor flows through the opening 136' at the bottom of the wall that is constructed between the aeration chamber 130' and the clarification chamber 140'. This small opening regulates flow from the aeration chamber 130' to the clarification chamber 140'. Solids in the treated wastewater are separated from the liquid and settle down to the bottom of the clarification chamber 140' and form a sludge layer or pile. The sludge return pump 148' that is installed at the bottom of the clarification chamber 140' pumps settled activated sludge and liquid from the clarification chamber 140' through a check valve 170' and a pipe system 147' to the mixing bar 127' in the anoxic chamber 120' to be mixed with the wastewater and further treated in the anoxic chamber 120'. Because the hydraulic detention time of the clarification chamber is more than 4 hours during a peak flow period, the accumulated sludge separated in the clarification chamber is gradually turned into an anoxic condition before entering the anoxic chamber 120'. After returning to the anoxic chamber 120', the de-nitrification bacteria in the returned sludge are mixed with the existing sludge in the anoxic chamber 120'. The de-nitrifiers in the sludge start to be active to digest nitrate and organics. Similar to the air pump, the sludge pump 148' also can be provided in more than one size, for example, a large pump for high flow rates and a small pump for low flow rates.

In order to improve the solids removal efficiency, a flow equalization apparatus 149' is installed on an inlet end of the outlet pipe 146' of the clarification chamber 140'. At least one flow equalization port regulates the peak flow from the clarification chamber 140' to the polishing chamber 150''' and improves solids removal efficiency. The purpose of using this flow equalization apparatus 149' is to average the effluent flow rate and enhance settling efficiency. This system was experimentally tested for a 6 month period with the influent waste water being heated to a temperature of 11° C.+/−1° C., when necessary, to ensure a minimum temperature of 10° C. without discarding any sludge. Sometimes, small amounts of sludge turned into light weight sludge that cannot be removed by the settling process. The sludge usually floats from the bottom of the chamber to the water surface in the clarification chamber 140'. To separate floating sludge and supernatant, an outer housing is structured at the outside of the flow equalization port to keep floating solids away from effluent flow. At least one overflow port is located above the at least one flow equalization port. If the at least one flow equalization port is plugged, treated wastewater flows to the polishing chamber 150''' through the at least one overflow port. Usually, the at least one flow equalization port is not plugged by solids easily. If sludge accumulates inside the flow equalization port and plugs the flow, the water level in the clarification chamber 140' will be raised to achieve the water level at the at least one overflow port. During the water level elevating time, the plugged at least one flow equalization port will be self-cleaned under the pressure of the water. If the plugged flow equalization port cannot be cleaned, the at least one overflow port allows liquid to flow into the polishing chamber 150'''. The diameter of the at least one flow equalization port varies from 0.25 to 0.5 inches. Additional details on embodiments of the flow equalization apparatus 149' are shown in and described in relation to FIGS. 11-14, 31, 32 and 59-65.

In FIG. 88, the polishing chamber 150''' consists of an influent well 154''' and an effluent well 158''' separated by a central wall 157''', all located transversely across the polishing chamber 150'' with a filtration bed 159'' horizontally located in and dividing the effluent well 158''' of the polishing chamber 150''' into upper and lower sections **158*a*''', 158*b*'''. The effluent from the clarification chamber 140' flows into the influent well 154''' of the polishing chamber 150'''. The flow is then distributed to the effluent well 158''' through an opening 164''' located at and formed through a bottom center of the central wall 167''' and moves up through the filtration bed 159''' where the treated wastewater passes through a filtration bed base 162''' and a filtration media 163'''** to perform a coarse filtration function. The biomass accumulated inside of the filtration material performs three functions: 1) further settling, 2) filtering, and 3) polishing treatment. The filter removes suspended solids (SS), BOD and total nitrogen from the clarification chamber effluent. The anoxic condition inside of the settled sludge and filtration beds allows de-nitrification bacteria to grow and remove certain amounts of nitrate.

The filtrate from the two filtration beds 159''' is collected from two submerged holes and directed to the upper section of the effluent well **158*a*''', in which, a finishing treatment system 160', such as shown in FIG. 2 as the finishing treatment system 160, can be installed to perform a final treatment on the effluent water before being discharged from the polishing chamber 150'''. For example, the finishing treatment system 160'** can include, but is not limited to, an UV assembly, a chlorination system, a de-chlorination system, a phosphorus removal system, a heavy metal removal system, a nitrogen/nitrate removal system and any combination of the above and is installed for disinfecting of the effluent from the filter. Because the filter is designed and structured very well and the filtrate is clear and contains less BOD and SS, disinfection performance of the UV assembly is excellent.

Several different types of material can be used as the filtration media for the system 100''' of FIG. 88. For example, gravel, ceramic, closed cell Styrofoam, natural, synthetic, rubber and plastic materials in certain sizes can be used as the filtration media 163''' in the filter. Specifically, the diameter of the filtration media 163''' varies from 0.5 to 5 inches. Because coarse filtration media 163' and a thin filtration bed are used in this design, it is easy to clean the filtration media during maintenance services. After the liquid in the filter is pumped out though the influent well 154''', an operator can rinse the filtration media 163''' with a garden hose, the sloughed biofilm is washed down to the bottom of the filter and flows along the slope to the influent well with accumulated sludge. A service pump pumps all the solids out of the filter. The filter cleaning process can be completed easily.

The wastewater treatment system tank of FIG. 88 can be constructed using concrete and/or a molded plastic, as will be seen and described in subsequent figures and paragraphs herein.

FIG. 89 is a partially exposed, top view of the wastewater treatment system tank of FIG. 88, in accordance with one or more embodiments of the disclosed subject matter. In FIG. 89, the internally installed pipe system 144' of the sludge return system extend from beneath the clarification chamber access opening 107' back toward the anoxic chamber 120'. Specifically, a first cross piece 214' is seen extending out of the clarification chamber 140' through the clarification chamber front wall 141' into and across the aeration chamber 130' to connect with a first end of the air-tight sealed coupling/connector tube 171' that extends through the aeration chamber front wall 131' and into the anoxic chamber 120' and is connected to a first end of a first elbow 216'. A second end of the first elbow 216' is connected to a first end of a return piece 210', which connects to the mixing bar 127' via the mixing bar riser tube 128'. An air pump 139' is connected to a first pipe section 224', which to a first end of a diffuser bar return piece 220', which connects to the diffuser bar 137' the diffuser bar riser 138'. Although, in FIG.

89, the pipe components of the sludge return system are connected on one end to the sludge return pump 148', extend up toward a top of the clarification chamber 140' then bend and extend toward the back wall 145' of the clarification chamber 140' at a substantially orthogonal angle to the sludge return pipe 147' to form a "U"-shaped loop 175' with the first cross piece 214', they can also be configured to form an orthogonal angle with the first cross piece 214' (see FIG. 79 for the alternative design.)

In FIG. 89, the internal structure of the polishing chamber is more clearly illustrated. For example, inlet pipe 152''' is seen attached to the front wall 151''' of the polishing chamber 150''' and in fluid communication with an influent well 154. Adjacent to the influent well 154''' is an effluent well 158''' in which the filtration bed base 162''' is located.

Figure 90:
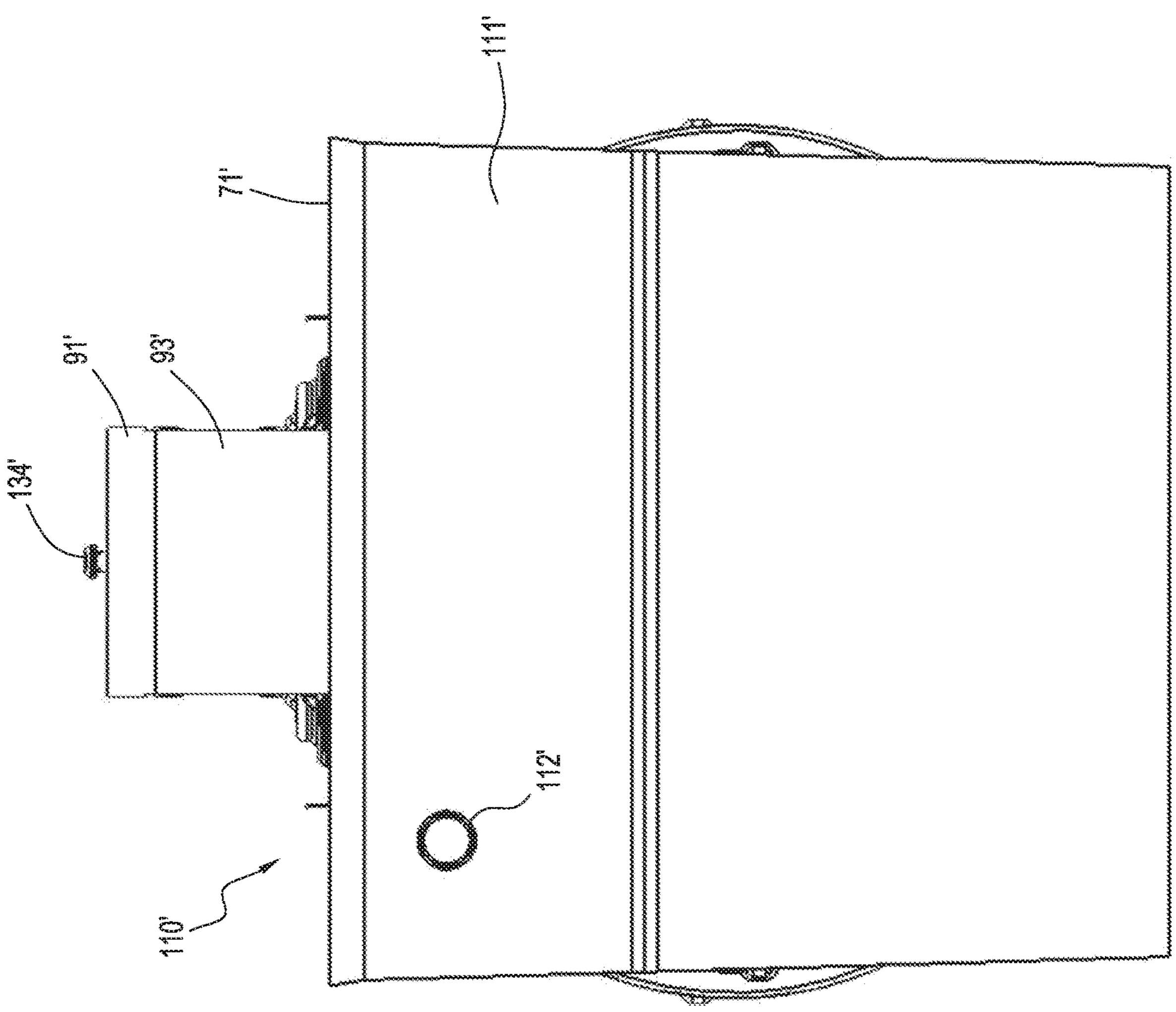
FIG. 90 is a front view of the pretreatment chamber in FIGS. 88 and 89, in accordance with one or more embodiments of the disclosed subject matter.

FIG. 90 is a front view of the pretreatment chamber 100' in FIGS. 88 and 89, in accordance with one or more embodiments of the disclosed subject matter. In FIG. 90, the pretreatment chamber inlet opening 112' is seen in the upper left corner of the front wall 111' of the pretreatment chamber 110'.

Figure 91:
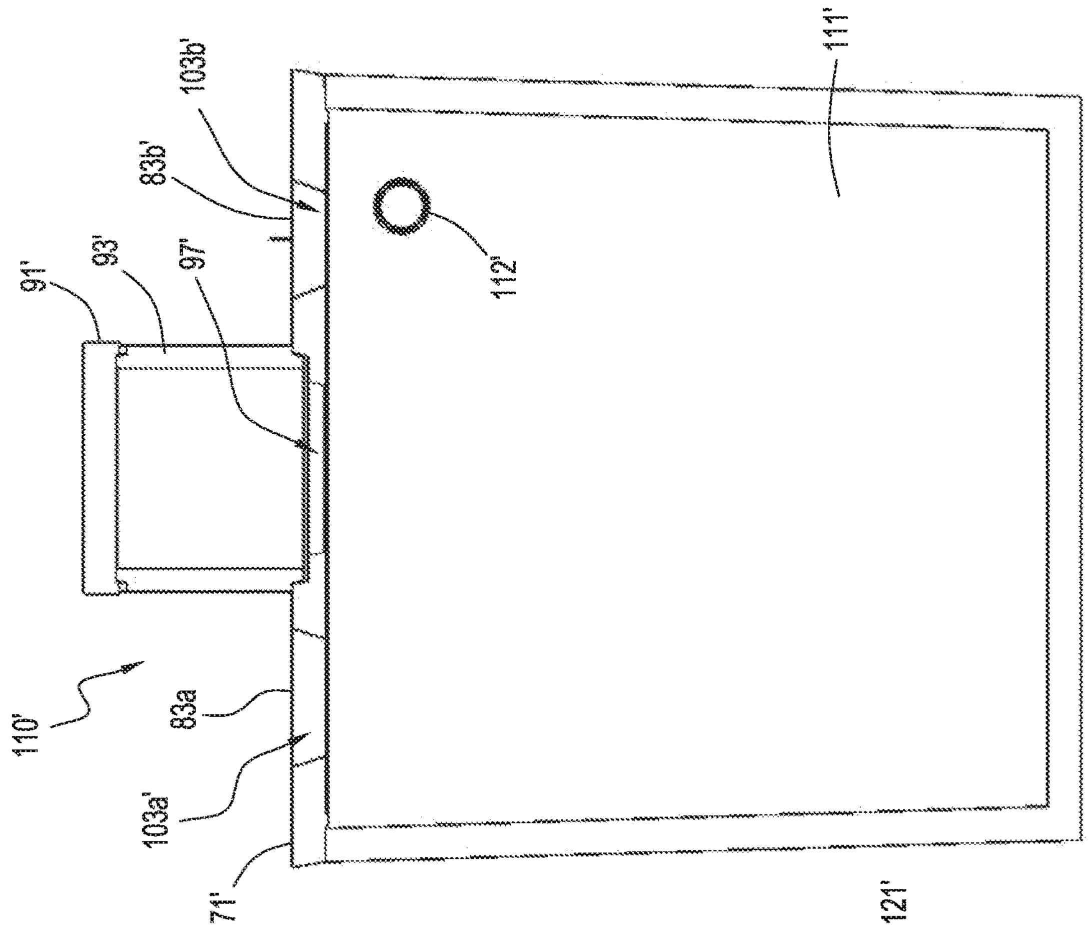
FIG. 91 is a lateral cross-sectional view along line A'-A' of the pretreatment chamber in FIG. 89, in accordance with one or more embodiments of the disclosed subject matter.

FIG. 91 is a lateral cross-sectional view along line A'-A' of the pretreatment chamber 100' in FIG. 89, in accordance with one or more embodiments of the disclosed subject matter. In FIG. 91, the pretreatment chamber 110' inlet pipe 112' is shown in the upper right corner of the pretreatment chamber front wall 111'.

Figure 92:
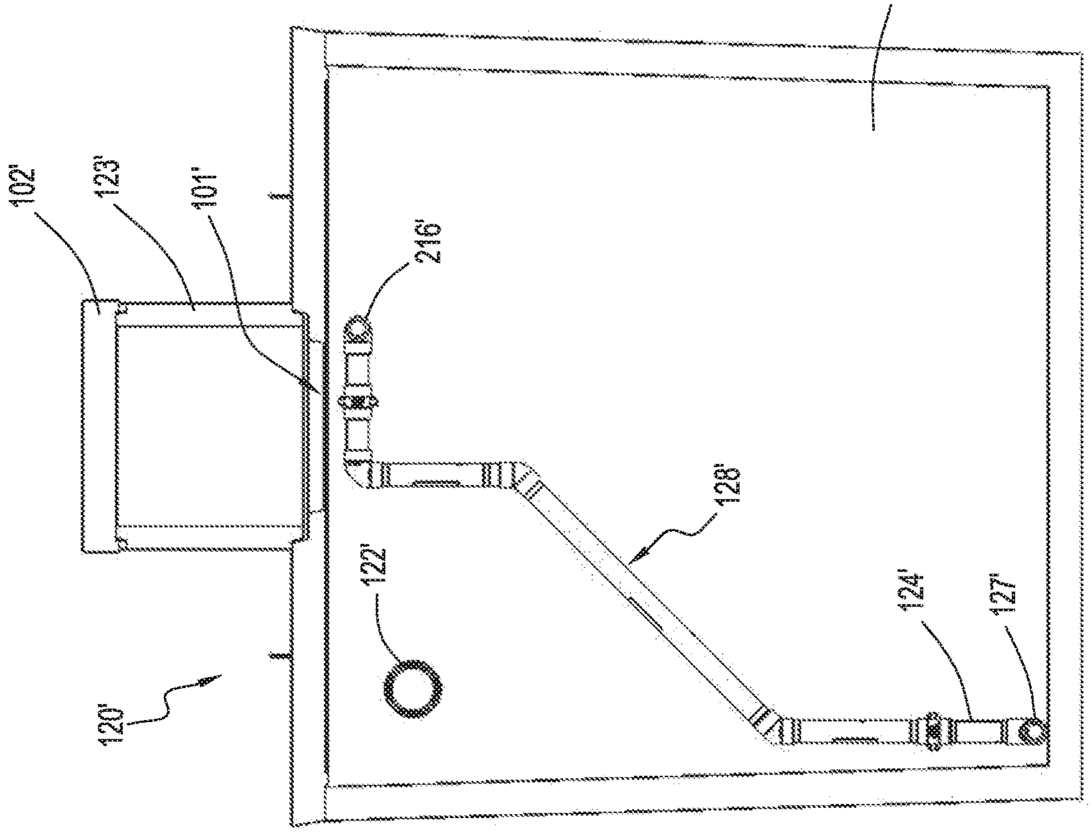
FIG. 92 is a lateral cross-sectional view along line B'-B' of the anoxic chamber in FIG. 89, in accordance with one or more embodiments of the disclosed subject matter.

FIG. 92 is a lateral cross-sectional view along line B'-B' of the anoxic chamber 120' in FIG. 89, in accordance with one or more embodiments of the disclosed subject matter. In FIG. 92, the inlet pipe 122' is seen in the upper left corner of the anoxic chamber 120' front wall 121' and a top end of the sludge return piping 128' is connected to connection joint 216' and a bottom end of the sludge return piping 128' is connected to the diffuser bar 127' near the bottom of the anoxic chamber 120'.

Figure 93:
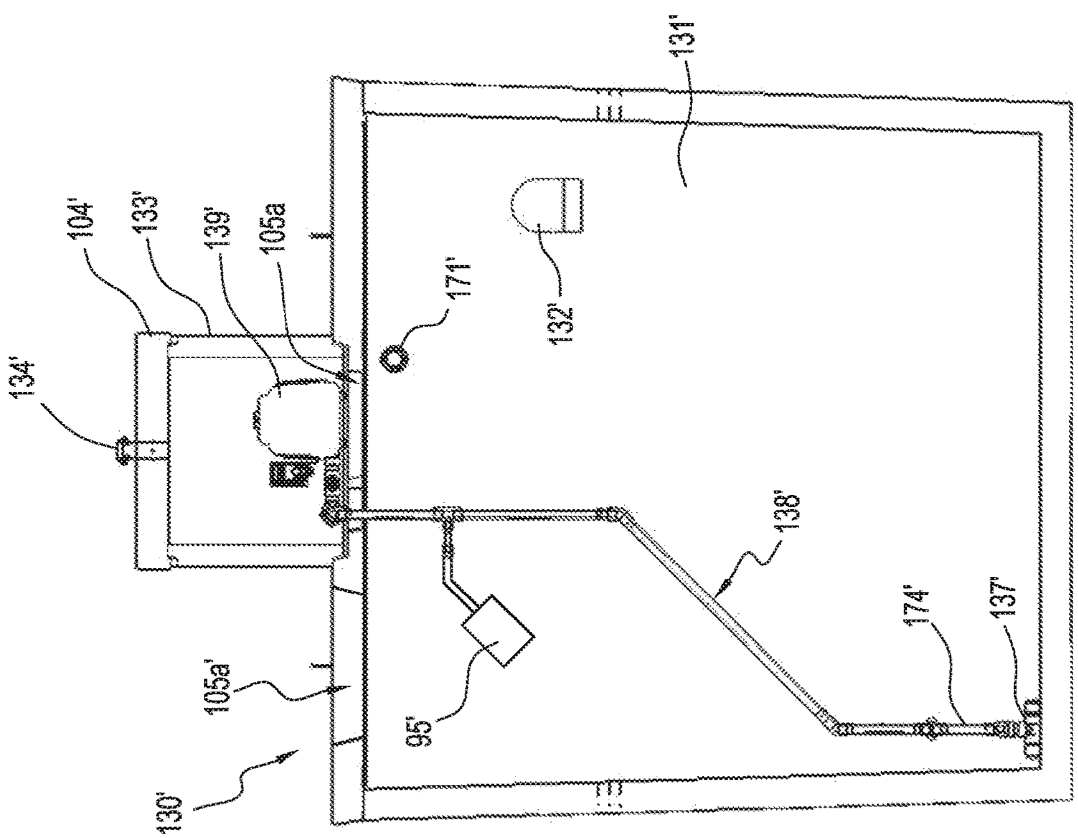
FIG. 93 is a lateral cross-sectional view along line C'-C' of the aerobic chamber in FIG. 89, in accordance with one or more embodiments of the disclosed subject matter.

FIG. 93 is a lateral cross-sectional view along line C'-C' of the aerobic chamber 130' in FIG. 89, in accordance with one or more embodiments of the disclosed subject matter. In FIG. 93, the aeration chamber inlet opening 132' is seen at the adjacent an upper right corner of the front wall 131' of the aeration chamber 130'. The air-tight sealed coupling/connector 171' is seen in the front wall 131' just below the right side of the riser 133' and, during operation of the system 100''', prevents fresh air brought in by air pump 139' and air valve 134' the aeration chamber 130' from passing from the aeration chamber 130' into the anoxic chamber 120'. The outlet opening 136' is located at the bottom of the back wall 135' of the aeration chamber 130', which is best seen in FIG. 94, is rectangular in shape with dimension of about 18 inches wide by about 6 inches high on the aeration chamber side and tapers down on all four sides to an opening in the clarification chamber front wall 141' of the about 16 inches wide and about 4 inches high.

Figure 94:
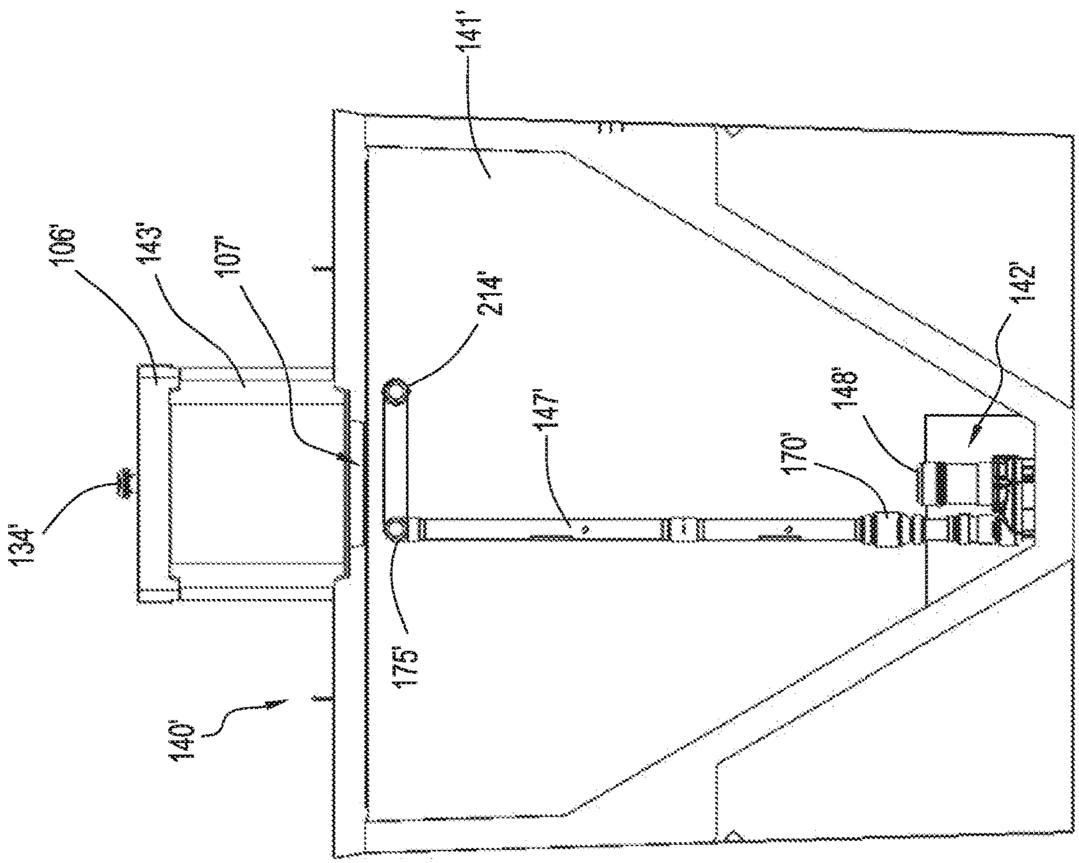
FIG. 94 is a lateral cross-sectional view along line $D_1$'-$D_1$' of the clarification chamber in FIG. 89, in accordance with one or more embodiments of the disclosed subject matter.

FIG. 94 is a lateral cross-sectional view along line $D_1$'-$D_1$' of the clarification chamber 140' in FIG. 89, in accordance with one or more embodiments of the disclosed subject matter. In FIG. 94, the clarification chamber 140' inlet opening 142' is shown at the bottom center of the front wall 141' of the clarification chamber 140' behind the sludge return pump 148'. The sludge return piping element 214' is seen passing through the clarification chamber front wall 141' just below the right side of the riser 143', which extends through the front wall 141' into and through the aeration chamber 130' and connects to the air-tight sealed coupling/connector 171' in the front wall 131' of the aeration chamber 130'.

Figure 95:
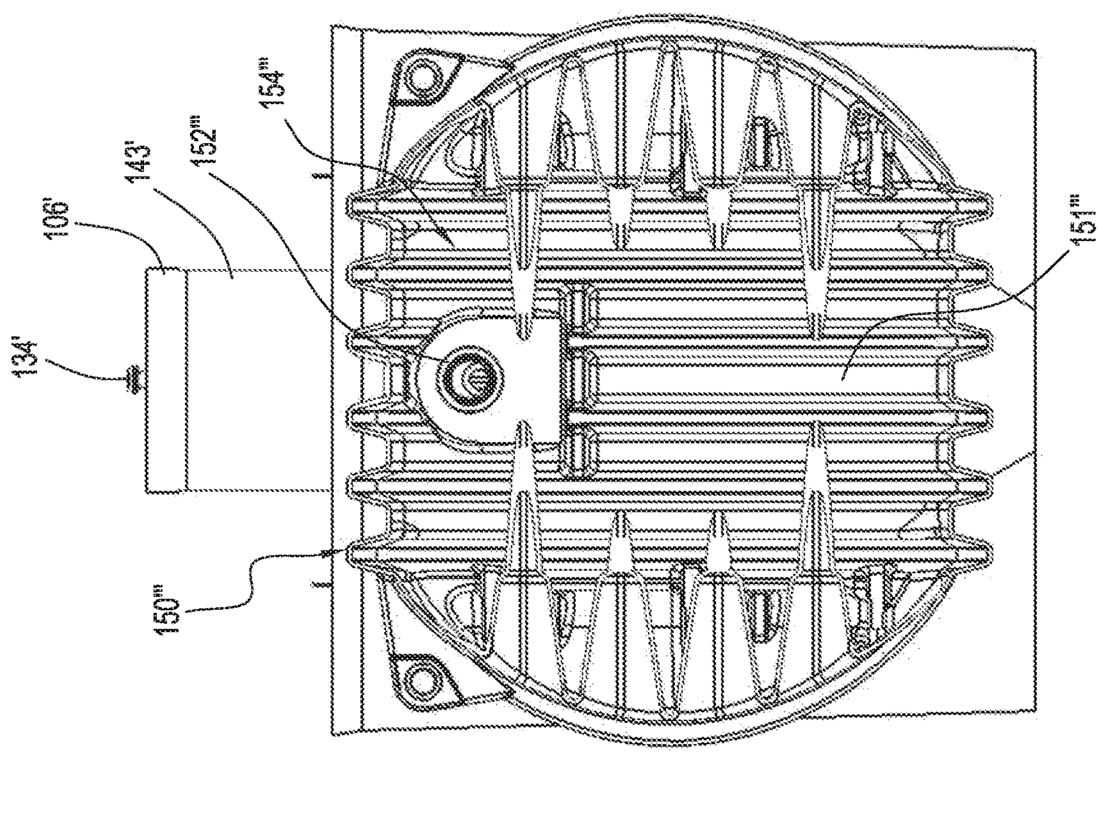
FIG. 95 is a lateral cross-sectional view along line $D_2$'''-$D_2$''' of the polishing chamber in FIG. 89, in accordance with one or more embodiments of the disclosed subject matter.

FIG. 95 is a lateral cross-sectional view along line $D_2$'''-$D_2$''' of the polishing chamber 150' in FIG. 89, in accordance with one or more embodiments of the disclosed subject matter. In FIG. 95, the influent well inlet opening 152''' is shown in an upper middle portion of the front wall 151''' and below the access opening **109*a*''' of the polishing chamber 150'''**.

Figure 96:
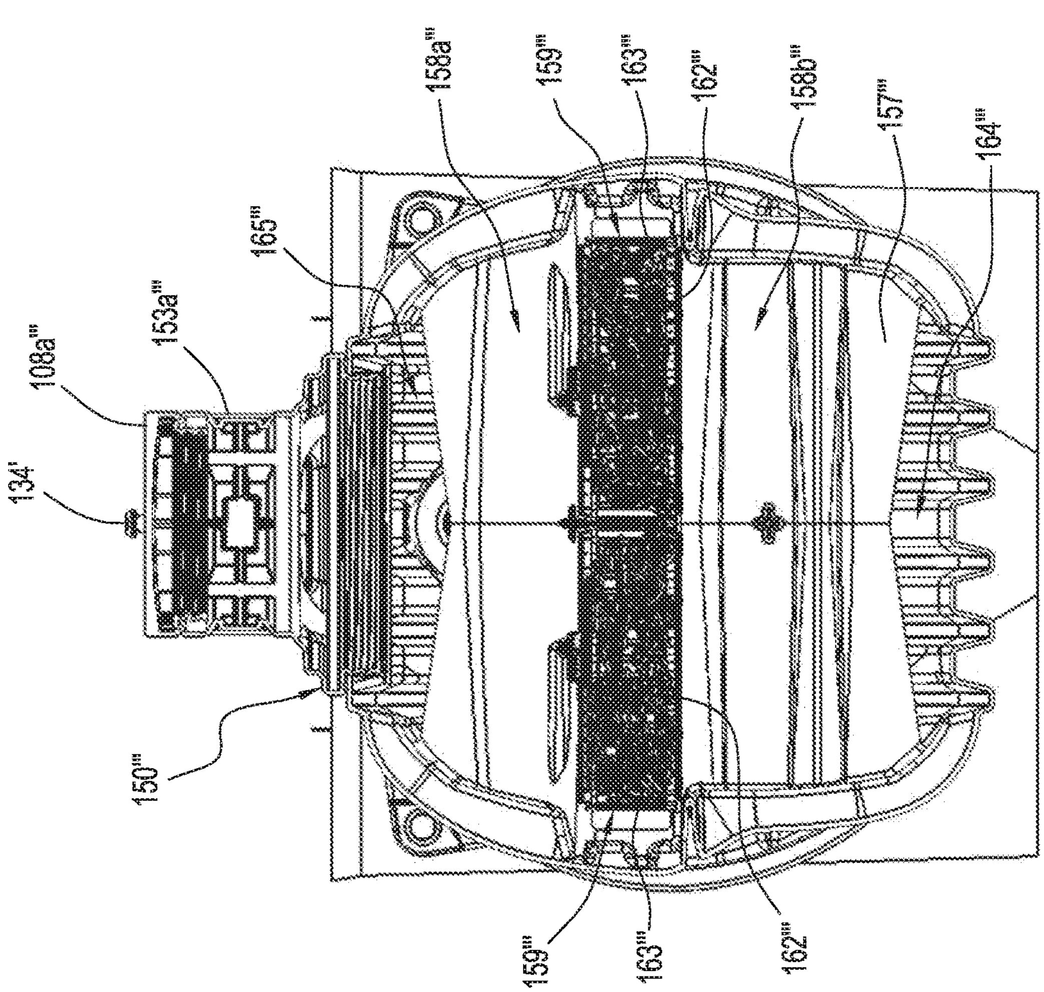
FIG. 96 is a lateral cross-sectional view along line $D_3$'''-$D_3$''' of the polishing chamber in FIG. 89, in accordance with one or more embodiments of the disclosed subject matter.

FIG. 96 is a lateral cross-sectional view along line $D_3$'-$D_3$' of the polishing chamber 150' in FIG. 89, in accordance with one or more embodiments of the disclosed subject matter. In FIG. 96, the effluent well inlet opening 164''' is shown in and extending through the central wall 157''' adjacent the bottom of the effluent well **158*b*''' to be in fluid communication with and receive flow from the influent well 154'''. The overflow opening 165' is shown substantially directly above the inlet opening 164''' in and extending through a top center section of the central wall 157''' to be in fluid communication with and send overflow water back into the influent well 154''' in overflow conditions. As seen in FIG. 96, there are two separate filtration beds 159''' positioned side-by-side in about a middle of the effluent well 158''' and through which the cleaned wastewater passes up and through for its final, or almost final, treatment before being discharged from the polishing chamber 150'''. Optionally, if the finishing treatment system 160'** is installed, it may be used to further treat the about to be discharged treated wastewater.

The details of the system 100 shown and described in relation to FIGS. 4-20 are also applicable to the present system 100''' of FIGS. 88-96 and subsequent other embodiments described below, but are not repeated separately here or below.

Figure 97:
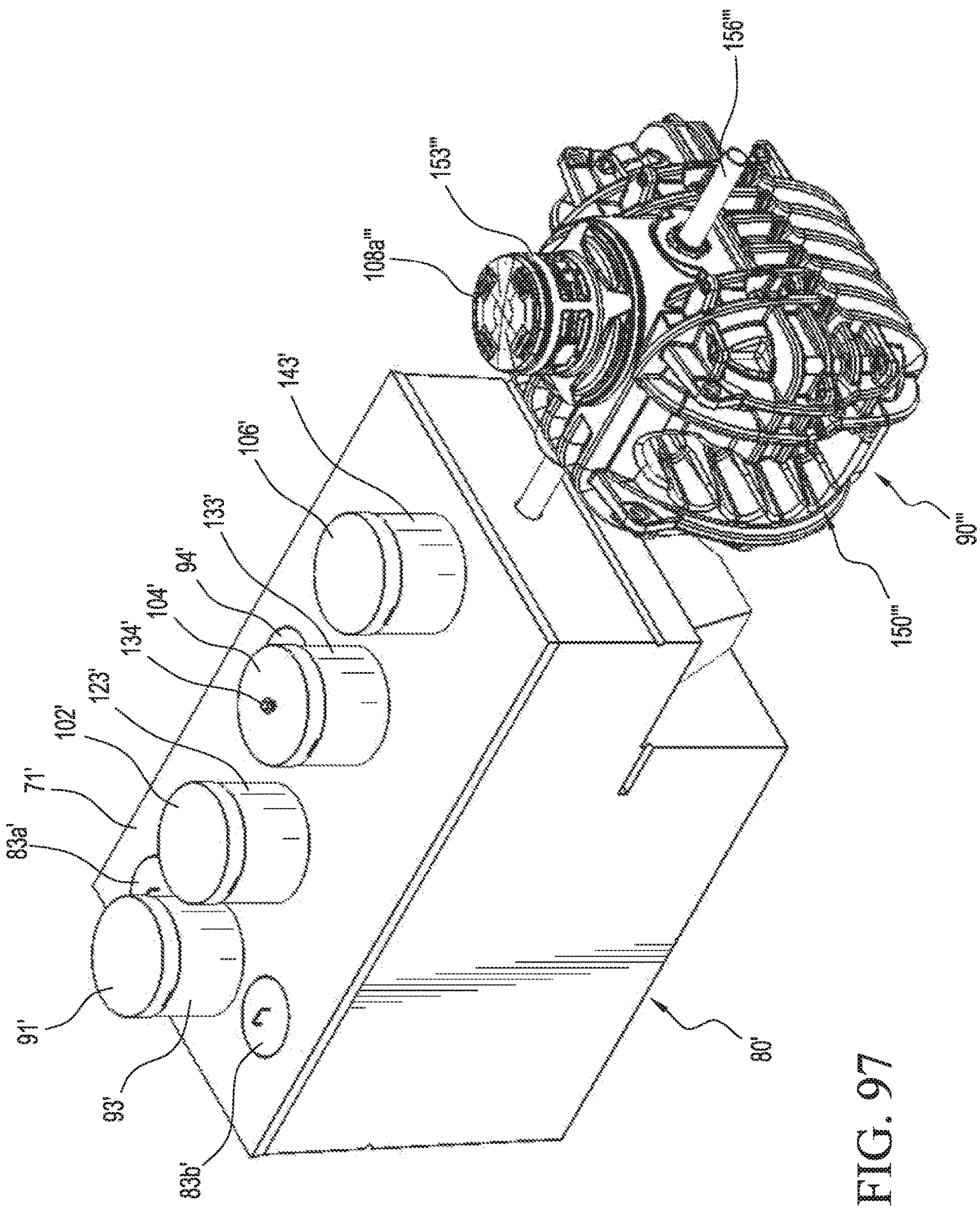
FIG. 97 is a top right rear perspective view of the wastewater treatment system in FIGS. 88 and 89, in accordance with one or more embodiments of the disclosed subject matter.

FIG. 97 is a top right, rear perspective view of the system 100''' in FIGS. 88 and 89, in accordance with one or more embodiments of the disclosed subject matter.

Figure 98:
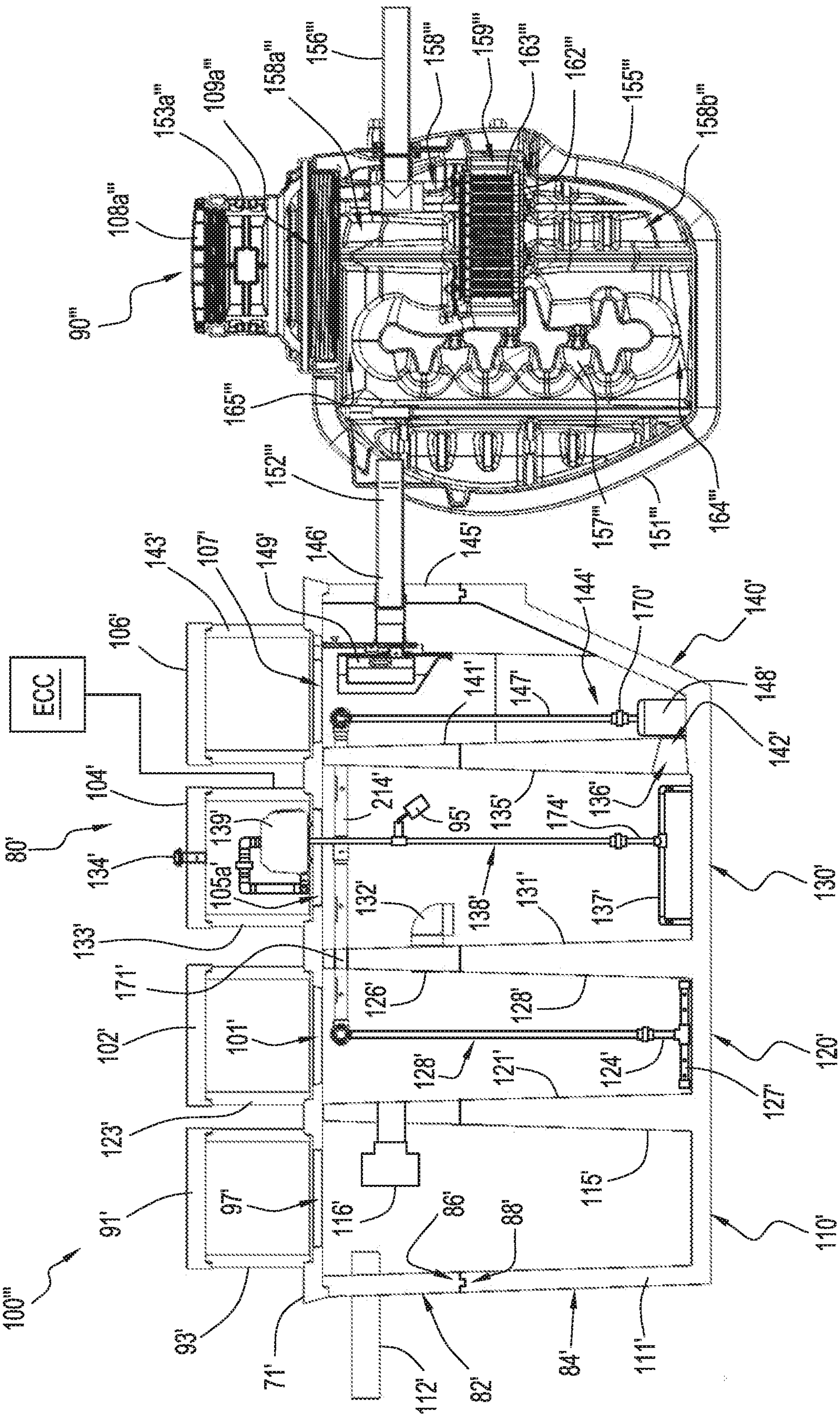
FIG. 98 is a cross-sectional, side view of a wastewater treatment system tank with a pretreatment chamber, an anoxic chamber, an aeration chamber, a clarification chamber and a polishing chamber, in accordance with one or more embodiments of the disclosed subject matter.

FIG. 98 is a cross-sectional, side view of a wastewater treatment system with a pretreatment chamber, an anoxic chamber, an aeration chamber, a clarification chamber and a polishing chamber, in accordance with one or more embodiments of the disclosed subject matter. In FIG. 98, a wastewater treatment system 100''' includes a first component 80' and a second component 90''' and is only turned on for a total of about 12 hours or less each day. In the embodiment illustrated in FIG. 98, the first and second components 80', 90''' each include a top half 82', 92''' and a bottom half 84', 94''', respectively. In general, the top components 82', 92''' have a ridge 86', 96''' extending from a bottom edge and the bottom components 84', 92''' have a reciprocally shaped groove 88', 98''', respectively, to receive the appropriate top component ridge 86', 96''' when the two components are assembled together. The first component 80' includes a pretreatment chamber 110', an anoxic chamber 120' in fluid communication with the pretreatment chamber 110', an aeration chamber 130' in fluid communication with the anoxic chamber 120', a clarification chamber 140' in fluid communication with the aeration chamber 130' and the anoxic chamber 120'. The second component 90''' includes a polishing chamber 150''' in fluid communication with the clarification chamber 140' of the first component 80' and an effluent well **158*b*''' in fluid communication with the influent well 154''' and also outside of the polishing chamber 150'**. System operation, monitoring, compliance and diagnostic functions area provided by an external control center ECC using MCD technology with pre-wired controls mounted in a lockable NEMA rated enclosure designed specifically for outdoor use. The control center ECC is a UL Listed assembly that includes a time clock, alarm light, reset button, power switch, power light, phone/network light, recirculation pump light, air pump light, high water light and auxiliary alarm light. A pre-programmed time clock controls the recirculation pump to insure that approximately 400% of the average daily flow is returned to the anoxic chamber. The control center ECC monitors recirculation pump current, air pump operation, high water and auxiliary alarm circuitry. In the event of an alarm from the air pump or auxiliary input, audible and visual alarms are activated and an optional telemetry system can report the condition. If abnormal operation of the recirculation pump is detected, a diagnostic sequence can begin and the visual alarm activates. After a factory programmed recovery interval, an automatic restart attempt is initiated and, if normal pump operation does not resume during 24 programmed recovery and restart cycles, the audible alarm activates and the optional telemetry system can report the condition to a monitoring center. In addition, the control center ECC can include a telemetry system with a heartbeat feature that is used to ensure the system is operating properly. In operation, at predefined intervals, for example, but not limited to, weekly, bi-weekly or monthly, the telemetry system initiates a call to a monitoring system, for example, but not limited to, a remote, online monitoring system at a monitoring center, to confirm proper operation of the system. If a call is not received at any of the predefined times and/or a negative operation report is received, the monitoring center notifies a service technician of the possible need for service to repair the system. If the lack of contact is only temporary due to a phone, internet or cellular connection being temporarily being offline, once it is back online, the normal reporting cycle will resume.

In FIG. 98, the pretreatment chamber 110' has a front wall 111' through which an influent inlet pipe 112' is located in an upper left corner of the front wall 111', when viewed from the outside and facing the front wall 111' (see FIG. 100), and provides access for an incoming flow of wastewater to be treated. The pretreatment chamber 110' also has a back wall 115' through which an outlet pipe 116' is located in an upper right corner of the back wall 115' (see FIG. 101) and permits pretreated wastewater to flow into the anoxic chamber 120'. The "T"-shape of the outlet pipe 116' permits wastewater to flow from the bottom in normal flow conditions and from the bottom and top in overflow conditions. Located in a top wall 71' of the pretreatment chamber 110' and above an exit of the influent inlet pipe 112' is a frustoconical first access opening **103*a*' with a reciprocal frustoconical first access opening cover 83*a*' (see FIG. 99). Also located in the top wall 71' of the pretreatment chamber 110' and above an entrance of the outlet pipe 116' is a frustoconical second access opening 103*b*' with a reciprocal frustoconical second access opening cover 83*b*'. In general, the bottom of the pretreatment chamber outlet pipe 116' is located at a height that is slightly below, for example, about 1 inch below, the pretreatment chamber influent inlet pipe 112'. Located in the top wall 71' between the first and second access openings 103*a*', 103*b*' is a first riser opening 97' that is aligned generally along a longitudinal center line of the first component 80'. A riser 93' having a substantially cylindrical exterior and internal opening extending there through and a base of the first riser 93' is seated and sealed around the first riser opening 97' and a substantially circular riser cover 91' is removably seated on top end of the first riser cover 93'**.

In FIG. 98, the anoxic chamber 120' has a front wall 121' through which an inlet pipe 122' is located in an upper right corner of the front wall 121', when looking back toward the pretreatment chamber 110', and provides access for an incoming flow of pretreated wastewater from the pretreatment chamber 110'. In fact, the anoxic chamber front wall 121' is also the pretreatment chamber back wall 115' and the anoxic chamber inlet pipe 122' is directly connected to and in fluid communication with the pretreatment chamber outlet pipe 116'. The anoxic chamber 120' also has a back wall 125' through which an outlet pipe 126' is located in an upper left corner of the back wall 125' (see FIG. 102) and permits anoxically treated wastewater to flow into the aeration chamber 130'. In general, the anoxic chamber outlet pipe 126' is located at a height that is below the anoxic chamber influent inlet pipe 122'. The difference in the heights of the pipes 112', 116', 122' and 126' helps to maintain the operating water levels in the pretreatment chamber 110', the anoxic chamber 120' and the aerobic chamber 130' to maintain an anoxic operational environment in the anoxic chamber 120'. Located in a top wall of the anoxic chamber 120' and adjacent to the anoxic chamber inlet pipe 122' is a frustoconical first access opening 101', which can include a reciprocal frustoconical first access opening cover 81'. An anoxic chamber riser 123' is sealingly affixed around and extends upwardly away from the first access opening 101' and the anoxic chamber riser 123' is covered by a removable anoxic chamber riser cover 102'. The air-tight seal coupling/connector 171' is affixed in and through the anoxic chamber back wall 125' and connects to an interior sludge return pump system located in a bottom of the clarification chamber 150' and that is configured to pump sludge back to the anoxic chamber 120' via an internally installed pipe system 144'.

In FIG. 98, the aeration chamber 130' has a front wall 131' through which an inlet pipe 132' is located in an upper left corner of the front wall 131', when looking back toward the anoxic chamber 120', and provides access for an incoming flow of anoxically treated wastewater from the anoxic chamber 120'. In fact, the aeration chamber front wall 131' is also the anoxic chamber back wall 125' and the aeration chamber inlet pipe 132' is directly connected to and in fluid communication with the anoxic chamber outlet pipe 126'. The aeration chamber 130' also has a back wall 135' through which an outlet opening 136' is located in a bottom center of the back wall 135' (see FIG. 104) and permits aerated wastewater to flow into the clarification chamber 140'. In general, the aeration chamber outlet opening 136' is located at a height that is well below the aeration chamber inlet pipe 132' and permits a back and forth flow of wastewater between the aeration chamber 130' and the clarification chamber 140'. Located in a top wall of the aeration chamber 130' and adjacent to the aeration chamber inlet pipe 132' is a frustoconical access opening **105*b*' with a reciprocal frustoconical first access opening cover 85*b*' (both best seen in FIG. 99). Also located in the top wall of the aeration chamber 130' on the same side as and in-line with access openings 97' and 101' is a frustoconical third access opening 105*a*' which can include a reciprocal frustoconical second access opening cover 85*a*' (both best seen in FIG. 99). An aeration chamber riser 133' is sealingly affixed around and extends upwardly away from opening 105*a*' and riser 133' is covered by an aeration chamber riser cover 104' in which an air intake valve 134' extends through the riser cover 104' to provide air for an air pump 139' located inside riser 133'**.

The clarification chamber 140' has a front wall 141' through which an inlet opening 142' is located in a bottom center of the clarification chamber front wall 141' and provides access for an incoming flow of aerated wastewater from the aeration chamber 130'. In fact, the clarification chamber front wall 141' is also the aeration chamber back wall 135' and the clarification chamber inlet opening 142' is directly connected to and in fluid communication with the aeration chamber outlet opening 136'. The clarification chamber 140' also has a back wall 145' through which an outlet pipe 146' is located in a top center of the back wall 145' and permits clarified wastewater to flow into the polishing chamber 150'. A flow equalization device 149' is positioned in front of and controls the flow to the clarification chamber outlet pipe 146'. In general, the clarification chamber outlet pipe 146' is located at a height that is well above the clarification chamber inlet opening 142' and permits a one way flow of wastewater from the clarification chamber 140' to the polishing chamber 150'''. Located in substantially the center of a top wall of the clarification chamber 140' and above the clarification chamber inlet pipe 142', the flow equalization unit 149' and the clarification chamber outlet pipe 146' is a frustoconical access opening 107', which can include a reciprocal frustoconical first access opening cover 87'. A clarification chamber riser 143' is sealingly affixed around and extends upwardly away from opening 107' and riser 143' is covered by a clarification chamber riser cover 106'.

In FIG. 98, the polishing chamber 150''' is shown as a separate system/component that is connected to and in fluid communication with the clarification chamber 140' via the clarification chamber outlet pipe 146', which connects to and is in fluid communication with a polishing chamber inlet pipe 152''' in a front wall 151''' of the polishing chamber 150'''. The polishing chamber inlet pipe 152''' is located in a top center of the polishing chamber front wall 151''' and provides access for an incoming flow of clarified wastewater from the clarification chamber 140'. The polishing chamber 150''' also has a back wall 155''' through which an effluent outlet pipe 156' is located in a top center of the back wall 155''' and permits fully treated wastewater to flow out of the polishing chamber 150'''. In general, the polishing chamber outlet pipe 156''' is located at a height that is below the polishing chamber inlet opening 152''' and a polishing chamber riser **153*a*''' is sealingly affixed around and extending upwardly away from opening 109*a*''' and is covered by a polishing chamber riser cover 108*a*'''**.

The embodiment of the system 100' in FIG. 98 is divided into two systems. In order to meet different application treatment requirements, the system is designed in different combinations to meet the different discharge requirements. For example, if a local authority requires a treatment plant to meet regular discharge limits or stringent discharge limits, a system including the first component 80' having the pretreatment, anoxic, aeration and clarification chambers 110', 120', 130', 140' can be applied to meet the discharge limits. If water reuse or a water recycling program is required, the second component 90''' including the polishing chamber 150''' can be added after the clarification chamber. Under such a situation or application, the system can be used as the first treatment step. Some additional polishing processes can be considered after the polishing chamber filtration. For example, chlorination, de-chlorination, de-nitrification, nitrogen/nitrate removal, phosphorus removal, carbon filtration and an ultra-filtration process or a similar process can be applied to enhance the water quality. After the polishing filtration treatment, the water quality meets the requirements for non-potable reuse. The function of the pretreatment chamber 110' is to remove grit, floating material and large suspended particles from domestic wastewater. The wastewater is preconditioned by passing through the pretreatment chamber 110' prior to being introduced to the anoxic chamber 120'. The outlet pipe 116' of the pretreatment chamber is equipped with a discharge tee or a baffle that extends vertically into the liquid so that only supernatant is displaced to the anoxic chamber 120'. The distance between the inlet 112' and outlet 116' of the pretreatment chamber is designed to be as far apart as possible. This design creates a good settling condition and improves solids removal efficiency.

As described above, the system 100' is different from any residential sewage treatment system. Not only does it use an aeration process, but it also uses anoxic and anaerobic processes. The purpose of using the anoxic chamber 120' in the system is to remove nitrate and total nitrogen. In a regular aeration treatment system, ammonia nitrogen is converted into nitrate by nitrifiers under an aerobic condition. A de-nitrification process must be applied to remove nitrate from treated effluent. Since the nitrate removal process (de-nitrification) needs certain organic nutrition, alkalinity and an anoxic condition for de-nitrifiers, this anoxic chamber receives the returned mixture of clarification chamber liquid and settled activated sludge containing nitrate from clarification chamber, and effluent containing certain amounts of organic nutrition from pretreatment chamber. Under the anoxic environment and mixing condition, the incubated de-nitrification bacteria in the anoxic chamber converts nitrate into nitrogen gas. Nitrate and organic matters measured as BOD are partially removed from sewage in the de-nitrification process.

In FIG. 98, the nitrate sources from the effluent are pumped from the bottom of the clarification chamber 140' to the anoxic chamber 120' periodically. A mixing bar 127', which is further shown in and described above in relation to FIG. 5, is installed at the end of a sludge return pipe 128' and located near the bottom of the anoxic chamber 120'. The end of the sludge return pipe is connected to a top end of a flexible pipe section 124' and a bottom end of the flexible pipe section 124' is connected to the mixing bar 127'. The flexible pipe section 124' permits the mixing bar 127' and the sludge return pipe 128' to be folded so as to be substantially parallel to each other to permit the easy installation of the sludge return pipe 128' and mixing bar 127' assembly in to the anoxic chamber 120'. An energy saving concept has been applied to design this system. Specifically, while a submersible sludge return pump 148' (i.e., a recirculation pump) is pumping the mixture of liquid and sludge up a sludge return pipe 147' of the internally installed pipe system 144' and back to the anoxic chamber 120', the current flows through holes (see FIG. 50) on the mixing bar 127'. As a result, the settled sludge and liquid in the anoxic chamber 120' are mixed by the current to form a mixed liquor. Mixing also creates a contact condition for de-nitrifiers and pollutants. Since fresh air is prohibited in the anoxic chamber, the mixture presents an anoxic condition that is essential for the de-nitrification process. When the sludge or solids in the anoxic chamber 120' settle down to a certain level, the sludge return pump 148' in the clarification chamber 140' starts its pumping cycle and creates a mixing condition in the anoxic chamber 120'. Frequent pumping keeps sludge in a suspension condition in the anoxic chamber. The pumping frequency can be selected based on the strength of the wastewater.

The sludge return pump 148' and the mixing bar 127' play two functions: 1) sending settled aerobic sludge and nitrate from the clarification chamber 140' to the anoxic chamber 120 and, 2) the current mixes the liquid simultaneously. In the de-nitrification process, nitrates from the clarification chamber and nutrition from pretreatment are mixed together, and the de-nitrification process is conducted under this anoxic condition.

Usually, the sludge return pump 148' is turned on from 1 to 10 percent of the system operating time. The pumping duration and frequency are based upon the flow rate of the submersible sludge return pump 148' and the strength of the influent wastewater. The flow rate of the sludge return pump 148' is adjustable for a return flow rate of between 100 to 1,000 percent of system flow rate depending on the organic and hydraulic load.

Because the sludge in the treatment system 100' is not allowed to be discarded, all the solids or sludge produced during the treatment period is kept in the system 100'. If a simple aeration system is operated under this kind of condition, floating sludge or scum is found at the surface of the clarification chamber 140'. In other words, the settleability of the aerobic sludge is not good after a certain length of operation. In long term aeration it is easy to cause a sludge expansion problem when dead microorganisms are pushed to the clarification chamber by a slow current in the system. Then, the sludge floats to the water surface of the clarification chamber 140' by tiny bubbles inside of the sludge particles. The floating solids or sludge affects the solids separation process. Some solids flow out of the clarification chamber 140' with effluent and cause high suspended solids in the effluent. Therefore, in order to combat this sludge expansion problem, the present system, alternatively applies an anoxic condition and an aerobic condition to the microorganisms. This improves the settleability of the sludge, and the floating sludge has been dramatically reduced. Therefore, the effluent quality from the clarification chamber is enhanced. The addition of an anoxic chamber not only removes total nitrogen, but also improves the effluent quality in both BOD and SS.

Figure 99:
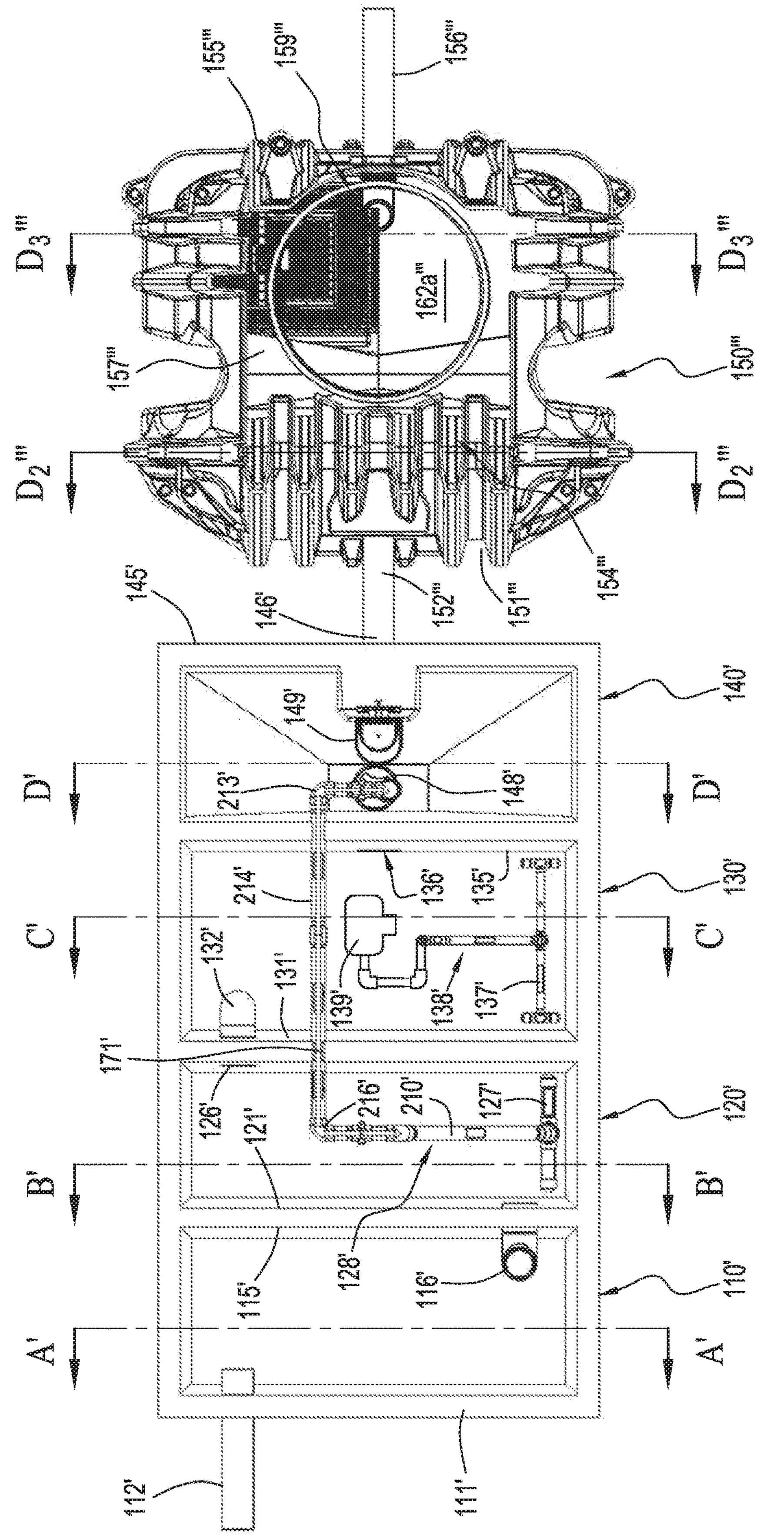
FIG. 99 is a partially exposed, top view of a wastewater treatment system tank with a pretreatment chamber, an anoxic chamber, an aeration chamber, a clarification chamber and a polishing chamber, in accordance with one or more embodiments of the disclosed subject matter.

In the system 100''' of FIG. 98, the denitrified domestic wastewater contains certain amounts of suspended solids, $BOD_5$ and nitrogen pollutants and flows through an elbow at an outlet end of the aeration chamber inlet tube 132' on that and enters the aeration chamber 130'. A low energy consumption air pump 139' is used to inject air into the mixed liquor and the aerobic bio-organisms in the aeration chamber 130' digest and remove organic pollutants, and convert TKN and ammonia to nitrate under the aerobic condition. The aeration process is completed by the air pump 139', which can be located within the aeration chamber riser 133' as shown in FIG. 99 as reference number 139' or externally as shown and described in relation to FIG. 2, a diffusion bar 137' and an air supply pipe 138'. The end of the air supply pipe 138' is connected to a top end of a flexible air pipe section 174' and a bottom end of the flexible air pipe section 174' is connected to the diffusion bar 137'. The flexible air pipe section 174' permits the diffusion bar 137' and the air supply pipe 138' to be folded so as to be substantially parallel to each other to permit the easy installation of the air supply pipe 138' and diffusion bar 137' assembly in to the aeration chamber 130'. At least two different sizes of the air pump 139' can be used depending on the desired or required flow rates. For example, with the larger air pump 139' the system 100' can process at about a 600 gallons per day flow rate and with the smaller air pump 139', it can process at about a 330 gallons per day flow rate. In addition, although the air pump 139' is shown inside of riser 133', it also can be located outside of the riser and up to 75 feet away. The diffusion bar 137' is made from plastic pipe and tiny holes are distributed along the length of the pipe. Air bubbles released from the diffusion bar 137' are injected into the wastewater and mix and aerate the mixed liquor. In this and subsequent embodiments, the diffusion bar 137', the general design of which can be seen, generally, in FIG. 8, but that includes additional holes to increase the number of bubbles produced to aid in the aeration process. Activated sludge that is constructed by biomass plays a key role to treat domestic wastewater in the aeration chamber. An overflow level detector 95' is connected to the air supply pipe 138' adjacent aeration chamber access opening **105*a'***.

After the aeration process in the aeration chamber 130', although the pollutants in the domestic wastewater are reduced to a low level, the activated sludge needs to be separated from mixed liquor before entering the polishing chamber 150''' for final treatment and discharge. The clarification chamber 140' is used to remove the solids from the treated wastewater. The mixed liquor flows through the opening 136' at the bottom of the wall that is constructed between the aeration chamber 130' and the clarification chamber 140'. This small opening regulates flow from the aeration chamber 130' to the clarification chamber 140'. Solids in the treated wastewater are separated from the liquid and settle down to the bottom of the clarification chamber 140' and form a sludge layer or pile. The sludge return pump 148' that is installed at the bottom of the clarification chamber 140' pumps settled activated sludge and liquid from the clarification chamber 140' through a check valve 170' and a pipe system 147' to the mixing bar 127' in the anoxic chamber 120' to be mixed with the wastewater and further treated in the anoxic chamber 120'. Because the hydraulic detention time of the clarification chamber is more than 4 hours during a peak flow period, the accumulated sludge separated in the clarification chamber is gradually turned into an anoxic condition before entering the anoxic chamber 120'. After returning to the anoxic chamber 120', the de-nitrification bacteria in the returned sludge are mixed with the existing sludge in the anoxic chamber 120'. The de-nitrifiers in the sludge start to be active to digest nitrate and organics. Similar to the air pump, the sludge pump 148' also can be provided in more than one size, for example, a large pump for high flow rates and a small pump for low flow rates.

In order to improve the solids removal efficiency, a flow equalization apparatus 149' is installed on an inlet end of the outlet pipe 146' of the clarification chamber 140'. At least one flow equalization port regulates the peak flow from the clarification chamber 140' to the polishing chamber 150''' and improves solids removal efficiency. The purpose of using this flow equalization apparatus 149' is to average the effluent flow rate and enhance settling efficiency. This system was experimentally tested for a 6 month period with the influent waste water being heated to a temperature of 11° C.+/−1° C., when necessary, to ensure a minimum temperature of 10° C. without discarding any sludge. Sometimes, small amounts of sludge turned into light weight sludge that cannot be removed by the settling process. The sludge usually floats from the bottom of the chamber to the water surface in the clarification chamber 140'. To separate floating sludge and supernatant, an outer housing is structured at the outside of the flow equalization port to keep floating solids away from effluent flow. At least one overflow port is located above the at least one flow equalization port. If the at least one flow equalization port is plugged, treated wastewater flows to the polishing chamber 150' through the at least one overflow port. Usually, the at least one flow equalization port is not plugged by solids easily. If sludge accumulates inside the flow equalization port and plugs the flow, the water level in the clarification chamber 140' will be raised to achieve the water level at the at least one overflow port. During the water level elevating time, the plugged at least one flow equalization port will be self-cleaned under the pressure of the water.

If the plugged flow equalization port cannot be cleaned, the at least one overflow port allows liquid to flow into the polishing chamber 150'''. The diameter of the at least one flow equalization port varies from 0.25 to 0.5 inches. Additional details on embodiments of the flow equalization apparatus 149' are shown in and described in relation to FIGS. 11-14, 31, 32 and 59-65.

In FIG. 98, the polishing chamber 150''' consists of an influent well 154''' and an effluent well 158''' separated by a central wall 157''', all located transversely across the polishing chamber 150''' with a filtration bed 159''' horizontally located in and dividing the effluent well 158''' of the polishing chamber 150''' into upper and lower sections 158*a*''', 158*b*'''. The polishing chamber 150''' in this embodiment is substantially identical to the polishing chamber in FIGS. 88 and 89 with the exception of in the embodiment in FIGS. 98 and 99, there is only one filter in the filtration bed 159''' on one side and flow prevention element 162A on the other side that prevents the flow of the effluent up through that side of the filtration bed 159'''. The effluent from the clarification chamber 140' flows into the influent well 154''' of the polishing chamber 150'''. The flow is then distributed to the effluent well 158''' through an opening 164' located at and formed through a bottom center of the central wall 167' and moves up through the filtration bed 159''' where the treated wastewater passes through a filtration bed base 162'' and a filtration media 163'' to perform a coarse filtration function. The biomass accumulated inside of the filtration material performs three functions: 1) further settling, 2) filtering, and 3) polishing treatment. The filter removes suspended solids (SS), BOD and total nitrogen from the clarification chamber effluent. The anoxic condition inside of the settled sludge and filtration beds allows de-nitrification bacteria to grow and remove certain amounts of nitrate.

The filtrate from the single filter in the filtration bed 159''' is collected from a submerged hole and directed to the upper section of the effluent well 158*a*''', in which, a finishing treatment system 160', such as shown in FIG. 2 as the finishing treatment system 160, can be installed to perform a final treatment on the effluent water before being discharged from the polishing chamber 150'''. For example, the finishing treatment system 160' can include, but is not limited to, an UV assembly, a chlorination system, a dechlorination system, a phosphorus removal system, a heavy metal removal system, a nitrogen/nitrate removal system and any combination of the above and is installed for disinfecting of the effluent from the filter. Because the filter is designed and structured very well and the filtrate is clear and contains less BOD and SS, disinfection performance of the UV assembly is excellent.

Several different types of material can be used as the filtration media for the system 100''' of FIG. 98. For example, gravel, ceramic, closed cell Styrofoam, natural, synthetic, rubber and plastic materials in certain sizes can be used as the filtration media 163' in the filter. Specifically, the diameter of the filtration media 163''' varies from 0.5 to 5 inches. Because coarse filtration media 163''' and a thin filtration bed are used in this design, it is easy to clean the filtration media during maintenance services. After the liquid in the filter is pumped out though the influent well 154''', an operator can rinse the filtration media 163''' with a garden hose, the sloughed biofilm is washed down to the bottom of the filter and flows along the slope to the influent well with accumulated sludge. A service pump pumps all the solids out of the filter. The filter cleaning process can be completed easily.

The wastewater treatment system tank of FIG. 98 can be constructed using concrete and/or a molded plastic, as will be seen and described in subsequent figures and paragraphs herein.

FIG. 99 is a partially exposed, top view of the wastewater treatment system tank of FIG. 98, in accordance with one or more embodiments of the disclosed subject matter. In FIG. 99 the internally installed pipe system 144' of the sludge return system extend from beneath the clarification chamber access opening 107' back toward the anoxic chamber 120'. Specifically, a first cross piece 214' is seen extending out of the clarification chamber 140' through the clarification chamber front wall 141' into and across the aeration chamber 130' to connect with a first end of the air-tight sealed coupling/connector tube 171' that extends through the aeration chamber front wall 131' and into the anoxic chamber 120' and is connected to a first end of a first elbow 216'. A second end of the first elbow 216' is connected to a first end of a return piece 210', which connects to the mixing bar 127' via the mixing bar riser tube 128'. An air pump 139' is connected to a first pipe section 224', which to a first end of a diffuser bar return piece 220', which connects to the diffuser bar 137' the diffuser bar riser 138'. Although, in FIG. 99, the pipe components of the sludge return system are connected on one end to the sludge return pump 148', extend up toward a top of the clarification chamber 140' then bend toward a side wall to form an orthogonal angle with the first cross piece 214', the pipe can alternatively be configured to bend and extend toward the back wall 145' of the clarification chamber 140' at a substantially orthogonal angle to the sludge return pipe 147' to form a "U"-shaped loop 175' with the first cross piece 214' (see FIG. 69 for the alternative design.)

In FIG. 99, the internal structure of the polishing chamber is more clearly illustrated. For example, inlet pipe 152 is seen attached to the front wall 151 of the polishing chamber 150' and in fluid communication with an influent well 154. Adjacent to the influent well 154' is an effluent well 158' in which the filtration bed base 162' is located.

Figure 100:
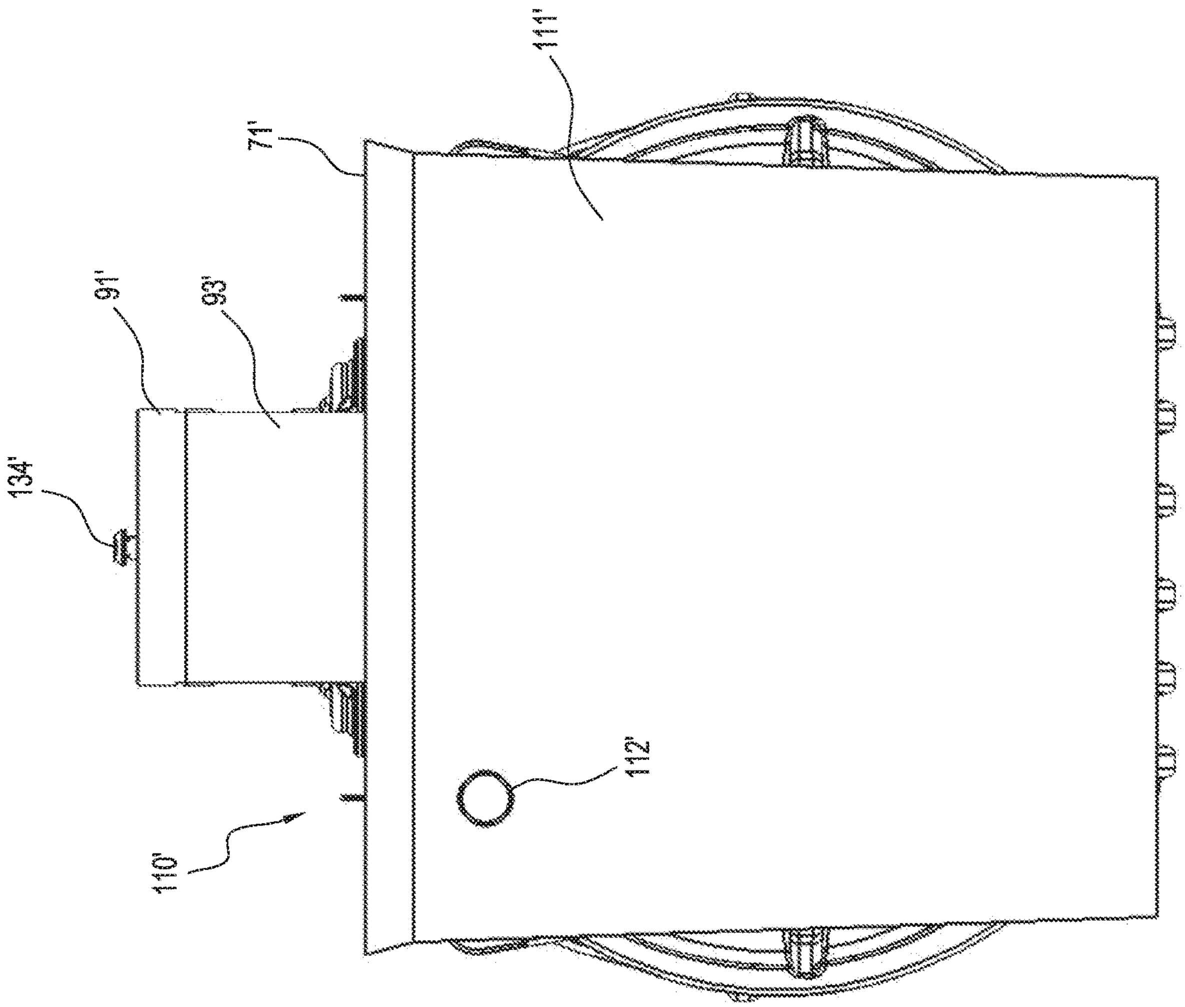
FIG. 100 is a front view of the pretreatment chamber in FIGS. 98 and 99, in accordance with one or more embodiments of the disclosed subject matter.

FIG. 100 is a front view of the pretreatment chamber 100' in FIGS. 98 and 99, in accordance with one or more embodiments of the disclosed subject matter. In FIG. 100, the pretreatment chamber inlet opening 112' is seen in the upper left corner of the front wall 111' of the pretreatment chamber 110'.

Figure 101:
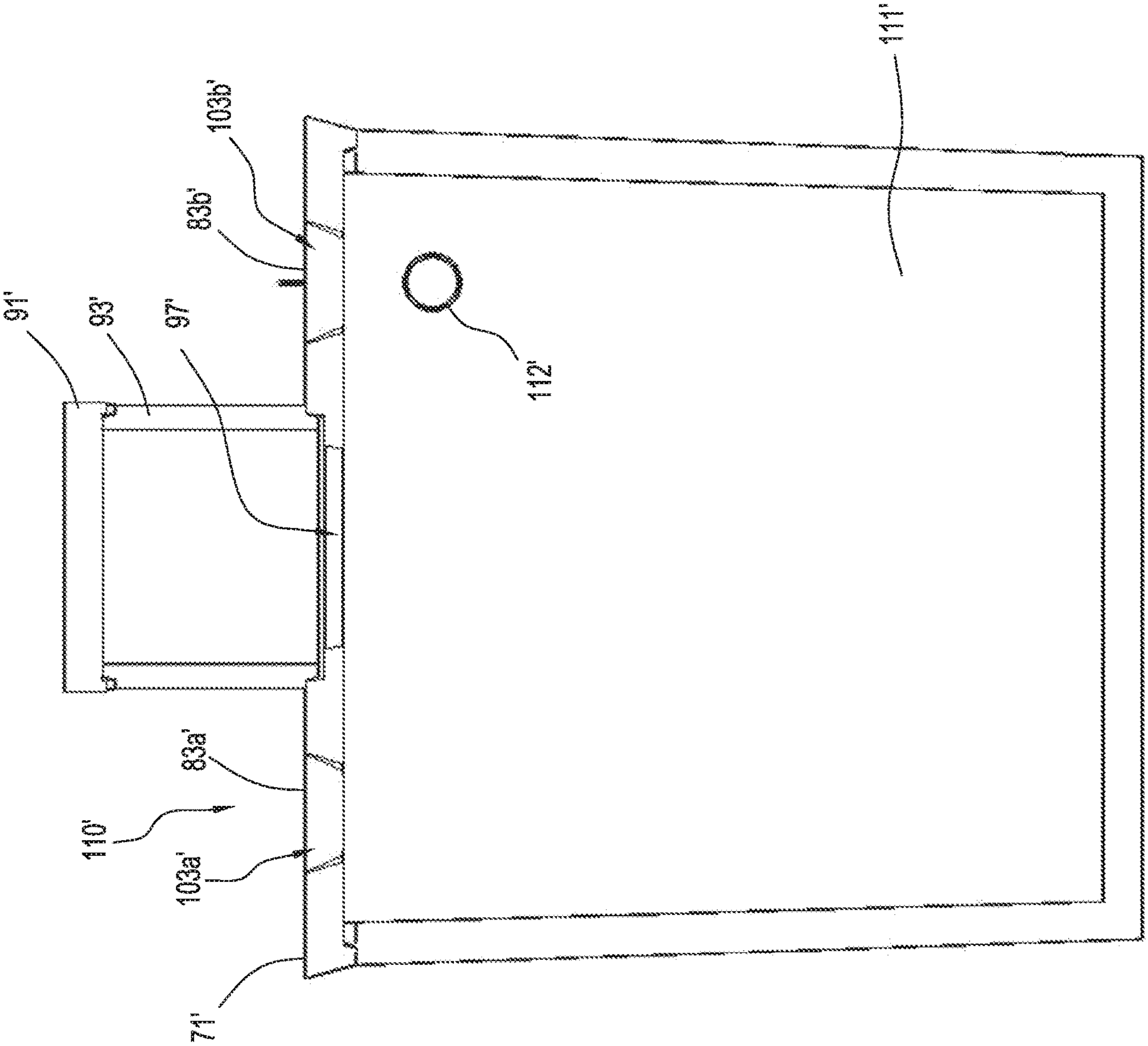
FIG. 101 is a lateral cross-sectional view along line A'-A' of the pretreatment chamber in FIG. 99, in accordance with one or more embodiments of the disclosed subject matter.

FIG. 101 is a lateral cross-sectional view along line A'-A' of the pretreatment chamber 100' in FIG. 99, in accordance with one or more embodiments of the disclosed subject matter. In FIG. 101, the pretreatment chamber 110' inlet pipe 112' is shown in the upper right corner of the pretreatment chamber front wall 111'.

Figure 102:
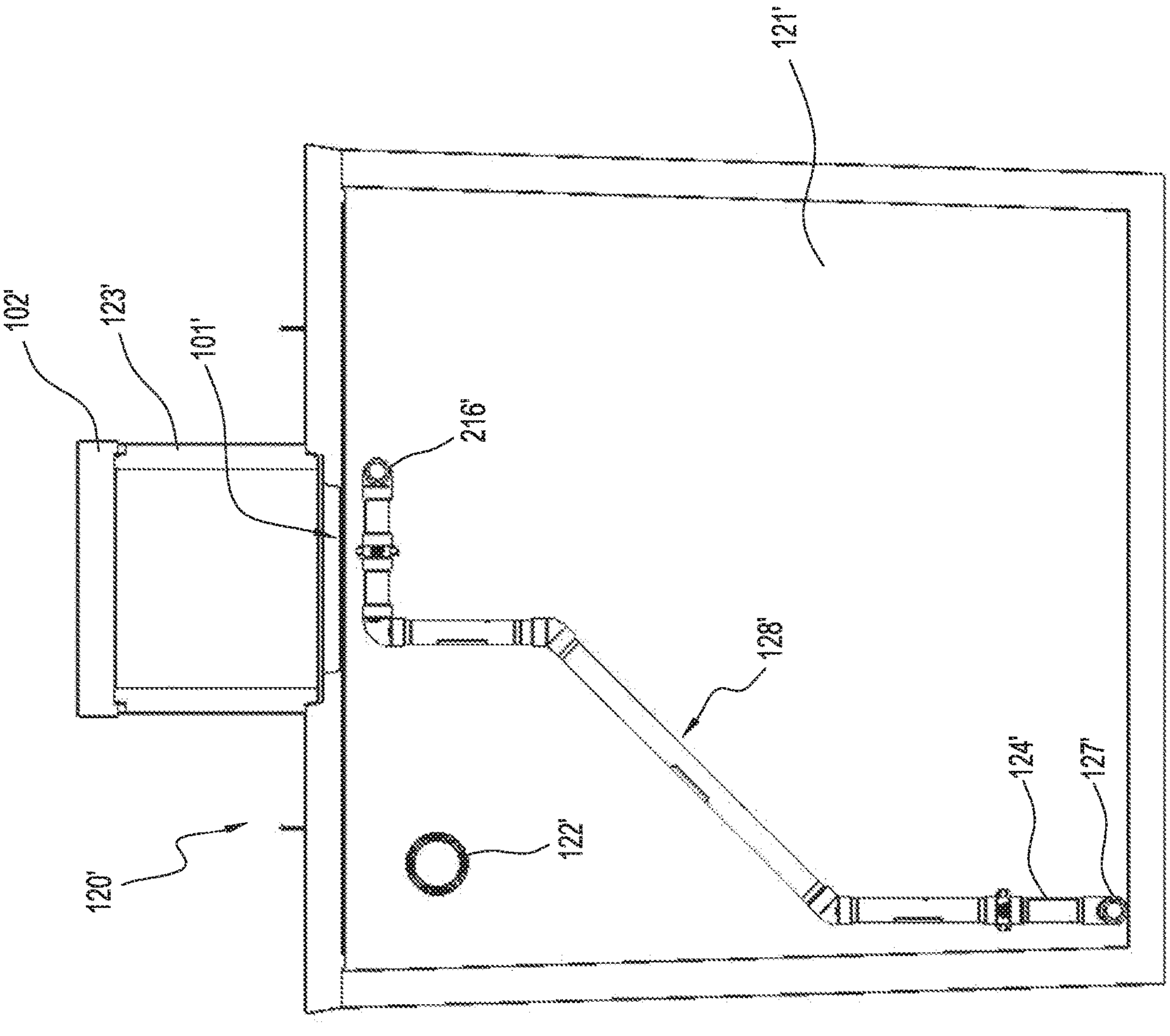
FIG. 102 is a lateral cross-sectional view along line B'-B' of the anoxic chamber in FIG. 99, in accordance with one or more embodiments of the disclosed subject matter.

FIG. 102 is a lateral cross-sectional view along line B'-B' of the anoxic chamber 120' in FIG. 99, in accordance with one or more embodiments of the disclosed subject matter. In FIG. 102, the inlet pipe 122' is seen in the upper left corner of the anoxic chamber 120' front wall 121' and a top end of the sludge return piping 128' is connected to connection joint 216' and a bottom end of the sludge return piping 128' is connected to the diffuser bar 127' near the bottom of the anoxic chamber 120'.

Figure 103:
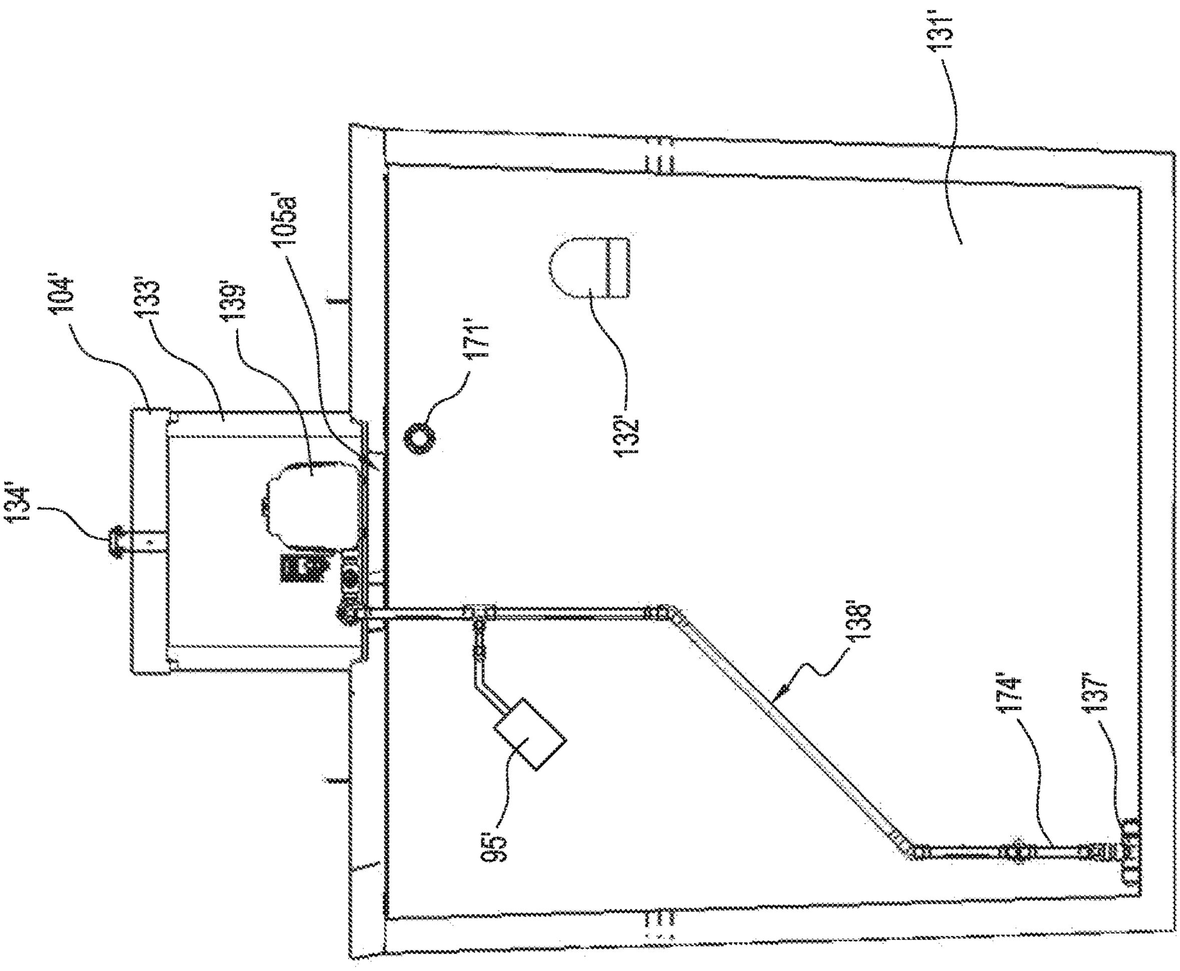
FIG. 103 is a lateral cross-sectional view along line C'-C' of the aerobic chamber in FIG. 99, in accordance with one or more embodiments of the disclosed subject matter.
Figure 104:
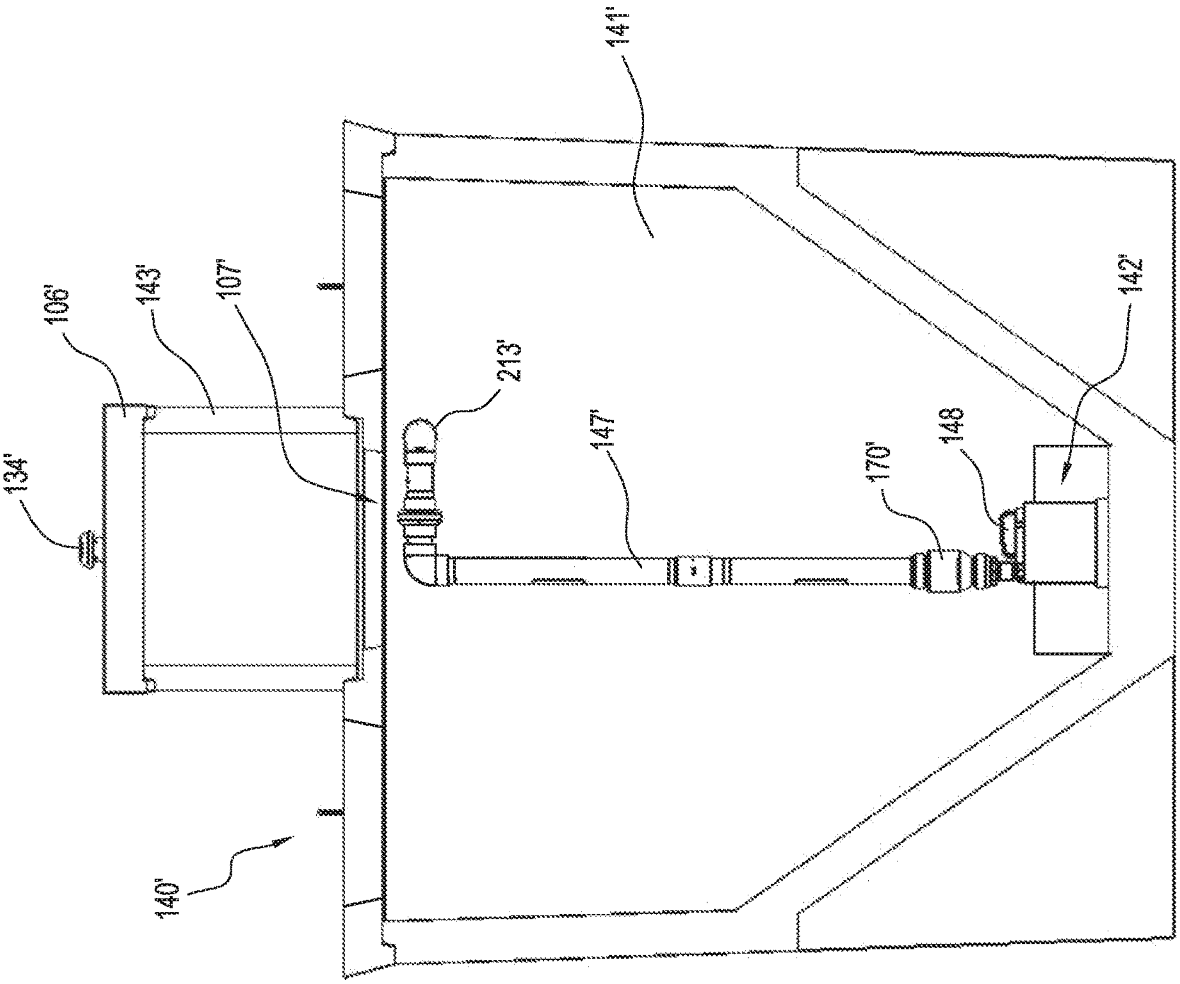
FIG. 104 is a lateral cross-sectional view along line $D_1$'-$D_1$' of the clarification chamber in FIG. 99, in accordance with one or more embodiments of the disclosed subject matter.

FIG. 103 is a lateral cross-sectional view along line C'-C' of the aerobic chamber 130' in FIG. 99, in accordance with one or more embodiments of the disclosed subject matter. In FIG. 103, the aeration chamber inlet opening 132' is seen at the adjacent an upper right corner of the front wall 131' of the aeration chamber 130'. The air-tight sealed coupling/connector 171' is seen in the front wall 131' just below the right side of the riser 133' and, during operation of the system 100', prevents fresh air brought in by air pump 139' and air valve 134' the aeration chamber 130' from passing from the aeration chamber 130' into the anoxic chamber 120'. The outlet opening 136' is located at the bottom of the back wall 135' of the aeration chamber 130', which is best seen in FIG. 74, is rectangular in shape with dimension of about 18 inches wide by about 6 inches high on the aeration chamber side and tapers down on all four sides to an opening in the clarification chamber front wall 141' of the about 16 inches wide and about 4 inches high. FIG. 104 is a lateral cross-sectional view along line $D_1$'-$D_1$' of the clarification chamber 140' in FIG. 99, in accordance with one or more embodiments of the disclosed subject matter. In FIG. 104, the clarification chamber 140' inlet opening 142' is shown at the bottom center of the front wall 141' of the clarification chamber 140' behind the sludge return pump 148'. The sludge return piping element 214' is seen passing through the clarification chamber front wall 141' just below the right side of the riser 143', which extends through the front wall 141' into and through the aeration chamber 130' and connects to the air-tight sealed coupling/connector 171' in the front wall 131' of the aeration chamber 130'.

Figure 105:
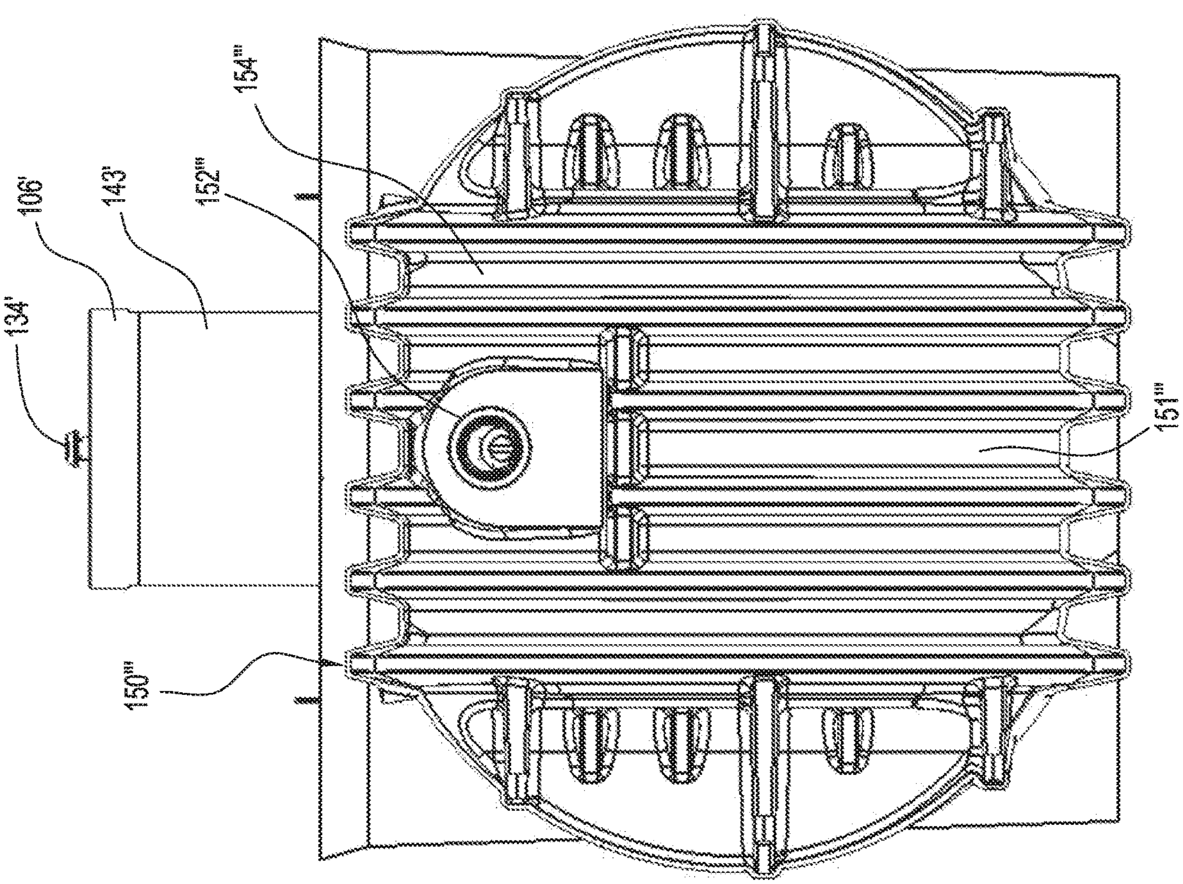
FIG. 105 is a lateral cross-sectional view along line $D_2$'''-$D_2$''' of the polishing chamber in FIG. 99, in accordance with one or more embodiments of the disclosed subject matter.

FIG. 105 is a lateral cross-sectional view along line $D_2$""-$D_2$"" of the polishing chamber 150''' in FIG. 99, in accordance with one or more embodiments of the disclosed subject matter. In FIG. 105, the influent well inlet opening 152''' is shown in an upper middle portion of the front wall 151''' and below the first frustoconical access opening **109*a*''' of the polishing chamber 150'''**.

Figure 106:
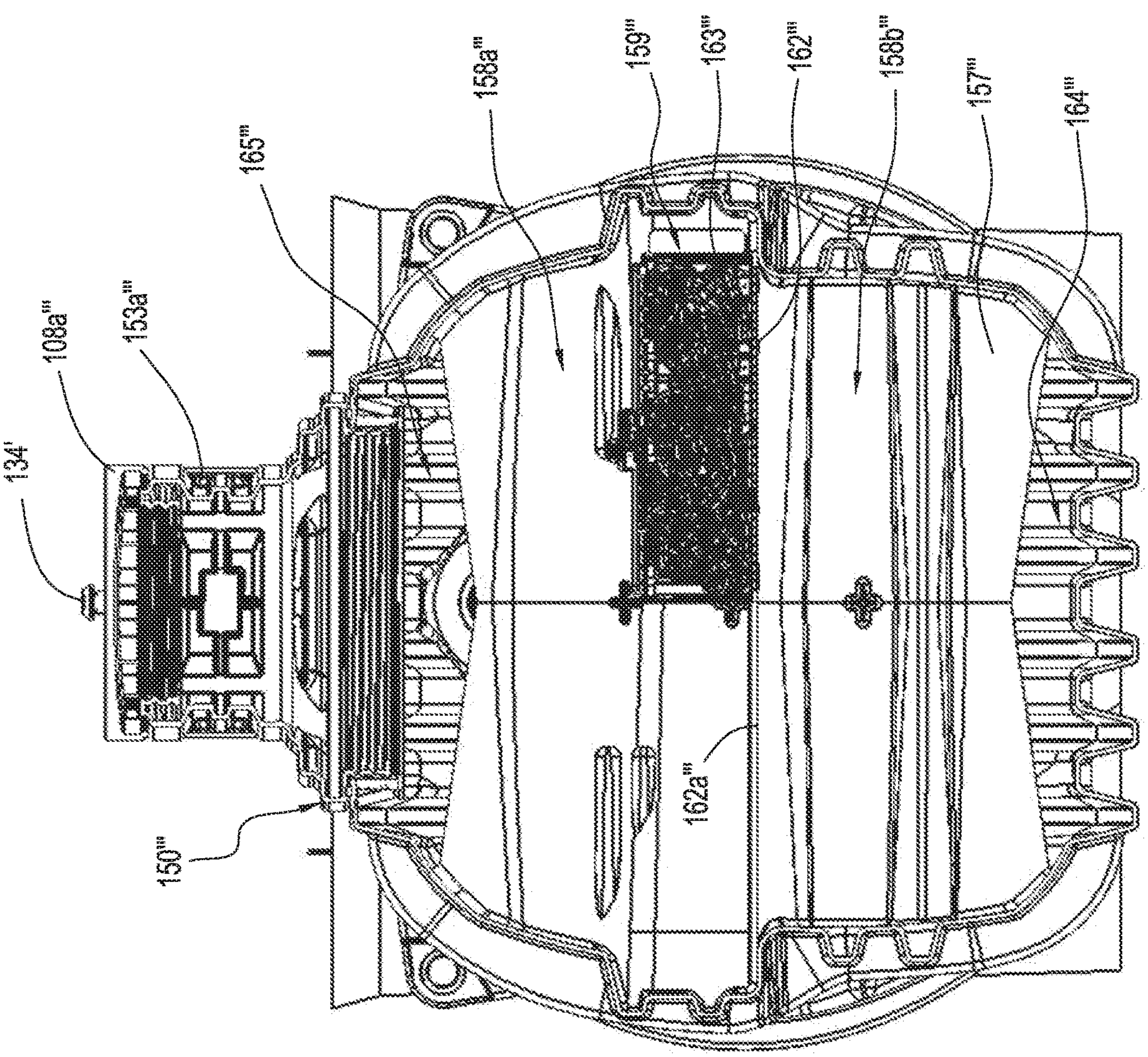
FIG. 106 is a lateral cross-sectional view along line $D_3$'''-$D_3$''' of the polishing chamber in FIG. 99, in accordance with one or more embodiments of the disclosed subject matter.

FIG. 106 is a lateral cross-sectional view along line $D_3$""-$D_3$"" of the polishing chamber 150''' in FIG. 99, in accordance with one or more embodiments of the disclosed subject matter. In FIG. 106, the effluent well inlet opening 164''' is shown in and extending through the central wall 157''' adjacent the bottom of the effluent well **158*b*''' to be in fluid communication with and receive flow from the influent well 154'''. The overflow opening 165''' is shown substantially directly above the inlet opening 164''' in and extending through a top center section of the central wall 157''' to be in fluid communication with and send overflow water back into the influent well 154''' in overflow conditions. As seen in FIG. 106, there are two separate filtration beds 159''' positioned side-by-side in about a middle of the effluent well 158' and through which the cleaned wastewater passes up and through for its final, or almost final, treatment before being discharged from the polishing chamber 150'. Optionally, if the finishing treatment system 160'** is installed, it may be used to further treat the about to be discharged treated wastewater.

The details of the system 100 shown and described in relation to FIGS. 4-20 are also applicable to the present system 100''' of FIGS. 98-106 and subsequent other embodiments described below, but are not repeated separately here or below.

Figure 107:
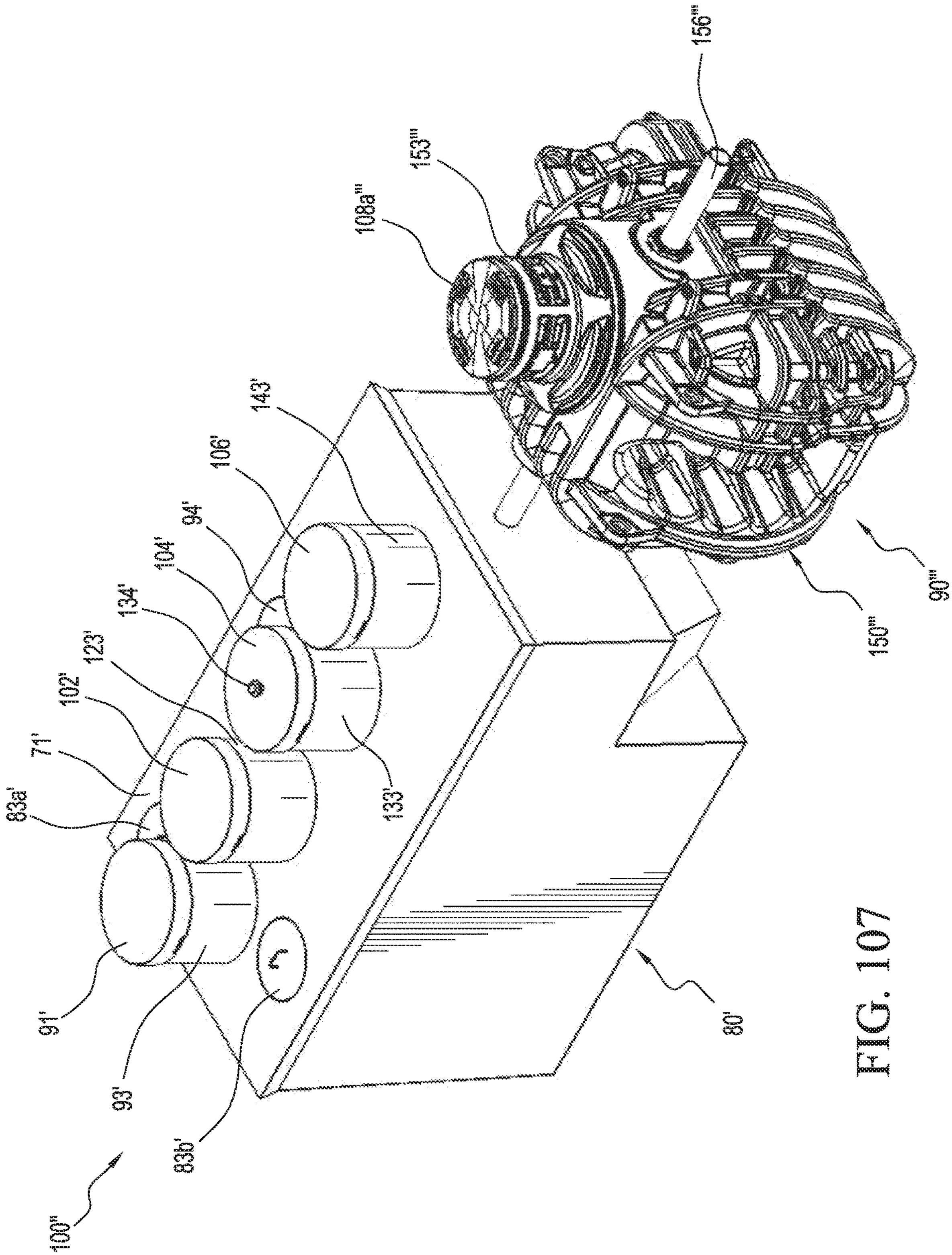
FIG. 107 is a top right rear perspective view of the wastewater treatment system in FIGS. 98 and 99, in accordance with one or more embodiments of the disclosed subject matter.

FIG. 107 is a top right, rear perspective view of the system 100''' in FIGS. 98 and 99, in accordance with one or more embodiments of the disclosed subject matter.

Figure 108:
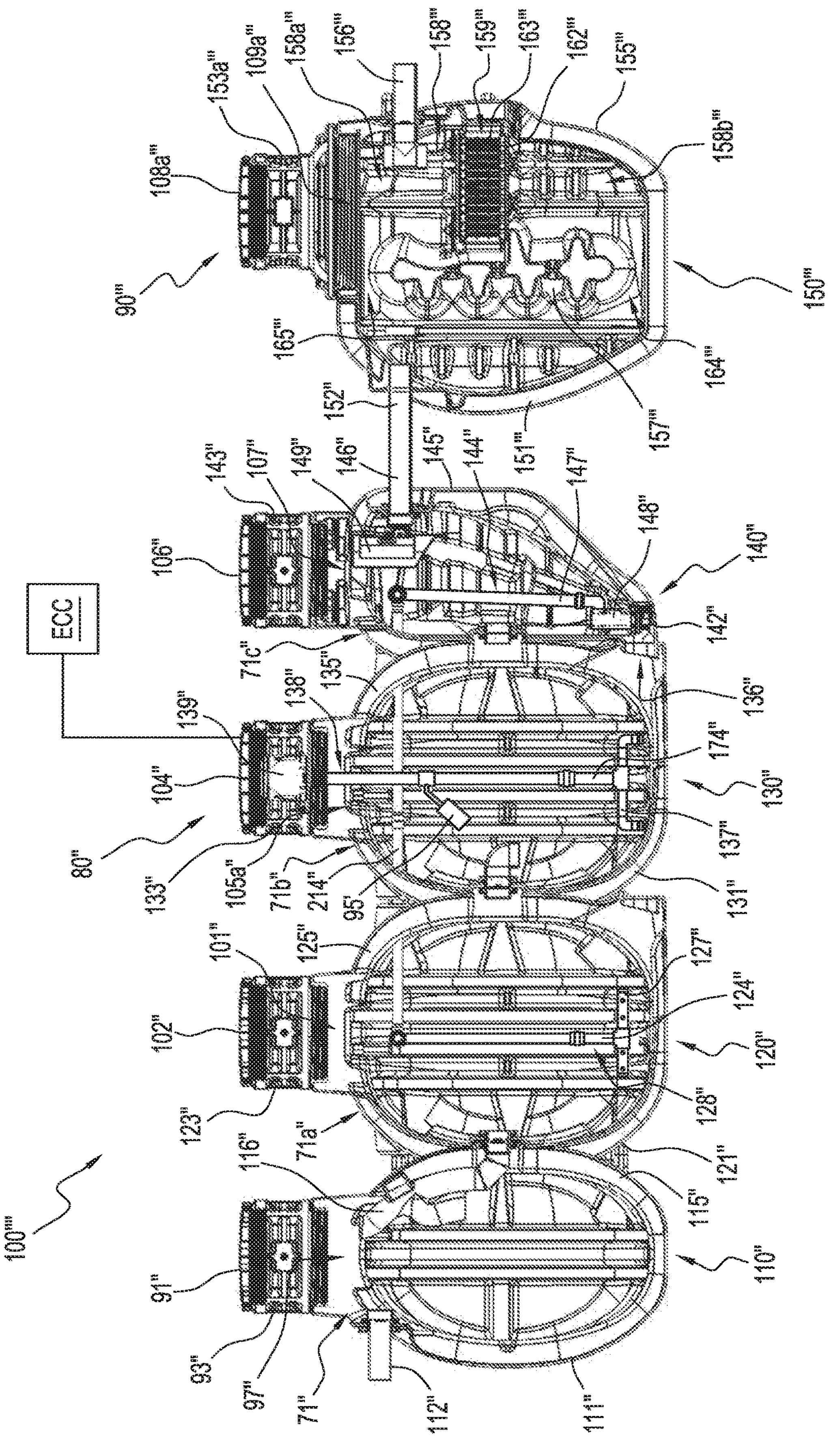
FIG. 108 is a cross-sectional, side view of a wastewater treatment system tank with a pretreatment chamber, an anoxic chamber, an aeration chamber, a clarification chamber and a polishing chamber, in accordance with one or more embodiments of the disclosed subject matter.

FIG. 108 is a cross-sectional, side view of a wastewater treatment system with a pretreatment chamber, an anoxic chamber, an aeration chamber, a clarification chamber and a polishing chamber, in accordance with one or more embodiments of the disclosed subject matter. In FIG. 108, a wastewater treatment system 100"" includes a first component 80" and a second component 90''' and is only turned on for a total of about 12 hours or less each day. In the embodiment illustrated in FIG. 108, the first and second components 80", 90''' are both made from molded plastic. The first component 80" includes four separate, but connected chambers, specifically, a pretreatment chamber 110", an anoxic chamber 120" in fluid communication with the pretreatment chamber 110", an aeration chamber 130" in fluid communication with the anoxic chamber 120", a clarification chamber 140" in fluid communication with the aeration chamber 130" and the anoxic chamber 120". The second component 90''' includes a polishing chamber 150''' in fluid communication with the clarification chamber 140" of the first component 80" and an effluent well **158*b*''' in fluid communication with the influent well 154''' and also outside of the polishing chamber 150'''. Each of the chambers 110", 120", 130", 140", 150''' are separately molded plastic units with the chambers 110", 120", 130", 140" of the first component 80" being designed and configured with interlocking ribs and overlapping connection points to permit their connection into a unified first component 80"**. System operation, monitoring, compliance and diagnostic functions area provided by an external control center ECC using MCD technology with pre-wired controls mounted in a lockable NEMA rated enclosure designed specifically for outdoor use. The control center ECC is a UL Listed assembly that includes a time clock, alarm light, reset button, power switch, power light, phone/network light, recirculation pump light, air pump light, high water light and auxiliary alarm light. A pre-programmed time clock controls the recirculation pump to insure that approximately 400% of the average daily flow is returned to the anoxic chamber. The control center ECC monitors recirculation pump current, air pump operation, high water and auxiliary alarm circuitry. In the event of an alarm from the air pump or auxiliary input, audible and visual alarms are activated and an optional telemetry system can report the condition. If abnormal operation of the recirculation pump is detected, a diagnostic sequence can begin and the visual alarm activates. After a factory programmed recovery interval, an automatic restart attempt is initiated and, if normal pump operation does not resume during 24 programmed recovery and restart cycles, the audible alarm activates and the optional telemetry system can report the condition to a monitoring center. In addition, the control center ECC can include a telemetry system with a heartbeat feature that is used to ensure the system is operating properly. In operation, at predefined intervals, for example, but not limited to, weekly, bi-weekly or monthly, the telemetry system initiates a call to a monitoring system, for example, but not limited to, a remote, online monitoring system at a monitoring center, to confirm proper operation of the system. If a call is not received at any of the predefined times and/or a negative operation report is received, the monitoring center notifies a service technician of the possible need for service to repair the system. If the lack of contact is only temporary due to a phone, internet or cellular connection being temporarily being offline, once it is back online, the normal reporting cycle will resume.

In FIG. 108, the pretreatment chamber 110" has a front wall 111" through which an influent inlet pipe 112" is located in a center of an upper section of the front wall 111", when viewed from the outside and facing the front wall 111" (see FIG. 110), and provides access for an incoming flow of wastewater to be treated. The pretreatment chamber 110" also has a back wall 115" through which an outlet pipe 116" is located in about a center or middle of the back wall 115" (see FIG. 111) and permits pretreated wastewater to flow into the anoxic chamber 120". The convoluted "T"-shape and elongated body of the outlet pipe 116" permits wastewater to flow from a bottom opening **116*a*" in normal flow conditions and from the bottom and a top opening 116***b*" in overflow conditions. As seen in FIG. 108, the outlet pipe 116" is shaped to conform with and runs up along the back wall 115" and has the appearance of a stretched out "λ" shape. In this embodiment, the outlet pipe 116" extends from the middle of the pretreatment chamber back wall 115" up to and above the top of the inlet pipe 112". Located in substantially the center of a top wall 71" of the pretreatment chamber 110" pretreatment chamber access opening 97" around which a pretreatment chamber riser 93" can be removeably or permanently affixed and sealed to permit non-wastewater from entering into the system 100" and a pretreatment chamber access opening cover 91*a*" is removeably and sealingly connected to a top of the pretreatment chamber riser 93" (see FIG. 109). In general, the bottom opening 116*a*" of the pretreatment chamber outlet pipe 116" is located at a height that is slightly below, for example, about 1 inch below, the pretreatment chamber influent inlet pipe 112". The pretreatment riser opening 97" is aligned generally along a longitudinal center line of the first component 80". The riser 93" has a substantially cylindrical exterior and internal opening extending there through and a base of the pretreatment riser 93" is seated and sealed around the first riser opening 97" and the substantially circular riser cover 91" is removably seated and sealed on the top end of the pretreatment riser cover 93".

In FIG. 108, the anoxic chamber 120" has a front wall 121" through which an inlet pipe 122" is located in about a center or middle of the front wall 121", when looking back toward the pretreatment chamber 110", and provides access for an incoming flow of pretreated wastewater from the pretreatment chamber 110". In fact, the anoxic chamber front wall 121" is also the pretreatment chamber back wall 115" and the anoxic chamber inlet pipe 122" is directly connected to and in fluid communication with the pretreatment chamber outlet pipe 116". The anoxic chamber 120" also has a back wall 125" through which an outlet pipe 126" is located in about a center or middle of the back wall 125" (see FIG. 112) and permits anoxically treated wastewater to flow into the aeration chamber 130". In general, the anoxic chamber outlet pipe 126" is located at a height that is below the anoxic chamber influent inlet pipe 122". The difference in the heights of the pipes 112", 116", 122" and 126" helps to maintain the operating water levels in the pretreatment chamber 110", the anoxic chamber 120" and the aerobic chamber 130" and to maintain an anoxic operational environment in the anoxic chamber 120". Located in a top wall 71*a*" of the anoxic chamber 120" and adjacent to the anoxic chamber inlet pipe 122" is an anoxic chamber access opening 101" and an anoxic chamber riser 123" is sealingly affixed around and extends upwardly away from the anoxic chamber access opening 101" and the anoxic chamber riser 123" is covered by a removable anoxic chamber riser cover 102". An air-tight seal coupling/connector 171" is affixed in and through the anoxic chamber back wall 125" and connects to an interior sludge return pump system located in a bottom of the clarification chamber 150'" that is configured to pump the sludge that accumulates in the bottom of the clarification chamber 150'" back to the anoxic chamber 120". This air-tight seal is essential to maintain the anoxic conditions in the anoxic chamber 120" via an internally installed pipe system 144".

In FIG. 108, the aeration chamber 130" has a front wall 131" through which an inlet pipe 132" with a downward facing opening is located in the center or middle of the front wall 131", when looking back toward the anoxic chamber 120", and provides access for an incoming flow of anoxically treated wastewater from the anoxic chamber 120". In fact, the aeration chamber front wall 131" is also the anoxic chamber back wall 125" and the aeration chamber inlet pipe 132" is directly connected to and in fluid communication with the anoxic chamber outlet pipe 126". The aeration chamber 130" also has a back wall 135" through which an outlet opening 136" is located in a bottom center of the back wall 135" (see FIG. 114) and permits aerated wastewater to flow into the clarification chamber 140". In general, the aeration chamber outlet opening 136" is located at a height that is well below the aeration chamber inlet pipe 132" and permits a back and forth flow of wastewater between the aeration chamber 130" and the clarification chamber 140". Located in a top wall 71*b*" of the aeration chamber 130" and adjacent to the aeration chamber inlet pipe 132" is an aeration chamber access opening 105*a*" with an aeration chamber riser 133" that is sealingly affixed around and extends upwardly away from opening 105*a*" and the aeration chamber riser 133" is covered by an aeration chamber riser cover 104" in which an air intake valve 134" extends through the riser cover 104" to provide air for an air pump 139" located inside the aeration chamber riser 133".

The clarification chamber 140" has a front wall 141" through which an inlet opening 142" is located in a bottom center of the clarification chamber front wall 141" and provides access for an incoming flow of aerated wastewater from the aeration chamber 130". In fact, the clarification chamber front wall 141" is also the aeration chamber back wall 135" and the clarification chamber inlet opening 142" is directly connected to and in fluid communication with the aeration chamber outlet opening 136". The clarification chamber 140" also has a back wall 145" through which an outlet pipe 146" is located in a top center of the back wall 145" and permits clarified wastewater to flow into the polishing chamber 150'". A flow equalization device 149" is positioned in front of and controls the flow to the clarification chamber outlet pipe 146". In general, the clarification chamber outlet pipe 146" is located at a height that is well above the clarification chamber inlet opening 142' and permits a one way flow of wastewater from the clarification chamber 140" to the polishing chamber 150'". Located in substantially the center of a top of the back wall 145" of the clarification chamber 140" and above the clarification chamber inlet pipe 142", the flow equalization unit 149" and the clarification chamber outlet pipe 146" is a clarification chamber access opening 107" and a clarification chamber riser 143" is sealingly affixed around and extends upwardly away from opening 107" and riser 143" is covered by a clarification chamber riser cover 106".

In FIG. 108, the polishing chamber 150'" is shown as a separate system/component that is connected to and in fluid communication with the clarification chamber 140" via the clarification chamber outlet pipe 146", which connects to and is in fluid communication with a polishing chamber inlet pipe 152'" in a front wall 151'" of the polishing chamber 150'". The polishing chamber inlet pipe 152'" is located in a top center of the polishing chamber front wall 151'" and provides access for an incoming flow of clarified wastewater from the clarification chamber 140". The polishing chamber 150'" also has a back wall 155'" through which an effluent outlet pipe 156'" is located in a top center of the back wall 155'" and permits fully treated wastewater to flow out of the polishing chamber 150'". In general, the polishing chamber outlet pipe 156'" is located at a height that is below the polishing chamber inlet opening 152'" and permits a one way flow of wastewater from the clarification chamber 140" into and out of the polishing chamber 150'" Located in a top wall of the polishing chamber 150''' and above the polishing chamber inlet pipe 152''' is a polishing chamber access opening 109*a*''' and a polishing chamber riser 153*a*''' is sealingly affixed around and extending upwardly away from opening 109*a*''' and is covered by a polishing chamber riser cover 108*a*'''.

The embodiment of the system 100'''' in FIG. 108 is divided into two systems. In order to meet different application treatment requirements, the system is designed in different combinations to meet the different discharge requirements. For example, if a local authority requires a treatment plant to meet regular discharge limits or stringent discharge limits, a system including the first component 80" having the pretreatment, anoxic, aeration and clarification chambers 110", 120", 130", 140" can be applied to meet the discharge limits. If water reuse or a water recycling program is required, the second component 90''' including the polishing chamber 150''' can be added after the clarification chamber. Under such a situation or application, the system can be used as the first treatment step. Some additional polishing processes can be considered after the polishing chamber filtration. For example, chlorination, de-chlorination, de-nitrification, nitrogen/nitrate removal, phosphorus removal, carbon filtration and an ultra-filtration process or a similar process can be applied to enhance the water quality. After the polishing filtration treatment, the water quality meets the requirements for non-potable reuse. The function of the pretreatment chamber 110" is to remove grit, floating material and large suspended particles from domestic wastewater. The wastewater is preconditioned by passing through the pretreatment chamber 110" prior to being introduced to the anoxic chamber 120". The outlet pipe 116" of the pretreatment chamber is equipped with a discharge tee or a baffle that extends vertically into the liquid so that only supernatant is displaced to the anoxic chamber 120". The distance between the inlet 112" and outlet 116" of the pretreatment chamber is designed to be as far apart as possible. This design creates a good settling condition and improves solids removal efficiency.

As described above, the system 100'''' is different from any residential sewage treatment system. Not only does it use an aeration process, but it also uses anoxic and anaerobic processes. The purpose of using the anoxic chamber 120" in the system is to remove nitrate and total nitrogen. In a regular aeration treatment system, ammonia nitrogen is converted into nitrate by nitrifiers under an aerobic condition. A de-nitrification process must be applied to remove nitrate from treated effluent. Since the nitrate removal process (de-nitrification) needs certain organic nutrition, alkalinity and an anoxic condition for de-nitrifiers, this anoxic chamber receives the returned mixture of clarification chamber liquid and settled activated sludge containing nitrate from clarification chamber, and effluent containing certain amounts of organic nutrition from pretreatment chamber. Under the anoxic environment and mixing condition, the incubated de-nitrification bacteria in the anoxic chamber converts nitrate into nitrogen gas. Nitrate and organic matters measured as BOD are partially removed from sewage in the de-nitrification process.

In FIG. 108, the nitrate sources from the effluent are pumped from the bottom of the clarification chamber 140" to the anoxic chamber 120" periodically. A mixing bar 127", which is further shown in and described above in relation to FIG. 5, is installed at the end of a sludge return pipe 128" and located near the bottom of the anoxic chamber 120". The end of the sludge return pipe is connected to a top end of a flexible pipe section 124" and a bottom end of the flexible pipe section 124" is connected to the mixing bar 127". The flexible pipe section 124" permits the mixing bar 127" and the sludge return pipe 128" to be folded so as to be substantially parallel to each other to permit the easy installation of the sludge return pipe 128" and mixing bar 127" assembly in to the anoxic chamber 120". An energy saving concept has been applied to design this system. Specifically, while a submersible sludge return pump 148" (i.e., a recirculation pump) is pumping the mixture of liquid and sludge up a sludge return pipe 147" of the internally installed pipe system 144" and back to the anoxic chamber 120", the current flows through holes (see FIG. 50) on the mixing bar 127". As a result, the settled sludge and liquid in the anoxic chamber 120" are mixed by the current to form a mixed liquor. Mixing also creates a contact condition for de-nitrifiers and pollutants. Since fresh air is prohibited in the anoxic chamber, the mixture presents an anoxic condition that is essential for the de-nitrification process. When the sludge or solids in the anoxic chamber 120" settle down to a certain level, the sludge return pump 148" in the clarification chamber 140" starts its pumping cycle and creates a mixing condition in the anoxic chamber 120". Frequent pumping keeps sludge in a suspension condition in the anoxic chamber. The pumping frequency can be selected based on the strength of the wastewater.

The sludge return pump 148" and the mixing bar 127" play two functions: 1) sending settled aerobic sludge and nitrate from the clarification chamber 140" to the anoxic chamber 120" and, 2) the current mixes the liquid simultaneously. In the de-nitrification process, nitrates from the clarification chamber and nutrition from pretreatment are mixed together, and the de-nitrification process is conducted under this anoxic condition.

Usually, the sludge return pump 148" is turned on from 1 to 10 percent of the system operating time. The pumping duration and frequency are based upon the flow rate of the submersible sludge return pump 148' and the strength of the influent wastewater. The flow rate of the sludge return pump 148" is adjustable for a return flow rate of between 100 to 1,000 percent of system flow rate depending on the organic and hydraulic load.

Because the sludge in the treatment system 100'''' is not allowed to be discarded, all the solids or sludge produced during the treatment period is kept in the system 100''''. If a simple aeration system is operated under this kind of condition, floating sludge or scum is found at the surface of the clarification chamber 140". In other words, the settleability of the aerobic sludge is not good after a certain length of operation. In long term aeration it is easy to cause a sludge expansion problem when dead microorganisms are pushed to the clarification chamber by a slow current in the system. Then, the sludge floats to the water surface of the clarification chamber 140" by tiny bubbles inside of the sludge particles. The floating solids or sludge affects the solids separation process. Some solids flow out of the clarification chamber 140" with effluent and cause high suspended solids in the effluent. Therefore, in order to combat this sludge expansion problem, the present system, alternatively applies an anoxic condition and an aerobic condition to the microorganisms. This improves the settleability of the sludge, and the floating sludge has been dramatically reduced. Therefore, the effluent quality from the clarification chamber is enhanced. The addition of an anoxic chamber not only removes total nitrogen, but also improves the effluent quality in both BOD and SS.

In the system 100'''' of FIG. 108, the denitrified domestic wastewater contains certain amounts of suspended solids, $BOD_5$ and nitrogen pollutants and flows through an elbow at an outlet end of the aeration chamber inlet tube 132" on that and enters the aeration chamber 130'. A low energy consumption air pump 139" is used to inject air into the mixed liquor and the aerobic bio-organisms in the aeration chamber 130" digest and remove organic pollutants, and convert TKN and ammonia to nitrate under the aerobic condition. The aeration process is completed by the air pump 139", which can be located within the aeration chamber riser 133" as shown in FIG. 99 as reference number 139" or externally as shown and described in relation to FIG. 2, a diffusion bar 137" and an air supply pipe 138". The end of the air supply pipe 138' is connected to a top end of a flexible air pipe section 174' and a bottom end of the flexible air pipe section 174' is connected to the diffusion bar 137'. The flexible air pipe section 174' permits the diffusion bar 137' and the air supply pipe 138' to be folded so as to be substantially parallel to each other to permit the easy installation of the air supply pipe 138' and diffusion bar 137' assembly in to the aeration chamber 130'. At least two different sizes of the air pump 139" can be used depending on the desired or required flow rates. For example, with the larger air pump 139" the system 100' can process at about a 600 gallons per day flow rate and with the smaller air pump 139", it can process at about a 330 gallons per day flow rate. In addition, although the air pump 139" is shown inside of riser 133", it also can be located outside of the riser and up to 75 feet away. The diffusion bar 137" is made from plastic pipe and tiny holes are distributed along the length of the pipe. Air bubbles released from the diffusion bar 137" are injected into the wastewater and mix and aerate the mixed liquor. In this and subsequent embodiments, the diffusion bar 137", the general design of which can be seen, generally, in FIG. 8, but that includes additional holes to increase the number of bubbles produced to aid in the aeration process. Activated sludge that is constructed by biomass plays a key role to treat domestic wastewater in the aeration chamber. An overflow level detector 95" is connected to the air supply pipe 138" adjacent aeration chamber access opening **105*a"***.

After the aeration process in the aeration chamber 130", although the pollutants in the domestic wastewater are reduced to a low level, the activated sludge needs to be separated from mixed liquor before entering the polishing chamber 150'" for final treatment and discharge. The clarification chamber 140" is used to remove the solids from the treated wastewater. The mixed liquor flows through the opening 136" at the bottom of the wall that is constructed between the aeration chamber 130" and the clarification chamber 140". This small opening regulates flow from the aeration chamber 130" to the clarification chamber 140". Solids in the treated wastewater are separated from the liquid and settle down to the bottom of the clarification chamber 140" and form a sludge layer or pile. The sludge return pump 148" that is installed at the bottom of the clarification chamber 140" pumps settled activated sludge and liquid from the clarification chamber 140" through a check valve 170" and a pipe system 147" to the mixing bar 127" in the anoxic chamber 120" to be mixed with the wastewater and further treated in the anoxic chamber 120". Because the hydraulic detention time of the clarification chamber is more than 4 hours during a peak flow period, the accumulated sludge separated in the clarification chamber is gradually turned into an anoxic condition before entering the anoxic chamber 120". After returning to the anoxic chamber 120", the de-nitrification bacteria in the returned sludge are mixed with the existing sludge in the anoxic chamber 120". The de-nitrifiers in the sludge start to be active to digest nitrate and organics. Similar to the air pump, the sludge pump 148" also can be provided in more than one size, for example, a large pump for high flow rates and a small pump for low flow rates.

In order to improve the solids removal efficiency, a flow equalization apparatus 149" is installed on an inlet end of the outlet pipe 146" of the clarification chamber 140". At least one flow equalization port regulates the peak flow from the clarification chamber 140' to the polishing chamber 150'" and improves solids removal efficiency. The purpose of using this flow equalization apparatus 149" is to average the effluent flow rate and enhance settling efficiency. This system was experimentally tested for a 6 month period with the influent waste water being heated to a temperature of 11° C.+/−1° C., when necessary, to ensure a minimum temperature of 10° C. without discarding any sludge. Sometimes, small amounts of sludge turned into light weight sludge that cannot be removed by the settling process. The sludge usually floats from the bottom of the chamber to the water surface in the clarification chamber 140". To separate floating sludge and supernatant, an outer housing is structured at the outside of the flow equalization port to keep floating solids away from effluent flow. At least one overflow port is located above the at least one flow equalization port. If the at least one flow equalization port is plugged, treated wastewater flows to the polishing chamber 150' through the at least one overflow port. Usually, the at least one flow equalization port is not plugged by solids easily. If sludge accumulates inside the flow equalization port and plugs the flow, the water level in the clarification chamber 140" will be raised to achieve the water level at the at least one overflow port. During the water level elevating time, the plugged at least one flow equalization port will be self-cleaned under the pressure of the water. If the plugged flow equalization port cannot be cleaned, the at least one overflow port allows liquid to flow into the polishing chamber 150'". The diameter of the at least one flow equalization port varies from 0.25 to 0.5 inches. Additional details on embodiments of the flow equalization apparatus 149" are shown in and described in relation to FIGS. 11-14, 31, 32 and 59-65.

In FIG. 108, the polishing chamber 150'" consists of an influent well 154'" and an effluent well 158'" separated by a central wall 157'", all located transversely across the polishing chamber 150'" with a filtration bed 159'" horizontally located in and dividing the effluent well 158'" of the polishing chamber 150'" into upper and lower sections **158*a*'", 158*b*". The effluent from the clarification chamber 140" flows into the influent well 154'" of the polishing chamber 150'". The flow is then distributed to the effluent well 158'" through an opening 164'" located at and formed through a bottom center of the central wall 167'" and moves up through the filtration bed 159'" where the treated wastewater passes through a filtration bed base 162'" and a filtration media 163'"** to perform a coarse filtration function. The biomass accumulated inside of the filtration material performs three functions: 1) further settling, 2) filtering, and 3) polishing treatment. The filter removes suspended solids (SS), BOD and total nitrogen from the clarification chamber effluent. The anoxic condition inside of the settled sludge and filtration beds allows de-nitrification bacteria to grow and remove certain amounts of nitrate.

The filtrate from the two filtration beds 159'" is collected from two submerged holes and directed to the effluent well 158'", in which, a finishing treatment system 160'", such as shown in FIG. 2 as the finishing treatment system 160, can be installed to perform a final treatment on the effluent water before being discharged from the polishing chamber 150'".

For example, the finishing treatment system 160''' can include, but is not limited to, an UV assembly, a chlorination system, a de-chlorination system, a phosphorus removal system, a heavy metal removal system, a nitrogen/nitrate removal system and any combination of the above and is installed for disinfecting of the effluent from the filter. Because the filter is designed and structured very well and the filtrate is clear and contains less BOD and SS, disinfection performance of the UV assembly is excellent.

Several different types of material can be used as the filtration media for the system 100' of FIG. 108. For example, gravel, ceramic, closed cell Styrofoam, natural, synthetic, rubber and plastic materials in certain sizes can be used as the filtration media 163''' in the filter. Specifically, the diameter of the filtration media 163''' varies from 0.5 to 5 inches. Because coarse filtration media 163''' and a thin filtration bed are used in this design, it is easy to clean the filtration media during maintenance services. After the liquid in the filter is pumped out though the influent well 154''', an operator can rinse the filtration media 163''' with a garden hose, the sloughed biofilm is washed down to the bottom of the filter and flows along the slope to the influent well with accumulated sludge. A service pump pumps all the solids out of the filter. The filter cleaning process can be completed easily.

The wastewater treatment system tank of FIG. 108 can be constructed using concrete and/or a molded plastic, as will be seen and described in subsequent figures and paragraphs herein.

Figure 109:
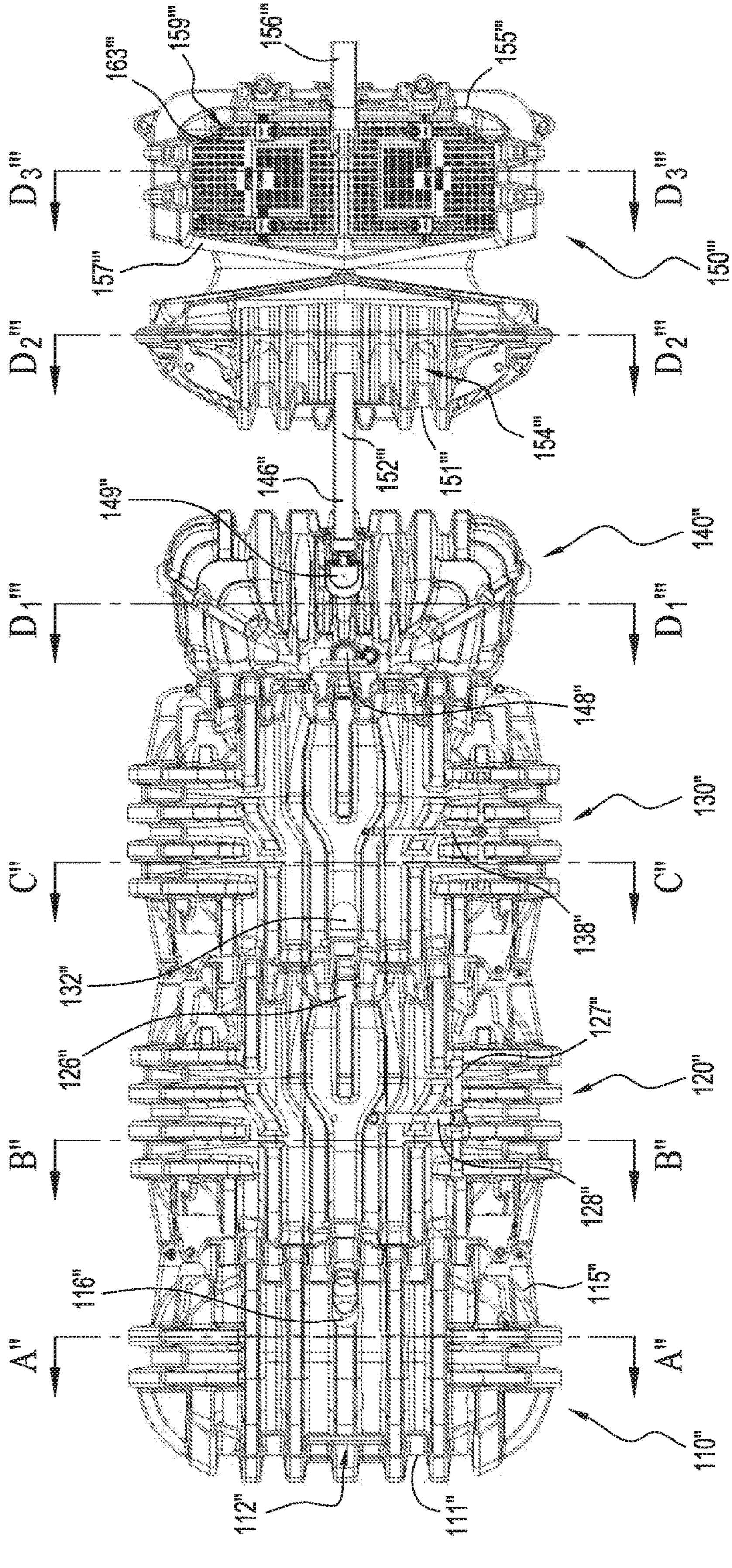
FIG. 109 is a partially exposed, top view of a wastewater treatment system tank with a pretreatment chamber, an anoxic chamber, an aeration chamber, a clarification chamber and a polishing chamber, in accordance with one or more embodiments of the disclosed subject matter.

FIG. 109 is a partially exposed, top view of the wastewater treatment system tank of FIG. 108, in accordance with one or more embodiments of the disclosed subject matter. In FIG. 109, the positions of the access openings 101", **103*a*", 103*b*", 105*a*", 105*b*", 107" in the top wall 71" of the first component 80" are shown in dashed line. In addition, the internally installed pipe system 144" of the sludge return system extend from beneath the clarification chamber access opening 107" back toward the anoxic chamber 120". Specifically, a first cross piece 214" is seen extending out of the clarification chamber 140" through the clarification chamber front wall 141" into and across the aeration chamber 130" to connect with a first end of the air-tight sealed coupling/connector tube 171" that extends through the aeration chamber front wall 131" and into the anoxic chamber 120" and is connected to a first end of a first elbow 216". A second end of the first elbow 216" is connected to a first end of a return piece 210", which connects to the mixing bar 127" via the mixing bar riser tube 128". An air pump 139" is connected to a first pipe section 224", which to a first end of a diffuser bar return piece 220", which connects to the diffuser bar 137" the diffuser bar riser 138". Although, in FIG. 109, the pipe components of the sludge return system are connected on one end to the sludge return pump 148", extend up toward a top of the clarification chamber 140" then bend toward a side wall to form an orthogonal angle with the first cross piece 214", the pipe can alternatively be configured to bend and extend toward the back wall 145" of the clarification chamber 140" at a substantially orthogonal angle to the sludge return pipe 147" to form a "U"-shaped loop 175' with the first cross piece 214" (see FIG. 69** for the alternative design.)

In FIG. 109, the internal structure of the polishing chamber is more clearly illustrated. For example, inlet pipe 152''' is seen attached to the front wall 151''' of the polishing chamber 150''' and in fluid communication with an influent well 154". Adjacent to the influent well 154''' is an effluent well 158''' in which the filtration bed base 162''' is located.

Figure 110:
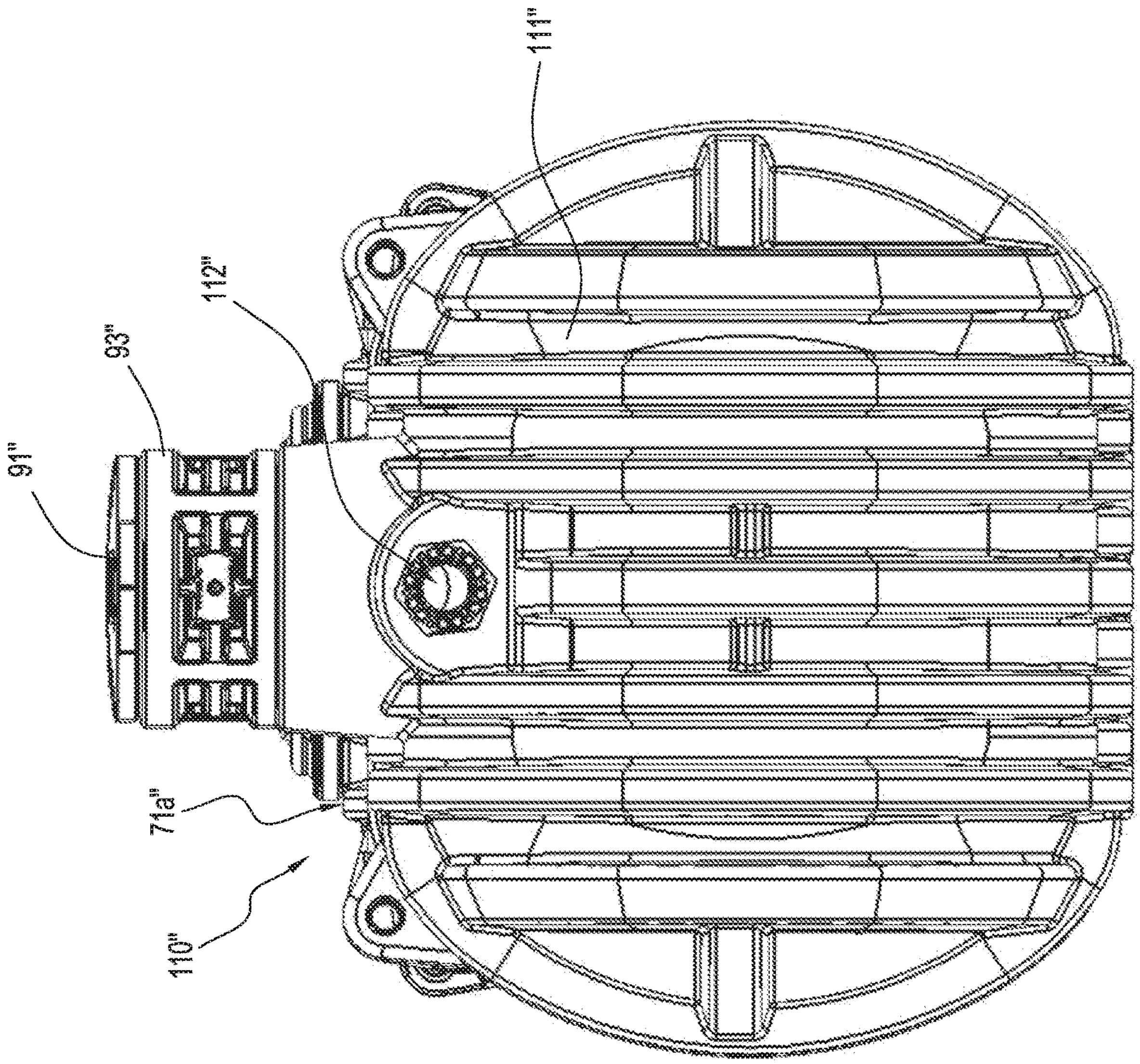
FIG. 110 is a front view of the pretreatment chamber in FIGS. 108 and 109, in accordance with one or more embodiments of the disclosed subject matter.

FIG. 110 is a front view of the pretreatment chamber 100"" in FIGS. 68 and 69, in accordance with one or more embodiments of the disclosed subject matter. In FIG. 110, the pretreatment chamber inlet opening 112" is seen in the upper left corner of the front wall 111" of the pretreatment chamber 110'''.

Figure 111:
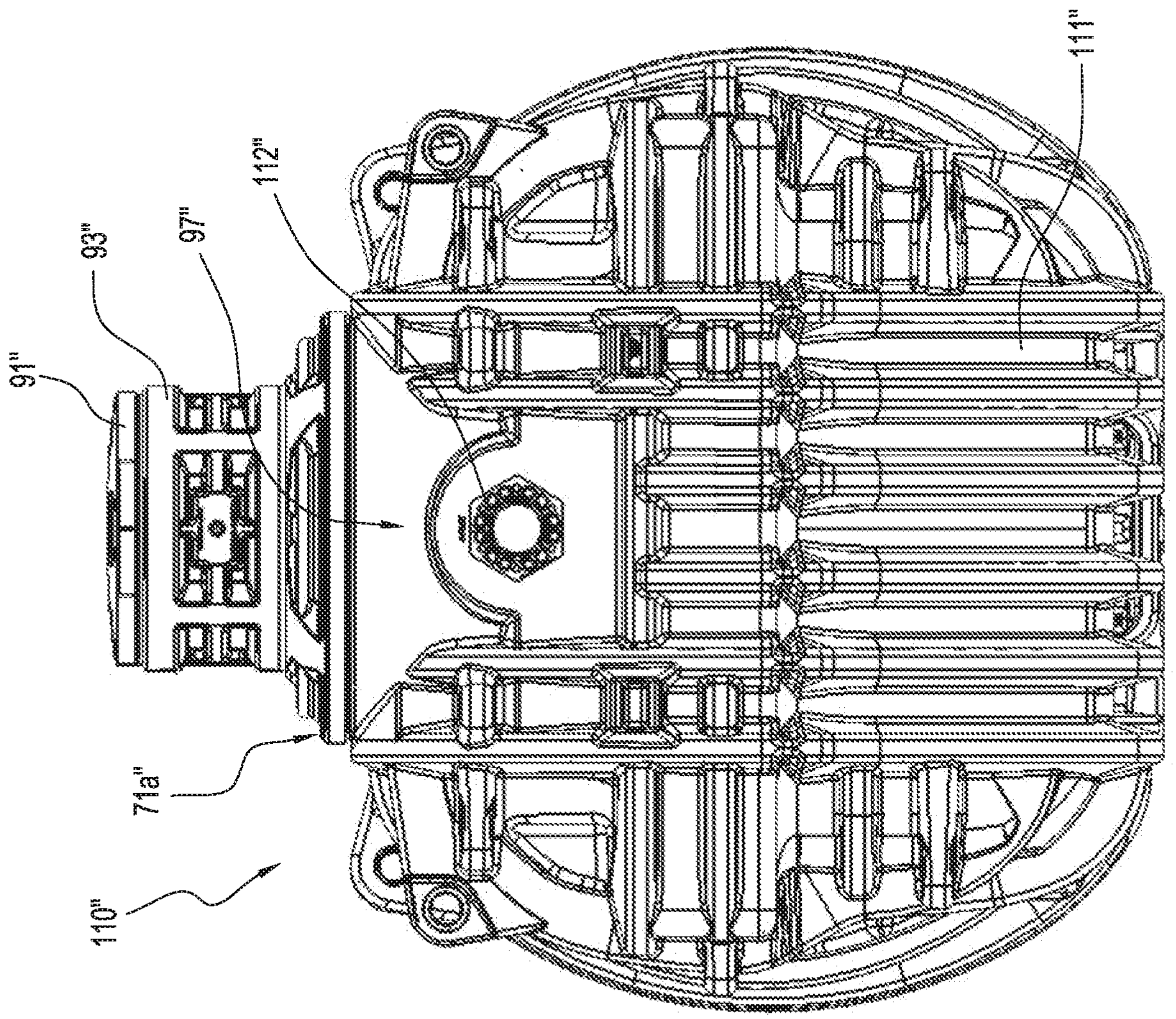

FIG. 111 is a lateral cross-sectional view along line A"-A" of the pretreatment chamber 110" in FIG. 69, in accordance with one or more embodiments of the disclosed subject matter. In FIG. 71, the pretreatment chamber 110" inlet pipe 112" is shown in the upper right corner of the pretreatment chamber front wall 111".

Figure 112:
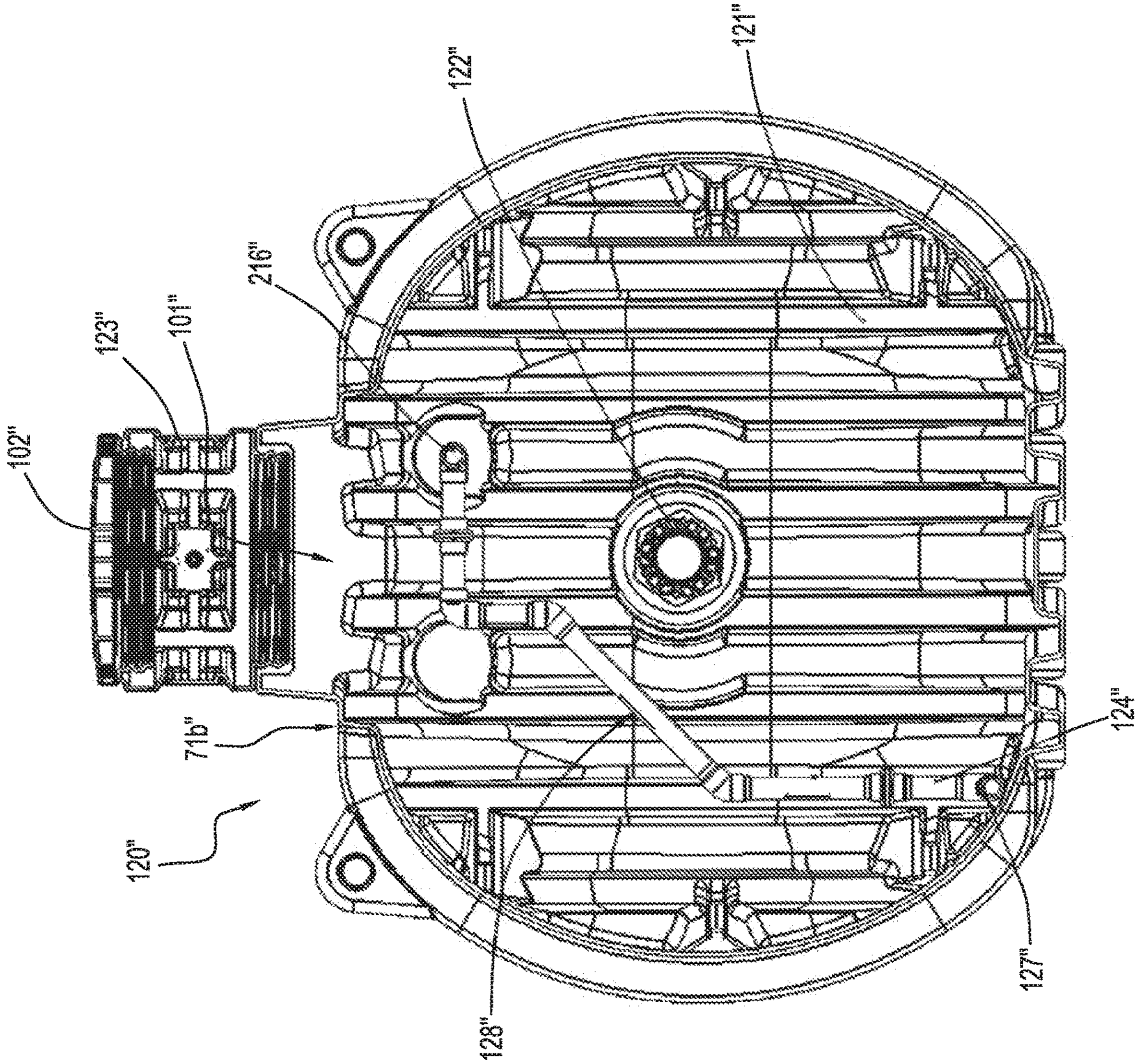

FIG. 112 is a lateral cross-sectional view along line B"-B" of the anoxic chamber 120" in FIG. 109, in accordance with one or more embodiments of the disclosed subject matter. In FIG. 112, the inlet pipe 122" is seen in the upper left corner of the anoxic chamber 120" front wall 121" and a top end of the sludge return piping 128" is connected to connection joint 216" and a bottom end of the sludge return piping 128" is connected to the diffuser bar 127" near the bottom of the anoxic chamber 120".

Figure 113:
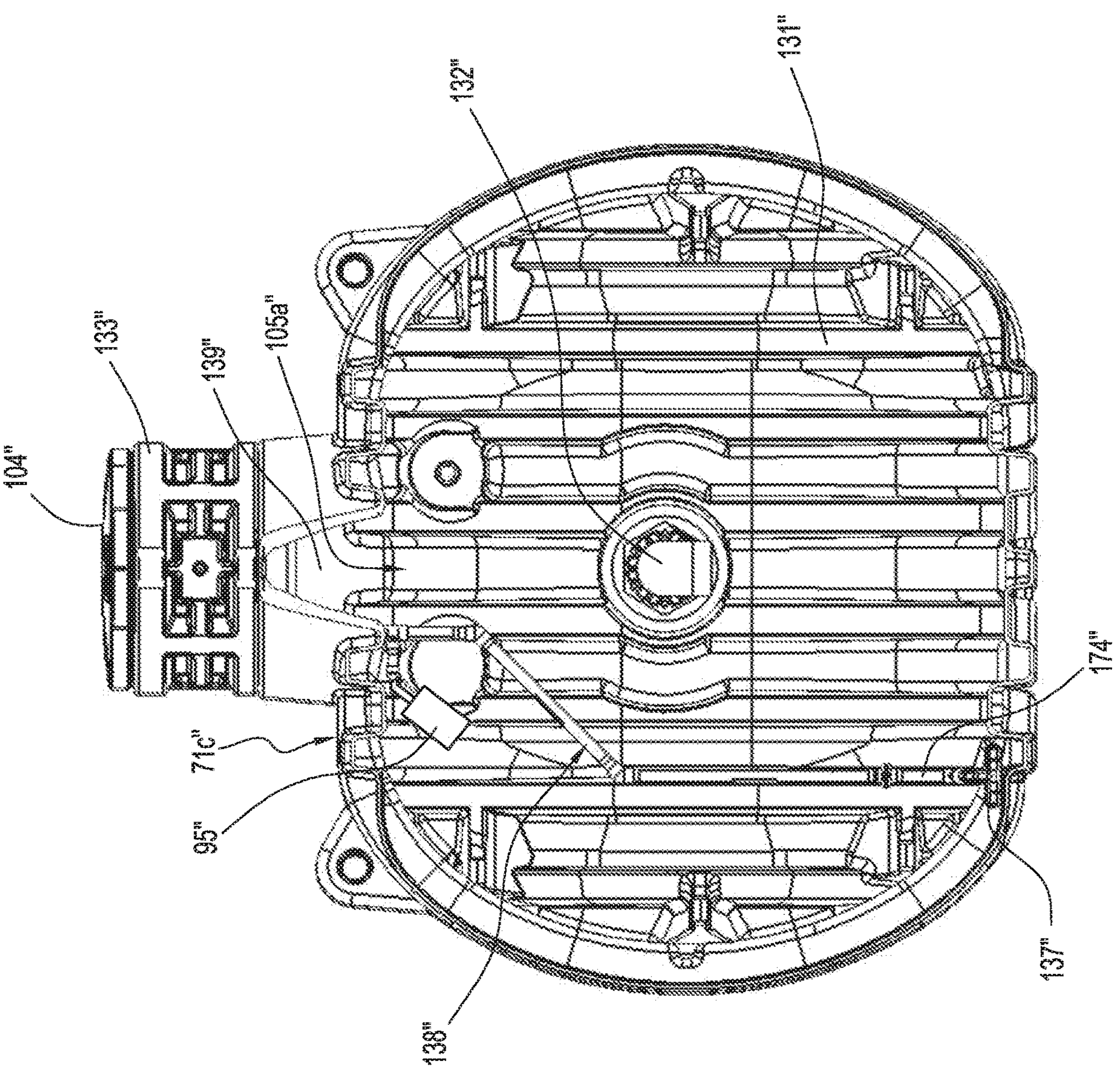
Figure 114:
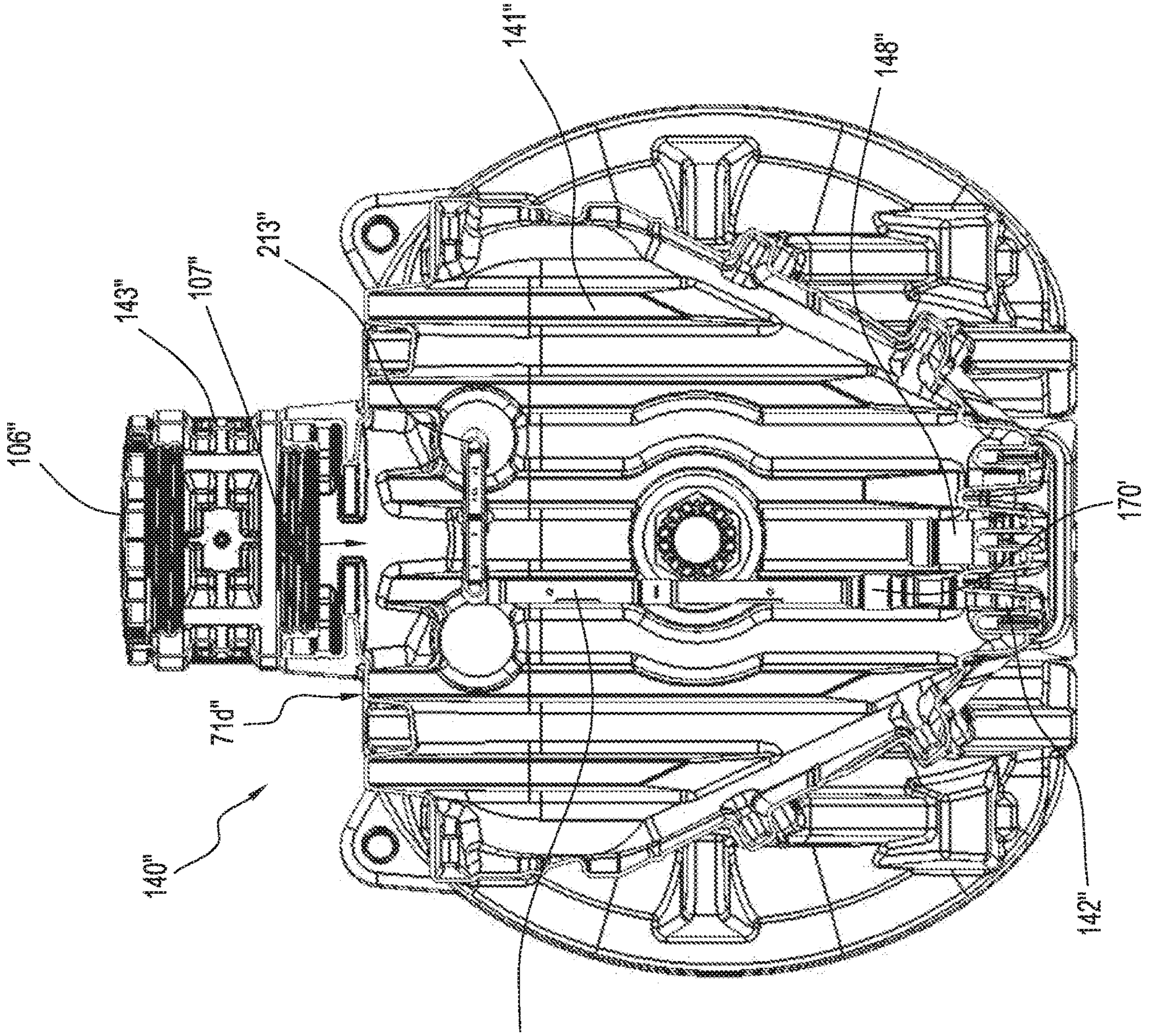

FIG. 113 is a lateral cross-sectional view along line C"-C" of the aerobic chamber 130" in FIG. 109, in accordance with one or more embodiments of the disclosed subject matter. In FIG. 113, the aeration chamber inlet opening 132" is seen at the adjacent an upper right corner of the front wall 131" of the aeration chamber 130". The air-tight sealed coupling/connector 171" is seen in the front wall 131" just below the right side of the riser 133" and, during operation of the system 100"", prevents fresh air brought in by the air pump 139" and the air valve 134" the aeration chamber 130" from passing from the aeration chamber 130" into the anoxic chamber 120". The outlet opening 136" is located at the bottom of the back wall 135" of the aeration chamber 130", which is best seen in FIG. 114, is rectangular in shape with dimension of about 18 inches wide by about 6 inches high on the aeration chamber side and tapers down on all four sides to an opening in the clarification chamber front wall 141" of the about 16 inches wide and about 4 inches high. FIG. 114 is a lateral cross-sectional view along line $D_1$"-$D_1$" of the clarification chamber 140" in FIG. 69, in accordance with one or more embodiments of the disclosed subject matter. In FIG. 114, the clarification chamber 140" inlet opening 142" is shown at the bottom center of the front wall 141" of the clarification chamber 140" behind the sludge return pump 148". The sludge return piping element 214" is seen passing through the clarification chamber front wall 141" just below the right side of the riser 143", which extends through the front wall 141" into and through the aeration chamber 130" and connects to the air-tight sealed coupling/connector 171" in the front wall 131" of the aeration chamber 130".

Figure 115:
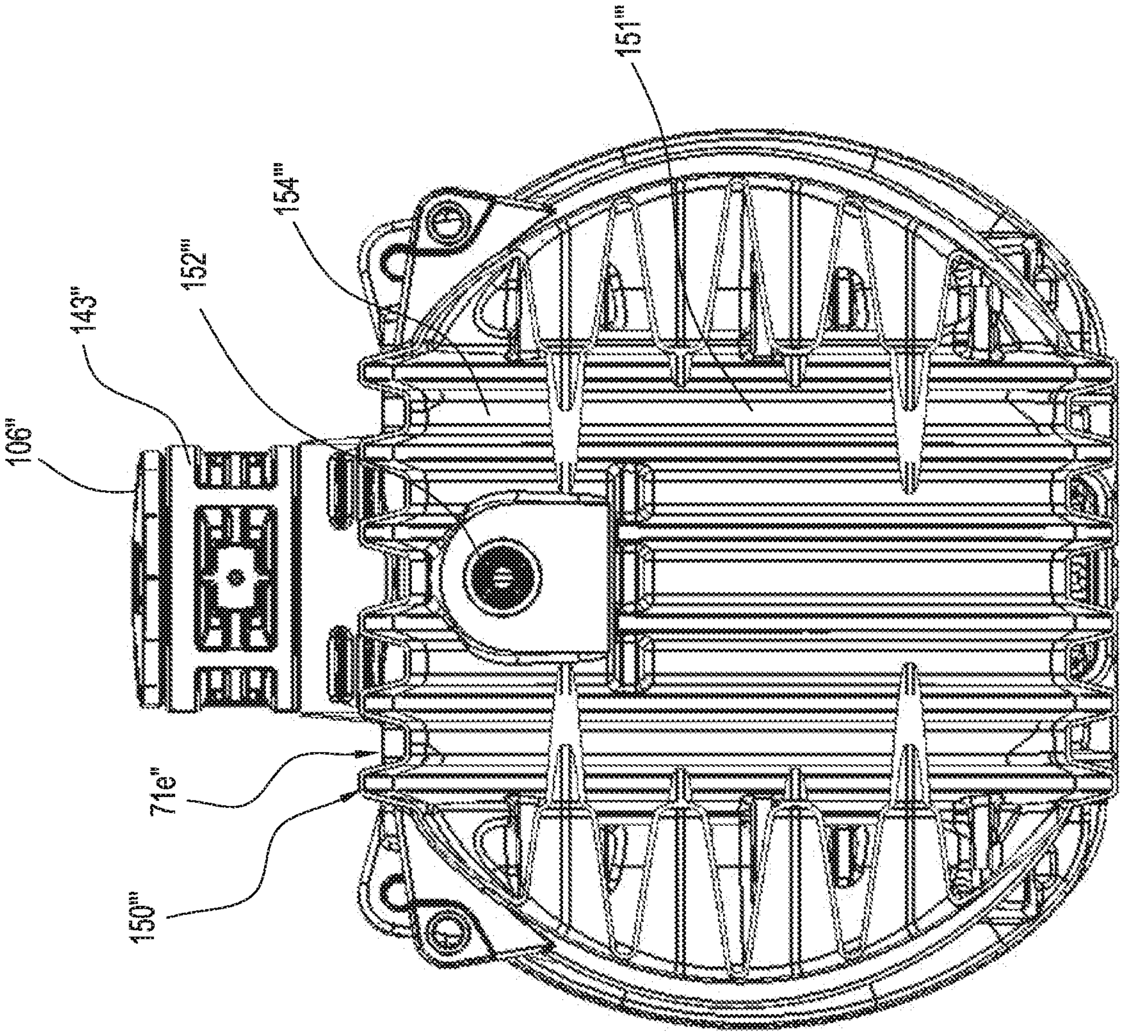

FIG. 115 is a lateral cross-sectional view along line $D_2$'''-$D_2$''' of the polishing chamber 150''' in FIG. 109, in accordance with one or more embodiments of the disclosed subject matter. In FIG. 115, the influent well inlet opening 152''' is shown in an upper middle portion of the front wall 151''' and below the first frustoconical access opening **109*a*''' of the polishing chamber 150'''**.

Figure 116:
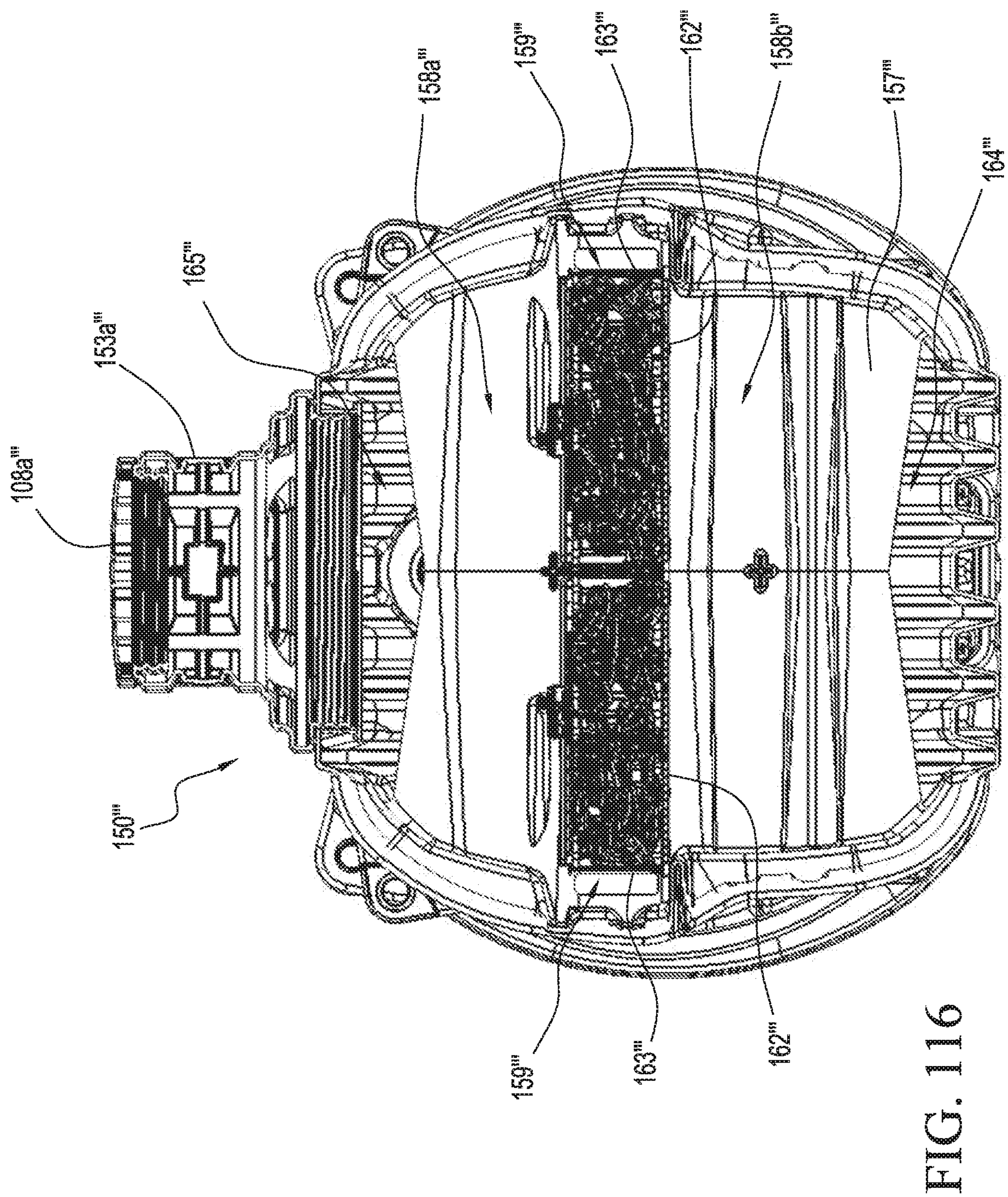

FIG. 116 is a lateral cross-sectional view along line $D_3$'''-$D_3$''' of the polishing chamber 150" in FIG. 109, in accordance with one or more embodiments of the disclosed subject matter. In FIG. 116, the effluent well inlet opening 164''' is shown in and extending through the central wall 157''' adjacent the bottom of the effluent well **158*b*''' to be in fluid communication with and receive flow from the influent well 154'''. The overflow opening 165''' is shown substantially directly above the inlet opening 164''' in and extending through a top center section of the central wall 157''' to be in fluid communication with and send overflow water back into the influent well 154''' in overflow conditions. As seen in FIG. 116, there are two separate filtration beds 159''' positioned side-by-side in about a middle of the effluent well 158'' and through which the cleaned wastewater passes up and through for its final, or almost final, treatment before being discharged from the polishing chamber 150'''. Optionally, if the finishing treatment system 160'** is installed, it may be used to further treat the about to be discharged treated wastewater.

The details of the system 100 shown and described in relation to FIGS. 4-20 are also applicable to the present system 100'''' of FIGS. 108-116 and subsequent other embodiments described below, but are not repeated separately here or below.

Figure 117:
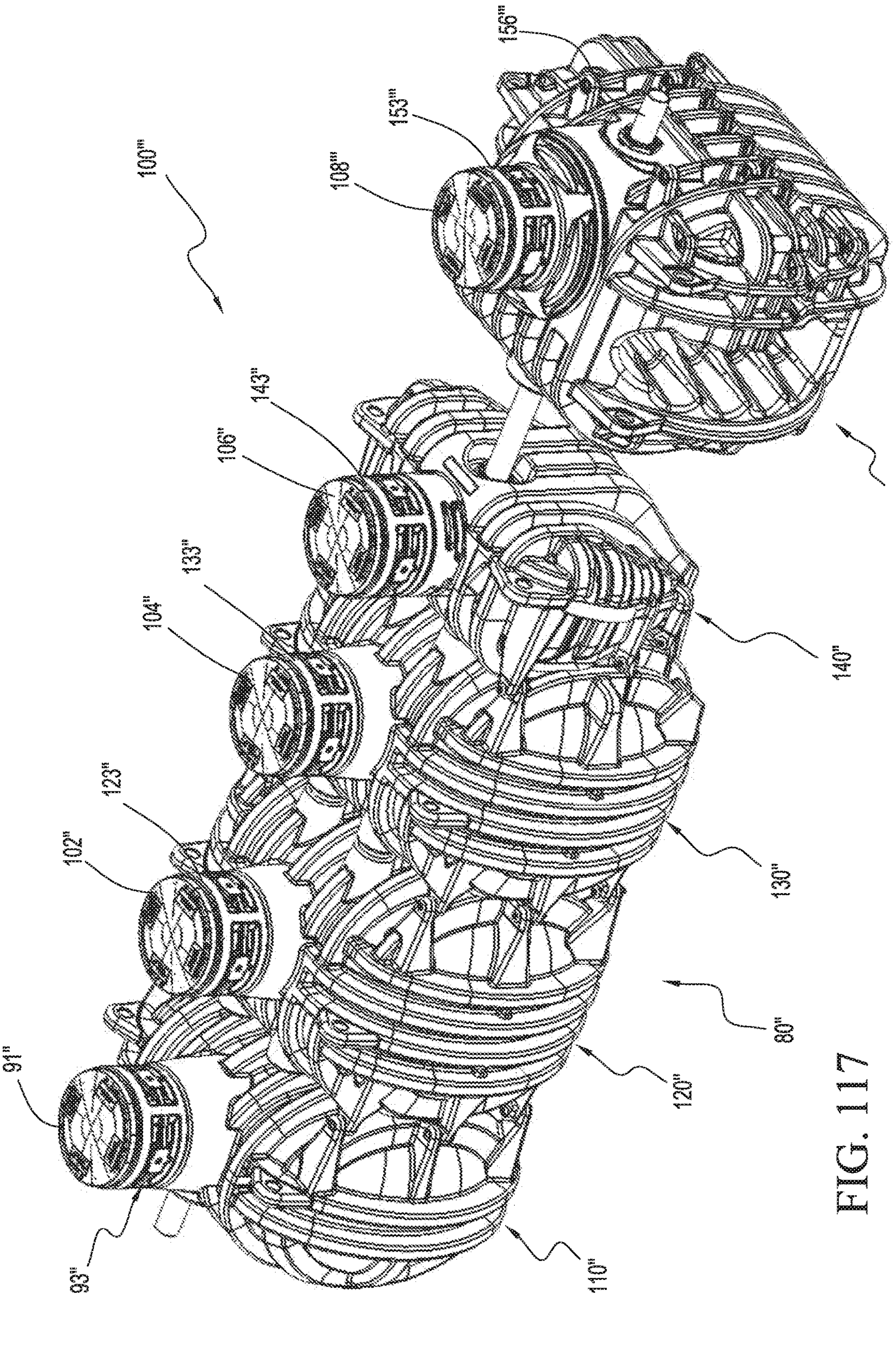

FIG. 117 is atop right, rear perspective view of the system 100'''' in FIGS. 108 and 109, in accordance with one or more embodiments of the disclosed subject matter.

Figure 118:
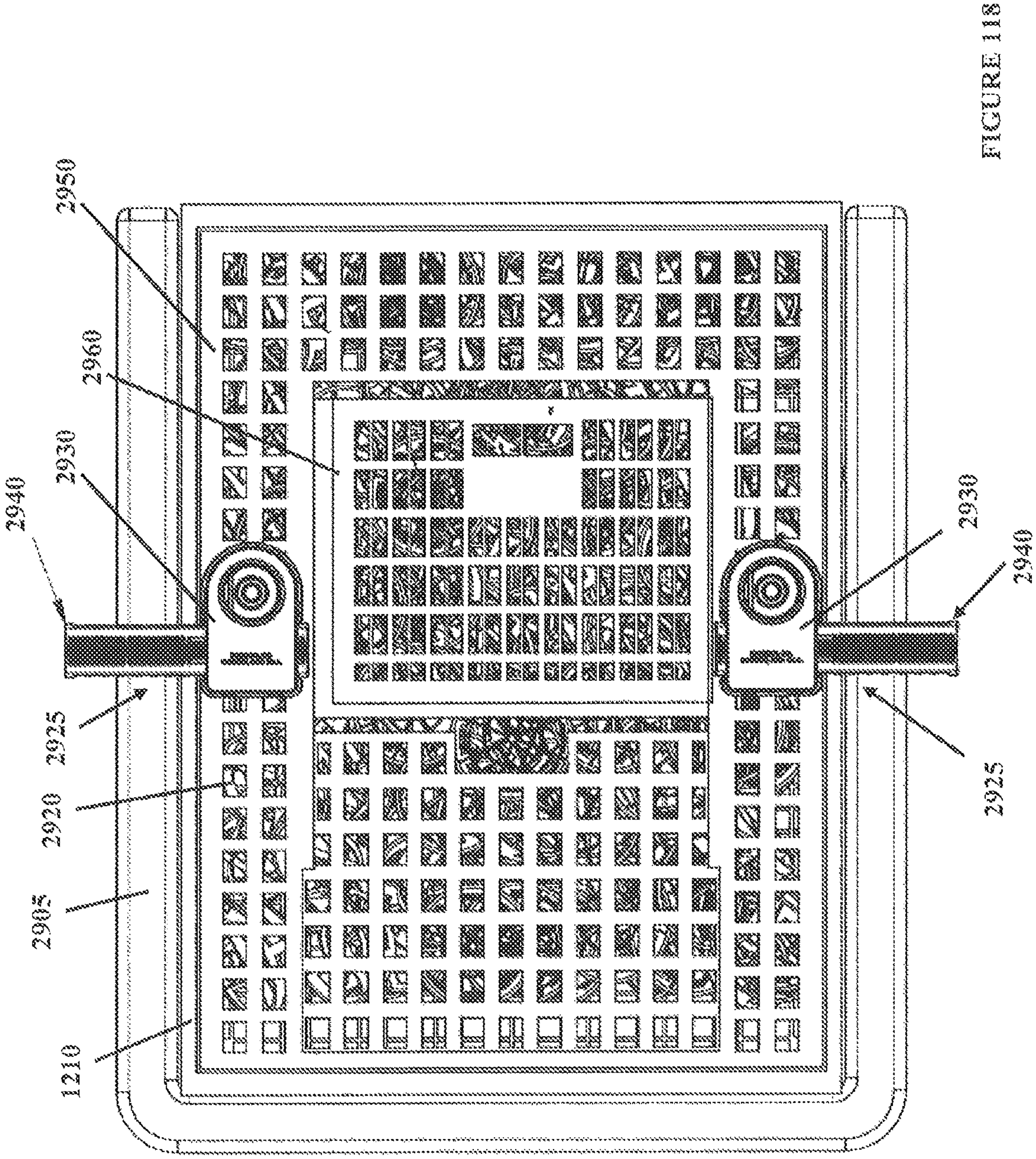

FIG. 118 is a top view of a bio-film reactor element positioned in a reactor baffle, in accordance with one or more embodiments of the disclosed subject matter. In FIG. 118, a reactor element 1210 is surrounded on three sides and held in place by a reactor baffle 2905 to prevent unfiltered waste water from traveling around rather than passing through the reactor element 1210. The reactor baffle 2905 is not necessarily needed in all embodiments of the disclosed subject matter and it is shown here to illustrate one exemplary embodiment. The reactor element 1210 features an enclosure and internal media 2920 that optimize both the surface area for beneficial bacteria bio-film growth and open area for fluid flow. The reactor elements can be wrapped by the special reactor baffle 2905 to fill any gaps around the reactor, thus further aiding in preventing the fluid from bypassing or short-circuiting the reactor. The reactor baffle 2905 allows flow through and also offers additional surface area for bio-film growth, but the open area is not as large as in the media chamber of the reactor. As a result, this causes the fluid to travel in an optimal path through the media under ideal conditions, while offering a protection in the event the main media is not serviced sufficiently. The reactor elements and reactor baffles are made of materials that do not corrode when exposed to normal sewer gases expected in a domestic wastewater treatment system.

In FIG. 118, a locking mechanism 2925 is positioned on opposite sides of a top side 2950 of the reactor element and each is used to restrain the reactor element 1210 at the ideal location by a slide lock slide mechanism 2940 that can be extended horizontally into respective receiving recesses integrated in to walls of the polishing chambers 150, 150', 150'' on opposite sides of the second chamber by a stationary slide lock portion 2930. Active bio-films can create and trap gases that can cause unrestrained reactors to float. The locking mechanisms are operable from grade using the access opening in the top of the tank. The extendable slide lock slide mechanism 2940 of the locking mechanism 2925 is limited in its travel to prevent it from falling out of the stationary portion during operation. The extending slide lock slide mechanism 2940 is held in the proper extension position by use of indexing arched recesses and a friction bump on the sliding portion and the stationary portion, respectively. The clearances between moving parts are optimal for working in environments with debris-laden water. The locking mechanisms are made of materials that do not corrode when exposed to normal sewer gases expected in a domestic wastewater treatment system.

In FIG. 118, an openable (e.g., hinged, slidable, removable, etc.) top side door 2960 is positioned over an opening formed in the top side 2950 to permit access to an inside of the reactor element 1210. Each reactor element 1210 acts to improve the quality of the wastewater effluent by performing a variety of functions. Working in conjunction with the geometry of the surrounding tankage, wastewater is forced passively (by gravity) to flow through the two chamber settling tank to temper and direct the flow. The reactor element 1210 offers substantial surface area for bio-film growth. The result is a combination of gravitational solids settling, bacterial treatment of waste products and filtration before discharge. The reactor element 1210 has the added benefit of blocking any mass exodus of solids to the disposal system which could be caused by any number of treatment system failures or overloads.

Figure 119:
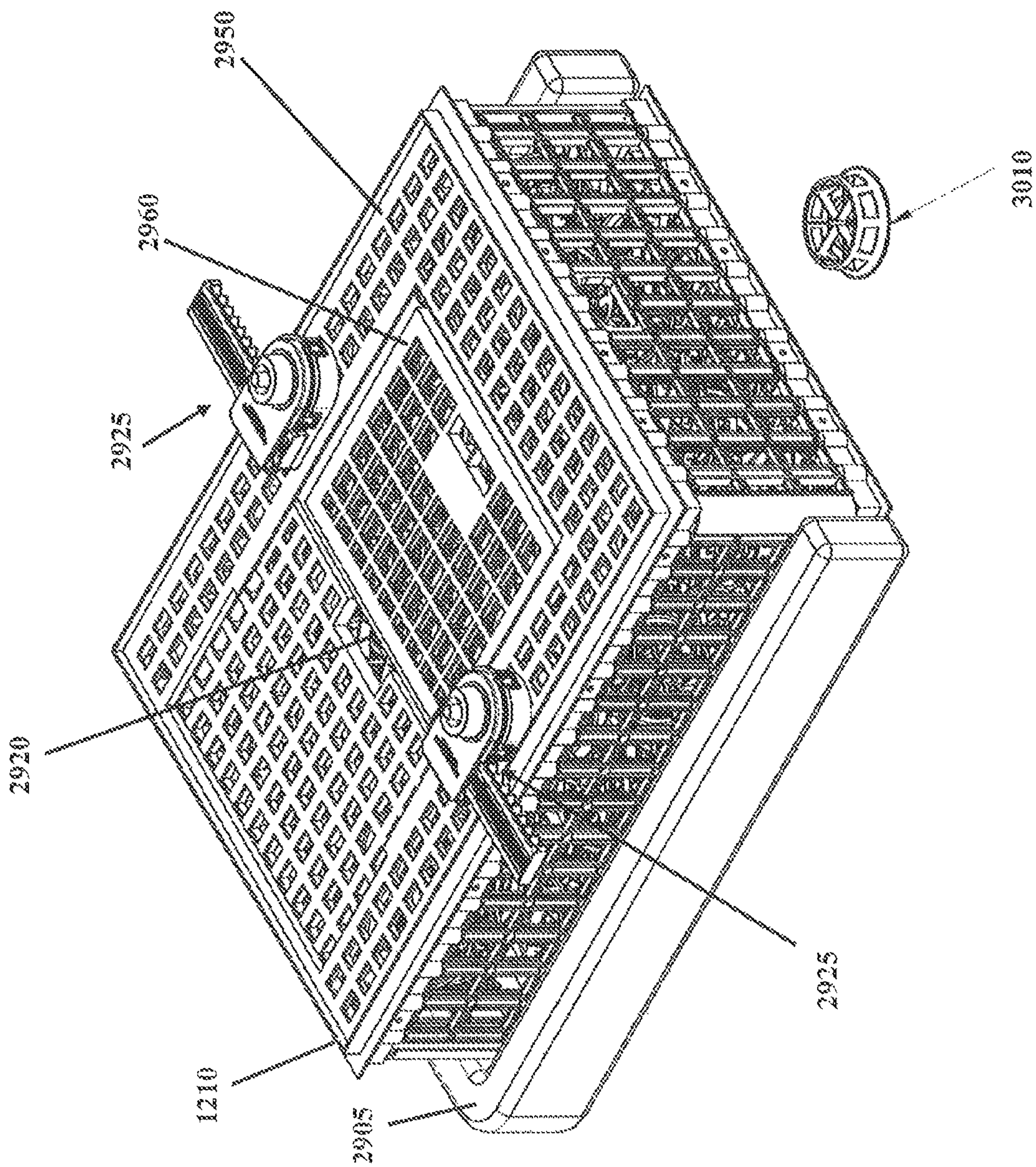

FIG. 119 is an isometric view of the bio-film reactor element and reactor baffle of FIG. 118 with an example of an attached growth media that are contained in the bio-film reactor, in accordance with one or more embodiments of the disclosed subject matter. In FIG. 30, a media 3010 is seen to have an open, conical disk-shaped design and configuration with internal cross pieces and a circular shape. In addition, the media can include substantially rectangular windows formed in the side of the conical disk. While the media element 3010 shown is an attached growth media 3010, other media can also be used.

Figure 120:
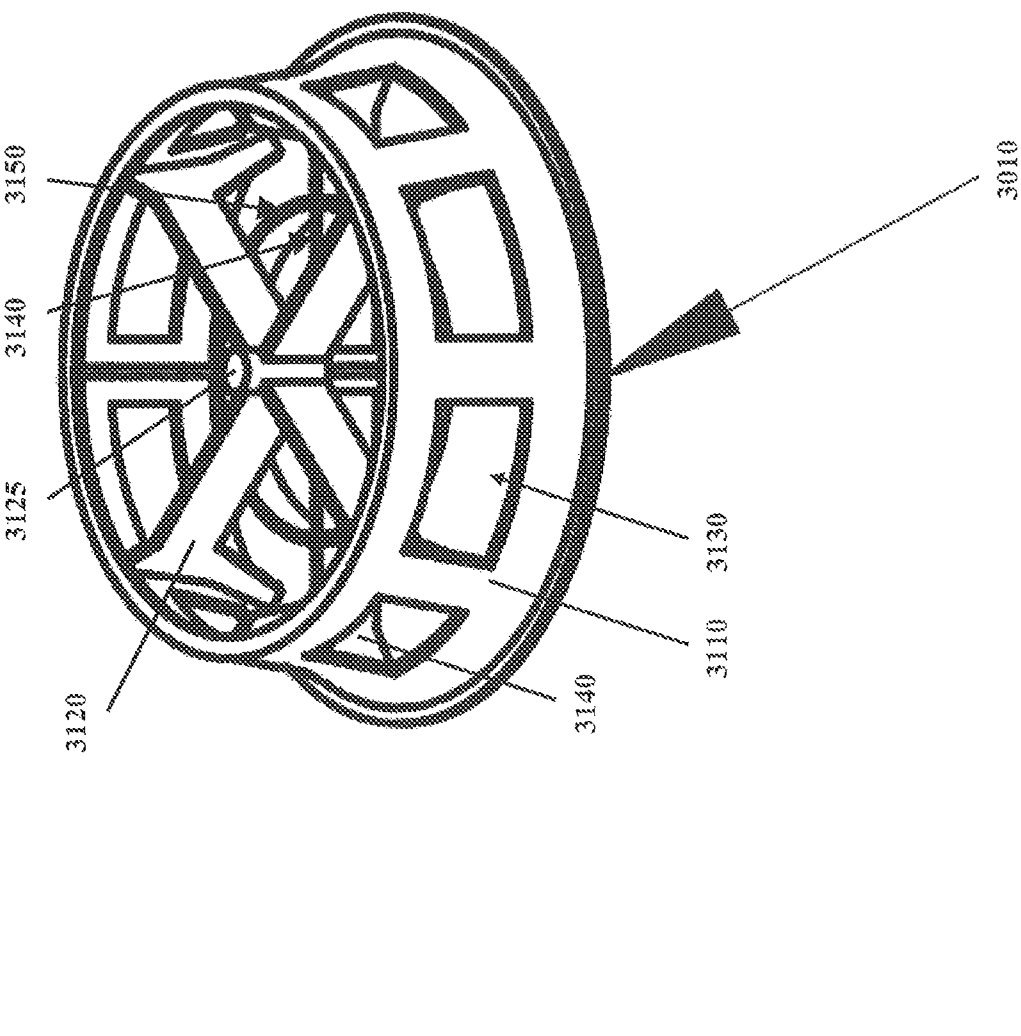

FIG. 120 is a close-up, isometric view of an exemplary media unit or a media member or a media material or a media segment or a media piece, or an attached growth media (hereinafter all referred to as "attached growth media) of FIG. 118, in accordance with one or more embodiments of the disclosed subject matter. In FIG. 120, the media element 3010 has an open, conical disk-shaped body 3110 with a top internal "X"-shaped cross piece 3120 connected in a center of the X"-shaped cross piece to a central post 3125 that has a height substantially equal to a height of the disk-shaped body 3110. Below the top internal "X"-shaped cross piece 3120 is a bottom internal "X"-shaped cross piece 3140 that is also connected to the central post 3125, but is offset from the top internal "X"-shaped cross piece 3120 by about 45 degrees and a circular ring 3150 having a diameter about one half of the disk-shaped body 3110 is centered around the central post and connected to the bottom internal "X"-shaped cross piece. In addition, the media element 3010 can include substantially rectangular windows 3130 formed in the side of the conical disk 3110. The combination of structural elements permits the easy passage of waste water while also providing significant surface area for the growth of bio-film. While the unique design of the media element 3010 is described herein, any suitable attached growth media can and is contemplated to be used in the bio-film reactor element 1210. For example, the media elements 3010 can include, but are not limited to, other plastic, wooden, ceramic, stone elements that can be fitted into the bio-film reactor element 1210 and permit similar fluid flow and bio-film growth.

Figure 121:
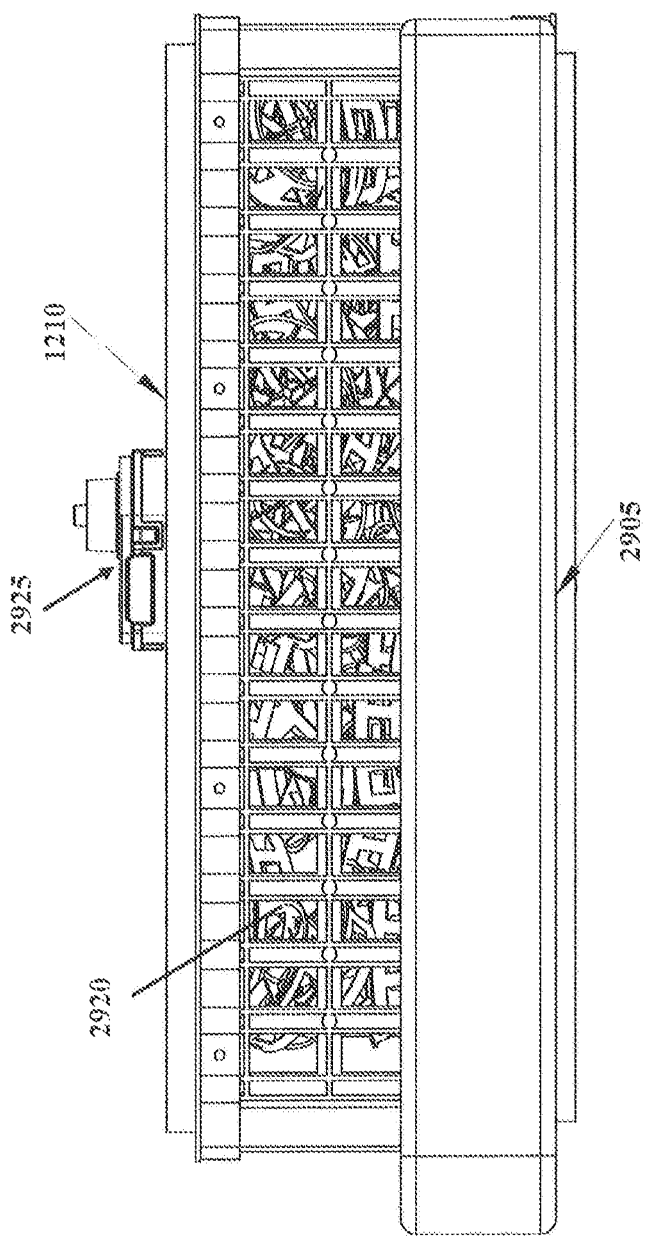

FIG. 121 is a side view of the bio-film reactor element and reactor baffle of FIG. 118 with an example of an attached growth media that are contained in the reactor element, in accordance with one or more embodiments of the disclosed subject matter.

Figure 122:
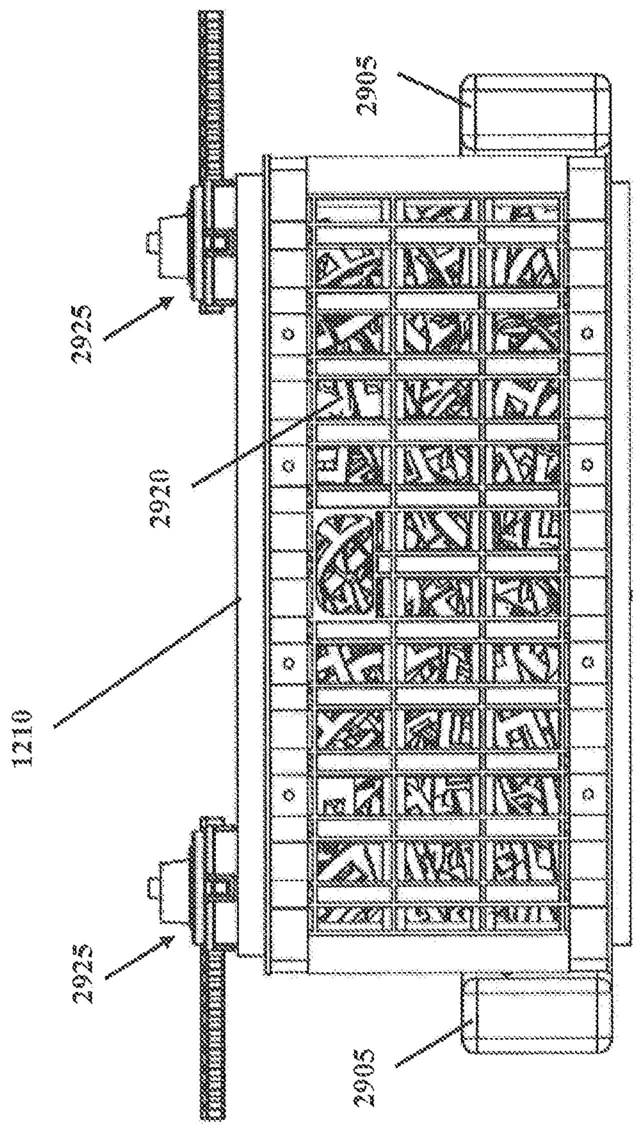

FIG. 122 is an open end view of the bio-film reactor element and reactor baffle of FIG. 118 with an example of an attached growth media that are contained in the reactor element, in accordance with one or more embodiments of the disclosed subject matter.

FIG. 123 is a side view of a slide lock assembly for a bio-film reactor element, in accordance with one or more embodiments of the disclosed subject matter. In FIG. 123, the locking mechanism 2925 slide lock slide mechanism 2940 that extends horizontally into respective receiving recesses integrated in to walls of the polishing chambers 150, 150', 150" is controlled by a manual slide lock gear 3410 which engages a set of indexing arched recesses 3460 on both longitudinal sides of the slide lock slide mechanism 2940. The locking mechanism 2925 is operable from grade using the respective access openings in the tops of the polishing chambers 150, 150', 150". The extendable slide lock slide mechanism 2940 of the locking mechanism 2925 is limited in its travel to prevent it from falling out of the stationary portion during operation. The extending slide lock slide mechanism 2940 is held in the proper extension position by use of the indexing arched recesses 3460 and a friction boss 3470 on the slide lock slide mechanism 2940 and the stationary slide lock portion 2930, respectively. The clearances between moving parts are optimal for working in environments with debris-laden water. The locking mechanisms are made of materials that do not corrode when exposed to normal sewer gases expected in a domestic wastewater treatment system. The slide lock portion 2930 includes a slide lock cap 3431 which is removeably attached to a slide lock base 3434 by multiple, open flexible detents 3432 extending downwardly from edges of the slide lock cap 3431 to cooperate with reciprocally shaped clips 3433 on sides of the slide lock base 3434. On a bottom of the slide lock base 3434 are multiple, downwardly depending protrusions 3430 that can be positioned in an open section in the top side 2950 of the reactor element 1210 to restrict movement of the slide lock portion 2930. In addition, two pairs of offset and facing clip elements 3420, 3440 with flanges 3421, 3441 at their bottoms that are designed to fit through the open sections in the top side 2950 of the reactor element 1210 and clip on to the top side 2950 of the reactor element 1210 and securely hold each locking mechanism 2925 in place.

FIG. 124 is an end view of the slide lock assembly of FIG. 123 for a bio-film reactor element, in accordance with one or more embodiments of the disclosed subject matter. In FIG. 124, a slide lock slide receiving opening 3510 is formed in the slide lock portion 2930.

FIG. 125 is a top view of the slide lock assembly of FIG. 123 for a bio-film reactor element, in accordance with one or more embodiments of the disclosed subject matter.

FIG. 126 is an isometric view of the slide lock assembly of FIG. 123 for a bio-film reactor element, in accordance with one or more embodiments of the disclosed subject matter.

FIG. 127 is an exploded, isometric view of the slide lock assembly of FIG. 126 for a bio-film reactor element, in accordance with one or more embodiments of the disclosed subject matter.

In one embodiment, a wastewater treatment plant includes means for receiving a volume of wastewater; means for pretreating the wastewater; means for receiving the pretreated wastewater from the pretreating means; means for anoxically treating the treated wastewater; means for receiving the anoxically treated wastewater from the anoxically treating means; means for aerating the anoxically treated wastewater; means for receiving the aerated wastewater from the aerating means; means for settling the aerated wastewater; means for internally pumping sedimentation and settled wastewater from the settling means back to the anoxically treating means; means for mixing pumped sedimentation and settled wastewater with the treated wastewater in the anoxically treating means; and means for discharging an effluent wastewater from the settling means.

The one embodiment above can further include means for receiving the discharged effluent wastewater; means for filtering the effluent wastewater; means for treating the filtered effluent wastewater; and means for discharging a final effluent wastewater.

In one embodiment, a wastewater treatment plant includes a wastewater treatment tank including a top wall, a bottom wall, a front wall, a back wall, a left side wall and a right side wall, the front wall, the back wall, the left side wall and the right side wall being connected together along respective sides and at respective top ends around a bottom side perimeter of the top wall and at respective bottom ends to a top side perimeter of the bottom wall, and having a plurality of interior walls extending between the top, bottom, left side and right side walls and defining a plurality of chambers within the wastewater treatment tank. One of the plurality of chambers includes a pretreatment chamber having an inlet formed in and extending through a front wall of the pretreatment chamber and the inlet being positioned adjacent to a first side wall and a top end of the front wall of the pretreatment chamber, a pretreatment chamber outlet formed in and extending through a back wall of the pretreatment chamber and adjacent to an opposite side wall and a top end of the back wall of the pretreatment chamber, and a pretreatment chamber access opening formed in and extending through a top wall of the pretreatment chamber. Another of the plurality of chambers includes an anoxic chamber including an anoxic chamber inlet sealingly coupled to and configured for fluid communication with the pretreatment chamber via the pretreatment chamber outlet, an anoxic chamber outlet formed in and extending through a back wall of the anoxic chamber, the back wall being opposite the back wall of the pretreatment chamber. Yet another of the plurality of chambers includes an aeration chamber including an aeration chamber inlet sealingly coupled to and configured for fluid communication with the anoxic chamber via the anoxic chamber outlet, an aeration chamber outlet opening formed in and near a bottom of a back wall of the aeration chamber opposite the aeration chamber inlet, an aeration chamber access opening formed in and extending through a top wall of the aeration chamber, an aeration chamber riser mounted on the top wall of the aeration chamber and surrounding and covering the aeration chamber access opening, an air pump positioned above the aeration chamber access opening, and a diffusion bar positioned near a bottom of the aeration chamber and attached to and configured for fluid communication with the air pump. Still another of the plurality of chambers includes a clarification chamber including a clarification chamber inlet sealingly coupled to and configured for fluid communication with the aeration chamber via the aeration chamber outlet opening, a clarification chamber outlet opening formed in a back wall of the clarification chamber, a clarification chamber access opening being formed in and extending through a top wall of the clarification chamber, a pump located near the aeration chamber outlet and sealingly coupled to and configured for fluid communication with the anoxic chamber via a piping component, the piping component being connected at a first end of a first portion of the piping component to the pump and extending upwardly from the pump toward a top of the clarification chamber to and above the aeration chamber outlet opening and a back end of a second portion of the piping component being connected to, in fluid communication with and extending substantially perpendicularly and forwardly away from a top end of the first portion of the piping component and through a clarification chamber return opening formed in the aeration chamber back wall and in fluid communication with the aeration chamber, the second portion of the piping component extending from the back wall of the aeration chamber to and being connected at a front end to a sealed opening formed in and extending through the back wall of the anoxic chamber, a third portion of the piping component being connected at a back end to and in fluid communication with an anoxic chamber side of the sealed opening formed in the back wall of the anoxic chamber, the sealed opening being sealed to prevent fluid communication outside of the piping component and between the aeration and anoxic chambers, the third portion extending forwardly into the anoxic chamber from the anoxic chamber back wall and a front end of the third portion connecting to and in fluid communication with to a top end of a fourth piping component that extends substantially perpendicularly downwardly away from the third piping component toward the bottom of the anoxic chamber to connect to and being in fluid communication with a bottom end of the fourth portion to a mixing bar located adjacent to and substantially parallel with the bottom of the anoxic chamber.

In one embodiment, a wastewater treatment plant including means for receiving a volume of wastewater; means for pretreating the wastewater; means for receiving the pretreated wastewater from the pretreating means; means for anoxically treating the pretreated wastewater; means for receiving the anoxically treated wastewater from the anoxically treating means; means for aerating the anoxically treated wastewater; means for receiving the aerated wastewater from the aerating means; means for settling the aerated wastewater; means for internally pumping sedimentation and settled wastewater from the settling means back to the anoxically treating means; means for mixing pumped sedimentation and settled wastewater with the pretreated wastewater in the anoxically treating means; and means for discharging an effluent wastewater from the settling means.

In one embodiment, a wastewater treatment plant including means for receiving a volume of wastewater; means for pretreating the wastewater; means for receiving the pretreated wastewater from the pretreating means; means for anoxically treating the pretreated wastewater; means for receiving the anoxically treated wastewater from the anoxically treating means; means for aerating the anoxically treated wastewater; means for receiving the aerated wastewater from the aerating means; means for settling the aerated wastewater; means for internally pumping sedimentation and settled wastewater from the settling means back to the anoxically treating means; means for mixing pumped sedimentation and settled wastewater with the pretreated wastewater in the anoxically treating means; means for discharging an effluent wastewater from the settling means; means for receiving the discharged effluent wastewater; means for filtering the effluent wastewater; means for treating the filtered effluent wastewater; and means for discharging a final effluent wastewater.

In one embodiment, a wastewater treatment tank including a top wall, a bottom wall, a front wall, a back wall, a left side wall and a right side wall, the front wall, the back wall, the left side wall and the right side wall being connected together along respective sides and at respective top ends around a bottom side perimeter of the top wall and at respective bottom ends to a top side perimeter of the bottom wall, and having a plurality of interior walls extending between the top, bottom, left side and right side walls and defining a plurality of chambers within the wastewater treatment tank, the plurality of chambers including a pretreatment chamber having an inlet formed in and extending through a front wall of the pretreatment chamber and the inlet being positioned adjacent to a first side wall and a top end of the front wall of the pretreatment chamber, a pretreatment chamber outlet formed in and extending through a back wall of the pretreatment chamber and adjacent to an opposite side wall and a top end of the back wall of the pretreatment chamber, and a pretreatment chamber access opening formed in and extending through a top wall of the pretreatment chamber, a pretreatment chamber riser mounted on the top wall of the pretreatment chamber and surrounding and covering the pretreatment chamber access opening; an anoxic chamber including an anoxic chamber inlet sealingly coupled to and configured for fluid communication with the pretreatment chamber via the pretreatment chamber outlet, an anoxic chamber outlet formed in and extending through a back wall of the anoxic chamber, the back wall being opposite the back wall of the pretreatment chamber, an anoxic chamber riser mounted on the top wall of the anoxic chamber and surrounding and covering the anoxic chamber access opening, a sealable opening formed in and extending through the back wall of the anoxic chamber and into an aeration chamber and configured for fluid communication there through; the aeration chamber including an aeration chamber inlet sealingly coupled to and configured for fluid communication with the anoxic chamber via the anoxic chamber outlet, an aeration chamber outlet opening formed in and near a bottom center of a back wall of the aeration chamber opposite the aeration chamber inlet, an aeration chamber access opening formed in and extending through a top wall of the aeration chamber, an aeration chamber riser mounted on the top wall of the aeration chamber and surrounding and covering the aeration chamber access opening, an air pump positioned above the aeration chamber access opening, and a diffusion bar positioned near a bottom of the aeration chamber and attached to and configured for fluid communication with the air pump; and a clarification chamber including a clarification chamber inlet opening formed in and near a bottom of a front wall of the clarification chamber and sealingly coupled to and configured for fluid communication with the aeration chamber via the aeration chamber outlet opening, a clarification chamber outlet opening formed in a back wall of the clarification chamber, a clarification chamber access opening being formed in and extending through a top wall of the clarification chamber, a clarification chamber riser mounted on the top wall of the clarification chamber and surrounding and covering the clarification chamber access opening, a pump located near the clarification chamber inlet and sealingly coupled to and configured for fluid communication with the anoxic chamber via an internal piping component, the internal piping component being connected at a first end of a first portion of the piping component to an output of the pump and extending upwardly away from the pump toward a top of the clarification chamber to and above the aeration chamber inlet opening, a back end of a second portion of the piping component being connected to a top end of the first portion of the piping component and the second portion of the piping component being in fluid communication with and extending substantially perpendicularly and forwardly away from the top end of the first portion of the piping component and through a clarification chamber return opening formed in the aeration chamber back wall and in fluid communication with the aeration chamber, the second portion of the piping component extending from the back wall of the aeration chamber to and being connected in the aeration chamber at a front end to a back end of the sealable opening formed in and extending through the back wall of the anoxic chamber, a third portion of the piping component being connected at a back end to and in fluid communication with an anoxic chamber side of the sealed opening formed in the back wall of the anoxic chamber, the sealed opening being sealed to prevent fluid communication outside of the piping component and between the aeration and anoxic chambers, the third portion extending forwardly into the anoxic chamber from the anoxic chamber back wall and a front end of the third portion connecting to and in fluid communication with to a top end of a fourth piping component that extends substantially perpendicularly downwardly away from the third piping component toward the bottom of the anoxic chamber to connect to and being in fluid communication with a bottom end of the fourth portion to a mixing bar located adjacent to and substantially parallel with the bottom of the anoxic chamber.

In another embodiment, a wastewater treatment plant includes a wastewater treatment system including a first component with four separate and connected chambers to permit fluid communication between the chambers, the first component including an inlet opening formed in a front wall and extending into the first component and being in fluid communication with an outlet opening formed in and extending through and out of a back wall, a first chamber including a first chamber front wall through which the inlet opening is formed and in fluid communication with an inlet opening and an inside of the first chamber, an outlet opening formed through a back wall of the first chamber and in fluid communication with an inlet opening and an inside of the second chamber, an outlet opening formed through a back wall of the second chamber and in fluid communication with an inlet opening and an inside of the third chamber, an outlet opening formed through a back wall of the fourth chamber and in fluid communication with an outside of the fourth chamber, the inlet opening of the first chamber being at a height that is greater than the outlet opening of the first chamber, the inlet opening of the second chamber being at a height that is greater than the outlet opening of the second chamber, the inlet opening of the third chamber being at a height that is greater than the outlet opening of the third chamber, the inlet opening of the fourth chamber being at a height that is less than the outlet opening of the fourth chamber, the second chamber including a mixing bar assembly positioned adjacent a bottom of the second chamber and in fluid communication with the fourth chamber via a sealable opening formed in and extending through the back wall of the second chamber and into the second chamber and configured for fluid communication there through, each of the chambers including an access opening formed through a top wall portion and each surrounded by a respective riser portion covered by a riser cover; an air pump connected via a piping component and in fluid communication with an air diffuser positioned adjacent a bottom of the third chamber; a sludge return pump positioned adjacent a bottom of the fourth chamber and connected via a sludge return piping component to and in fluid communication with the mixing bar in the second chamber; a flow equalization apparatus installed at a front end of the fourth chamber outlet opening, the flow equalization apparatus including an intake opening, at least one flow equalization port, at least one peak flow port located above the at least one flow equalization port, and at least one overflow port located above the at least one peak flow port; and a second component connected to and in fluid communication with the first component via an inlet pipe connected to the outlet pipe of the fourth chamber, the second component including an outlet opening formed in and extending through and out of a back wall of the second component, a fifth chamber including a fifth chamber front wall through which the inlet opening is formed and in fluid communication with the inlet opening and an influent side of the first chamber, an outlet opening formed in a bottom of a back wall of the influent side that is connected to and in fluid communication with an inlet opening of an adjacent effluent side of the fifth chamber, an outlet opening formed through a back wall of the fifth chamber and in fluid communication with an outside of the fifth chamber, a filtration bed filled with filtration media located between the inlet opening of the effluent side and the outlet opening formed through the back wall of the fifth chamber, the fifth chamber including an access opening formed through a top wall portion and surrounded by a fifth chamber riser portion that is covered by a riser cover.

In one embodiment, a wastewater treatment plant includes a wastewater treatment tank including a top wall, a bottom wall, a front wall, a back wall, a left side wall and a right side wall, the front wall, the back wall, the left side wall and the right side wall being connected together along respective sides and at respective top ends around a bottom side perimeter of the top wall and at respective bottom ends to a top side perimeter of the bottom wall, and having a plurality of interior walls extending between the top, bottom, left side and right side walls and defining a plurality of chambers within the wastewater treatment tank. One of the plurality of chambers includes a pretreatment chamber having an inlet formed in and extending through a front wall of the pretreatment chamber and the inlet being positioned adjacent to a first side wall and a top end of the front wall of the pretreatment chamber, a pretreatment chamber outlet formed in and extending through a back wall of the pretreatment chamber and adjacent to an opposite side wall and a top end of the back wall of the pretreatment chamber, and a pretreatment chamber access opening formed in and extending through a top wall of the pretreatment chamber. Another of the plurality of chambers includes an anoxic chamber including an anoxic chamber inlet sealingly coupled to and configured for fluid communication with the pretreatment chamber via the pretreatment chamber outlet, an anoxic chamber outlet formed in and extending through a back wall of the anoxic chamber, the back wall being opposite the back wall of the pretreatment chamber. Yet another of the plurality of chambers includes an aeration chamber including an aeration chamber inlet sealingly coupled to and configured for fluid communication with the anoxic chamber via the anoxic chamber outlet, an aeration chamber outlet opening formed in and near a bottom of a back wall of the aeration chamber opposite the aeration chamber inlet, an aeration chamber access opening formed in and extending through a top wall of the aeration chamber, an aeration chamber riser mounted on the top wall of the aeration chamber and surrounding and covering the aeration chamber access opening, an air pump positioned above the aeration chamber access opening, and a diffusion bar positioned near a bottom of the aeration chamber and attached to and configured for fluid communication with the air pump. Still another of the plurality of chambers includes a clarification chamber including a clarification chamber inlet sealingly coupled to and configured for fluid communication with the aeration chamber via the aeration chamber outlet opening, a clarification chamber outlet opening formed in a back wall of the clarification chamber, a clarification chamber access opening being formed in and extending through a top wall of the clarification chamber, a pump located near the aeration chamber outlet and sealingly coupled to and configured for fluid communication with the anoxic chamber via a piping component.

In another embodiment, a method of treating wastewater includes: receiving a volume of wastewater into a pretreatment chamber; pretreating the wastewater in the pretreatment chamber; receiving the treated wastewater from the pretreatment chamber in an anoxic chamber; anoxically treating the treated wastewater in the anoxic chamber; receiving the anoxically treated wastewater in an aeration chamber; aerating the anoxically treated wastewater in the aeration chamber; receiving the aerated wastewater in a clarification chamber; settling the aerated wastewater in the clarification chamber; returning sedimentation and settled wastewater from the clarification chamber to the anoxic chamber; mixing the returned sedimentation and settled wastewater with the treated wastewater in the anoxic chamber and anoxically treating the mixed wastewater in the anoxic chamber; and discharging effluent from the clarification chamber.

In yet another embodiment, a wastewater treatment plant includes means for receiving a volume of wastewater; means for pretreating the wastewater; means for receiving the pretreated wastewater from the pretreating means; means for anoxically treating the treated wastewater; means for receiving the anoxically treated wastewater from the anoxically treating means; means for aerating the anoxically treated wastewater; means for receiving the aerated wastewater from the aerating means; means for settling the aerated wastewater; means for pumping sedimentation and settled wastewater from the settling means back to the anoxically treating means; means for mixing pumped sedimentation and settled wastewater with the treated wastewater in the anoxically treating means; and means for discharging an effluent wastewater from the settling means.

In yet another embodiment, a wastewater treatment system includes a multi-chamber wastewater treatment tank including a top wall, a bottom wall, a front wall, a back wall, a left side wall and a right side wall, the front wall, the back wall, the left side wall and the right side wall being connected together along respective sides and at respective top ends around a bottom side perimeter of the top wall and at respective bottom ends to a top side perimeter of the bottom wall, and having a plurality of interior walls extending between the top, bottom, left side and right side walls and defining a pretreatment chamber at a first end, an anoxic chamber adjacent to the pretreatment chamber, an aeration chamber adjacent the anoxic chamber, and a clarification chamber adjacent to the aeration chamber; the pretreatment chamber having an inlet formed in and extending through a front wall of the pretreatment chamber and the inlet being positioned adjacent to a first side wall and a top end of the front wall of the pretreatment chamber, a pretreatment chamber outlet formed in and extending through a back wall of the pretreatment chamber and adjacent to a second side wall and a top end of the back wall of the pretreatment chamber, and at least one pretreatment chamber access opening formed in and extending through a top wall of the pretreatment chamber; the anoxic chamber including an anoxic chamber inlet sealingly coupled to and configured for fluid communication with the pretreatment chamber via the pretreatment chamber outlet, an anoxic chamber outlet formed in and extending through a back wall of the anoxic chamber, the anoxic chamber outlet being diagonally across from the anoxic chamber inlet, the back wall being opposite the back wall of the pretreatment chamber, and an anoxic chamber access opening formed in and extending through a top wall of the anoxic chamber, an anoxic chamber riser mounted on the top wall of the anoxic chamber and surrounding and covering the anoxic chamber access opening; the aeration chamber including an aeration chamber inlet sealingly coupled to and configured for fluid communication with the anoxic chamber via the anoxic chamber outlet, an aeration chamber outlet opening formed in and near a bottom of a back wall of the aeration chamber opposite the aeration chamber inlet, a first aeration chamber access opening formed in and extending through a top wall of the aeration chamber and adjacent a side wall opposite the aeration chamber inlet, an aeration chamber riser mounted on the top wall of the aeration chamber and surrounding and covering the first aeration chamber access opening, a second aeration chamber access opening formed in and extending through the top wall of the aeration chamber and substantially above the aeration chamber inlet, and an aeration system; and the clarification chamber including a clarification chamber inlet sealingly coupled to and configured for fluid communication with the aeration chamber via the aeration chamber outlet opening, a clarification chamber outlet opening formed in a back wall of the clarification chamber, a clarification chamber access opening being formed in and extending through a top wall of the clarification chamber, a clarification chamber riser mounted on the top wall of the clarification chamber and surrounding and covering the clarification chamber access opening, a lower portion of a back wall of the clarification chamber being angled downwardly and inwardly toward the back wall of the aeration chamber, and a clarification chamber outlet opening being formed in and extending through an upper portion of the back wall of the clarification chamber.

In yet another embodiment, a wastewater treatment system includes a multi-chamber wastewater treatment tank including a top wall, a bottom wall, a front wall, a back wall, a left side wall and a right side wall, the front wall, the back wall, the left side wall and the right side wall being connected together along respective sides and at respective top ends around a bottom side perimeter of the top wall and at respective bottom ends to a top side perimeter of the bottom wall, and having a plurality of interior walls extending between the top, bottom, left side and right side walls and defining a pretreatment chamber at a first end, an anoxic chamber adjacent to the pretreatment chamber, an aeration chamber adjacent the anoxic chamber, and a clarification chamber adjacent to the aeration chamber; the pretreatment chamber having an inlet formed in and extending through a front wall of the pretreatment chamber and the inlet being positioned adjacent to a first side wall and a top end of the front wall of the pretreatment chamber, a pretreatment chamber outlet formed in and extending through a back wall of the pretreatment chamber and adjacent to a second side wall and a top end of the back wall of the pretreatment chamber, and at least one pretreatment chamber access opening formed in and extending through a top wall of the pretreatment chamber; the anoxic chamber including an anoxic chamber inlet sealingly coupled to and configured for fluid communication with the pretreatment chamber via the pretreatment chamber outlet, an anoxic chamber outlet formed in and extending through a back wall of the anoxic chamber, the anoxic chamber outlet being diagonally across from the anoxic chamber inlet, the back wall being opposite the back wall of the pretreatment chamber, and an anoxic chamber access opening formed in and extending through a top wall of the anoxic chamber, an anoxic chamber riser mounted on the top wall of the anoxic chamber and surrounding and covering the anoxic chamber access opening; the aeration chamber including an aeration chamber inlet sealingly coupled to and configured for fluid communication with the anoxic chamber via the anoxic chamber outlet, an aeration chamber outlet opening formed in and near a bottom of a back wall of the aeration chamber opposite the aeration chamber inlet, a first aeration chamber access opening formed in and extending through a top wall of the aeration chamber and adjacent a side wall opposite the aeration chamber inlet, an aeration chamber riser mounted on the top wall of the aeration chamber and surrounding and covering the first aeration chamber access opening, a second aeration chamber access opening formed in and extending through the top wall of the aeration chamber and substantially above the aeration chamber inlet; the clarification chamber including a clarification chamber inlet sealingly coupled to and configured for fluid communication with the aeration chamber via the aeration chamber outlet opening, a clarification chamber outlet opening formed in a back wall of the aeration chamber, a clarification chamber access opening being formed in and extending through a top wall of the clarification chamber, a clarification chamber riser mounted on the top wall of the clarification chamber and surrounding and covering the clarification chamber access opening, a lower portion of a back wall of the clarification chamber being angled downwardly and inwardly toward the back wall of the aeration chamber, and a clarification chamber outlet opening being formed in and extending through an upper portion of the back wall of the clarification chamber; and a polishing chamber component including an influent well, an effluent well, an influent inlet defined in a back wall of the influent well and that is configured for fluid communication with the clarification chamber via the clarification chamber outlet, an effluent outlet defined in a front wall of the effluent well and that is configured for fluid communication with the outside of the effluent well, the polishing chamber including a filtration media filter component located below the influent inlet and the effluent outlet.

In another embodiment, a method of treating wastewater includes receiving a volume of wastewater; pretreating the wastewater; receiving the pretreated wastewater; anoxically treating the pretreated wastewater; receiving the anoxically treated wastewater; aerating the anoxically treated wastewater; receiving the aerated wastewater; settling the aerated wastewater; returning sedimentation and settled wastewater for further anoxic treatment; mixing the pumped sedimentation and settled wastewater with the pretreated wastewater and anoxically treated wastewater and further anoxically treating the mixed wastewater; and discharging effluent after settling.

In another embodiment, a method of treating wastewater includes pretreating a volume of wastewater in a pretreatment chamber; anoxically treating the pretreated wastewater in an anoxic chamber; aerating the anoxically treated wastewater in an aeration chamber; settling the aerated wastewater in a clarification chamber; returning sedimentation and settled wastewater from the clarification chamber to the anoxic chamber; mixing the pumped sedimentation and settled wastewater with the treated wastewater in the anoxic chamber and anoxically treating the mixed wastewater in the anoxic chamber; discharging effluent from the clarification chamber; filtering the effluent wastewater through a filtration media filter in a polishing chamber; treating the filtered effluent wastewater in the polishing chamber; and discharging a final treated effluent wastewater out an effluent outlet of the polishing chamber.

In yet another embodiment, a wastewater treatment plant includes a means for pretreating a volume of wastewater; means for anoxically treating the pretreated wastewater; means for aerating the anoxically treated wastewater; means for settling the aerated wastewater; means for returning sedimentation and settled wastewater from the settling means back to the anoxically treating means; means for mixing pumped sedimentation and settled wastewater with the treated wastewater in the anoxically treating means; and means for discharging an effluent wastewater from the settling means.

In yet another embodiment, a wastewater treatment plant includes a pretreatment chamber sealingly connected to and configured for fluid communication with a wastewater influent line, and the pretreatment chamber including an outlet line and a top wall access opening; an anoxic chamber sealingly connected to and configured for fluid communication with the pretreatment chamber outlet line and the anoxic chamber including an anoxic chamber outlet line and a mixing bar; an aeration chamber sealingly connected to and configured for fluid communication with the anoxic chamber outlet line and the aeration chamber including an aeration chamber outlet line and a diffusion bar positioned near a bottom of the aeration chamber and attached to and sealingly connected to and configured for fluid communication with an air pump; a clarification chamber sealingly connected to and configured for fluid communication with the aeration chamber outlet line and the clarification chamber including a clarification chamber outlet line and the clarification chamber sealingly connected to and configured for fluid communication with the mixing bar in the anoxic chamber; and a polishing chamber sealingly connected to and configured for fluid communication with the clarification chamber outlet line and the polishing chamber including a filtration component and a polishing chamber outlet line.

In still yet another embodiment, a wastewater treatment plant including a wastewater treatment tank including a top wall, a bottom wall, a front wall, a back wall, a left side wall and a right side wall, the front wall, the back wall, the left side wall and the right side wall being connected together along respective sides and at respective top ends around a bottom side perimeter of the top wall and at respective bottom ends to a top side perimeter of the bottom wall, and having a plurality of interior walls extending between the top, bottom, left side and right side walls and defining a plurality of chambers within the wastewater treatment tank. The plurality of chambers including: a pretreatment chamber having an inlet formed in and extending through a front wall of the pretreatment chamber and the inlet being positioned adjacent to a first side wall and a top end of the front wall of the pretreatment chamber, a pretreatment chamber outlet formed in and extending through a back wall of the pretreatment chamber and adjacent to an opposite side wall and a top end of the back wall of the pretreatment chamber, and a pretreatment chamber access opening formed in and extending through a top wall of the pretreatment chamber, a pretreatment chamber riser mounted on the top wall of the pretreatment chamber and surrounding and covering the pretreatment chamber access opening; an anoxic chamber including an anoxic chamber inlet sealingly coupled to and configured for fluid communication with the pretreatment chamber via the pretreatment chamber outlet, an anoxic chamber outlet formed in and extending through a back wall of the anoxic chamber, the back wall being opposite the back wall of the pretreatment chamber, an anoxic chamber riser mounted on the top wall of the anoxic chamber and surrounding and covering the anoxic chamber access opening, a sealable opening formed in and extending through the back wall of the anoxic chamber and into an aeration chamber and configured for fluid communication there through; an aeration chamber including an aeration chamber inlet sealingly coupled to and configured for fluid communication with the anoxic chamber via the anoxic chamber outlet, an aeration chamber outlet opening formed in and near a bottom center of a back wall of the aeration chamber opposite the aeration chamber inlet, an aeration chamber access opening formed in and extending through a top wall of the aeration chamber, an aeration chamber riser mounted on the top wall of the aeration chamber and surrounding and covering the aeration chamber access opening, an air pump connected to a diffusion bar positioned near a bottom of the aeration chamber and attached to and configured for fluid communication with the air pump; a clarification chamber including a clarification chamber inlet opening formed in and near a bottom of a front wall of the clarification chamber and sealingly coupled to and configured for fluid communication with the aeration chamber via the aeration chamber outlet opening, a clarification chamber outlet opening formed in a back wall of the clarification chamber, a clarification chamber access opening being formed in and extending through a top wall of the clarification chamber, a clarification chamber riser mounted on the top wall of the clarification chamber and surrounding and covering the clarification chamber access opening, a pump located near the clarification chamber inlet and sealingly coupled to and configured for fluid communication with the anoxic chamber via an internal piping component, the internal piping component being connected at a first end of a first portion of the piping component to an output of the pump and extending upwardly away from the pump toward a top of the clarification chamber to and above the aeration chamber inlet opening, a back end of a second portion of the piping component being connected to a top end of the first portion of the piping component and the second portion of the piping component being in fluid communication with and extending substantially perpendicularly and forwardly away from the top end of the first portion of the piping component and through a clarification chamber return opening formed in the aeration chamber back wall and in fluid communication with the aeration chamber, the second portion of the piping component extending from the back wall of the aeration chamber to and being connected in the aeration chamber at a front end to a back end of the sealable opening formed in and extending through the back wall of the anoxic chamber, a third portion of the piping component being connected at a back end to and in fluid communication with an anoxic chamber side of the sealed opening formed in the back wall of the anoxic chamber, the sealed opening being sealed to prevent fluid communication outside of the piping component and between the aeration and anoxic chambers, the third portion extending forwardly into the anoxic chamber from the anoxic chamber back wall and a front end of the third portion connecting to and in fluid communication with to a top end of a fourth piping component that extends substantially perpendicularly downwardly away from the third piping component toward the bottom of the anoxic chamber to connect to and being in fluid communication with a bottom end of the fourth portion to a mixing bar located adjacent to and substantially parallel with the bottom of the anoxic chamber; and a polishing chamber component including an influent well, an effluent well, at least one polishing chamber access opening being formed in and extending through a top wall of the polishing chamber, an influent inlet defined in a back wall of the influent well and that is configured for fluid communication with the clarification chamber via the clarification chamber outlet, an effluent outlet defined in a front wall of the effluent well and that is configured for fluid communication with the outside of the effluent well, the polishing chamber including a filtration media filter component located below the influent inlet and the effluent outlet and filled with a plurality of filtration media, and a polishing chamber riser mounted on the top wall of the polishing chamber and surrounding and covering the polishing chamber access opening.

In a further embodiment, a wastewater treatment plant as herein illustrated and described.

In a still further embodiment, a wastewater treatment means as herein illustrated and described.

While the invention(s) has/have been described in conjunction with a number of embodiments, it is evident that many alternatives, modifications and variations would be or are apparent to those of ordinary skill in the applicable arts. For example, different component designs and/or elements only shown in association with a particular embodiment also may be used with the other embodiments. Accordingly, Applicants intend to embrace all such alternatives, modifications, equivalents, and variations that are within the spirit and scope of the invention(s) described herein.

What is claimed is:

1. A wastewater treatment plant comprising:

a wastewater treatment tank including a top wall, a bottom wall, a front wall, a back wall, a left side wall and a right side wall, the front wall, the back wall, the left side wall and the right side wall being connected together along respective sides and at respective top ends around a bottom side perimeter of the top wall and at respective bottom ends to a top side perimeter of the bottom wall, and having a plurality of interior walls extending between the top, bottom, left side and right side walls and defining a plurality of chambers within the wastewater treatment tank, the plurality of chambers including a pretreatment chamber having an inlet formed in and extending through a front wall of the pretreatment chamber and the inlet being positioned adjacent to a first side wall and a top end of the front wall of the pretreatment chamber, a pretreatment chamber outlet formed in and extending through a back wall of the pretreatment chamber and adjacent to an opposite side wall and a top end of the back wall of the pretreatment chamber, and a pretreatment chamber access opening formed in and extending through a top wall of the pretreatment chamber, a pretreatment chamber riser mounted on the top wall of the pretreatment chamber and surrounding and covering the pretreatment chamber access opening;

an anoxic chamber including an anoxic chamber inlet sealingly coupled to and configured for fluid communication with the pretreatment chamber via the pretreatment chamber outlet, an anoxic chamber outlet formed in and extending through a back wall of the anoxic chamber, the back wall being opposite the back wall of the pretreatment chamber, an anoxic chamber riser mounted on the top wall of the anoxic chamber and surrounding and covering the anoxic chamber access opening, a sealable opening formed in and extending through the back wall of the anoxic chamber and into an aeration chamber and configured for fluid communication there through;

the aeration chamber including an aeration chamber inlet sealingly coupled to and configured for fluid communication with the anoxic chamber via the anoxic chamber outlet, an aeration chamber outlet opening formed in and near a bottom center of a back wall of the aeration chamber opposite the aeration chamber inlet, an aeration chamber access opening formed in and extending through a top wall of the aeration chamber, an aeration chamber riser mounted on the top wall of the aeration chamber and surrounding and covering the aeration chamber access opening, an air pump positioned above the aeration chamber access opening, and a diffusion bar positioned near a bottom of the aeration chamber and attached to and configured for fluid communication with the air pump via an air supply pipe system, the air supply pipe system including a flexible pipe component connected to the diffusion bar; and a clarification chamber including a clarification chamber inlet opening formed in and near a bottom of a front wall of the clarification chamber and sealingly coupled to and configured for fluid communication with the aeration chamber via the aeration chamber outlet opening, a clarification chamber outlet opening formed in a back wall of the clarification chamber, a clarification chamber access opening being formed in and extending through a top wall of the clarification chamber, a clarification chamber riser mounted on the top wall of the clarification chamber and surrounding and covering the clarification chamber access opening, a pump located near the clarification chamber inlet and sealingly coupled to and configured for fluid communication with the anoxic chamber via an internal piping component, the internal piping component being connected at a first end of a first portion of the piping component to an output of the pump and extending upwardly away from the pump toward a top of the clarification chamber to and above the aeration chamber inlet opening, a back end of a second portion of the piping component being connected to a top end of the first portion of the piping component and the second portion of the piping component being in fluid communication with and extending substantially perpendicularly and forwardly away from the top end of the first portion of the piping component and through a clarification chamber return opening formed in the aeration chamber back wall and in fluid communication with the aeration chamber, the second portion of the piping component extending from the back wall of the aeration chamber to and being connected in the aeration chamber at a front end to a back end of the sealable opening formed in and extending through the back wall of the anoxic chamber, a third portion of the piping component being connected at a back end to and in fluid communication with an anoxic chamber side of the sealed opening formed in the back wall of the anoxic chamber, the sealed opening being sealed to prevent fluid communication outside of the piping component and between the aeration and anoxic chambers, the third portion extending forwardly into the anoxic chamber from the anoxic chamber back wall and a front end of the third portion connecting to and in fluid communication with to a top end of a fourth piping component that extends substantially perpendicularly downwardly away from the third piping component toward the bottom of the anoxic chamber to connect to and being in fluid communication with a bottom end of the fourth portion to a mixing bar located adjacent to and substantially parallel with the bottom of the anoxic chamber, the fourth portion being made of a second flexible pipe component.

2. The wastewater treatment plant of claim 1, wherein the sealed opening is a cast-in-place coupler that is sealingly connected around at least a contiguous portion of its outside surface to an inside surface of the sealed opening to form a fluid-tight seal between the two surfaces.

3. The wastewater treatment plant of claim 2 further comprising:

a polishing chamber component including an influent well, an effluent well, an influent inlet defined in a back wall of the influent well and that is configured for fluid communication with the clarification chamber via the clarification chamber outlet, an effluent outlet defined in a front wall of the effluent well and that is configured for fluid communication with the outside of the effluent well, the polishing chamber including a filtration media filter component located below the influent inlet and the effluent outlet, and a polishing chamber riser mounted on the top wall of the polishing chamber and surrounding and covering the polishing chamber access opening.

4. The wastewater treatment plant of claim 3 wherein the diffusion bar comprises:

a plurality of openings extending through opposite sides of the diffusion bar at an angle below a plane extending horizontal with a longitudinal axis of the diffusion bar.

5. The wastewater treatment plant of claim 4 wherein the mixing bar comprises:

at least four openings extending through a single side of the mixing bar at an angle below a plane extending horizontal with a longitudinal axis of the mixing bar.

6. The wastewater treatment plant of claim 5 further comprising:

a discharge baffle positioned in and extending vertically downward from the pretreatment chamber outlet and into the pretreatment chamber.

7. The wastewater treatment plant of claim 6, wherein the filtrations media filter component comprises at least one filtration bed.

8. The wastewater treatment plant of claim 7 wherein the at least one filtration bed comprises:

a substantially rectangular frame filled with a filtration media.

9. The wastewater treatment plant of claim 8 further comprising:

a flow equalization apparatus installed in the clarification chamber outlet opening.

10. The wastewater treatment plant of claim 9 wherein the flow equalization apparatus comprises:

an intake opening, at least one flow equalization port, and at least one peak flow port located above the at least one flow equalization port.

11. The wastewater treatment plant of claim 10 wherein the flow equalization apparatus further comprises:

at least one overflow port located above the at least one peak flow port.

12. A wastewater treatment plant comprising:

means for receiving a volume of wastewater;

means for pretreating the wastewater;

means for receiving the pretreated wastewater from and being sealing coupled to and configured for fluid communication with the pretreating means;

means for anoxically treating the pretreated wastewater being sealing coupled to and configured for fluid communication with the pretreated wastewater receiving means;

means for receiving the anoxically treated wastewater from and being sealingly coupled to and configured for fluid communication with the anoxically treating means;

means for aerating the anoxically treated wastewater being sealingly coupled to and configured fro communication with the anoxically treated wastewater receiving means and the anoxically treated wastewater aerating means being aerated from a bottom of the anoxically treated wastewater aerating means;

means for receiving the aerated wastewater from the aerating means;

means for settling the aerated wastewater;

means for internally pumping sedimentation and settled wastewater from the settling means back to the anoxically treating means;

means for mixing pumped sedimentation and settled wastewater with the pretreated wastewater in the anoxically treating means; and means for discharging an effluent wastewater from the settling means.

13. The wastewater treatment plant of claim 12 further comprising:

means for receiving the discharged effluent wastewater;

means for filtering the effluent wastewater;

means for treating the filtered effluent wastewater; and means for discharging a final effluent wastewater.

14. The wastewater treatment plant of claim 12 wherein the means for treating the wastewater comprises:

a pretreatment chamber.

15. The wastewater treatment plant of claim 12 wherein the means for anoxically treating the treated wastewater comprises:

an anoxic chamber;

a mixing bar disposed adjacent a bottom of the anoxic chamber and connected to and configured for fluid communication with the means for internally pumping sedimentation and settled wastewater; and a plurality of incubated de-nitrification bacteria.

16. The wastewater treatment plant of claim 12 wherein the means for aerating the anoxically treated wastewater comprises:

an aeration chamber;

an air pump; and a diffusion bar disposed adjacent a bottom of the aeration chamber and connected to and configured for fluid communication with the air pump.

17. The wastewater treatment plant of claim 12 wherein the means for settling the aerated wastewater comprises:

a clarification chamber.

18. The wastewater treatment plant of claim 17 wherein the means for pumping sedimentation and settled wastewater for further anoxic treatment comprises:

a pump located adjacent a bottom wall in the clarification chamber and the pump is configured for fluid communication with the mixing bar in the anoxic chamber via an internal piping component.

19. The wastewater treatment plant of claim 12 wherein the means for filtering the effluent wastewater comprises at least one of:

gravel;

plastic elements;

natural elements;

synthetic elements;

rubber elements;

ceramic elements; and

Styrofoam elements.

20. The wastewater treatment plant of claim 19 wherein the means for treating the filtered effluent wastewater comprises at least one of:

a UV light;

a chlorination system;

a de-chlorination system;

a phosphorus removal system;

a heavy metal removal system; and a nitrogen/nitrate removal system.

21. The wastewater treatment plant of claim 12 wherein means for discharging an effluent wastewater from the settled aerated wastewater comprises:

a flow equalization apparatus.

22. The wastewater treatment plant of claim 21 wherein the flow equalization apparatus comprises:

an intake opening, at least one flow equalization port, at least one sustained flow port located above the at least one flow equalization port, and at least one overflow flow port located above the at least one sustained flow port.

23. A wastewater treatment system comprising:

a first component with four separate and connected chambers to permit fluid communication between the chambers, the first component including an inlet opening formed in a front wall and extending into the first component and being in fluid communication with an outlet opening formed in and extending through and out of a back wall, a first chamber including a first chamber front wall through which the inlet opening is formed and in fluid communication with an inlet opening and an inside of the first chamber, an outlet opening formed through a back wall of the first chamber and in fluid communication with an inlet opening and an inside of the second chamber, an outlet opening formed through a back wall of the second chamber and in fluid communication with an inlet opening and an inside of the third chamber, an outlet opening formed through a back wall of the fourth chamber and in fluid communication with an outside of the fourth chamber, the inlet opening of the first chamber being at a height that is greater than the outlet opening of the first chamber, the inlet opening of the second chamber being at a height that is greater than the outlet opening of the second chamber, the inlet opening of the third chamber being at a height that is greater than the outlet opening of the third chamber, the inlet opening of the fourth chamber being at a height that is less than the outlet opening of the fourth chamber, the second chamber including a mixing bar assembly positioned adjacent a bottom of the second chamber and in fluid communication with the fourth chamber via a sealable opening formed in and extending through the back wall of the second chamber and into the second chamber and configured for fluid communication there through, each of the chambers including an access opening formed through a top wall portion and each surrounded by a respective riser portion covered by a riser cover;

an air pump connected via a piping component and in fluid communication with an air diffuser positioned adjacent a bottom of the third chamber;

a sludge return pump positioned adjacent a bottom of the fourth chamber and connected via a sludge return piping component to and in fluid communication with the mixing bar in the second chamber;

a flow equalization apparatus installed at a front end of the fourth chamber outlet opening, the flow equalization apparatus including an intake opening, at least one flow equalization port, at least one peak flow port located above the at least one flow equalization port, and at least one overflow port located above the at least one peak flow port; and a second component connected to and in fluid communication with the first component via an inlet pipe connected to the outlet pipe of the fourth chamber, the second component including an outlet opening formed in and extending through and out of a back wall of the second component, a fifth chamber including a fifth chamber front wall through which the inlet opening is formed and in fluid communication with the inlet opening and an influent side of the first chamber, an outlet opening formed in a bottom of a back wall of the influent side that is connected to and in fluid communication with an inlet opening of an adjacent effluent side of the fifth chamber, an outlet opening formed through a back wall of the fifth chamber and in fluid communication with an outside of the fifth chamber, a filtration bed filled with filtration media located between the inlet opening of the effluent side and the outlet opening formed through the back wall of the fifth chamber, the fifth chamber including an access opening formed through a top wall portion and surrounded by a fifth chamber riser portion that is covered by a riser cover.

24. The wastewater treatment plant of claim 23 wherein the first component comprises:

a single unit made of concrete.

25. The wastewater treatment plant of claim 24 wherein the second component comprises:

a single unit made of concrete with two filtration beds.

26. The wastewater treatment plant of claim 24 wherein the second component comprises:

a single unit made of concrete with a single filtration bed.

27. The wastewater treatment plant of claim 24 wherein the second component comprises:

a single unit made of plastic with at least one filtration bed.

28. The wastewater treatment plant of claim 24 wherein the first component comprises:

four units made of plastic.

29. The wastewater treatment plant of claim 28 wherein the second component comprises:

a single unit made of plastic with at least one filtration bed.

30. The wastewater treatment plant of claim 23 wherein the filtration media comprises at least one of:

gravel;
plastic elements;
natural elements;
synthetic elements;
rubber elements;
ceramic elements; and
Styrofoam elements.

31. The wastewater treatment plant of claim 23 further comprising means for treating the filtered effluent wastewater that comprises at least one of:

a UV light;
a chlorination system;
a de-chlorination system;
a phosphorus removal system;
a heavy metal removal system; and
a nitrogen/nitrate removal system.

32. A wastewater treatment plant comprising:

a wastewater treatment tank including a top wall, a bottom wall, a front wall, a back wall, a left side wall and a right side wall, the front wall, the back wall, the left side wall and the right side wall being connected together along respective sides and at respective top ends around a bottom side perimeter of the top wall and at respective bottom ends to a top side perimeter of the bottom wall, and having a plurality of interior walls extending between the top, bottom, left side and right side walls and defining a plurality of chambers within the wastewater treatment tank, the plurality of chambers including a pretreatment chamber having an inlet formed in and extending through a front wall of the pretreatment chamber and the inlet being positioned adjacent to a first side wall and a top end of the front wall of the pretreatment chamber, a pretreatment chamber outlet formed in and extending through a back wall of the pretreatment chamber and adjacent to an opposite side wall and a top end of the back wall of the pretreatment chamber, and a pretreatment chamber access opening formed in and extending through a top wall of the pretreatment chamber, a pretreatment chamber riser mounted on the top wall of the pretreatment chamber and surrounding and covering the pretreatment chamber access opening;

an anoxic chamber including an anoxic chamber inlet sealingly coupled to and configured for fluid communication with the pretreatment chamber via the pretreatment chamber outlet, an anoxic chamber outlet formed in and extending through a back wall of the anoxic chamber, the back wall being opposite the back wall of the pretreatment chamber, an anoxic chamber riser mounted on the top wall of the anoxic chamber and surrounding and covering the anoxic chamber access opening, a sealable opening formed in and extending through the back wall of the anoxic chamber and into an aeration chamber and configured for fluid communication there through;

an aeration chamber including an aeration chamber inlet sealingly coupled to and configured for fluid communication with the anoxic chamber via the anoxic chamber outlet, an aeration chamber outlet opening formed in and near a bottom center of a back wall of the aeration chamber opposite the aeration chamber inlet, an aeration chamber access opening formed in and extending through a top wall of the aeration chamber, an aeration chamber riser mounted on the top wall of the aeration chamber and surrounding and covering the aeration chamber access opening, an air pump connected to a diffusion bar positioned near a bottom of the aeration chamber and attached to and configured for fluid communication with the air pump;

a clarification chamber including a clarification chamber inlet opening formed in and near a bottom of a front wall of the clarification chamber and sealingly coupled to and configured for fluid communication with the aeration chamber via the aeration chamber outlet opening, a clarification chamber outlet opening formed in a back wall of the clarification chamber, a clarification chamber access opening being formed in and extending through a top wall of the clarification chamber, a clarification chamber riser mounted on the top wall of the clarification chamber and surrounding and covering the clarification chamber access opening, a pump located near the clarification chamber inlet and sealingly coupled to and configured for fluid communication with the anoxic chamber via an internal piping component, the internal piping component being connected at a first end of a first portion of the piping component to an output of the pump and extending upwardly away from the pump toward a top of the clarification chamber to and above the aeration chamber inlet opening, a back end of a second portion of the piping component being connected to a top end of the first portion of the piping component and the second portion of the piping component being in fluid communication with and extending substantially perpendicularly and forwardly away from the top end of the first portion of the piping component and through a clarification chamber return opening formed in the aeration chamber back wall and in fluid communication with the aeration chamber, the second portion of the piping component extending from the back wall of the aeration chamber to and being connected in the aeration chamber at a front end to a back end of the sealable opening formed in and extending through the back wall of the anoxic chamber, a third portion of the piping component being connected at a back end to and in fluid communication with an anoxic chamber side of the sealed opening formed in the back wall of the anoxic chamber, the sealed opening being sealed to prevent fluid communication outside of the piping component and between the aeration and anoxic chambers, the third portion extending forwardly into the anoxic chamber from the anoxic chamber back wall and a front end of the third portion connecting to and in fluid communication with to a top end of a fourth piping component that extends substantially perpendicularly downwardly away from the third piping component toward the bottom of the anoxic chamber to connect to and being in fluid communication with a bottom end of the fourth portion to a mixing bar located adjacent to and substantially parallel with the bottom of the anoxic chamber; and a polishing chamber component including an influent well, an effluent well, at least one polishing chamber access opening being formed in and extending through a top wall of the polishing chamber, an influent inlet defined in a back wall of the influent well and that is configured for fluid communication with the clarification chamber via the clarification chamber outlet, an effluent outlet defined in a front wall of the effluent well and that is configured for fluid communication with the outside of the effluent well, the polishing chamber including a filtration media filter component located below the influent inlet and the effluent outlet and filled with a plurality of filtration media, and a polishing chamber riser mounted on the top wall of the polishing chamber and surrounding and covering the polishing chamber access opening.

33. The wastewater treatment plant of claim 32, wherein the sealed opening is a cast-in-place coupler that is sealingly connected around at least a contiguous portion of its outside surface to an inside surface of the sealed opening to form a fluid-tight seal between the two surfaces.

34. The wastewater treatment plant of claim 33 further comprising:

an external control center electrically and communicatively connected to the wastewater treatment plant and configured to monitor conditions in and control the operation of the wastewater treatment plant.

35. The wastewater treatment plant of claim 34 wherein the diffusion bar comprises:

a plurality of openings extending through opposite sides of the diffusion bar at an angle below a plane extending horizontal with a longitudinal axis of the diffusion bar.

36. The wastewater treatment plant of claim 35 wherein the mixing bar comprises:

at least four openings extending through a single side of the mixing bar at an angle below a plane extending horizontal with a longitudinal axis of the mixing bar.

37. The wastewater treatment plant of claim 36 further comprising:

a discharge baffle positioned in and extending vertically downward from the pretreatment chamber outlet and into the pretreatment chamber.

38. The wastewater treatment plant of claim 37, wherein the filtrations media filter component comprises at least one filtration bed.

39. The wastewater treatment plant of claim 38 wherein the at least one filtration bed comprises:

a substantially rectangular frame filled with a filtration media.

40. The wastewater treatment plant of claim 39 further comprising:

a flow equalization apparatus installed in the clarification chamber outlet opening.

41. The wastewater treatment plant of claim 40 wherein the flow equalization apparatus comprises:

an intake opening, at least one flow equalization port, and at least one peak flow port located above the at least one flow equalization port.

42. The wastewater treatment plant of claim 41 wherein the flow equalization apparatus further comprises:

at least one overflow port located above the at least one peak flow port.

43. The wastewater treatment plant of claim 34 wherein the external control center includes at least one preset and a plurality of adjustable recirculation cycles for the pump in the clarification chamber.

44. The wastewater treatment plant of claim 43 wherein the external control center includes a predetermined number of automatic restart attempts for the pump in the clarification chamber before an alarm is triggered.

45. The wastewater treatment plant of claim 43 wherein the external control center includes a plurality of auxiliary inputs.

46. The wastewater treatment plant of claim 45 wherein the plurality of auxiliary inputs include inputs for at least one piece of sterilization equipment, one or more pumps, one or more water level floats and one or more alarms.

47. The wastewater treatment plant of claim 43 wherein the external control center is communicatively connected to a monitoring center via landlines or by a wireless communication system.

48. The wastewater treatment plant of claim 47 wherein the external control center performance and/or status can be monitored by the monitoring center.

49. The wastewater treatment plant of claim 43 wherein the external control center includes a plurality of auxiliary inputs.

50. The wastewater treatment plant of claim 49 wherein the plurality of auxiliary inputs includes at least a high and low current alarm and an aerator pressure.

51. The wastewater treatment plant of claim 32 wherein the air pump is directly mounted in the riser of the aeration chamber.

52. The wastewater treatment plant of claim 32 wherein the air pump is mounted externally to the riser of the aeration chamber.

53. The wastewater treatment plant of claim 52 wherein the air pump is mounted up to 75 feet away from the aeration chamber.

54. The wastewater treatment plant of claim 32 wherein the second component comprises:

a single unit made of concrete with two filtration beds.

55. The wastewater treatment plant of claim 32 wherein the second component comprises:

a single unit made of concrete with a single filtration bed.

56. The wastewater treatment plant of claim 32 wherein the second component comprises:

a single unit made of plastic with at least one filtration bed.

57. The wastewater treatment plant of claim 32 wherein the first component comprises:

four units made of plastic.

58. The wastewater treatment plant of claim 57 wherein the second component comprises:

a single unit made of plastic with at least one filtration bed.

59. The wastewater treatment plant of claim 32 wherein the filtration media comprises at least one of:

gravel;
plastic elements;
natural elements;
synthetic elements;
rubber elements;
ceramic elements; and
Styrofoam elements.

60. The wastewater treatment plant of claim 32 further comprising means for treating the filtered effluent wastewater that comprises at least one of:

a UV light;
a chlorination system;
a de-chlorination system;
a phosphorus removal system;
a heavy metal removal system; and
a nitrogen/nitrate removal system.

61. The apparatus of claim 32 further comprising:

a flat ledge component in the polishing chamber component configured to receive a bio-film reactor element and direct waste water flow through the bio-film reactor element.

62. The apparatus of claim 61 wherein the flat ledge component is formed by a plurality of standoffs on the back wall, on a left side wall and on a right side wall and a portion of the back side wall of the middle wall.

63. The apparatus of claim 62 wherein the bio-film reactor is positioned on and fastened to the flat ledge component by a pair of slide lock assemblies.

64. The apparatus of claim 63 wherein the reactor element comprises:

a substantially rectangular enclosure having a top surface, a bottom surface opposite the top surface, a back surface extending between and connected to a back edge of each of the top surface and the bottom surface, a front surface opposite the back surface and extending between and connected to a front edge of each of the top surface and the bottom surface; a right side surface extending between and connected to a right edge of each of the top surface and the bottom surface, a left side surface opposite the right side surface and extending between and connected to a left edge of each of the top surface and the bottom surface, the top surface having formed therein a lid, and a plurality of openings formed in each of the surfaces of the reactor to provide a grate-like appearance and to permit the free-flow of waste water up and through the reactor element;

a plurality of substantially identical media elements contained within the substantially rectangular enclosure; and a pair of locking mechanisms with one connected on opposite sides of and in approximately a center of the bio-film reactor.

65. The apparatus of claim 64 wherein the plurality of substantially identical media members comprise a media unit with an open, conical disk-shaped body with uniform substantially rectangular window openings formed in and substantially evenly spaced around a side of the disk-shaped body, a top internal "X"-shaped cross piece connected in a center of the X"-shaped cross piece to a central post that has a height substantially equal to a height of the disk-shaped body, and below the top internal "X"-shaped cross piece is a bottom internal "X"-shaped cross piece that is connected to the central post, but is offset from the top internal "X"-shaped cross piece by about 45 degrees and a circular ring having a diameter about one half of the disk-shaped body is centered around the central post and connected to the bottom internal "X" shaped cross piece.

66. The apparatus of claim 65 wherein the media elements comprise a plurality of attached growth medias.

67. The apparatus of claim 65 wherein the media elements comprise a plurality of 2A media elements.

68. The apparatus of claim 62 wherein each of the pair of slide lock assemblies comprises a sliding portion cooperatively connected to a stationary portion and the sliding portion configured to extend through and away from the stationary portion and an end of each of the sliding portions is configured to fixedly engage a recess in a wall of the polishing chamber component.

69. The apparatus of claim 32 wherein the air supply pipe system includes a flexible pipe component at a distal end connected to the diffuser bar.

70. The apparatus of claim 32 wherein the sludge return pipe system includes a flexible pipe section at a distal end connected to the mixing bar.

71. The apparatus of claim 32 wherein the sludge return pipe system includes a check valve connected between a distal end of the sludge return pipe and the sludge return pump.

72. The wastewater treatment plant of claim 32 further comprising:

an external control center electrically and communicatively connected to the wastewater treatment plant and configured to monitor conditions in and control the operation of the wastewater treatment plant, and a telemetry system communicatively connected to a monitoring center and configured to report system information and receive control instructions.

73. The wastewater treatment plant of claim 72 wherein the telemetry system is communicatively connected to the monitoring center by at least one of the internet, wireless and land lines.

74. The wastewater treatment plant of claim 73 wherein the telemetry system is configured to periodically communicatively connect to the monitoring center and report system information.

75. The wastewater treatment plant of claim 74 wherein the telemetry system is configured to communicatively connect to the monitoring center and report system information based on at least one predetermined interval.

76. The wastewater treatment plant of claim 75 wherein the at least one predetermined interval is at least as frequently as every 60 seconds.

77. The wastewater treatment plant of claim 32 wherein the wastewater treatment plant can operate at a rate of from around about 333 gallons per day to around about 1,500 gallons per day.

78. The wastewater treatment plant of claim 32 wherein the first component comprises:

a single unit made of concrete.

* * * * *